United States Patent
Ge et al.

(10) Patent No.: US 12,498,758 B2
(45) Date of Patent: Dec. 16, 2025

(54) ELECTRONIC DEVICE AND INFORMATION DISPLAY METHOD APPLICABLE TO SAME, AND MEDIUM

(71) Applicant: Honor Device Co., Ltd., Shenzhen (CN)

(72) Inventors: Feng Ge, Shenzhen (CN); Xiao Han, Shenzhen (CN); Wenying Bao, Shenzhen (CN); Taolin Zhang, Shenzhen (CN); Duo Xu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 230 days.

(21) Appl. No.: 18/263,784

(22) PCT Filed: Jan. 5, 2023

(86) PCT No.: PCT/CN2023/070718
§ 371 (c)(1),
(2) Date: Aug. 1, 2023

(87) PCT Pub. No.: WO2023/131243
PCT Pub. Date: Jul. 13, 2023

(65) Prior Publication Data
US 2024/0015238 A1    Jan. 11, 2024

(30) Foreign Application Priority Data

Jan. 10, 2022   (CN) .......................... 202210022460.9

(51) Int. Cl.
*H04M 1/02* (2006.01)

(52) U.S. Cl.
CPC ....... *H04M 1/0243* (2013.01); *H04M 1/0214* (2013.01); *H04M 1/0268* (2013.01); *H04M 2201/42* (2013.01)

(58) Field of Classification Search
CPC ...... G06F 3/048; G06F 3/0482; G06F 3/0483; G06F 3/04842; G06F 3/0485; G06F 3/0487; G06F 3/0488; G06F 3/04883
See application file for complete search history.

(56) References Cited

U.S. PATENT DOCUMENTS 9,152,371 B2 * 10/2015 Sirpal .................. G06F 3/1446
9,684,342 B2 *  6/2017 Kim .................... G06F 3/04883
(Continued)

FOREIGN PATENT DOCUMENTS

| CN | 110647731 A | 1/2020 |
| CN | 110673694 A | 1/2020 |

(Continued)

*Primary Examiner* — Patrick F Marinelli
(74) *Attorney, Agent, or Firm* — Conley Rose, P.C.

(57) ABSTRACT

An electronic device and an information display method. The electronic device includes a first screen and a second screen. The first screen is larger than the second screen. The first screen is a foldable screen. The method includes: detecting a first operation when a plurality of cards are displayed on the second screen in a stacked manner; and displaying, on the first screen in response to the first operation, the plurality of cards displayed on the second screen. A first part of cards and a second part of cards among the plurality of cards are displayed in different positions on the first screen.

20 Claims, 79 Drawing Sheets

(56) References Cited

U.S. PATENT DOCUMENTS

| | | | | |
|---|---|---|---|---|
| 10,133,310 B2* | 11/2018 | Kim | | G06F 3/147 |
| 10,318,106 B2* | 6/2019 | Sirpal | | G06F 3/0482 |
| 10,606,469 B2* | 3/2020 | Jiang | | G06F 3/0481 |
| 11,061,543 B1* | 7/2021 | Blatz | | G06F 3/0482 |
| 11,126,223 B2* | 9/2021 | Seo | | G06F 1/1652 |
| 11,137,904 B1* | 10/2021 | Tyler | | G06F 3/04845 |
| 11,188,202 B2* | 11/2021 | Tyler | | G06F 3/04883 |
| 11,409,488 B2 | 8/2022 | Kwon et al. | | |
| 11,416,127 B2* | 8/2022 | Tyler | | G06F 3/0488 |
| 11,455,085 B2* | 9/2022 | Tyler | | G06F 3/0482 |
| 11,474,674 B2* | 10/2022 | Tyler | | G06F 3/0488 |
| 11,762,538 B2* | 9/2023 | Tyler | | G06F 3/0486 715/825 |
| 11,921,993 B2* | 3/2024 | Tyler | | G06F 3/0484 |
| 12,056,334 B2* | 8/2024 | Tyler | | G06F 3/0486 |
| 12,056,340 B2* | 8/2024 | Sonnino | | G06F 3/04883 |
| 12,099,857 B2* | 9/2024 | Ding | | G06Q 10/02 |
| 12,223,160 B2* | 2/2025 | Huang | | G06F 3/04842 |
| 12,248,723 B2* | 3/2025 | Lee | | G06F 1/1647 |
| 12,265,748 B2* | 4/2025 | Lee | | G06F 1/1652 |
| 12,292,810 B2* | 5/2025 | Li | | G06F 3/0484 |
| 12,350,587 B2* | 7/2025 | Ganschow | | H04N 21/4662 |
| 12,353,896 B2* | 7/2025 | Chen | | G06F 9/542 |
| 2015/0268851 A1* | 9/2015 | Sirpal | | G06F 3/017 715/771 |
| 2016/0004393 A1* | 1/2016 | Faaborg | | G06F 3/0482 715/765 |
| 2016/0132074 A1* | 5/2016 | Kim | | G06F 1/1652 345/173 |
| 2016/0253086 A1* | 9/2016 | Jiang | | G06F 3/04842 715/790 |
| 2019/0294315 A1* | 9/2019 | Sirpal | | G06F 3/04817 |
| 2020/0333834 A1* | 10/2020 | Seo | | G09G 5/391 |
| 2021/0286480 A1* | 9/2021 | Tyler | | G06F 3/0486 |
| 2021/0286487 A1* | 9/2021 | Tyler | | G06F 3/0482 |
| 2021/0286488 A1* | 9/2021 | Tyler | | G06F 3/0486 |
| 2021/0286489 A1* | 9/2021 | Tyler | | G06F 3/0485 |
| 2021/0286509 A1* | 9/2021 | Tyler | | G06F 3/04883 |
| 2021/0286510 A1* | 9/2021 | Tyler | | G06F 3/0484 |
| 2022/0365645 A1* | 11/2022 | Tyler | | G06F 3/0486 |
| 2023/0079981 A1* | 3/2023 | Tyler | | G06F 3/0486 715/762 |
| 2023/0097857 A1* | 3/2023 | Huang | | G06F 3/0483 715/765 |
| 2024/0015238 A1* | 1/2024 | Ge | | H04M 1/0268 |
| 2024/0103888 A1* | 3/2024 | Ding | | G06F 9/451 |
| 2024/0126572 A1* | 4/2024 | Chen | | G06F 3/0486 |
| 2024/0211117 A1* | 6/2024 | Tyler | | G06F 3/0484 |
| 2024/0281112 A1* | 8/2024 | Zhang | | G06F 3/0483 |
| 2024/0288989 A1* | 8/2024 | Ren | | G06F 9/451 |
| 2025/0238126 A1* | 7/2025 | Shen | | G06F 3/0483 |

FOREIGN PATENT DOCUMENTS

| | | |
|---|---|---|
| CN | 111124326 A | 5/2020 |
| CN | 111580601 A | 8/2020 |
| EP | 2207076 A2 | 7/2010 |

\* cited by examiner

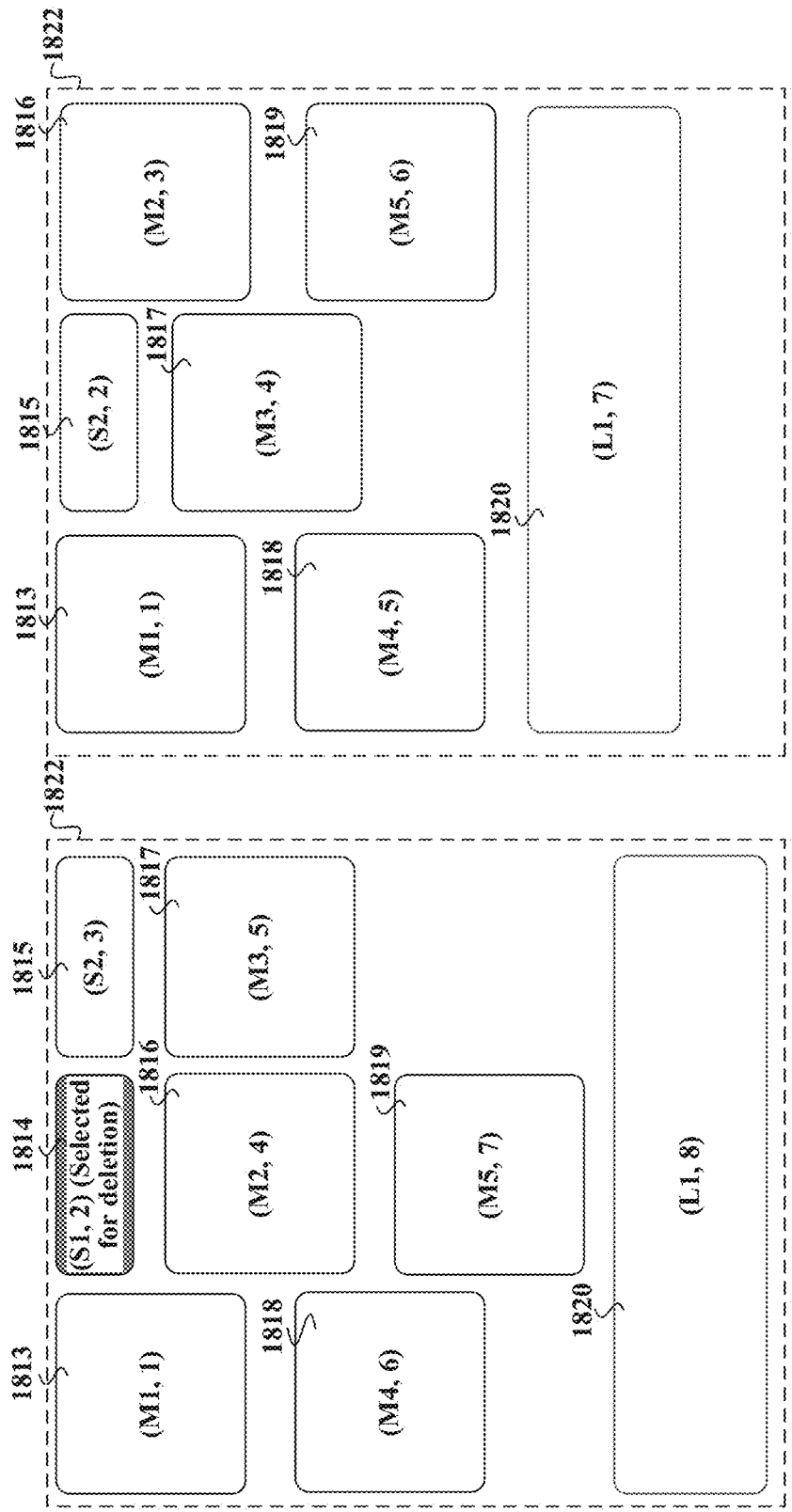

ELECTRONIC DEVICE AND INFORMATION DISPLAY METHOD APPLICABLE TO SAME, AND MEDIUM

CROSS-REFERENCE TO RELATED APPLICATIONS

This is a U.S. National Stage of International Application No. PCT/CN2023/070718 filed on Jan. 5, 2023, which claims priority to Chinese Patent Application No. 202210022460.9, filed with the China National Intellectual Property Administration on Jan. 10, 2022, both of which are incorporated herein by reference in their entireties.

TECHNICAL FIELD

This application relates to image processing technology, and in particular, to an electronic device and an information display method applicable to same, and a medium.

BACKGROUND

An electronic device that supports a foldable screen is increasingly popular. With the foldable screen, a user can switch between an outer screen and an inner screen of the electronic device so that a home screen of the electronic device can be displayed on the outer screen and the inner screen separately. However, because the outer screen and the inner screen differ in dimensions or ratio, the elements displayed on the home screen of the electronic device are inconsistent between the outer screen and the inner screen, thereby impairing user experience.

SUMMARY

This application provides an electronic device and an information display method applicable to same, and a medium.

According to a first aspect, an embodiment of this application provides an information display method, applied to an electronic device. The electronic device includes a first screen and a second screen. The first screen is larger than the second screen. The first screen is a foldable screen. The method includes:
  detecting a first operation when a plurality of cards are displayed on the second screen in a stacked manner; and
  displaying, on the first screen in response to the first operation, the plurality of cards displayed on the second screen, where a first part of cards and a second part of cards among the plurality of cards are displayed in different positions on the first screen.

In some embodiments of this application, when a user uses a large-sized inner screen of the electronic device, the inner screen of the electronic device can display more cards. The plurality of cards may be ranked in order of priority when being displayed. After the user has adjusted the order or a plurality of cards are adjusted automatically based on priority, when the user folds the inner screen and uses the outer screen instead, the finally adjusted cards can be displayed on the outer screen, thereby improving user experience.

In this embodiment of this application, the cards, the first part of cards, and the second part of cards may be cards or display boxes. Understandably, a user interface of the first screen of the electronic device may further include a plurality of the first part of cards and the second part of cards.

Further, understandably, the user interface that includes the first part of cards and the second part of cards may be a main screen or another home screen such as a leftmost home screen, without being limited herein.

In a possible implementation of the first aspect, the first screen is a foldable screen. The first screen is in a folded state when the plurality of cards are displayed on the second screen in a stacked manner. The folded state means that an angle between a first sub-screen and a second sub-screen of the first screen is smaller than a first preset angle.

In this embodiment of this application, the first screen may be an inner screen of the electronic device, that is, a screen that can be unfolded and folded; and the second screen may be an outer screen of the electronic device. The first sub-screen and the second sub-screen of the first screen may be two display regions of the first screen. The first sub-screen and the second sub-screen may be axisymmetric to each other. The folded state here may mean that the first screen does not display the user interface of the electronic device. That the angle between the first sub-screen and the second sub-screen is smaller than a first preset angle may mean that the first screen does not display the user interface of the electronic device after the first screen is folded to such an extent that the angle between the first sub-screen and the second sub-screen reaches the first preset angle.

In a possible implementation of the first aspect, the first operation is an operation to unfold an angle between a first sub-screen and a second sub-screen of the first screen to an angle larger than a first preset angle.

In this embodiment of this application, the first operation may be understood as an operation to unfold the first screen of the electronic device. To be specific, after the first screen is unfolded to such an extent that the angle between the first sub-screen and the second sub-screen reaches the first preset angle, the first screen displays the user interface of the electronic device.

In a possible implementation of the first aspect, when the first screen is in an unfolded state, the first screen is disposed opposite to the second screen, and the first screen and the second screen are located on different sides of the electronic device.

In this embodiment of this application, the first part of cards and the second part of cards are used for displaying at least one of the data generated by an application of the electronic device or the data subscribed by the electronic device, such as schedule, flight information, and climate clock. Understandably, a card may display the data corresponding to an event automatically arranged by the electronic device without user operation, for example, a weather event generated in a weather forecast application. The application may be a system application of the electronic device, or a third-party application, or a microservice registered by the electronic device through a cloud server.

In a possible implementation of the first aspect, the first part of cards includes a first card. The first card may be a Climate Clock card.

The displaying a plurality of cards on the second screen in a stacked manner includes:
  displaying the plurality of cards on the second screen in a stacked manner based on a preset condition, where the preset condition is priority of the plurality of cards; and
  displaying the second part of cards on the first screen in a stacked manner based on the priority.

In this embodiment of this application, when the electronic device displays the first part of cards on the second screen, a first card in the first part of cards may be displayed based on a display rule applicable to the second screen. Understandably, the display rule of the second screen may be: to display a plurality of cards in the first part of cards based on the order of priority between a plurality of cards in the first part of cards. Understandably, the order of priority between a plurality of cards may include: priority of time information or location information included in a plurality of cards. The priority here may also be referred to as order of priority. The electronic device may further change the rank order of a plurality of cards based on the order of priority between the cards, and can display a current card of interest to the user. Therefore, the method provided in this embodiment of this application can effectively help the user follow the card of interest, thereby improving user experience.

In this embodiment of this application, when the electronic device displays the first part of cards on the second screen, if the electronic device detects a touch operation on the first part of cards, the electronic device may switch from the first card to the second card. To be specific, the electronic device can change the order of a plurality of cards in response to a user operation, and can display the current content of interest to the user. Therefore, the method provided in this embodiment of this application can effectively help the user follow the content of the cards, thereby improving user experience.

In a possible implementation of the first aspect, the method further includes:
  receiving the first operation on the plurality of cards displayed on the second screen, and displaying a second card other than a card of top priority among the plurality of cards on a first layer in response to the first operation; and
  displaying the second card on the first layer when the second part of cards is displayed on the first screen in a stacked manner.

In this embodiment of this application, on the first screen of the electronic device, the first part of cards may be displayed in parallel with the second part of cards. The second part of cards may be a card set formed by stacking a plurality of cards. A first card in the first part of cards may a Climate Clock card. A second card in the second part of cards may be a Scheduler card. The Scheduler card here may be a card of higher priority in a card set corresponding to the second part of cards.

In this embodiment of this application, the touch operation on the second part of cards may be understood as a user operation to change a card in the second part of cards displayed on the first screen of the electronic device. For example, the second operation may be understood as a user operation of swiping the second part of cards down.

In a possible implementation of the first aspect, the method further includes:
  detecting a second operation; and
  displaying, on the second screen in response to the second operation, the first part of cards and second part of cards displayed on the first screen.

The first part of cards and the second part of cards among the plurality of cards are displayed in an identical position on the second screen in a stacked manner based on priority.

In this embodiment of this application, the second operation may be understood as an operation performed by user to fold the first screen of the electronic device. In this case, the second screen of the electronic device displays the home screen.

In a possible implementation of the first aspect, the method further includes:
  detecting a second operation; and
  displaying, on the second screen in response to the second operation, the first part of cards and second part of cards displayed on the first screen, where the first part of cards and the second part of cards among the plurality of cards are displayed in an identical position on the second screen in a stacked manner, and the second card or the first card is displayed on the first layer.

In this embodiment of this application, if the electronic device detects a folding operation on the first screen when the first screen displays the second part of cards, the second screen displays the first part of cards and the second part of cards that are stacked. For example, for a Scheduler card displayed in the second part of cards displayed on the first screen of the electronic device, after the user folds the first screen, the electronic device displays the Scheduler card on the second screen. To be specific, after the user folds the first screen such as an inner screen of the electronic device, the electronic device can continue to display, on the second screen such as the outer screen, the Scheduler card displayed in the second part of cards on the first screen. In other words, even if the user folds the first screen, the electronic device can still continue to display, on the second screen, the card of top priority among a plurality of cards, and can display the current card of interest to the user. Therefore, the method provided in this embodiment of this application can effectively help the user follow the content of the card, thereby improving user experience.

In a possible implementation of the first aspect, the method further includes:
  receiving a third operation on the second part of cards,
  displaying a third card on the first layer of the second part of cards in response to the third operation;
  detecting a second operation; and
  displaying, on the second screen in response to the second operation, the first part of cards and second part of cards displayed on the first screen, where the first part of cards and the second part of cards among the plurality of cards are displayed in an identical position on the second screen in a stacked manner, and the third card is displayed on the first layer.

In this embodiment of this application, the third operation may be: switching from a second card in the second part of cards to a third card if the electronic device detects a touch operation on the second part of cards when the electronic device displays the second part of cards. For example, the third operation may be: switching from a Scheduler card to a Flight Info card. To be specific, the electronic device can change the order of a plurality of cards in the second part of cards in response to a user operation, and can display the current content of interest to the user. Therefore, the method provided in this embodiment of this application can effectively help the user follow the content of the cards, thereby improving user experience.

In a possible implementation of the first aspect, the second operation is an operation to fold an angle between a first sub-screen and a second sub-screen of the first screen to an angle smaller than a second preset angle.

In this embodiment of this application, if a swipe left operation on the third card is detected when the first screen of the electronic device displays the third card, the electronic device deletes the third card and displays the second card instead. For example, the electronic device deletes the Flight Info card and displays the Scheduler card instead. In other words, the electronic device can delete the second card in response to the user operation, and can remove the content of no interest and display the current content of interest to the user instead. Therefore, the method provided in this embodiment of this application can effectively help the user follow the content of the cards, thereby improving user experience.

In this embodiment of this application, in response to a touch operation on the second part of cards, the first screen displays an operation region. The operation region includes at least a first button, a second button, and a third button.

In this embodiment of this application, in response to a touch operation on the first button in the operation region, the first screen displays the third card after the second card.

In this embodiment of this application, in response to a touch operation on the second button in the operation region, the first screen removes the second part of cards and retains the first part of cards.

In this embodiment of this application, in response to a touch operation on the third button in the operation region, the first screen opens a first window. The first window is used for editing the second card.

In this embodiment of this application, if a touch operation on the second card is detected when the second card in the second part of cards is displayed, the electronic device displays an operation region. The operation region may include a first button, a second button, and a third button that are used for setting the second card. In this way, the method provided in this embodiment of this application can provide a function that enables the user to modify a card, and help the user change the display content of the card, thereby improving user experience.

In this embodiment of this application, if a tap operation on the first button in the operation region is detected when the second card in the second part of cards is displayed, the electronic device deletes the second card and displays the third card, for example, deletes the Scheduler card and displays the Flight Info card. In this way, the method provided in this embodiment of this application can provide a function that enables the user to modify a card, and help the user change the display content of the card, thereby improving user experience.

In this embodiment of this application, if a tap operation on the second button in the operation region is detected when the third card in the second part of cards is displayed, the electronic device deletes the second part of cards, for example, deletes the entire card set that includes the Scheduler card and the Flight Info card, and retains the Climate Clock card. In this way, the method provided in this embodiment of this application can provide a function that enables the user to modify a card, and help the user change the display content of the card, thereby improving user experience.

In this embodiment of this application, if a tap operation on the third button in the operation region is detected when the second card in the second part of cards is displayed, the electronic device displays an edit page of the second card. For example, the first screen of the electronic device starts YOYO Smart Assistant so that the second card is edited through the YOYO Smart Assistant. In this way, the method provided in this embodiment of this application can provide a function that enables the user to modify a card, and help the user change the display content of the card, thereby improving user experience.

In this embodiment of this application, if it is detected that a hidden third card meets a preset condition when the second card in the second part of cards is displayed, the electronic device displays the third card in the second part of cards. In this way, the method provided in this embodiment of this application can automatically switch the display content of the card, and help the user follow the display content of the card in time, thereby improving user experience.

In a possible implementation of the first aspect, the priority of the plurality of cards depends on a result of comparison between time information or location information included in the plurality of cards and current time information or current location information of the electronic device.

In this embodiment of this application, the plurality of cards may be a first card, a second card, and a third card. The result of comparison between the time information of an included event and the current time information of the electronic device may be: it is determined that a difference between the occurrence time of the event included in the first card, the second card, and the third card and the current time of the electronic device is less than a preset threshold. For example, the events included in the third card may include a meeting, the occurrence time of the meeting is 8:30, and the current time of the electronic device is 8:20, and therefore, if the preset threshold is 10 minutes, the first screen of the electronic device displays the third card in the second part of cards.

In a possible implementation of the first aspect, the preset condition is a rank order preset for the plurality of cards during creation or modification of the plurality of cards.

In this embodiment of this application, the electronic device may display the first card, the second card, and the third card based on the rank order of the first card, the second card, and the third card. The rank order is set by the user during creation or setting of the first card, the second card, and the third card. For example, by means of the YOYO Smart Assistant application on the electronic device, the user may set the first card, the second card, and the third card to be arranged in the order from the first card to the second card and the third card successively.

According to a second aspect, an embodiment of this application provides an information display method, applied to an electronic device. The electronic device includes a first screen and a second screen. The first screen is larger than the second screen. The first screen is a foldable screen. The method includes:
  detecting a first operation when a first card is displayed on the second screen, where the first card is used for displaying a first multimedia file in an album of the electronic device; and
  displaying, on the first screen in response to the first operation, a second card corresponding to the first card, where the second card displays the first multimedia file and a second multimedia file.

In some embodiments of this application, the display manner of the content in the card may be adjusted based on each different screen of the electronic device. If the currently used screen of the electronic device is an outer screen, the electronic device may display a single multimedia file such as a picture or video in a card of the outer screen. After the user unfolds the inner screen of the electronic device, the electronic device may adjust, based on the dimensions or ratio of the inner screen versus the outer screen of the foldable screen, the number of multimedia files that can be displayed in the card on the inner screen.

In a possible implementation of the second aspect, the first screen is a foldable screen. The first screen is in a folded state when the first card is displayed on the second screen. The folded state means that an angle between a first sub-screen and a second sub-screen of the first screen is smaller than a first preset angle.

In this embodiment of this application, the first screen may be an inner screen of the electronic device, that is, a screen that can be unfolded and folded; and the second screen may be an outer screen of the electronic device. The first sub-screen and the second sub-screen of the first screen may be two display regions of the first screen. The first sub-screen and the second sub-screen may be axisymmetric to each other. The folded state here may mean that the first screen does not display the user interface of the electronic device. That the angle between the first sub-screen and the second sub-screen is smaller than a first preset angle may mean that the first screen does not display the user interface of the electronic device after the first screen is folded to such an extent that the angle between the first sub-screen and the second sub-screen reaches the first preset angle.

In a possible implementation of the second aspect, the first operation is an operation to unfold an angle between a first sub-screen and a second sub-screen of the first screen to an angle larger than a first preset angle.

In this embodiment of this application, the first operation may be understood as an operation to unfold the first screen of the electronic device. To be specific, after the first screen is unfolded to such an extent that the angle between the first sub-screen and the second sub-screen reaches the first preset angle, the first screen displays the user interface of the electronic device.

In a possible implementation of the second aspect, when the first screen is in an unfolded state, the first screen is disposed opposite to the second screen, and the first screen and the second screen are located on different sides of the electronic device.

In this embodiment of this application, the first card or the second card may be understood as a card or a display box. Understandably, the user interface that includes the first card may be a main screen or another home screen such as a leftmost home screen, without being limited herein.

In this embodiment of this application, the first card or the second card is used for displaying at least one of: a picture determined in an album of the electronic device, or a video determined in a video library of the electronic device. For example, the first card or the second card may be used for displaying a "Smart Selection" gallery or a "Designated Album" gallery.

In this embodiment of this application, if a touch operation on the first card is detected when the first card displays a first multimedia file, the electronic device displays an edit page of the first multimedia file. For example, when the first multimedia file is a picture, the electronic device may open a gallery application to display the first multimedia file.

In a possible implementation of the second aspect, before the detecting a first operation, the method further includes: displaying the second multimedia file in the first card after a preset time segment.

In this embodiment of this application, after a preset time segment, the first card may display the second multimedia file after displaying the first multimedia file. The preset time segment may be preset. For example, the preset time segment may be 20 seconds. After 20 seconds, the file displayed in the first card switches from the first multimedia file to the second multimedia file.

In a possible implementation of the second aspect, the second multimedia file is a file in the album, and creation time of the file is earlier than that of the first multimedia file; or the second multimedia file is a file displayed after the first multimedia file among a plurality of multimedia files recommended by the electronic device.

In this embodiment of this application, the first multimedia file and the second multimedia file may include time information. The second multimedia file may be a file created later than the first multimedia file in the electronic device. For example, the first multimedia file and the second multimedia file may be two pictures shot successively by the electronic device. The first multimedia file and the second multimedia file may further include arrangement information. The second multimedia file may be a file arranged after the first multimedia file in the electronic device. For example, the user may set the second multimedia file to be displayed after the first multimedia file.

In a possible implementation of the second aspect, the first multimedia file is a first picture. The second multimedia file is a second picture. The second card displays a third picture obtained by stitching the first picture and the second picture. A first region in the third picture displays the first picture. A second region in the third picture displays the second picture.

The method further includes:
displaying a first interface in response to a received operation on the first region, where the first interface is an interface of a gallery application, and the first interface includes the first picture; and
displaying a second interface in response to a received operation on the second region, where the second interface is an interface of the gallery application, and the second interface includes the second picture.

In this embodiment of this application, on the first screen of the electronic device, the first picture and the second picture in the second card may be displayed vertically or horizontally alongside to form a third picture. The operation on the first picture or the second picture may be understood as an operation to start an application on the first screen of the electronic device, and the application is used for displaying the first picture or the second picture. For example, the operation may be understood as a tap operation performed by the user on the first picture or the second picture.

In this embodiment of this application, if a touch operation on the first picture or the second picture is detected when the second card displays the first picture or the second picture, the electronic device displays a detailed interface of a gallery application that includes the first picture or the second picture.

In a possible implementation of the second aspect, the first multimedia file is a fourth picture in a group of pictures recommended by the electronic device. The second multimedia file is a fifth picture in the group of pictures recommended by the electronic device. The second card displays a sixth picture obtained by stitching the fourth picture and the fifth picture. A first region in the sixth picture displays the fourth picture, and a second region in the sixth picture displays the fifth picture.

The method further includes:
displaying a third interface in response to an operation on any position in the sixth picture, where the third interface is an interface of a gallery application, and the third interface includes a player control; and
playing the group of pictures in form of video frames in response to the operation on the player control.

In this embodiment of this application, on the first screen of the electronic device, the fourth picture and the fifth picture in the second card may be displayed vertically or horizontally alongside to form a sixth picture. The fourth picture and the fifth picture may be two pictures included in moment pictures or moment videos stored in the electronic device. Understandably, the moment pictures or moment videos may be a group of pictures to be played in the form of video frames in the gallery application of the electronic device. The operation on the fourth picture or the fifth picture may be understood as an operation to start an application on the first screen of the electronic device, and the application is used for playing the moment pictures or moment videos that, in each case, include the fourth picture and the fifth picture. For example, the operation may be understood as a tap operation performed by the user on the fourth picture or the fifth picture.

In this embodiment of this application, if a touch operation on the fourth picture or the fifth picture is detected when the second card displays the fourth picture or the fifth picture, the electronic device opens a detailed interface of a player application used for playing the moment pictures or moment videos that, in each case, include the fourth picture and the fifth picture.

In a possible implementation of the second aspect, the method further includes: displaying the second multimedia file and a third multimedia file in the second card after a preset time segment.

In this embodiment of this application, after a preset time segment, the second card may display the second multimedia file and the third multimedia file after displaying the first multimedia file and the second multimedia file. The preset time segment may be preset. For example, the preset time segment may be 20 seconds. After 20 seconds, the files displayed in the first card switch from the first multimedia file and the second multimedia file to the second multimedia file and the third multimedia file.

In a possible implementation of the second aspect, when the second card displays the first multimedia file and the second multimedia file, the method further includes:
  detecting a second operation; and
  displaying the first card on the second screen in response to the second operation, where the first card displays the third multimedia file.

In a possible implementation of the second aspect, the second operation is an operation to fold an angle between a first sub-screen and a second sub-screen of the first screen to an angle smaller than a second preset angle.

In this embodiment of this application, the second operation may be understood as an operation performed by user to fold the first screen of the electronic device. In this case, the second screen of the electronic device displays the home screen.

In this embodiment of this application, if an operation of folding the first screen is detected when the first screen displays the second multimedia file and the third multimedia file simultaneously through the second card, the electronic device displays the third multimedia file through the first card of the second screen. After the user folds the first screen such as the inner screen of the electronic device, the electronic device may display, on the second screen such as the outer screen, the third multimedia file in the changed second card in the first screen. In other words, the electronic device can continue to display the latest displayed third multimedia file on the second screen, thereby keeping continuity of the content displayed in the card.

In this embodiment of this application, when the second card displays the first multimedia file and the second multimedia file, the method further includes: displaying, by the first screen, a second window in response to a touch operation on the first multimedia file and the second multimedia file, where the second window is used for displaying or editing the first multimedia file and the second multimedia file.

In a possible implementation of the second aspect, when the second screen displays the first card, the method further includes:
  displaying the first multimedia file in a first region of the first card in the second screen; and
  displaying the second multimedia file in a second region of the first card in response to a touch operation on the first card.

In this embodiment of this application, the first region and the second region may be display regions occupied on the second screen by the first multimedia file and the second multimedia file in the first card. The first region and the second region may be arranged horizontally or vertically.

In this embodiment of this application, the touch operation on the first card may be understood as a user operation on a border of the first card. For example, the operation may be understood as a drag operation performed by the user on a right border of the first card.

In this embodiment of this application, if a touch operation on the first card is detected when the first card displays a first multimedia file, the electronic device expands the first card so that the first card displays the first multimedia file and the second multimedia file simultaneously. For example, when the user drags the right border of the first card rightward, the first card may expand rightward to display the first multimedia file and the second multimedia file simultaneously.

In a possible implementation of the second aspect, the first multimedia file is displayed in a first region of the first card on the second screen in response to a touch operation on the first card.

In this embodiment of this application, the touch operation on the first card may be understood as a user operation on a border of the first card. For example, the operation may be understood as a drag operation performed by the user on a right border of the first card.

In this embodiment of this application, if a touch operation on the first card is detected when the first card displays a first multimedia file and a second multimedia file, the electronic device shrinks the first card so that the first card shrinks to display the first multimedia file. For example, when the user drags the right border of the first card leftward, the first card may shrink leftward to display the first multimedia file.

In a possible implementation of the second aspect, the second multimedia file is displayed in a second region of the first card on the second screen in response to a touch operation on the first card.

In this embodiment of this application, the touch operation on the first card may be understood as a user operation on a border of the first card. For example, the operation may be understood as a drag operation performed by the user on a left border of the first card.

In this embodiment of this application, if a touch operation on the first card is detected when the first card displays a first multimedia file and a second multimedia file simultaneously, the electronic device shrinks the first card so that the first card displays the second multimedia file. For example, when the user drags the left border of the first card rightward, the first card may shrink rightward to display the second multimedia file.

In a possible implementation of the second aspect, the first screen displays a second card corresponding to the first card, and the method further includes:

displaying the first multimedia file in a third region of the second card on the first screen, and displaying the second multimedia file in a fourth region of the second card; and displaying the first multimedia file in the third region of the second card on the first screen in response to a touch operation on the second card.

In this embodiment of this application, the third region and the fourth region may be display regions occupied on the first screen by the first multimedia file and the second multimedia file in the second card. The third region and the fourth region may be arranged horizontally or vertically.

In this embodiment of this application, the touch operation on the second card may be understood as a user operation on a border of the second card. For example, the operation may be understood as a drag operation performed by the user on a right border of the second card.

In this embodiment of this application, if a touch operation on the second card is detected when the second card displays a first multimedia file and a second multimedia file, the electronic device shrinks the second card so that the second card shrinks to display the first multimedia file. For example, when the user drags the right border of the second card leftward, the first card may shrink leftward to display the first multimedia file.

In a possible implementation of the second aspect, the second multimedia file is displayed in a fourth region of the second card on the first screen in response to a touch operation on the second card.

In this embodiment of this application, the touch operation on the second card may be understood as a user operation on a border of the second card. For example, the operation may be understood as a drag operation performed by the user on a left border of the second card.

In this embodiment of this application, if a touch operation on the second card is detected when the second card displays a first multimedia file and a second multimedia file simultaneously, the electronic device shrinks the second card so that the second card displays the second multimedia file. For example, when the user drags the left border of the second card rightward, the second card may shrink rightward to display the second multimedia file.

According to a third aspect, an embodiment of this application provides an information display method, applied to an electronic device. The electronic device includes a first screen and a second screen. The first screen is larger than the second screen. The method includes:

displaying a plurality of cards on a leftmost home screen of the second screen, where the plurality of cards are arranged in two columns;

detecting a first operation; and displaying, on the first screen in response to the first operation, the plurality of cards displayed on the second screen, where the plurality of cards are arranged in three columns on the first screen.

In this embodiment of this application, the leftmost home screen may display a plurality of cards, in the leftmost home screen of the second screen, the cards may be displayed in two columns and a plurality of rows. In the leftmost home screen of the first screen, the cards may be displayed in three columns and a plurality of rows. The cards may be arranged based on a sorting rule.

In a possible implementation of the third aspect, the method includes:

displaying, on the leftmost home screen of the second screen, a first interface that includes at least a first region, a second region, and a third region, where the first region and the second region are arranged in sequence from left to right, and the third region is arranged under the first region;

detecting a first operation;

displaying a second interface on the leftmost home screen of the first screen in response to the first operation, where a first region, a second region, and a third region in the second interface are arranged in sequence from left to right;

the first region, the second region, and the third region display a first card, a second card, and a third card respectively; and receiving a drag operation on the first card, controlling the first card to move toward the third card, and, arranging, when the first card and the third card meet a first condition, the first card in the third region, controlling the second card to move toward the first region, and controlling the third card to move toward the second region.

In a possible implementation of the third aspect, the first screen is a foldable screen. The first screen is in a folded state when the leftmost home screen of the second screen displays a second interface that includes at least the first region, the second region, and the third region. The folded state means that an angle between a first sub-screen and a second sub-screen of the first screen is smaller than a first preset angle.

In a possible implementation of the third aspect, the first operation is an operation to unfold an angle between a first sub-screen and a second sub-screen of the first screen to an angle larger than a first preset angle.

In a possible implementation of the third aspect, when the first screen is in an unfolded state, the first screen is disposed opposite to the second screen, and the first screen and the second screen are located on different sides of the electronic device.

In this embodiment of this application, when the cards are arranged at the same height on the leftmost home screen, the cards are arranged from left to right. When the cards are arranged at different heights on the leftmost home screen, the cards are arranged from left to right and from top to bottom. The electronic device ensures that the cards displayed in a card region of the leftmost home screen of the inner screen are arranged in an orderly manner, and ensures that a card ranked ahead is displayed first, thereby utilizing the display resources efficiently.

In a possible implementation of the third aspect, that the first card and the third card meet a first condition includes: a center point of the first card coincides with any point in the third card.

In a possible implementation of the third aspect, the method includes:

displaying a first interface on the leftmost home screen of the first screen, where the first interface includes a first region, a second region, a third region, and a fourth region, where the first region, the second region, and the third region are arranged in order from left to right, the fourth region is located under the first region; the first region, the second region, and the third region display the first card, the second card, and the third card respectively; the first card, the second card, and the third card are of a first dimension; the fourth region displays a fourth card of a second dimension; and the second dimension is larger than the first dimension;

controlling, in response to a first drag operation on the fourth card, the fourth card to move toward the first card, the second card, and the third card; and arranging the fourth card in the first region, the second region, and the third region if the fourth card, the first card, the second card, and the third card meet a first condition, and controlling the first card, the second card, and the third card to move toward the fourth region.

In this embodiment of this application, the first region, the second region, and the third region are horizontally adjacent to each other, and are located in the same row region. In addition, the first region, the second region, and the third region are as large as each other. In this way, in the leftmost home screen, the first card arranged in the first region, the second card arranged in the second region, and the third card arranged in the third region are actually arranged at the same height.

In this embodiment of this application, the first region, the second region, and the third region are vertically adjacent to the fourth region, but are located in a different row region in comparison with the fourth region. The fourth region is located under the first region, the second region, and the third region. In this way, on the leftmost home screen, the arrangement height of the fourth card is lower than that of the first card, the second card, and the third card.

In this embodiment of this application, the user can change the rank order of a card by rearranging the cards. For example, in a scenario in which the width of the leftmost home screen is just enough for horizontally arranging three cards of the first dimension, the first card, the second card, and the third card on the leftmost home screen may be arranged in order from left to right, and the fourth card may be arranged under the first card, the second card, and the third card. In response to a first drag operation on the fourth card, the electronic device may control the fourth card to move. For example, after the electronic device detects a swipe of a finger on a display screen performed by the user who has selected the fourth card, the swipe may be regarded as a first drag operation on the fourth card. Therefore, in response to this operation, the electronic device may control the fourth card to move along with the movement of a touch point between the user finger and the display screen, thereby implementing the movement of the fourth card.

In this embodiment of this application, the electronic device receives the first drag operation on the fourth card. The electronic device determines that the fourth card is selected. The electronic device controls the fourth card to move. During the movement of the fourth card, if the fourth card, the first card, the second card, and the third card meet a first condition, then the electronic device controls the fourth card to exchange positions with the first card, the second card, and the third card. In other words, the electronic device controls the fourth card to occupy the first region, the second region, and the third region, and controls the first card, the second card, and the third card to occupy the fourth region.

In a possible implementation of the third aspect, the method includes: displaying a first interface on the leftmost home screen of the first screen, where the first interface includes a first region, a second region, a third region, a fourth region, and a fifth region.

The first region, the second region, and the third region are arranged in order from left to right. The fourth region is located to the right of the first region and under the second region. The fifth region is located to the right of the fourth region and under the third region. The first region is used for displaying the first card of the first dimension. The second region, the third region, the fourth region, and the fifth region are used for displaying the second card, the third card, the fourth card, and the fifth card, respectively, of a third dimension. The third dimension is greater than the first dimension. The upper edges of the first card, the second card, and the third card are located at the same height. The lower edges of the first card, the fourth card, and the fifth card are located at the same height.

In this embodiment of this application, the first region, the second region, and the third region are horizontally adjacent to each other. The first region, the fourth region, and the fifth region are horizontally adjacent to each other. In addition, the second region, the third region, the fourth region, and the fifth region are as large as each other. In this way, in the leftmost home screen, the second card in the second region and the third card in the third region are actually arranged at the same height. The fourth card in the fourth region and the fifth card in the fifth region are actually arranged at the same height. The upper edge of the first card in the first region is actually arranged at the same height as the second card in the second region and the third card in the third region. The lower edges of the first card, the fourth card, and the fifth card are located at the same height. The upper edges of the first card, the second card, and the third card are located at the same height, indicating that the third dimension of the first card may be twice the first dimension.

In this embodiment of this application, the second region and the second region are vertically adjacent to the fourth region and the fifth region, but are located in a different row region in comparison with the fourth region and the fifth region.

In a possible implementation of the third aspect, in response to a first drag operation on the first card, the first card is controlled to move toward the second card and the fourth card. If the first card, the second card, and the fourth card meet a second condition, the first card is arranged in the second region and the fourth region, and the second card and the fourth card are controlled to move simultaneously toward the first region.

In a possible implementation of the third aspect, that the dimension of the first card and the dimensions of the second card and the fourth card meet a second condition includes: an edge of the first card moves beyond central axes of both the second card and the fourth card.

In this embodiment of this application, the electronic device receives the first drag operation on the first card. The electronic device determines that the first card is selected. The electronic device controls the first card to move. During the movement of the first card, if the first card, the second card, and the fourth card meet the second condition, then the electronic device controls the first card to exchange positions with the second card and the fourth card. In other words, the electronic device controls the first card to occupy the second region and the fourth region, and controls the second card and the fourth card to occupy the first region.

In a possible implementation of the third aspect, in response to a second drag operation on the second card, the second card is controlled to move toward the first card. If the second card and the first card meet the first condition, then the second card is arranged in the first region, the first card is controlled to move toward the second region and the fourth region, and the fourth card is controlled to move toward the first region.

In this embodiment of this application, the electronic device receives the second drag operation on the second card. The electronic device determines that the second card is selected. The electronic device controls the second card to move. During the movement of the second card, if the second card and the first card meet the first condition, then the electronic device controls the first card to exchange positions with the second card and the fourth card. In other words, the electronic device controls the second card and the fourth card to occupy the first region, and controls the first card to occupy the second region and the fourth region.

In a possible implementation of the third aspect, in response to a third drag operation on the fourth card, the fourth card is controlled to move toward the first card. If the fourth card and the first card meet the first condition, then the fourth card is arranged in the first region, the first card is controlled to move toward the second region and the fourth region, the second card is controlled to move toward the third region, and the third card is controlled to move toward the first region.

In this embodiment of this application, the electronic device receives the third drag operation on the fourth card. The electronic device determines that the fourth card is selected. The electronic device controls the fourth card to move. During the movement of the fourth card, if the fourth card and the first card meet the first condition, then the electronic device controls the fourth card to move toward the first region. In other words, the electronic device controls the fourth card and the third card to occupy the first region, controls the second card to occupy the third region, and controls the first card to occupy the second region and the fourth region.

In a possible implementation of the third aspect, in response to a fourth drag operation on the third card, the third card is controlled to move toward the first card. If the third card and the second card meet the first condition, then the third card is arranged in the second region, and the second card is controlled to move toward the third region. If the center of the third card coincides with any point in the first card, the third card is arranged in the first region, the first card is controlled to move toward the second region and the fourth region, and the fourth card is controlled to move toward the first region.

In this embodiment of this application, the electronic device receives the fourth drag operation on the third card. The electronic device determines that the third card is selected. The electronic device controls the third card to move. During the movement of the third card, if the third card and the second card meet the first condition, then the electronic device controls the fourth card to move toward the second region. In other words, the electronic device controls the third card to occupy the second region, and controls the second card to occupy the third region. During the movement of the third card, if the third card and the first card meet the first condition, then the electronic device controls the third card to move toward the first region. In other words, the electronic device controls the third card and the fourth card to occupy the first region, and controls the first card to occupy the second region and the fourth region.

In a possible implementation of the third aspect, the method includes: displaying a first interface on the leftmost home screen of the first screen, where the first interface includes a first region, a second region, a third region, a fourth region, a fifth region, and a sixth region.

The first region, the second region, and the third region are arranged in order from left to right. The fourth region is located under the first region. The fifth region is located under the second region. The sixth region is located under the third region. The first region, the second region, and the third region are used for displaying the first card, the second card, and the third card, respectively, of a first dimension. The fourth region, the fifth region, and the sixth region are used for displaying the fourth card, the fifth card, and the sixth card, respectively, of a third dimension. The third dimension is greater than the first dimension.

In this embodiment of this application, the first region, the second region, and the third region are horizontally adjacent to each other, and are located in the same row region. The fourth region, the fifth region, and the sixth region are horizontally adjacent to each other, and are located in the same row region. In addition, the first region, the second region, and the third region are as large as each other; and the fourth region, the fifth region, and the sixth region are as large as each other. In this way, in the leftmost home screen, the first card in the first region, the second card in the second region, and the third card in the third region are actually arranged at the same height. The fourth card in the fourth region, the fifth card in the fifth region, and the sixth card in the sixth region are actually arranged at the same height. The third dimension of the fourth card in the fourth region, the fifth card in the fifth region, and the sixth card in the sixth region may be twice the first dimension of the first card in the first region, the second card in the second region, and the third card in the third region.

In a possible implementation of the third aspect, the method includes:

In response to a first drag operation on the fourth card, the fourth card is controlled to move toward the first card. If the fourth card and the first card meet the first condition, then the fourth card is arranged in the first region, the first card is controlled to move toward the second region, the second card is controlled to move toward the third region, the third card is controlled to move toward the fifth region, the fifth card is controlled to move toward the sixth region, and the sixth card is controlled to move toward the fourth region. The upper edges of the first card and the fourth card are located at the same height. The lower edges of the third card and the fourth card are located at the same height. The upper edges of the third card and the fifth card are located at the same height.

In this embodiment of this application, the electronic device receives the first drag operation on the fourth card. The electronic device determines that the fourth card is selected. The electronic device controls the fourth card to move. During the movement of the fourth card, if the fourth card and the first card meet the first condition, then the electronic device controls the fourth card to move toward the first region, that is, controls the fourth card to occupy the first region; controls the first card to move toward the second region, that is, controls the first card to occupy the second region; controls the second card to move toward the third region, that is, controls the second card to occupy the third region; controls the third card to move toward the fifth region, that is, controls the third card to occupy the fifth region; controls the fifth card to move toward the sixth region, that is, controls the fifth card to occupy the sixth region; and controls the sixth card to move toward the fourth region, that is, controls the sixth card to occupy the fourth region.

In a possible implementation of the third aspect, in response to a second drag operation on the fourth card, the fourth card is controlled to move toward the second card. If the fourth card and the second card meet the first condition, then the fourth card is arranged in the second region, the second card is controlled to move toward the third region, the third card is controlled to move toward the first region, the fifth card is controlled to move toward the sixth region, and the sixth card is controlled to move toward the fourth region. The upper edges of the first card and the fourth card are located at the same height. The lower edges of the third card and the fourth card are located at the same height. The upper edges of the third card and the fifth card are located at the same height.

In this embodiment of this application, the electronic device receives the second drag operation on the fourth card. The electronic device determines that the fourth card is selected. The electronic device controls the fourth card to move. During the movement of the fourth card, if the fourth card and the second card meet the first condition, then the electronic device controls the fourth card to move toward the second region, that is, controls the fourth card to occupy the second region; controls the second card to move toward the third region, that is, controls the second card to occupy the third region; controls the third card to move toward the fourth region, that is, controls the third card to occupy the fourth region; controls the fifth card to move toward the sixth region, that is, controls the fifth card to occupy the sixth region; and controls the sixth card to move toward the fourth region, that is, controls the sixth card to occupy the fourth region.

In a possible implementation of the third aspect, in response to a third drag operation on the fifth card, the fifth card is controlled to move toward the second card. If the fifth card and the second card meet the first condition, then the fifth card is arranged in the second region, the second card is controlled to move toward the third region, the third card is controlled to move toward the first region, the fourth card is controlled to move toward the sixth region, and the sixth card is controlled to move toward the fourth region. The upper edges of the first card and the fifth card are located at the same height. The lower edges of the third card and the fifth card are located at the same height. The upper edges of the third card and the fourth card are located at the same height.

In this embodiment of this application, the electronic device receives the third drag operation on the fifth card. The electronic device determines that the fifth card is selected. The electronic device controls the fifth card to move. During the movement of the fifth card, if the fifth card and the second card meet the first condition, then the electronic device controls the fifth card to move toward the second region, that is, controls the fifth card to occupy the second region; controls the second card to move toward the third region, that is, controls the second card to occupy the third region; controls the third card to move toward the fourth region, that is, controls the third card to occupy the fourth region; controls the fourth card to move toward the sixth region, that is, controls the fourth card to occupy the sixth region; and controls the sixth card to move toward the fourth region, that is, controls the sixth card to occupy the fourth region.

According to a fourth aspect, an embodiment of this application provides a readable medium. The readable medium stores an instruction. When executed on an electronic device, the instruction causes the electronic device to perform the information display method according to the first aspect, the second aspect, and the third aspect.

According to a fifth aspect, an embodiment of this application provides an electronic device. The electronic device includes:
 a memory, configured to store instructions to be executed by one or more processors of the electronic device; and
 a processor, being one of processors of the electronic device, and configured to perform the information display method according to the first aspect, the second aspect, and the third aspect.

According to a sixth aspect, an embodiment of this application provides a computer program product, including: a non-volatile computer-readable storage medium. The non-volatile computer-readable storage medium includes computer program code used for performing the information display method according to the first aspect, the second aspect, and the third aspect.

BRIEF DESCRIPTION OF DRAWINGS

FIG. 25*a* to FIG. 25*c* are schematic diagrams of a group of user interfaces according to an embodiment of this application;

DETAILED DESCRIPTION

Figure 1A:
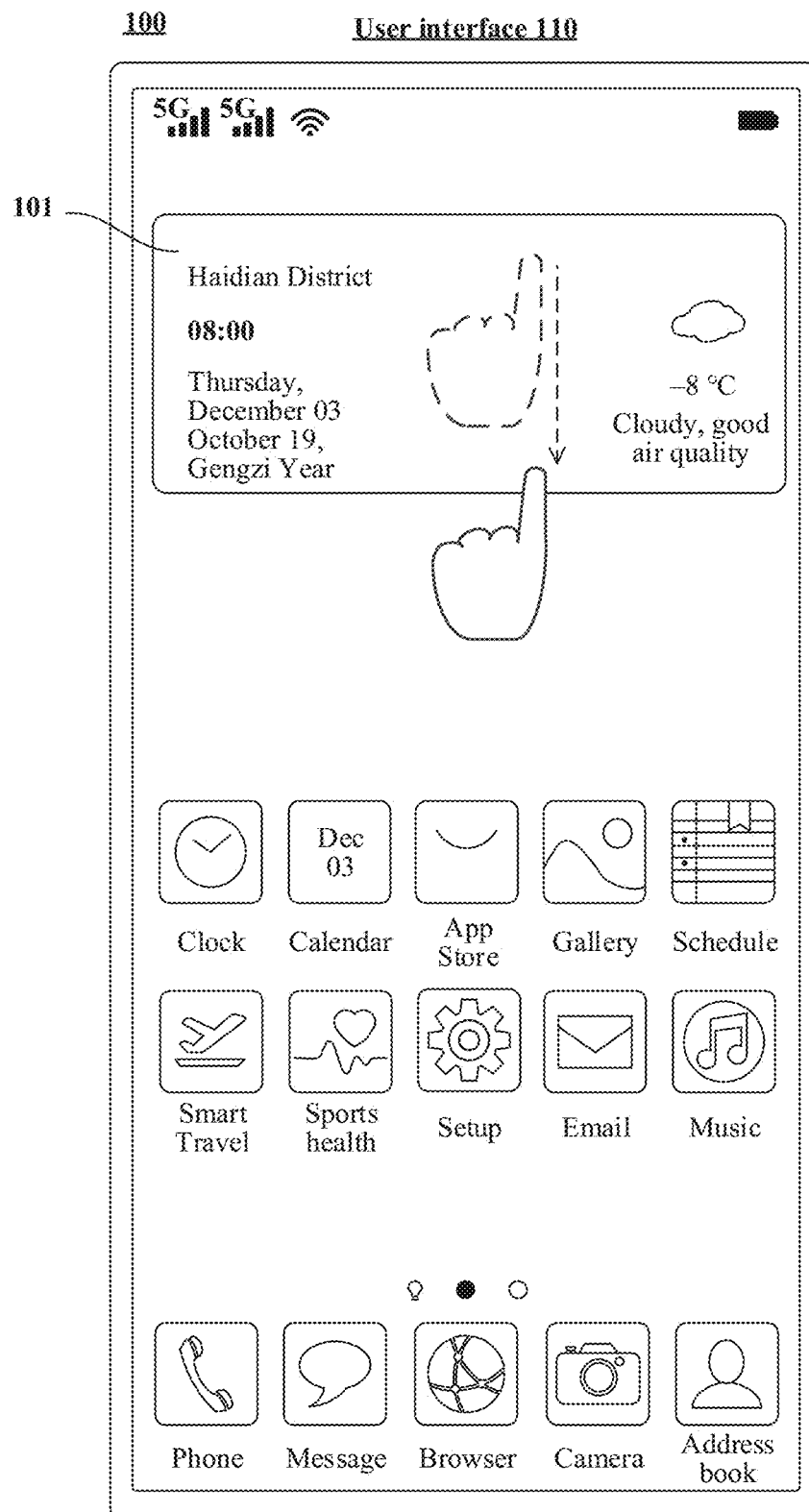
FIG. 1a to FIG. 1c are schematic diagrams of a group of user interfaces according to an embodiment of this application.

The following clearly and thoroughly describes technical solutions in embodiments of this application with reference to the accompanying drawings. In descriptions of embodiments of this application, unless otherwise specified, "/" means "or", for example, A/B may mean "A or B"; "and/or" used herein is only used for describing an association relationship between associated objects, and indicates that three relationships may exist. For example, "A and/or B" may indicate the following three cases: only A exists, both A and B exist, and only B exists.

In the following, the terms "first" and "second" are merely used for description, and shall not be understood as an indication or implication of relative importance or an implicit indication of a quantity of indicated technical features. Therefore, features defined with "first" or "second" may explicitly or implicitly include one or more of the features. In the description of the embodiments of this application, unless otherwise stated, "a plurality of" means two or more.

An "embodiment" in this application means that a specific feature, structure, or characteristic described with reference to the embodiment may be included in at least one embodiment of this application. The term "embodiment" mentioned at different locations in this specification does not necessarily refer to a same embodiment, nor does it refer to an independent or alternative embodiment mutually exclusive with another embodiment. A person skilled in the art explicitly and implicitly understands that an embodiment described in this application may be combined with another embodiment.

Before the technical solutions according to some embodiments of this application are described, some terms and definitions used herein are explained below. The term "event" included in an embodiment of this application may be data generated by an application of an electronic device, or a push message subscribed by a user, for example, a meeting recorded by a user through an event memo application, a flight scheduled through a life service application, a work schedule or exercise plan formulated through a sports and health application, or an event automatically arranged by the electronic device without a user operation such as a weather event generated by a weather forecast application. Such applications may be a system application, or a third-party application, or a microservice registered by the electronic device through a cloud server.

Understandably, an event may include event information, event type, event name, occurrence time, and optionally, location of the event.

The event type is used for distinguishing between events, and may include: schedule, travel, climate clock, and the like. Understandably, the event type may correspond to the application that generates the event on the electronic device.

With respect to the event name, occurrence time, and location of the event, using a meeting event as an example, a meeting event may include a meeting name, meeting time (including start time and end time), place of meeting, and the like. When the meeting is online, the place of meeting may be omitted. For another example, a travel event may include a travel name, travel time, and travel places. The travel places may include a departure place and a destination. For information on various events, reference may be made to the method embodiment to be described herein later, details of which are omitted here.

The term "home screen card" included in an embodiment of this application may be a display region on a screen of an electronic device, that is, a form of displaying content on the screen, and may be used for displaying events, that is, application data, so as to make up for the inability of the application to display the data of interest to the user in time. For a user, the home screen card is usually located in a conspicuous position on the screen of the electronic device. Through the home screen card, the electronic device displays the event that the user wants to follow from time to time. For example, if the user has scheduled a meeting for the day, the home screen card may display the meeting of the day. Home screen cards may include visual interface elements such as a text, an icon, a button, a menu, a tab, a text box, a dialog box, a status bar, a navigation bar, a widget, or a picture. Understandably, a plurality of home screen cards may be stacked together in sequence to form a home screen card set. The user may switch the currently displayed card between different home screen cards by performing an operation on the home screen cards. Understandably, the electronic device may set a corresponding home screen card for each type of event to display the event information corresponding to the event.

In an embodiment of this application, the home screen card may specially refer to the YOYO Suggestion card. A user may set the YOYO Suggestion card through a YOYO Smart Assistant app installed on the electronic device. A plurality of YOYO Suggestion cards may be stacked into a YOYO Suggestion card set displayed on the screen of the electronic device.

Figure 1B:
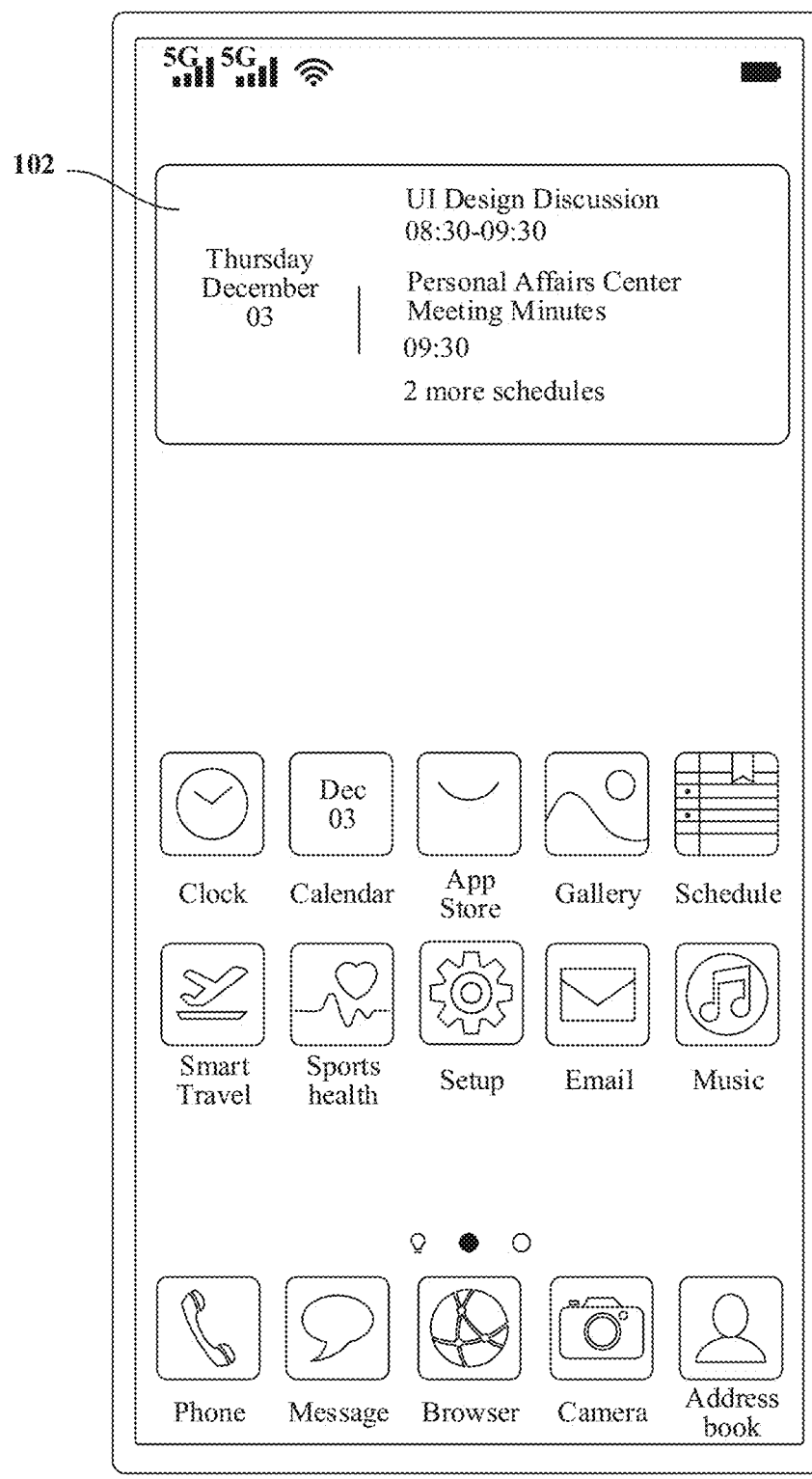
Figure 1C:
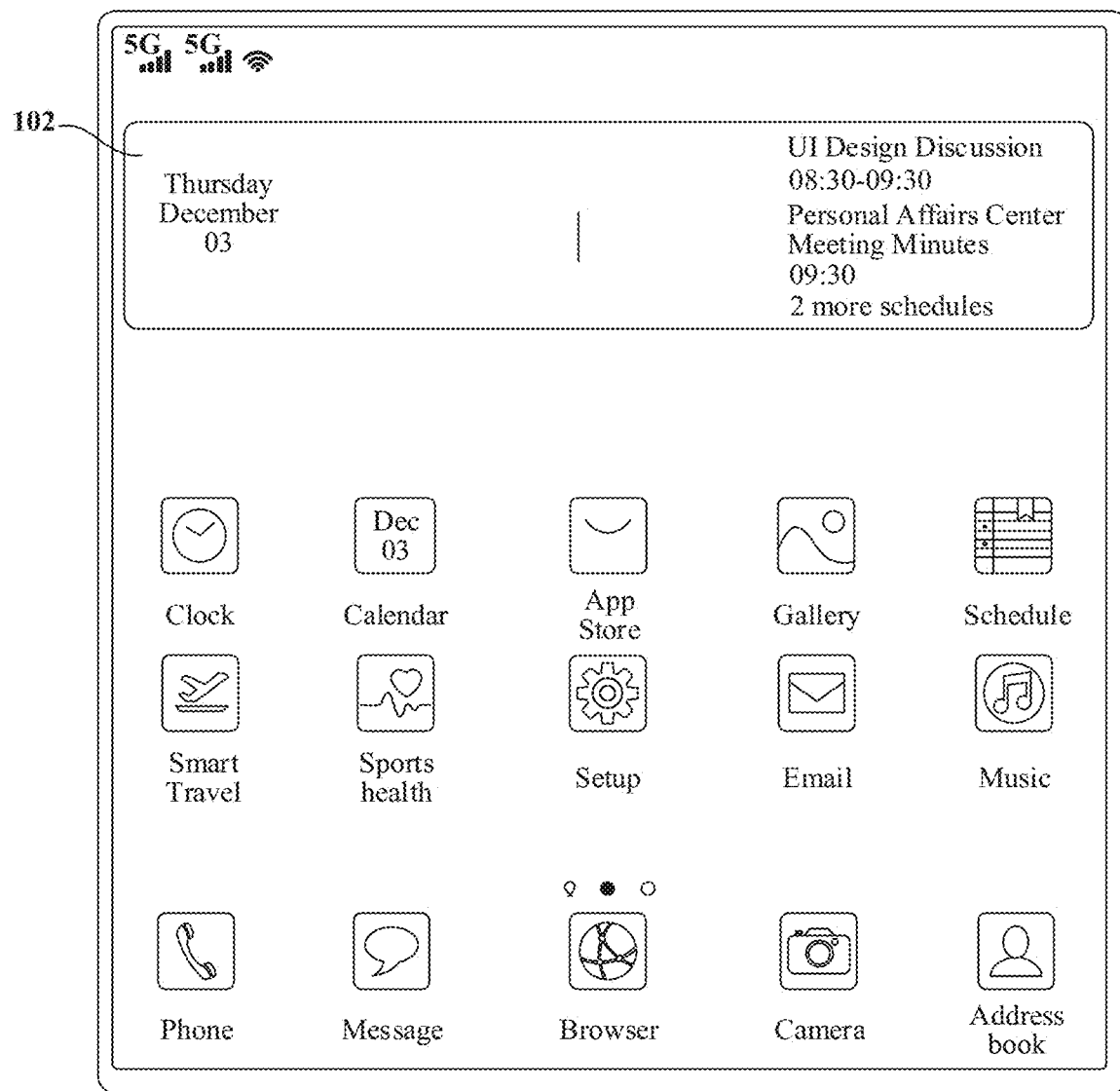

Referring to FIG. 1*a* to FIG. 1*c*, FIG. 1*a* to FIG. 1*c* exemplarily show user interfaces displayed on home screens of an outer screen and an inner screen of the electronic device 100, where the user interfaces include home screen cards corresponding to events.

As shown in FIG. 1*a*, the user interface 110 is a home screen of the outer screen of the electronic device 100. The user interface 110 displays a Climate Clock card 101. The Climate Clock card 101 displays current time information and weather information. For example, the current time is "08:00" a.m., and the weather information is "cloudy", and so on. The user interface 110 further displays icons of other apps such as "Gallery" and icons of frequently used apps such as "Phone".

When the electronic device 100 receives a swipe-down operation performed by the user on the home screen card 101 in the user interface 110 shown in FIG. 1*a*, the electronic device 100 displays, as shown in FIG. 1*b*, a user interface 120 of the outer screen of the electronic device 100 in response to the operation. The user interface 120 displays a Scheduler card 102. To be specific, the Climate Clock card 101 and the Scheduler card 102 may be stacked into a home screen card set displayed in the user interface 110 and the user interface 120. The Scheduler card 102 shows meetings scheduled by the user, such as "UI Design Discussion" at 08:30-09:30, and "Personal Affairs Center Meeting Minutes" at 09:30. The size of the Scheduler card 102 restricts the display of other schedules, so that "2 more schedules" is displayed under the Scheduler card 102. The user may tap the Scheduler card 102 to see details of the meetings, details of which are omitted here.

As shown in FIG. 1*c*, after the user unfolds the inner screen of the electronic device 100, the electronic device 100 displays the user interface 130 of the inner screen of the electronic device 100 shown in FIG. 1*c*. The cards displayed in the user interface 130 include the Scheduler card 102 corresponding to the outer screen. The locations of the Scheduler card 102, icons of other apps, and icons of frequently used apps are adjustable based on the dimensions or ratio of the inner screen. For example, the spacing between the calendar and the meeting information displayed in the Scheduler card 102 increases based on the dimensions or ratio of the inner screen.

Understandably, FIG. 1*a* to FIG. 1*c* show just an example of a user interface 110 of the outer screen and a user interface 120 of the inner screen of the electronic device 100. The example does not constitute any limitation on this embodiment of this application.

Evidently, according to the foregoing display method applied to the electronic device, after the user unfolds the inner screen of the electronic device, the electronic device can adjust the display manner of the home screen cards based on the dimensions or ratio of the inner screen. However, for a user, the events displayed in the home screen cards are usually the content of interest to the user, or the content influential on the life and work of the user. For example, an event in a home screen card may be a meeting scheduled by the user through a meeting app, a flight scheduled by the user through a life service app, or an event automatically arranged by the electronic device without a user operation such as a weather event generated by a weather forecast app. However, the display manner of a home screen card set that includes a plurality of home screen cards is not adjustable based on the dimensions or ratio of the screen of the electronic device, thereby impairing user experience.

To solve the foregoing problem, an embodiment of this application provides a method for displaying home screen cards of an electronic device. In this method, the electronic device can adjust the display manner of the home screen cards on different screens of the electronic device based on a preset display rule. If the currently used screen of the electronic device is an outer screen, the electronic device may display a plurality of home screen cards on the outer screen. The plurality of home screen cards may be stacked and displayed in the form of a home screen card set. After the user unfolds the inner screen of the electronic device, the electronic device can adjust the display manner of home screen cards on the inner screen based on the dimensions or ratio of the inner screen relative to the outer screen of the foldable screen. For example, the electronic device displays a plurality of home screen cards on the inner screen by tiling. When the user folds the inner screen after performing an operation of changing a home screen card on the inner screen, the electronic device can display on the outer screen the home screen card last changed by the user. In addition, after a period of time, the electronic device can automatically sort the home screen cards in order of priority of the home screen cards, and display the home screen cards of a higher priority order. Understandably, the priority order here may be determined based on the event information such as time information and location information included in the home screen card. Alternatively, the priority order may be a sequence recommended by the YOYO Smart Assistant app for the setting of the home screen cards. For example, the sequence recommended by YOYO may be the display sequence of a plurality of home screen cards in the home screen card set.

When the display method according to this embodiment of this application is implemented, after the electronic device switches from the outer screen to the inner screen of the foldable screen, the electronic device can change the display manner of the home screen cards on the inner screen based on a preset display rule such as the dimensions or ratio of the inner screen relative to the outer screen. The electronic device can display a plurality of home screen cards on the inner screen at the same time. After the electronic device switches from the inner screen to the outer screen, the electronic device can display on the outer screen the home screen card last changed by the user. In this way, when the user uses the large-sized inner screen of the electronic device, the inner screen of the electronic device can display more cards. When the user folds the inner screen and uses the outer screen instead after adjusting the home screen cards, the outer screen can display the event information in the last adjusted home screen card, thereby improving user experience.

To describe the prompting method provided in some embodiments of this application more clearly and in more detail, the following first describes an electronic device 100 according to an embodiment of this application, to which the method is applicable. The electronic device 100 may be a device equipped with a display screen, such as a mobile phone, a tablet computer, a wearable device, an in-vehicle device, an augmented reality (augmented reality, AR)/virtual reality (virtual reality, VR) device, a notebook computer, an ultra-mobile personal computer (ultra-mobile personal computer, UMPC), a netbook, and a personal digital assistant (personal digital assistant, PDA). The specific type of the electronic device is not limited in this embodiment of this application.

Figure 2:
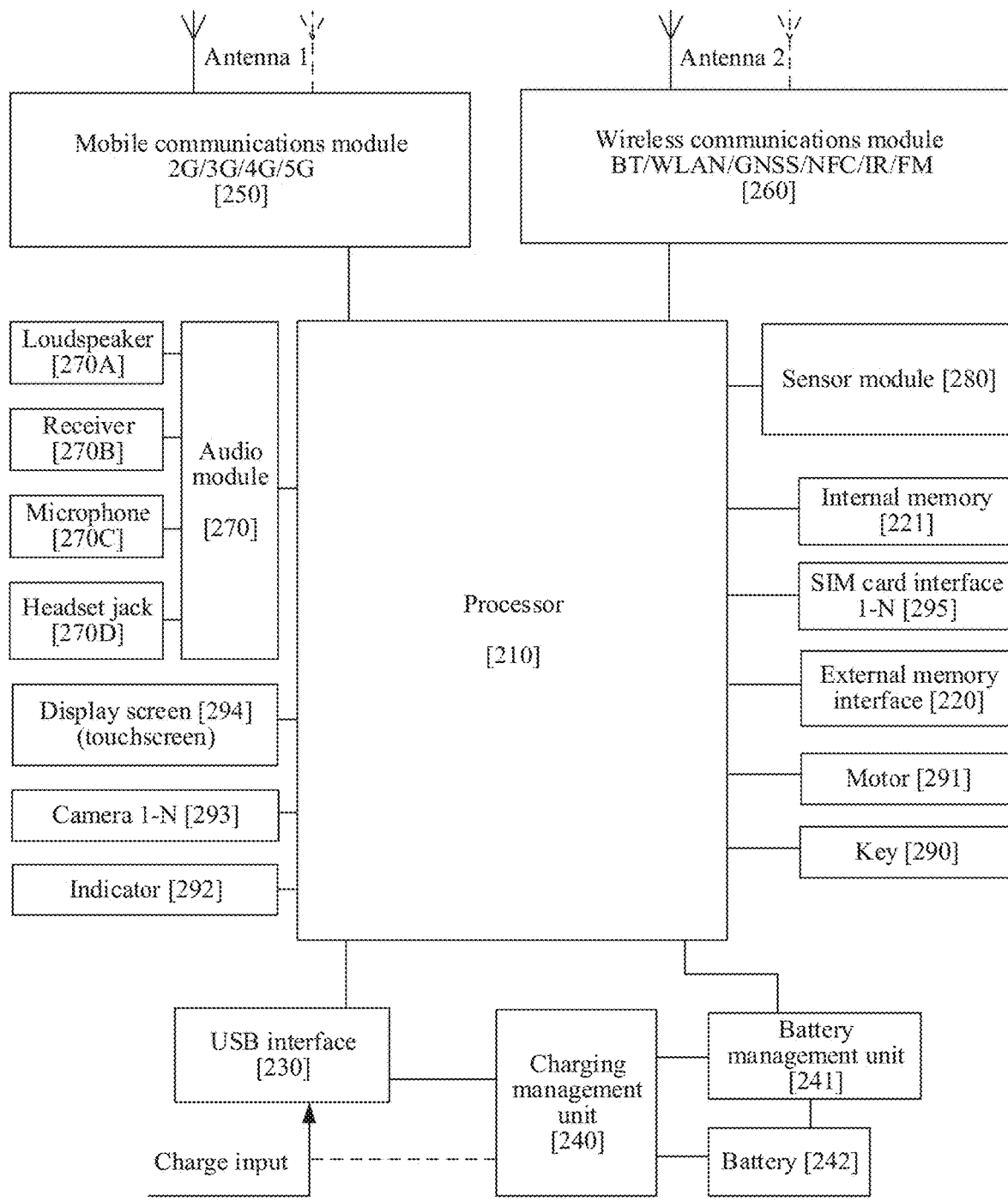
FIG. 2 is a schematic diagram of a hardware structure of an electronic device according to an embodiment of this application.

FIG. 2 is a schematic structural diagram of an electronic device 100 according to an embodiment of this application. As shown in FIG. 2, the electronic device such as a mobile phone may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a phone receiver 270B, a microphone 270C, a headset jack 270D, a sensor module 280, a key 290, a motor 291, an indicator 292, a camera 293, a display screen 294, a subscriber identity module (subscriber identity module, SIM) card interface 295, and the like.

The sensor module 280 may include a sensor such as a pressure sensor, a gyro sensor, a barometric pressure sensor, a magnetic sensor, an acceleration sensor, a distance sensor, an optical proximity sensor, a fingerprint sensor, a temperature sensor, a touch sensor, and an ambient light sensor.

Understandably, the structure shown in this embodiment does not constitute any limitation on the electronic device. In other embodiments, the electronic device may include more or fewer components than those shown in the figure, or combine some components, or split some components, or have different component arrangements. The components in the figure may be implemented by hardware, software or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). The different processing units may be independent devices, or may be integrated into one or more processors.

A memory may be further disposed in the processor 210 to store an instruction and data. In some embodiments, the memory of the processor 210 is a cache memory. The memory may store an instruction or data that has just been used or has been cyclically used by the processor 210. If the processor 210 needs to use the instruction or the data again, the processor 210 may directly invoke the instruction or the data from the memory. This avoids repeated access, reduces a waiting time of the processor 210, and therefore improves system efficiency.

In some embodiments, the processor 210 may comprise one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

Understandably, an interface connection relationship between modules shown in this embodiment is merely a schematic description, and does not limit a structure of the electronic device. In other embodiments, the electronic device may alternatively use an interface connection manner different from that in the foregoing embodiment, or use a combination of a plurality of interface connection manners.

The electronic device implements a display function through the GPU, the display screen 294, the application processor. The GPU is a microprocessor for image processing, and connects the display 294 and the application processor. The GPU is configured to perform mathematical and geometric calculation to perform graphics rendering. The processor 210 may include one or more GPUs, and the GPU executes program instructions to generate or change display information.

The display screen 294 is configured to display an image and a video. The display screen 294 includes a display panel.

The electronic device can implement a photographing function by using the ISP, the camera 293, the video codec, the GPU, the display screen 294, the application processor, and the like. The ISP is configured to process data fed back by the camera lens 293. The camera lens 293 is configured to capture a static image or a video. In some embodiments, the electronic device may include 1 or N cameras 293, wherein N is a positive integer greater than 1.

The external memory interface 220 may be configured to connect to an external memory card, such as a micro SD card, to extend a storage capability of the electronic device. The external storage card communicates with the processor 210 by using the external memory interface 220 to implement a data storage function, for example, to store music, videos, and other files in the external storage card.

The internal memory 221 may be configured to store computer executable program code. The executable program code includes instructions. The processor 210 performs various functional applications and data processing of the electronic device by running the instructions stored in the internal memory 221. For example, in this embodiment of this application, the processor 210 can execute instructions stored in the internal memory 221. The internal memory 221 may include a program storage area and a data storage area.

The program storage region may store an operating system, an application required by at least one function (for example, a sound playing function or an image playing function), and the like. The data storage area may store data (such as audio data and a phone book) and the like created during use of the electronic device. In addition, the internal memory 221 may include a high-speed random access memory, and may further include a non-volatile memory, such as at least one magnetic disk storage device, a flash memory device, or a universal flash storage (universal flash storage, UFS).

Understandably, the structure shown in this embodiment does not constitute any limitation on the electronic device. In other embodiments, the electronic device may include more or fewer components than those shown in the figure, or combine some components, or split some components, or have different component arrangements. The components in the figure may be implemented by hardware, software or a combination of software and hardware.

Figure 3:
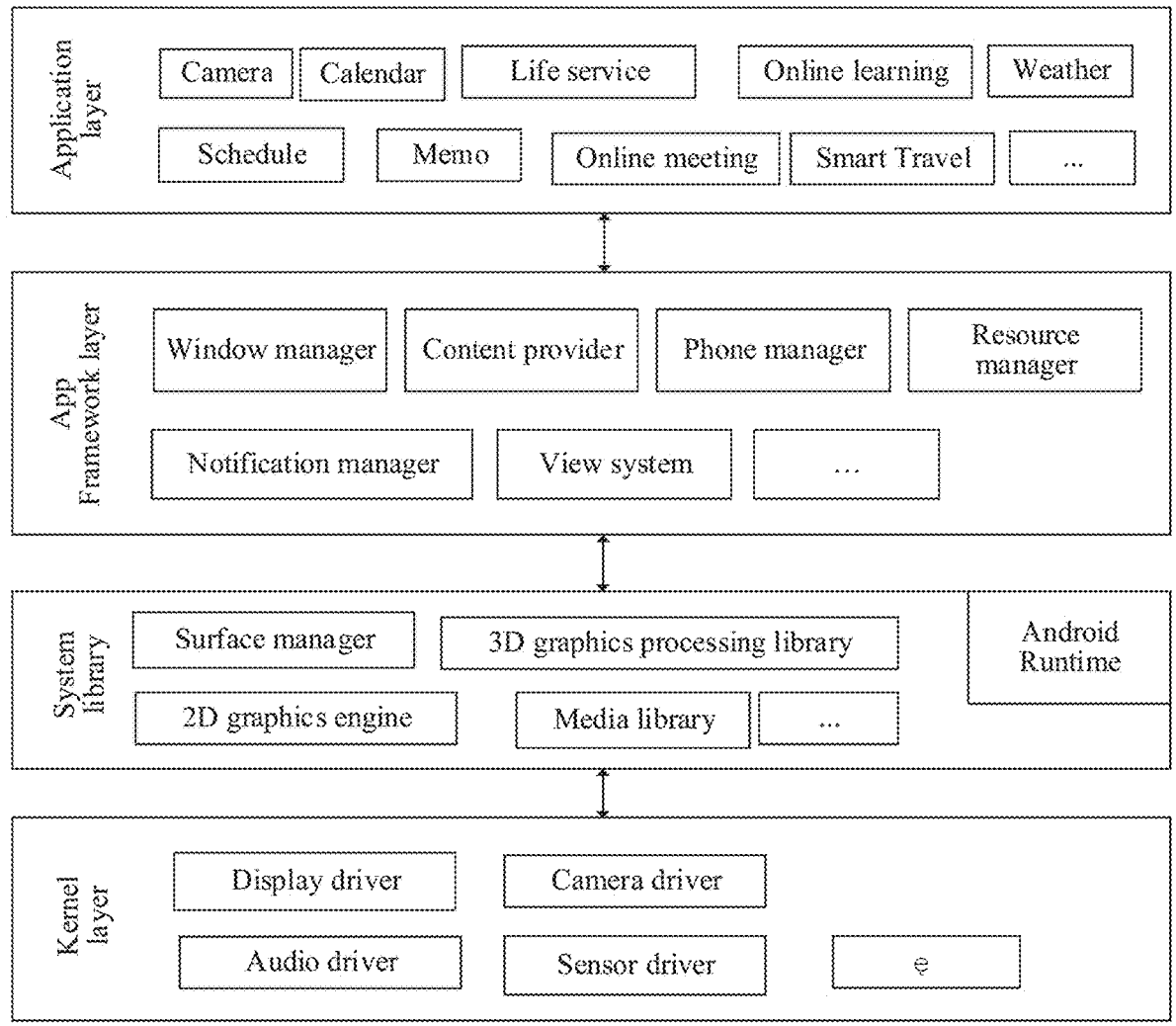
FIG. 3 is a schematic diagram of a software structure of an electronic device according to an embodiment of this application.

FIG. 3 is a block diagram of a software structure of an electronic device 100 according to an embodiment of the present invention.

A layered architecture divides software into several layers, and each layer has a clear role and task. Layers communicate with each other through software interfaces. In some embodiments, an Android system is divided into four layers: an application layer, an application framework layer, Android runtime (Android runtime) and a system library, and a kernel layer from top to bottom.

The application program layer may include a series of application program packages.

As shown in FIG. 3, the application packages may include applications such as camera, scheduler, smart travel, calendar, weather, memorandum, life service, and online meeting.

In some embodiments of this application, the user may set an application. The electronic device generates an event through an application package in response to the setting performed by the user.

Figure 4:
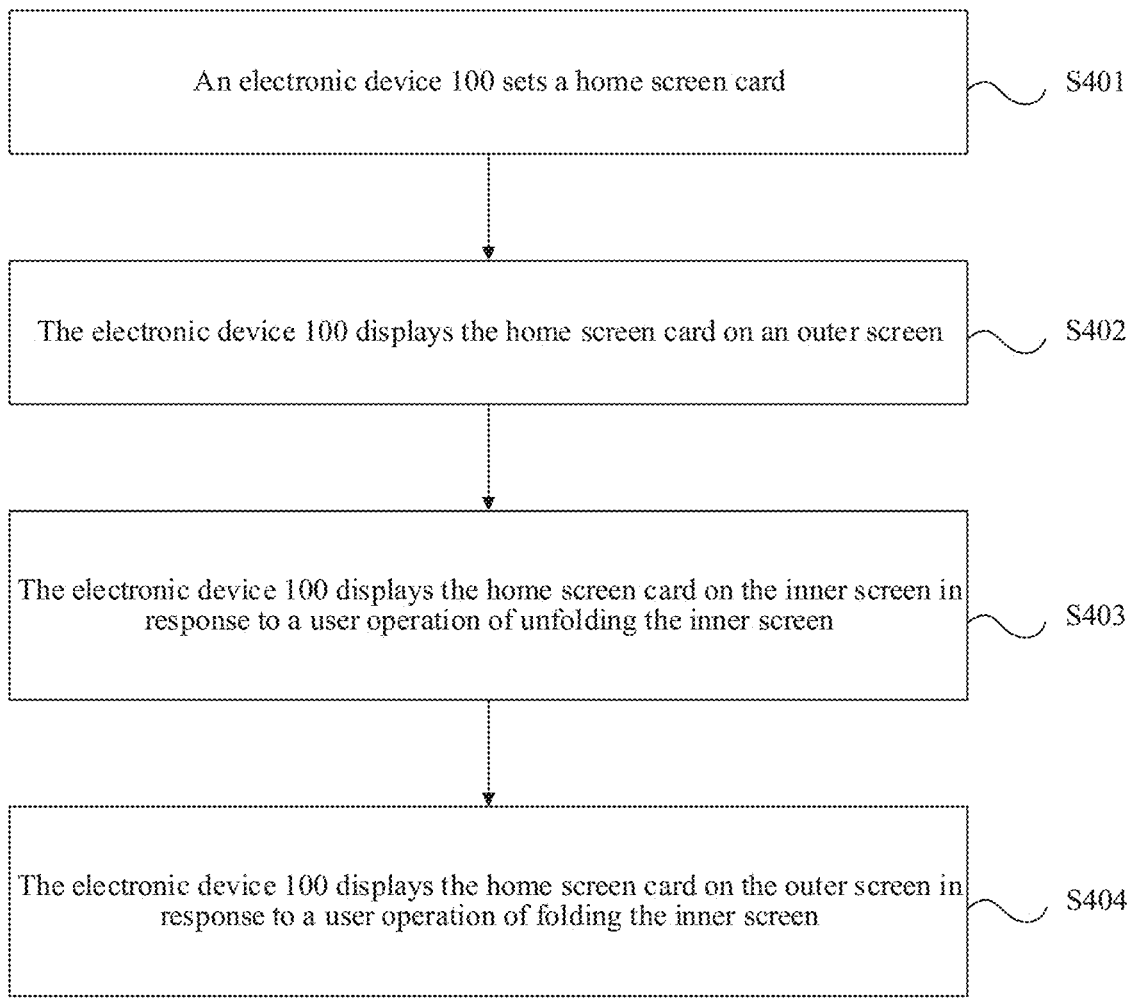
FIG. 4 is a schematic diagram of a process of a method according to an embodiment of this application.

The following describes a display method in detail according to an embodiment of this application with reference to the schematic method flowchart shown in FIG. 4.

The method shown in FIG. 4 may be implemented by a processor of the electronic device 100 by executing related instructions.

Referring to FIG. 4, the display method may include the following steps.

S401: An electronic device 100 sets a home screen card.

In some embodiments of this application, the home screen card may be applied to an outer screen and an inner screen of the electronic device 100. Each home screen card may display one type of event, that is, data of one application. The user may set home screen cards through an application installed on the electronic device 100. The following describes an example of setting home screen cards on the electronic device 100 according to an embodiment of this application. In this example, the application is YOYO Smart Assistant.

Referring to FIG. 5a to FIG. 5d, FIG. 5a to FIG. 5d exemplarily show an operation received by the electronic device 100 and input by a user to set home screen cards.

Figure 5A:
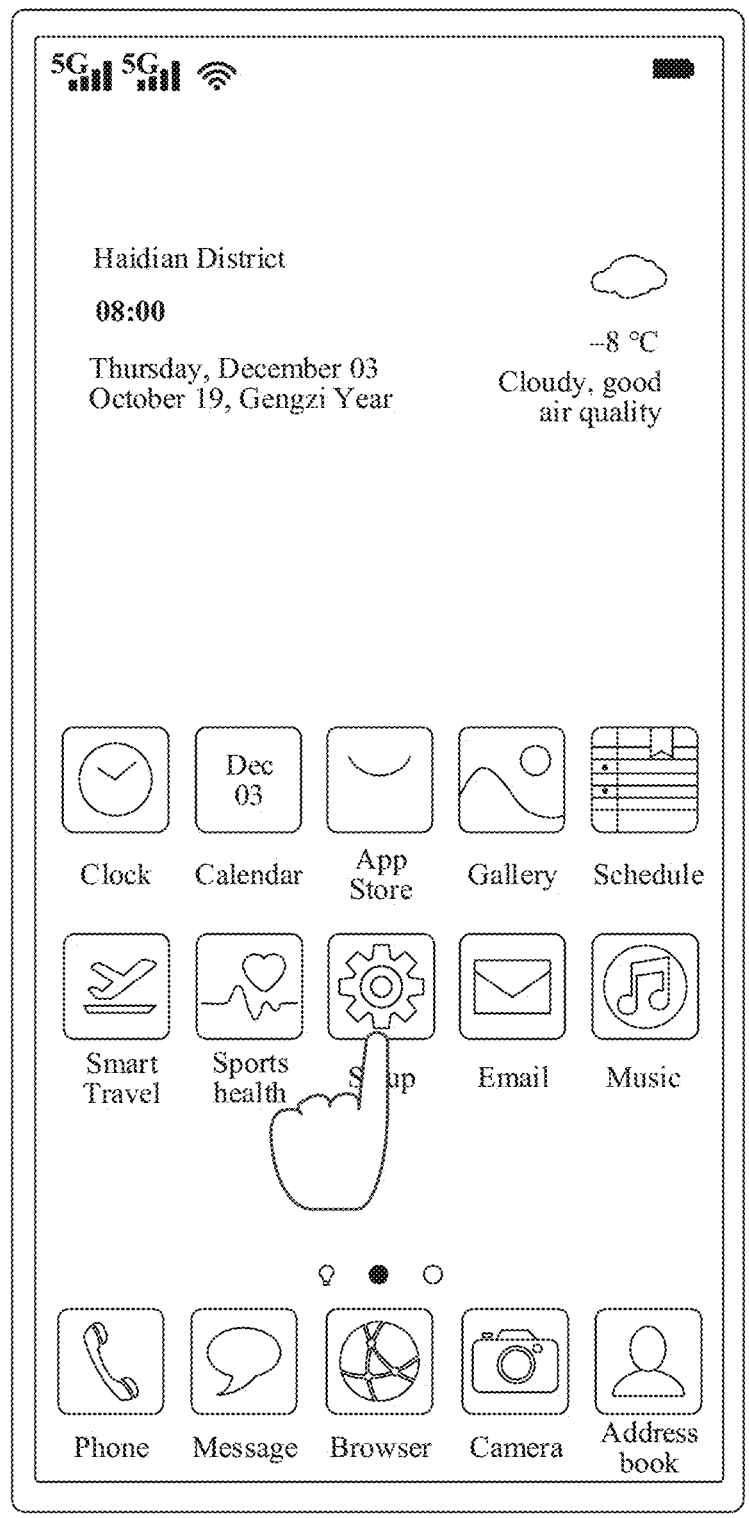
FIG. 5a to FIG. 5d are schematic diagrams of a group of user interfaces according to an embodiment of this application.

As shown in FIG. 5a, the electronic device 100 may receive an icon setting operation of the user in the user interface 510 shown in FIG. 5a. In response to the operation, the electronic device 100 displays an icon setting user interface 520 shown in FIG. 5b.

Figure 5B:
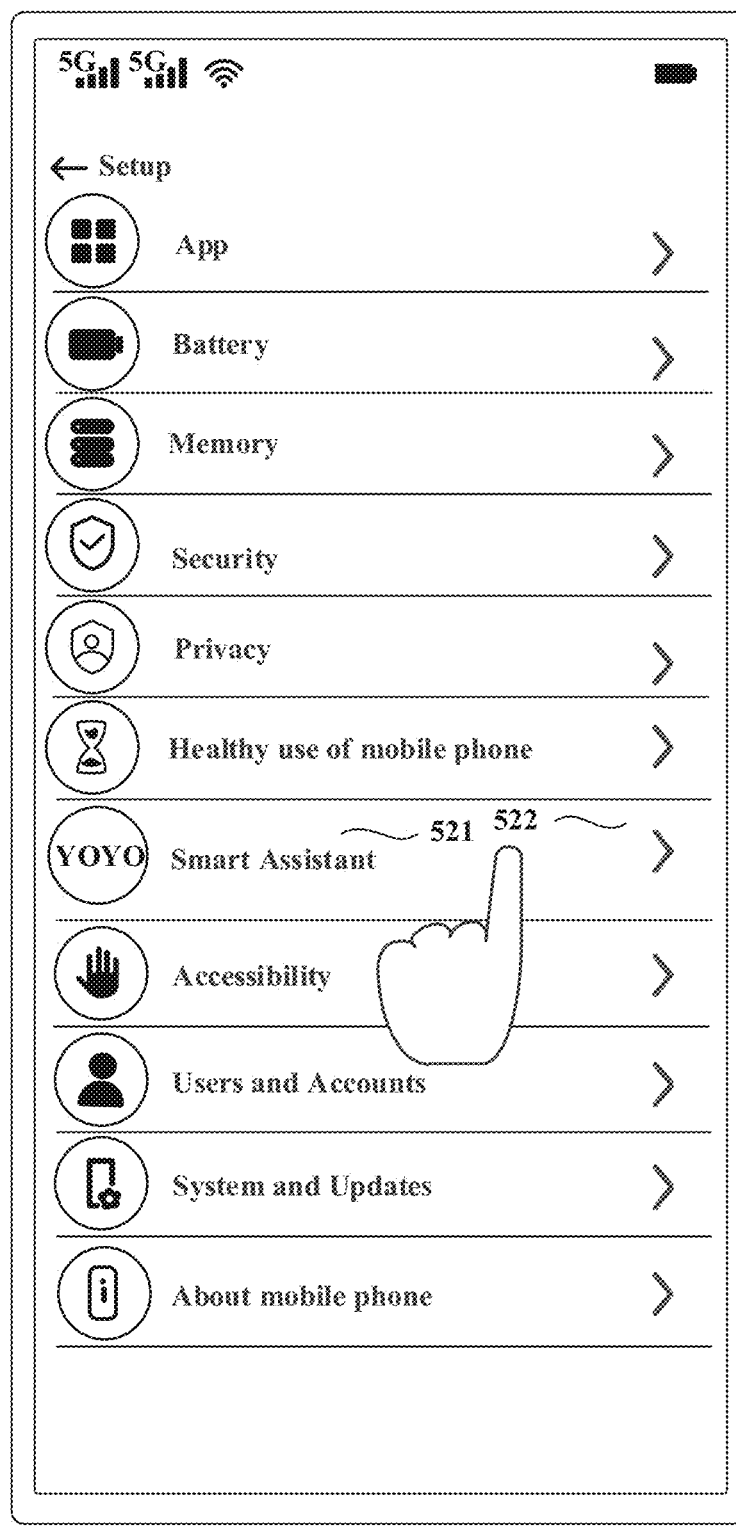

FIG. 5b exemplarily shows a user interface 520 displayed on the electronic device 100.

As shown in FIG. 5b, the user interface 520 displays setting options such as an option 521 of the YOYO Smart Assistant, and a "More" control 522 corresponding to the YOYO Smart Assistant. Further, other options such as Apps, Battery, and Storage and more controls corresponding to the options may be displayed. When the electronic device 100 receives an operation performed by the user on the "More" control 522 in the user interface 520, the electronic device 100 displays, in response to the operation, a user interface 530 shown in FIG. 5c.

Figure 5C:
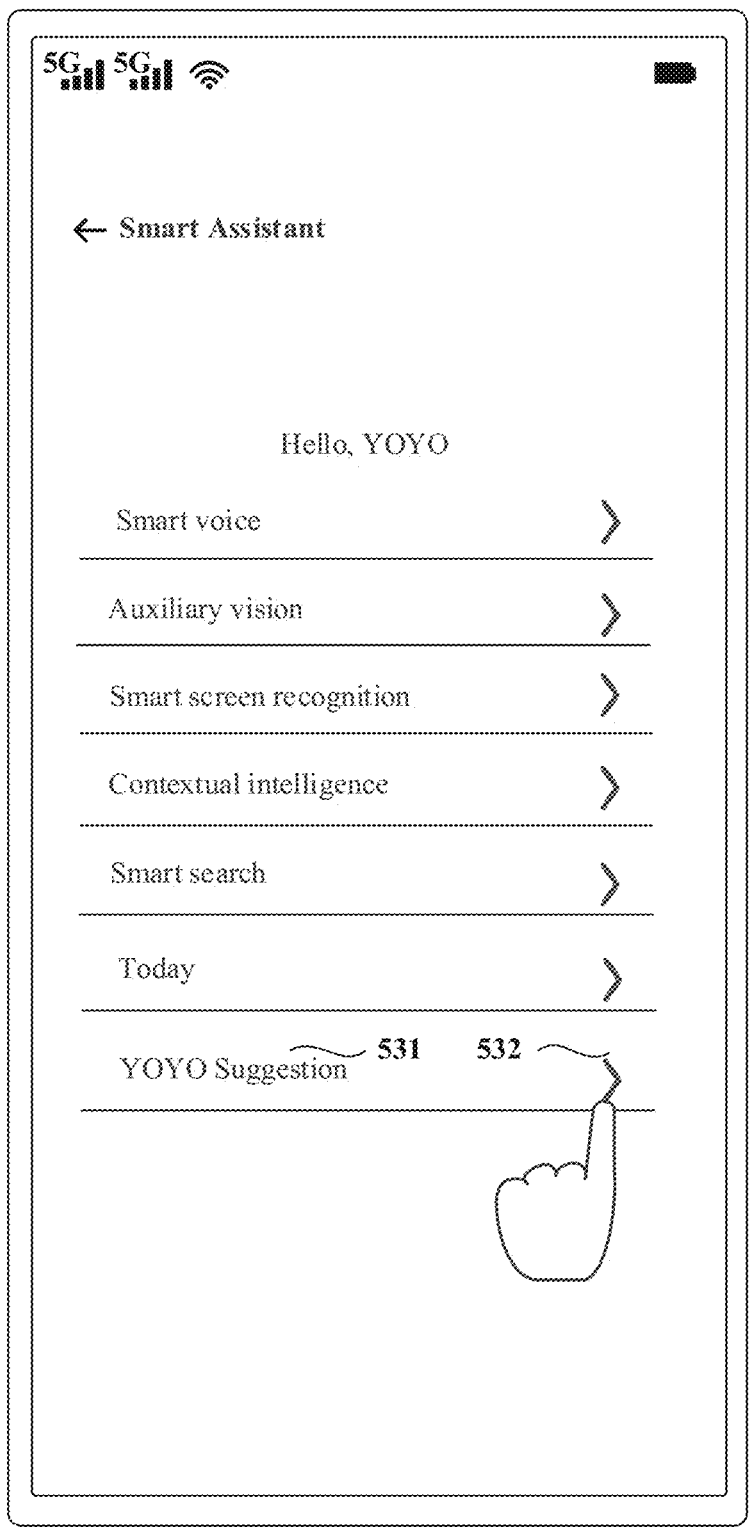

FIG. 5c exemplarily shows a user interface 530 displayed on the electronic device 100.

As shown in FIG. 5c, the user interface 530 displays some function options provided by the YOYO Smart Assistant such as a YOYO Suggestion option 531, a "More" control 532 corresponding to the YOYO Suggestion option, and other options such as Smart Voice, Auxiliary Vision, Smart Screen Recognition, Contextual Intelligence. Smart Search, and the "More" control corresponding to each option. When the electronic device 100 receives an operation performed by the user on the "More" control 532 in the user interface 530, the electronic device 100 displays, in response to the operation, a user interface 540 shown in FIG. 5d.

Figure 5D:
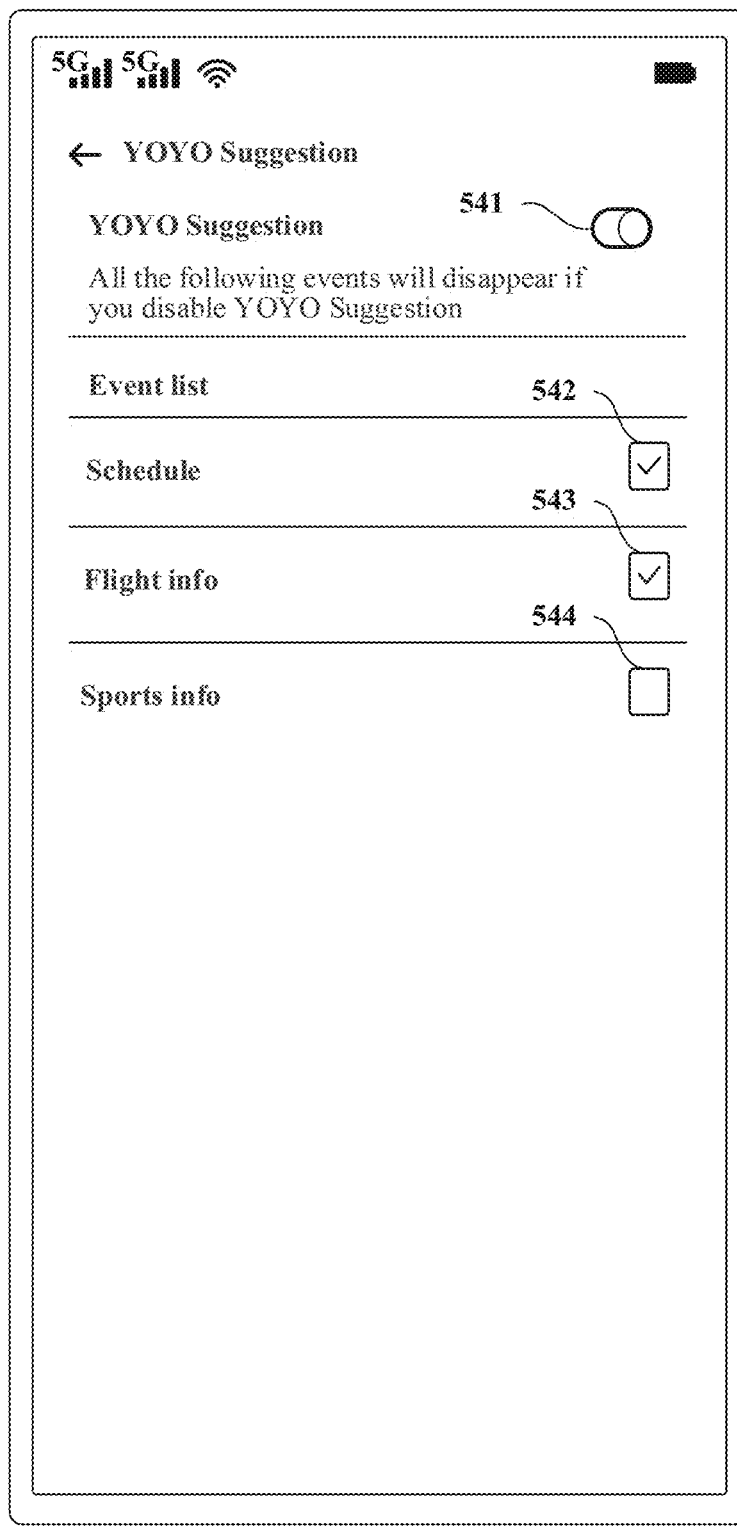

As shown in FIG. 5d, the user interface 540 displays an on/off control 541 corresponding to YOYO Suggestion, and a list of events provided by YOYO Suggestion, such as Scheduler, Flight Info, and Sports Info. The schedule, flight info, and sports info are controlled by the on/off control 542, on/off control 543, and on/off control 544, respectively. When the electronic device receives a user operation of turning on the on/off control 541 in the user interface 540, if the on/off control 542 of Scheduler and the on/off control 543 of Flight Info are turned on, the electronic device can set the home screen card corresponding to an event after receiving a user operation of generating the event by inputting event information in an application. For example, when the electronic device receives an input indicating that the user has recorded a meeting through a memo application and has booked a flight through a life service application, the electronic device can set the Scheduler card and the Flight Info card separately.

The following uses a Scheduler app and a Smart Travel app as examples to describe an example of a user-generated event in an embodiment of this application.

Figure 6A:
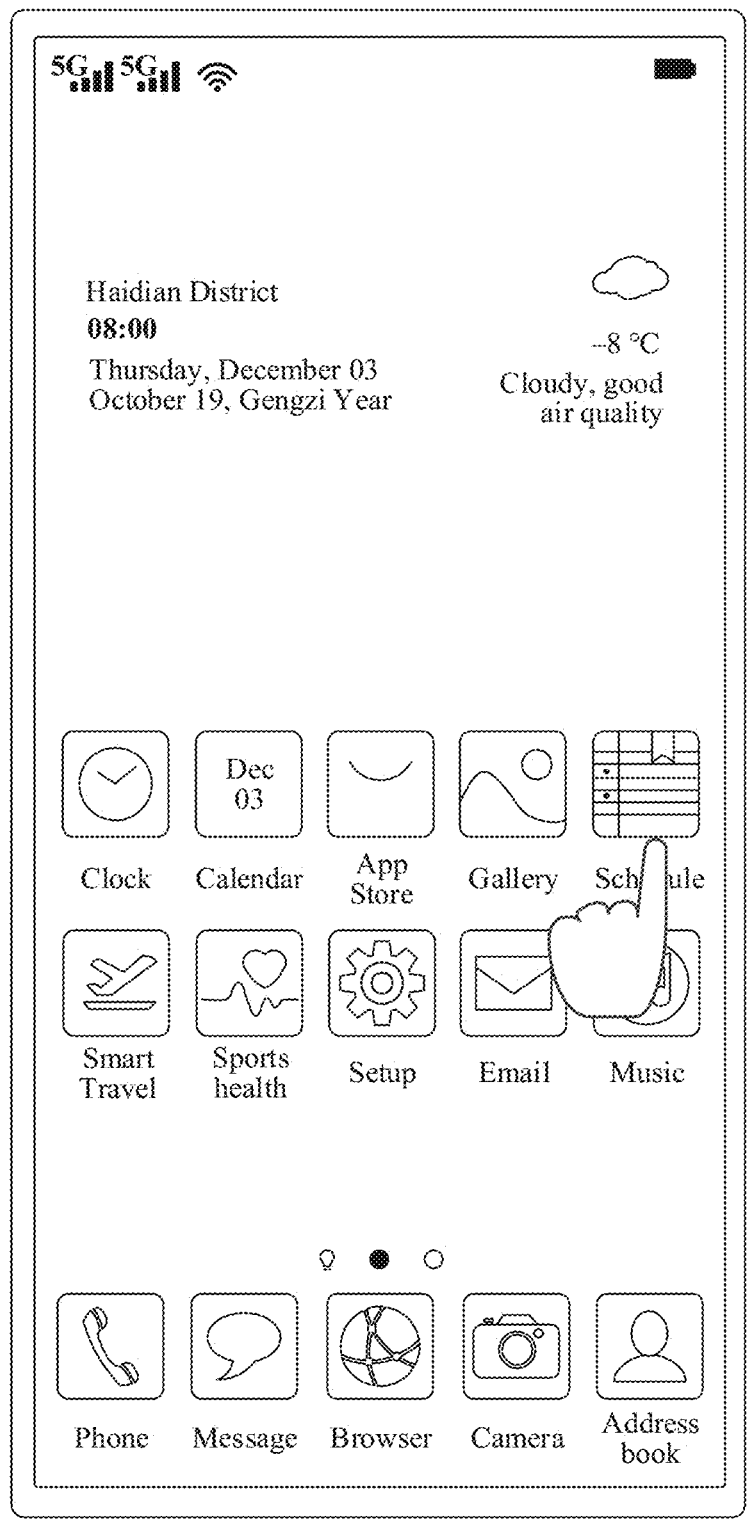
FIG. 6a to FIG. 6d are schematic diagrams of a group of user interfaces that respond to user operations according to an embodiment of this application.
Figure 6B:
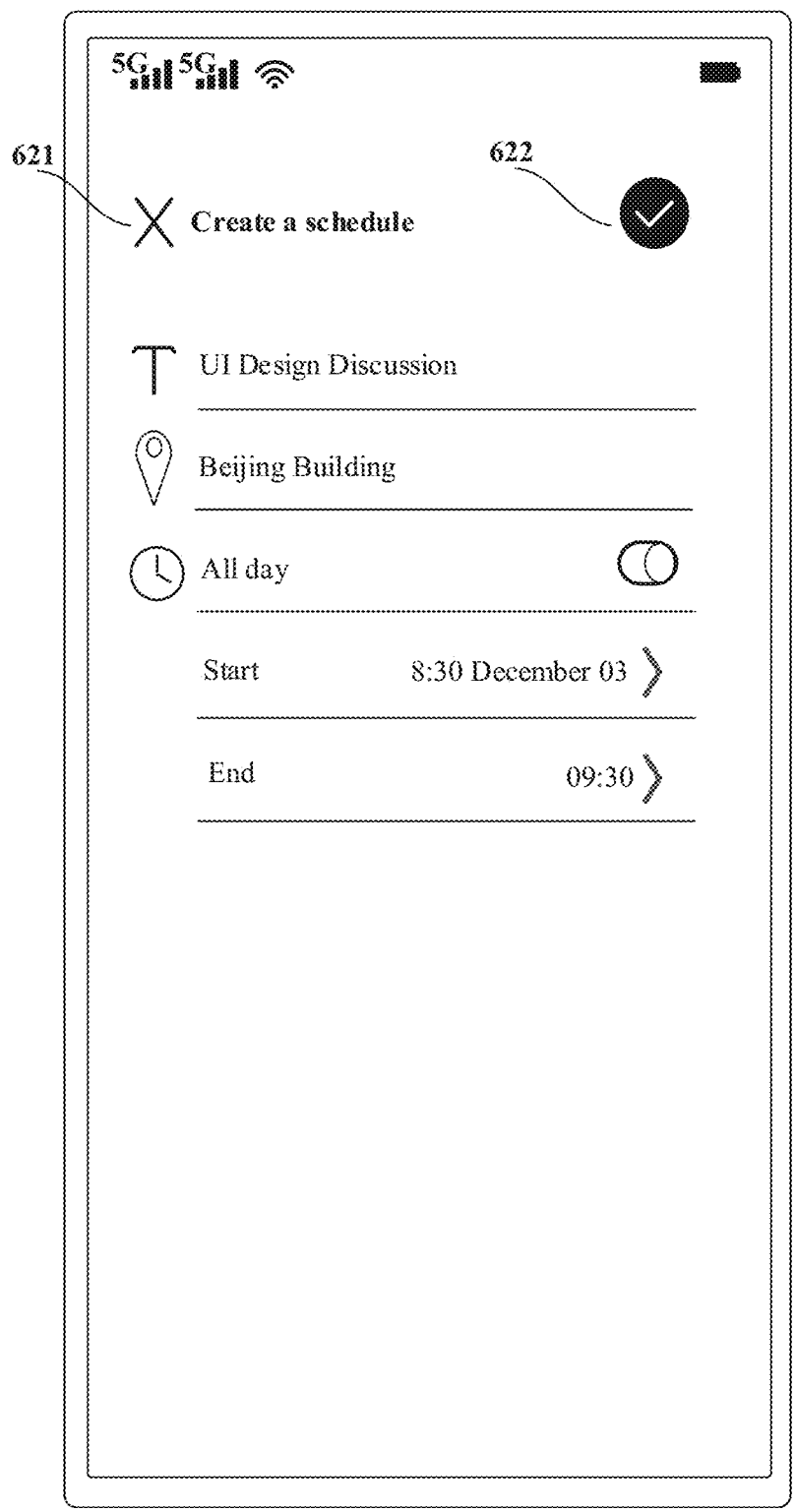
Figure 6C:
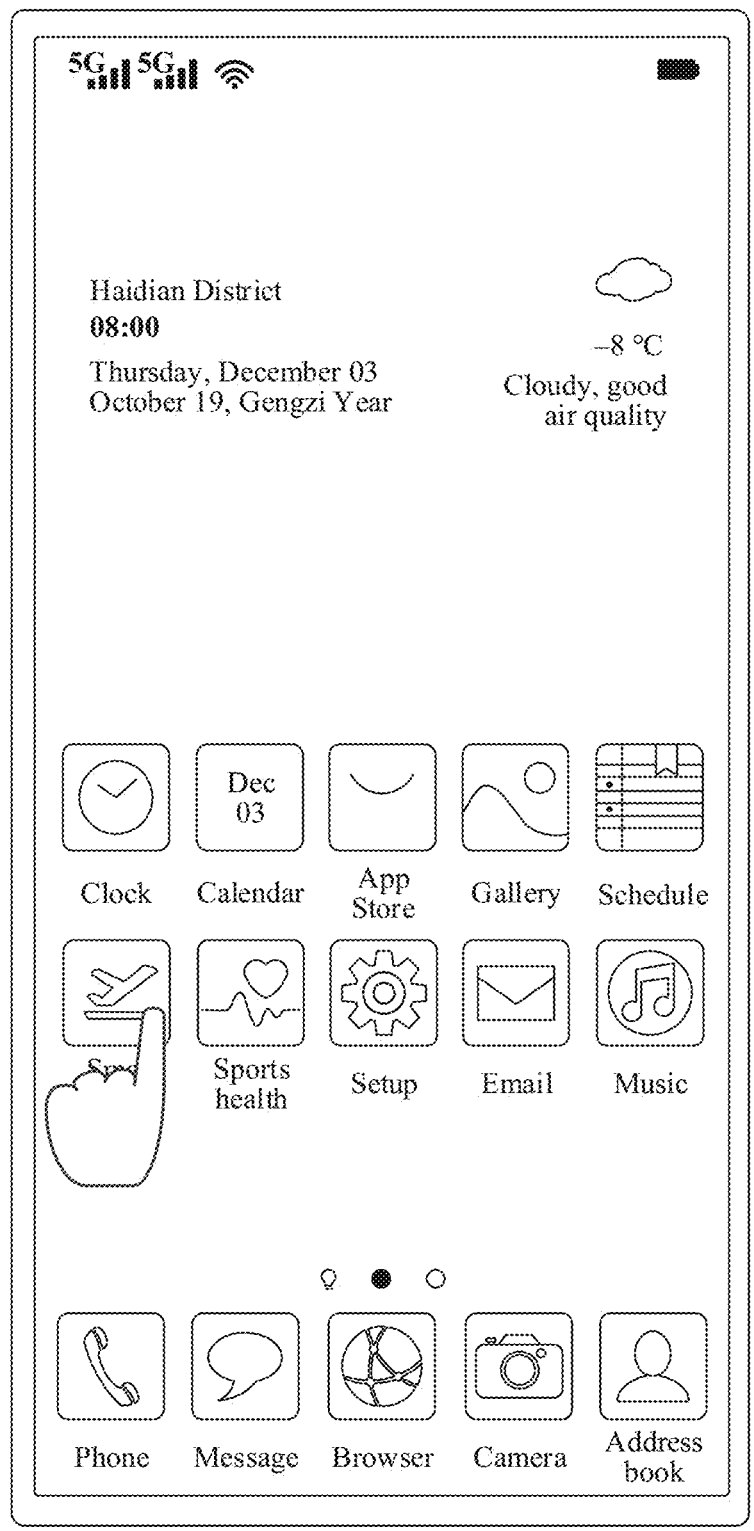
Figure 6D:
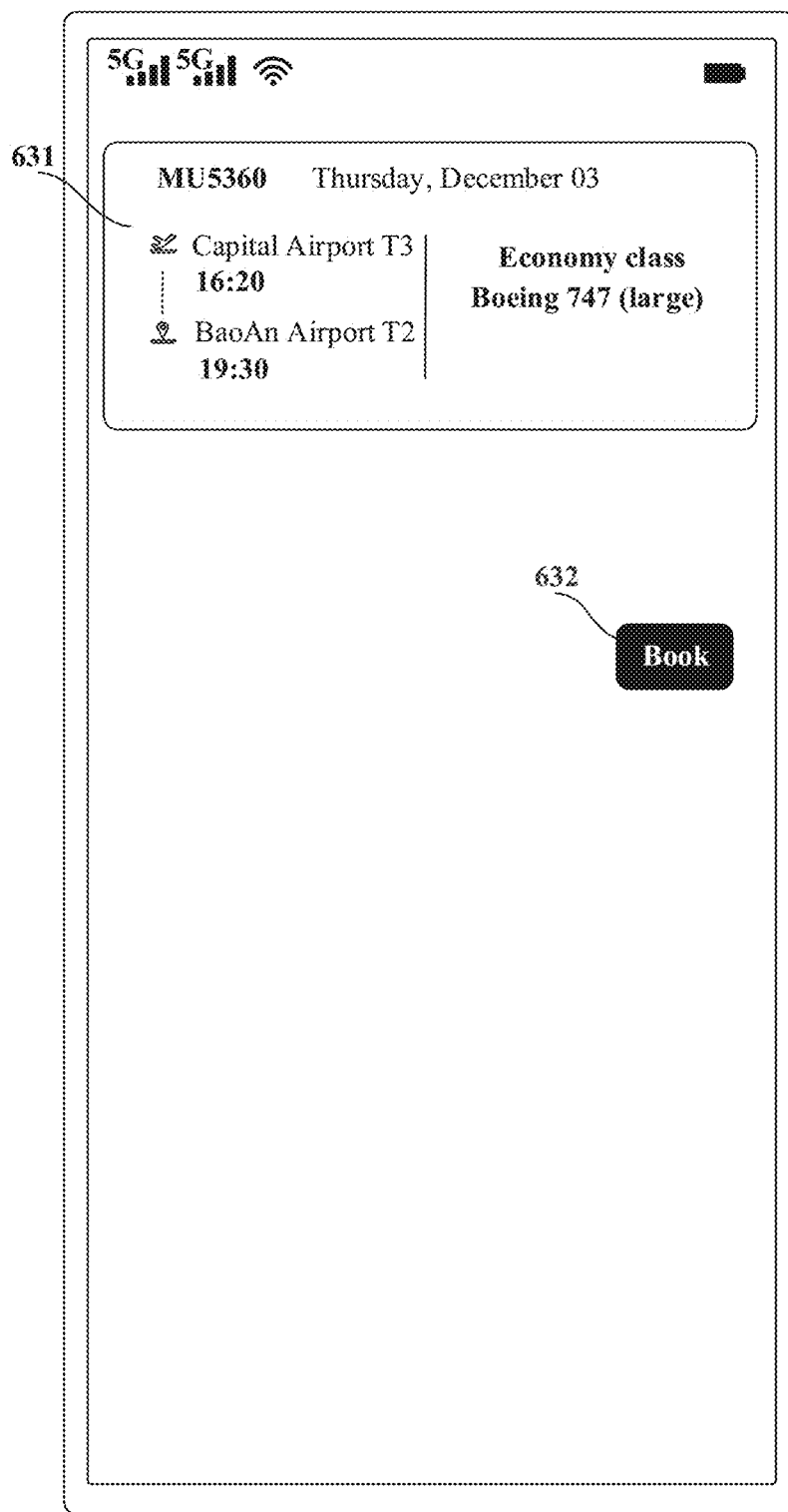

Referring to FIG. 6a to FIG. 6d, FIG. 6a to FIG. 6b exemplarily show a user operation of adding an event in the Scheduler app; and FIG. 6c to FIG. 6d exemplarily show a user operation of adding an event in the Smart Travel app.

As shown in FIG. 6a, when the electronic device 100 receives an operation performed by the user on a Scheduler app icon in the user interface 610 shown in FIG. 6a, the electronic device 100 displays, in response to the operation, a user interface 620 shown in FIG. 6b and provided by the Scheduler app.

As shown in FIG. 6b, the user interface 620 is a page to be edited that is used for creating a schedule. The user interface 620 may include a Cancel icon 621, a Confirm icon 622, a page title (for example, Create a schedule), a title item, a location item, a time item, and other setting items. The Cancel icon 621 may be used for closing the page to be edited. The Confirm icon 622 may be used for confirming an edited meeting event. The title item may be used for receiving a user input that is a title of a meeting event. The location item may be used for receiving a user input that is a place of meeting event. The time item may be used for receiving a user input that is start time and end time of the meeting event.

For example, the user may input a name of a to-do event as "UI Design Discussion", input "Beijing Building" as a place of meeting, and input "8:30-9:30 December 3" as the meeting time. After the editing is completed, the electronic device 100 may further receive an operation performed by the user on the Confirm icon 622. In response to the operation, the Scheduler app of the electronic device 100 receives the meeting event edited by the user, that is, the meeting event added by the user in the Scheduler app.

As shown in FIG. 6c, when the electronic device 100 receives an operation performed by the user on a Smart Travel app icon in the user interface 610 shown in FIG. 6c, the electronic device 100 displays, in response to the operation, a user interface 630 shown in FIG. 6d and provided by the Smart Travel app. The user interface 610 shown in FIG. 6c is the same as the user interface 610 shown in FIG. 6a described above. The description of fields on the user interface 610 in FIG. 6a is also applicable to the fields on the user interface 610 shown in FIG. 6c.

As shown in FIG. 6d, the user interface 630 displays information 631 related to "air ticket from Beijing to Shenzhen", such as flight number, departure time, departure location, landing time, landing location, aircraft model, and displays a Book control 632. When the electronic device 100 receives an operation performed by the user on the Book control 632 in the user interface 630, the Scheduler app of the electronic device 100 receives, in response to the operation, the to-do event edited by the user, that is, the event added by the user in the Scheduler app.

Understandably, FIG. 6a to FIG. 6d merely show examples of a user interface in which the user adds an event through the Scheduler app and the Smart Travel app. The examples do not constitute any limitation on this application.

In some embodiments of this application, an event displayed in a home screen card is an event automatically arranged by the electronic device without user operation, for example, a weather event generated in a weather forecast app and a calendar event generated in a Calendar app of the electronic device.

S402: The electronic device 100 displays the home screen card on an outer screen.

When the inner screen of the electronic device 100 is in a folded state, the electronic device 100 can display a user interface through the outer screen. When an application of the electronic device 100 generates an event shown in FIG. 6a to FIG. 6d, the electronic device 100 can display a home screen card in the user interface of the outer screen based on a display rule corresponding to the outer screen, where the home screen card includes the event of the application.

Understandably, the event displayed in the home screen card may be an event generated after the user inputs the event information through the application. For example, when the electronic device 100 receives a user operation of adding a schedule event in the Scheduler app by inputting schedule information, the electronic device 100 may generate and display a home screen card that includes the schedule event; or, when the electronic device 100 receives a user operation of booking a flight in the Smart Travel app by inputting flight information, the electronic device 100 may generate and display a home screen card that includes the flight event.

When the electronic device 100 displays a home screen card in the user interface of the outer screen based on a display rule corresponding to the outer screen, where the home screen card includes the event of the application, the home screen card may be displayed in the following circumstances.

Figure 7A:
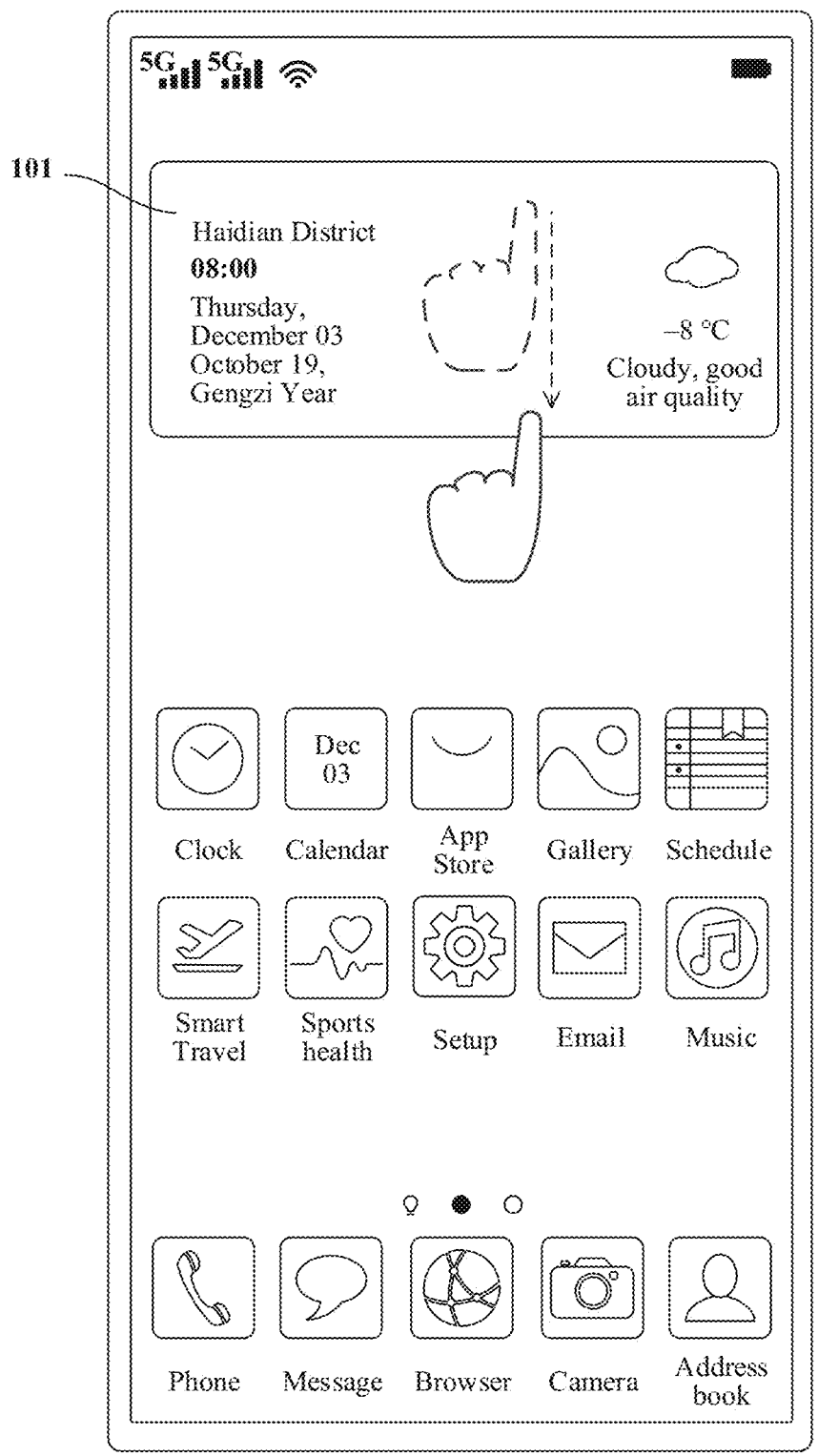
FIG. 7a to FIG. 7c are schematic diagrams of a group of user interfaces according to an embodiment of this application.
Figure 7B:
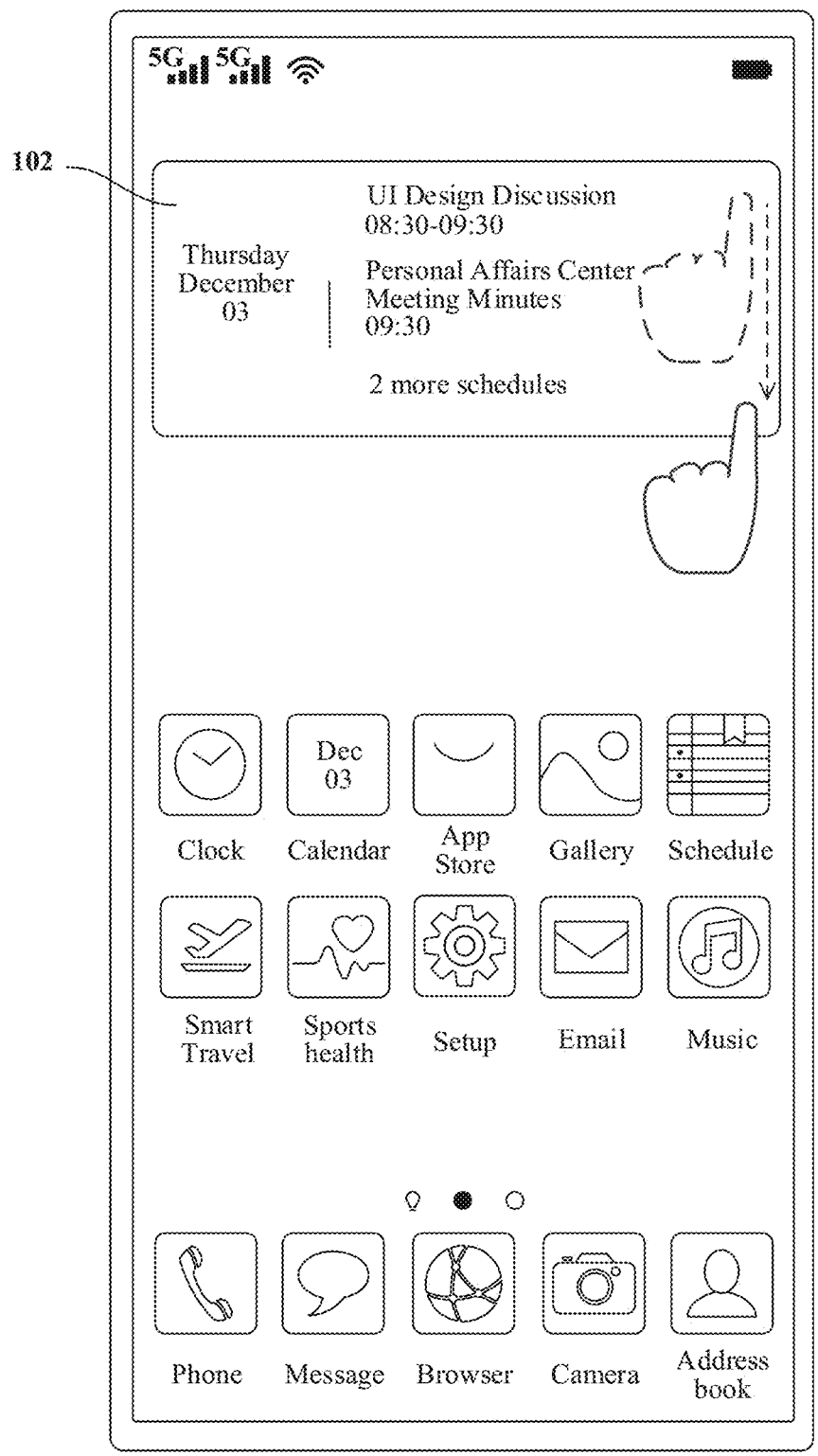
Figure 7C:
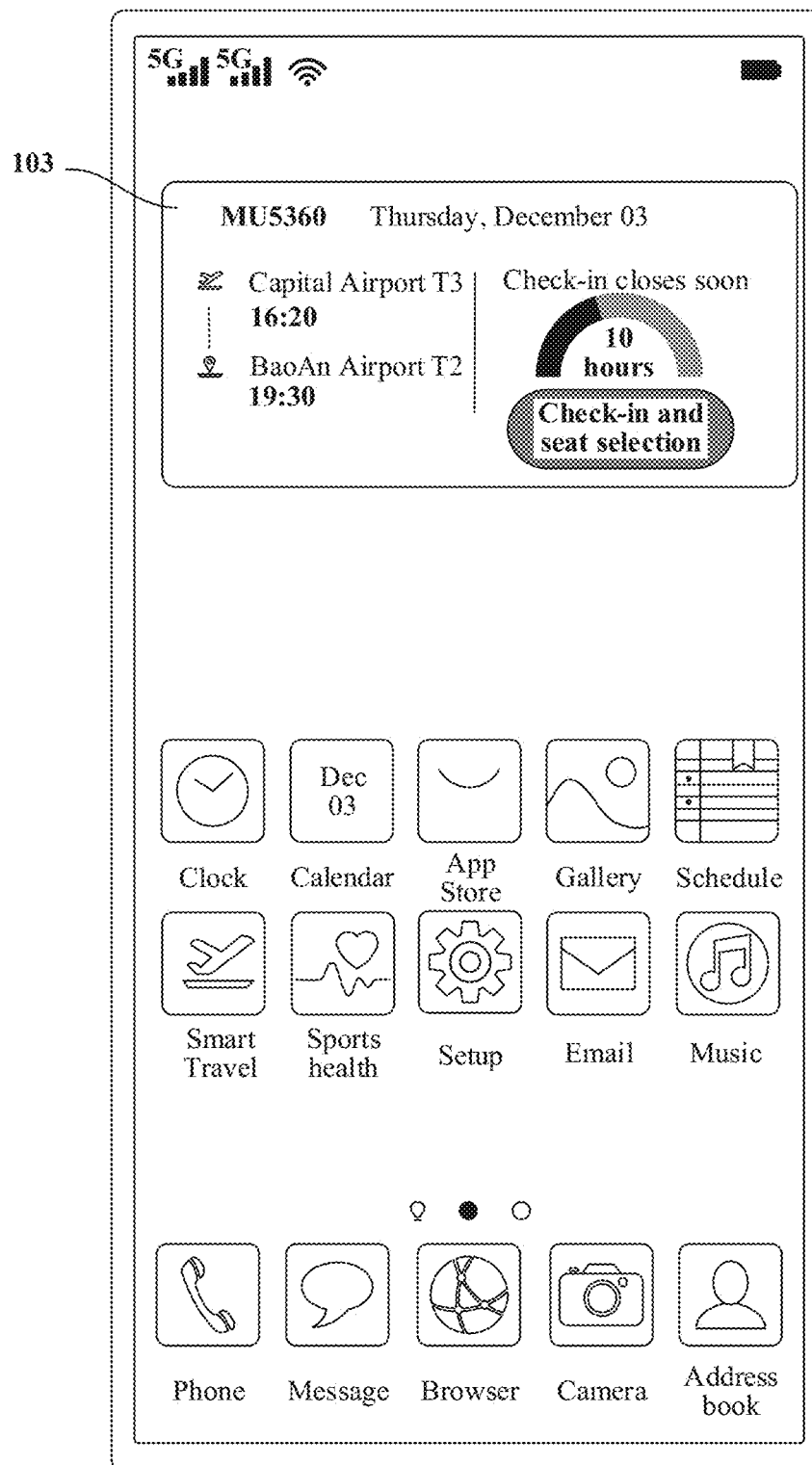

In some embodiments of this application, when the electronic device 100 generates a plurality of home screen cards to form a home screen card set, the electronic device 100 may display the home screen card set in a stacked manner in the user interface of the outer screen. The user may perform a gesture operation on a home screen card to switch the display between the home screen cards. Referring to FIG. 7a to FIG. 7c, FIG. 7a to FIG. 7c exemplarily show an operation performed by a user on a home screen card set on an outer screen of the electronic device 100.

As shown in FIG. 7a, the user interface 710 displays a Climate Clock card 101. The Climate Clock card 101 may be a default home screen card that is set by the electronic device 100 in a home screen card set.

When the electronic device 100 receives a swipe-down operation performed by the user on the Climate Clock card 101 in the user interface 710 shown in FIG. 7a, the electronic device 100 displays, in response to the operation, a user interface 720 shown in FIG. 7b. The user interface 720 displays a Scheduler card 102.

As shown in FIG. 7b, when the electronic device 100 receives a swipe-down operation performed by the user on the Scheduler card 102 in the user interface 720 shown in FIG. 7b, the electronic device 100 displays, in response to the operation, a user interface 730 shown in FIG. 7c. The user interface 730 displays a Flight Info card 103.

Understandably, the electronic device 100 may set the Climate Clock card as a card displayed by default in the home screen card set.

In some embodiments of this application, when the user interface of the outer screen of the electronic device 100 displays a home screen card set, the electronic device 100 may further switch the display between different home screen cards in the home screen card set based on the event information included in the home screen card set.

An exemplary method for the electronic device 100 to switch the display between different home screen cards in the home screen card set is: The electronic device 100 detects the occurrence time of the event, and specifically, compares the occurrence time of each event included in the home screen card set with the current time of the electronic device 100; and, if the electronic device 100 determines that a time difference between the occurrence time of a target event and the current time is less than or equal to a preset time threshold such as 30 minutes, then the electronic device 100 may, instead, display the home screen card that includes the target event. For example, the Scheduler card includes an event named "UI Design Discussion", where the occurrence time is "8:30-9:30" and the place of meeting is "Beijing Building". In this case, the electronic device 100 obtains the occurrence time of "UI Design Discussion" event, that is, 8:30. If the current time is 8:00 and the preset time threshold is 30 minutes, then the electronic device 100 compares the occurrence time with the current time and determines that the time difference between the occurrence time of the "UI Design Discussion" event and the current time is equal to the preset time threshold 30 minutes. Therefore, the electronic device 100 may display the Scheduler card in the home screen card set instead, for example, switch the default home screen card in the home screen card set from the Climate Clock card to the Scheduler card.

S403: The electronic device 100 displays the home screen card on the inner screen in response to a user operation of unfolding the inner screen.

The user operation of unfolding the inner screen of the electronic device 100 may be: The user unfolds the inner screen of the electronic device while the outer screen of the electronic device 100 keeps displaying the user interface that includes the home screen cards; and, after the user unfolds the inner screen of the electronic device 100, the electronic device 100 may display the user interface through the inner screen. To be specific, based on the dimensions or ratio of the inner screen relative to the outer screen, and based on a display rule corresponding to the inner screen, the electronic device 100 may display, in the user interface of the inner screen, the home screen card that includes the event of the application.

When the electronic device 100 displays a home screen card in the user interface of the inner screen based on a display rule corresponding to the inner screen, where the home screen card includes the event of the application, the home screen card may be displayed in the following circumstances.

In some embodiments of this application, based on a fact that the dimension of the inner screen of the electronic device 100 is larger than the dimension of the outer screen of the electronic device 100 (for example, the ratio of the dimension of the inner screen to the dimension of the outer screen is close to 2:1), when the electronic device 100 has generated a plurality of home screen cards to form a first home screen card set, the electronic device 100 may divide the first home screen card set into a first part of home screen card set and a second part of home screen card set, and display the first part of home screen card set and the second part of home screen card set in the user interface of the inner screen simultaneously. The first part of home screen card set may include one single home screen card, and keep displaying this home screen card all the time. The second part of home screen card set may include one or more home screen cards, and display the cards in a stacked manner. The first part of home screen card set and the second part of home screen card set may be displayed on the home screen of the inner screen in parallel.

A home screen card in the first part of home screen card set may be a default home screen card. For example, the default home screen card may be a Climate Clock card.

If a home screen card in the first home screen card set is a Climate Clock card before the user unfolds the inner screen of the electronic device 100, then, after the user unfolds the inner screen of the electronic device 100, the default home screen card in the second part of home screen card set in the user interface of the inner screen of the electronic device 100 may be a home screen card of a relatively high priority order in the first home screen card set except the Climate Clock card, for example, may be a Scheduler card that includes an imminent meeting or a Flight Info card that includes an upcoming airport check-in. If the second part of home screen card set includes a plurality of cards, the second part of home screen card set may be arranged on the home screen of the inner screen in the priority order recommended by YOYO Suggestion.

Before the user unfolds the inner screen of the electronic device 100, if a home screen card in the first home screen card set is a second home screen card other than the Climate Clock card that is the first home screen card, the second home screen card may be a card of top priority in the first home screen card set except the first home screen card, or may be different from the card of top priority in the first home screen card set except the first home screen card, without being limited in this application. After the user unfolds the inner screen of the electronic device 100, the default home screen card displayed in the second part of home screen card set may keep consistent with the second home screen card displayed before the user unfolds the inner screen of the electronic device 100. For example, if the home screen card in the first home screen card set is a Scheduler card before the user unfolds the inner screen of the electronic device 100, then, after the user unfolds the inner screen of the electronic device 100, the default home screen card in the second part of home screen card set in the user interface of the inner screen of the electronic device 100 is the Scheduler card.

Referring to FIG. 8*a* to FIG. 8*e*, FIG. 8*a* to FIG. 8*e* show an example of a home screen card set displayed on the inner screen of the electronic device 100.

Figure 8A:
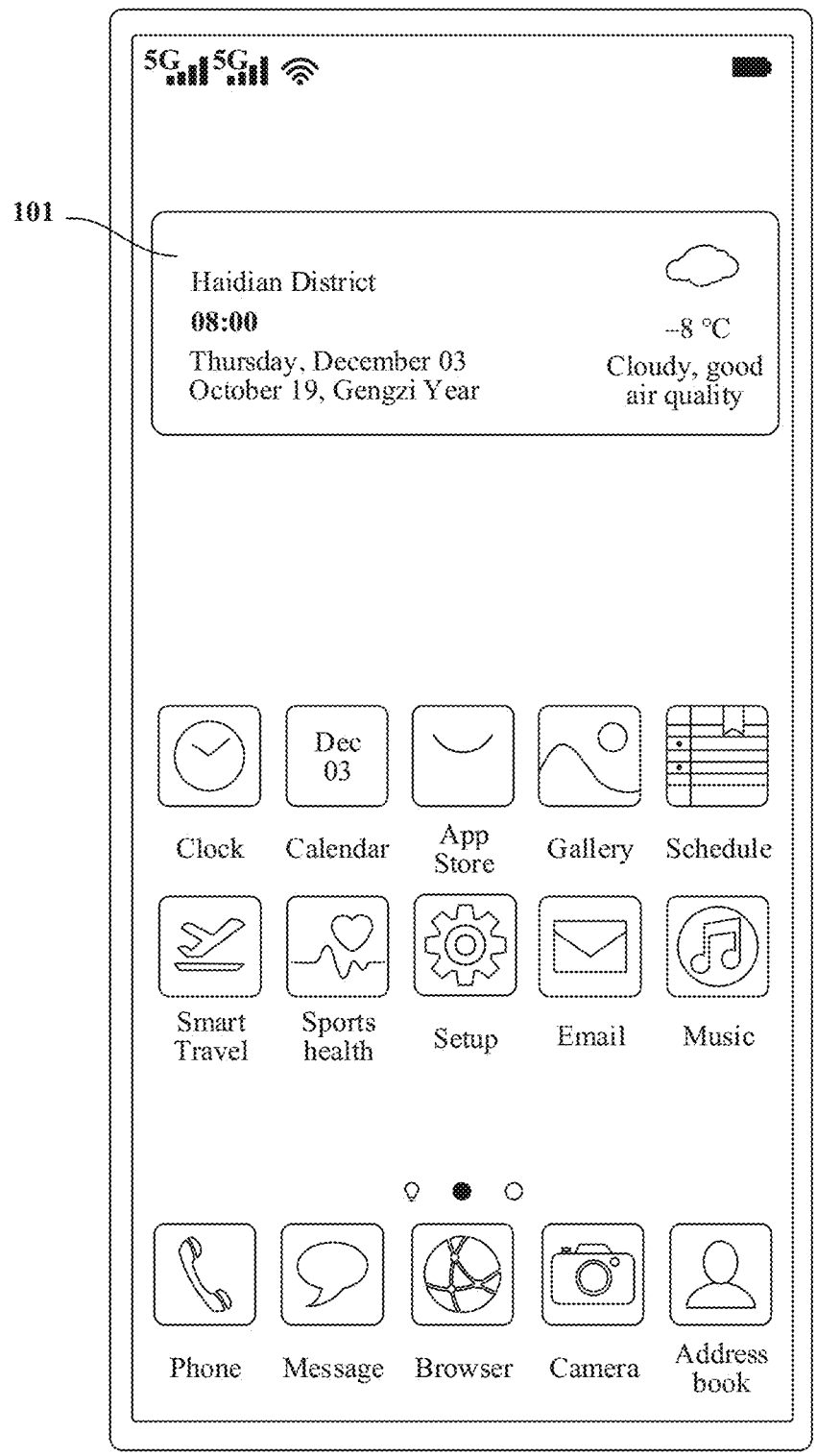
FIG. 8a to FIG. 8e are schematic diagrams of a group of user interfaces according to an embodiment of this application.
Figure 8B:
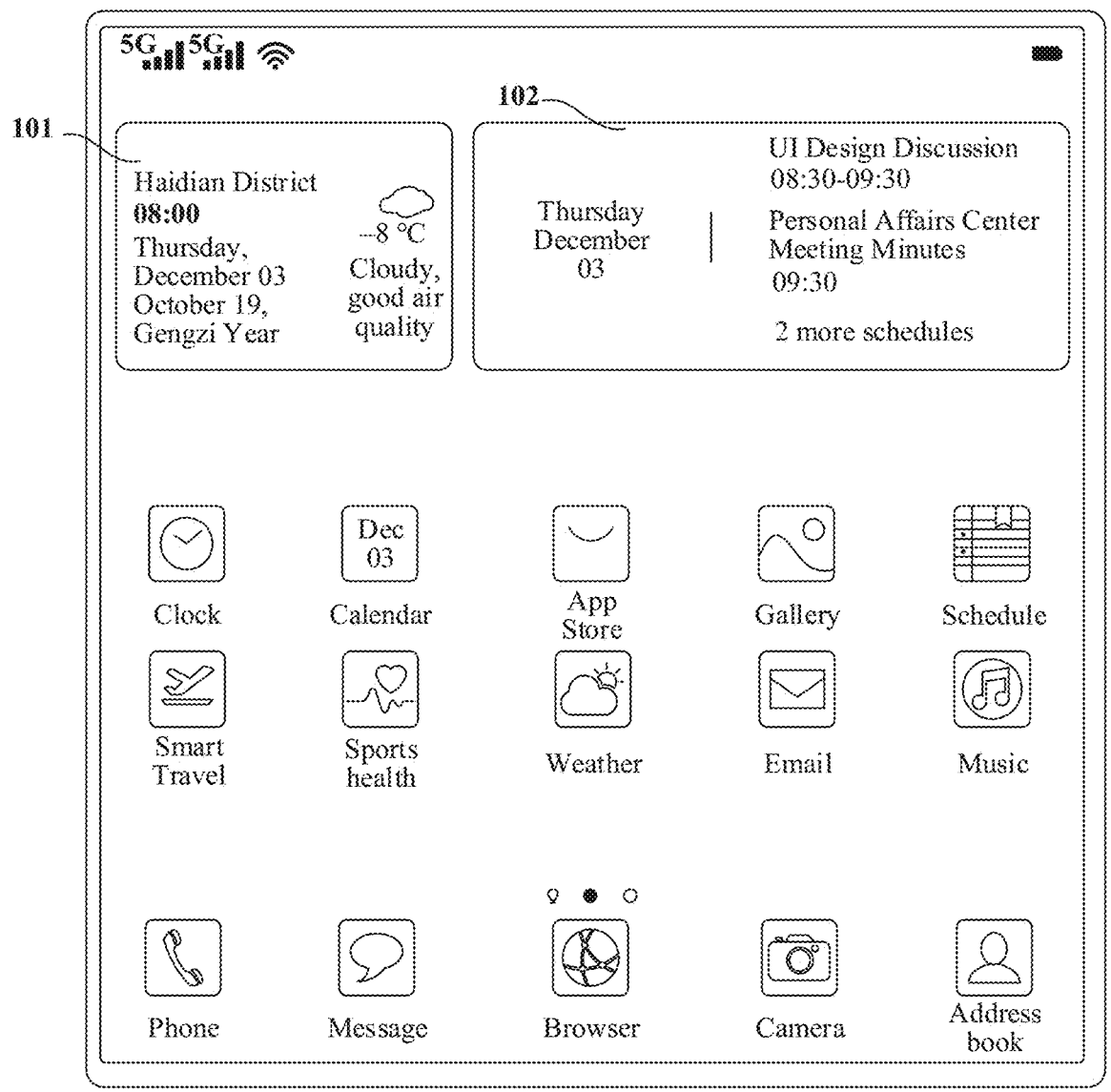

As shown in FIG. 8*a*, FIG. 8*a* exemplarily shows a user interface 810 displayed on the outer screen of the electronic device 100. The user interface 810 displays a Climate Clock card 101. After the user unfolds the inner screen of the electronic device 100, as shown in FIG. 8*b*, the inner screen of the electronic device 100 displays a user interface 820. The dimensional ratio between the inner screen and the outer screen is close to 2:1. Therefore, in the user interface 820, the first part of home screen card set may be displayed in parallel with the second part of home screen card set. The first part of home screen card set may include a Climate Clock card 101 alone. In addition, the electronic device 100 may set the Climate Clock card 101 to be displayed constantly so that the user is unable to switch the home screen card by performing a gesture operation on the Climate Clock card 101. The second part of home screen card set may be displayed in a stacked manner. As shown in FIG. 8*b*, a Scheduler card 102 in the second part of home screen card set is displayed. The Scheduler card 102 may be a home screen card of a relatively high priority order in the first home screen card set.

Figure 8C:
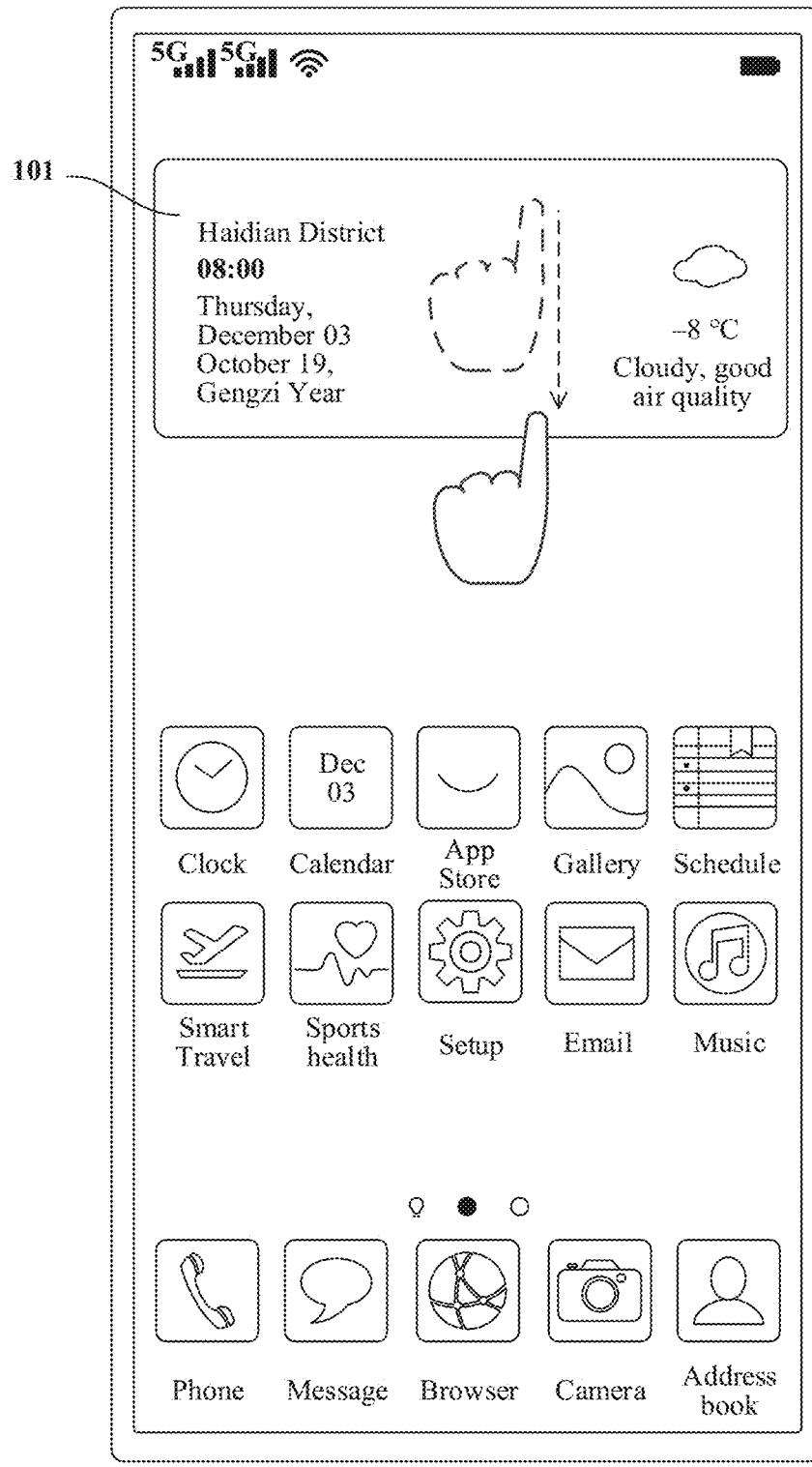
Figure 8D:
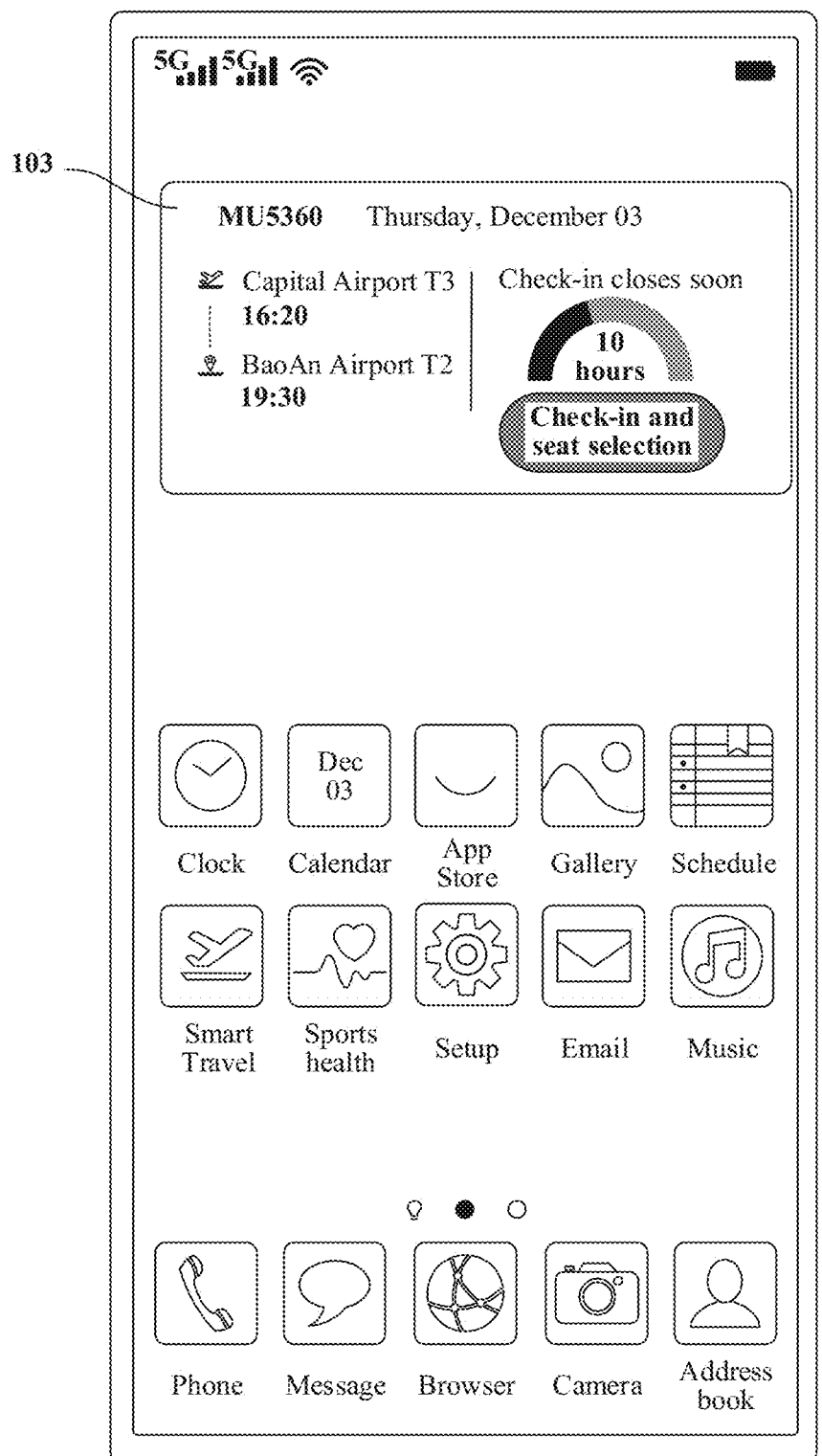

When the electronic device 100 receives a swipe-down operation performed by the user on the Climate Clock card 101 in the user interface 810 shown in FIG. 8*c*, the electronic device 100 displays, in response to the operation, a user interface 830 shown in FIG. 8*d*. The user interface 830 displays a Flight Info card 103.

Figure 8E:
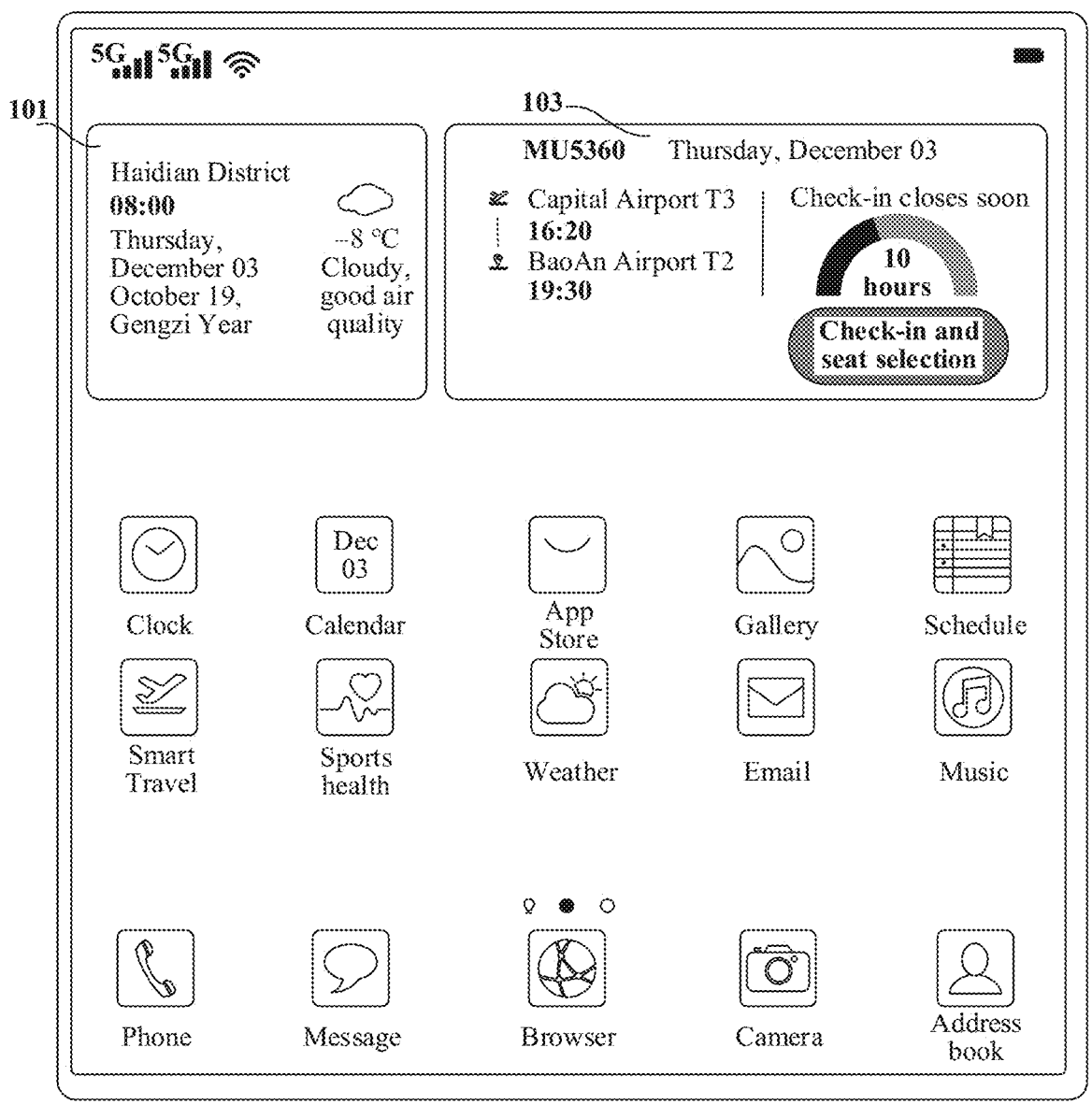

After the user unfolds the inner screen of the electronic device 100, as shown in FIG. 8*e*, the inner screen of the electronic device 100 displays a user interface 840, as shown in FIG. 8*e*. In the user interface 840, in the first part of home screen card set, the Climate Clock card 101 is displayed. In the second part of home screen card set, the Flight Info card 103 is displayed by default.

In some embodiments of this application, the user may switch the display between different home screen cards by performing a gesture operation on the second part of home screen card set. In response to an operation performed by the user on the second part of home screen card set on the inner screen, the electronic device 100 can change the home screen card displayed on the inner screen.

Referring to FIG. 9*a* to FIG. 9*e*, FIG. 9*a* to FIG. 9*e* show an example of how the electronic device 100 switches between home screen cards in response to an operation performed by the user on a home screen card set displayed on the inner screen.

Figure 9A:
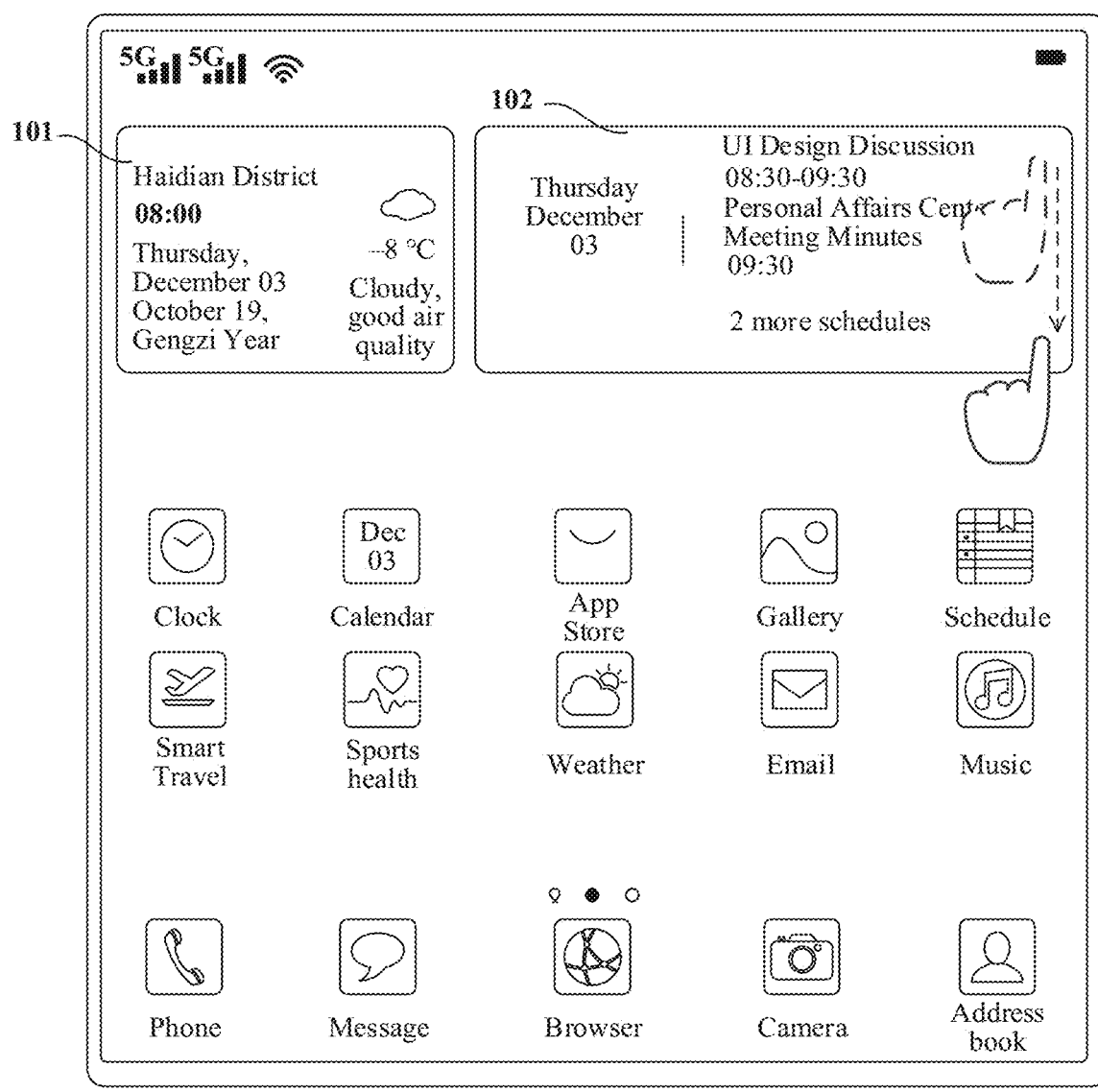
FIG. 9a to FIG. 9e are schematic diagrams of a group of user interfaces according to an embodiment of this application.
Figure 9B:
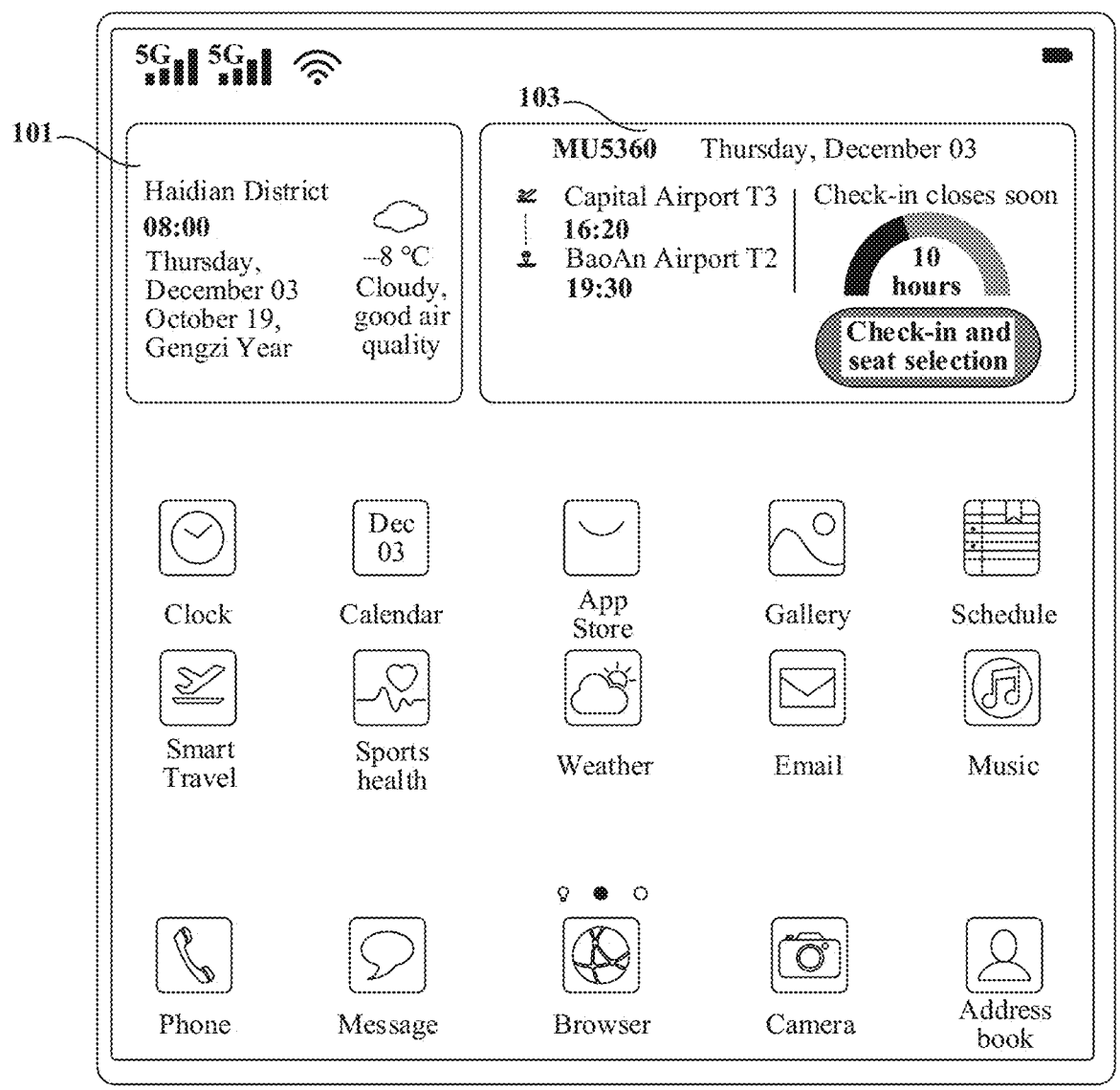

When the electronic device 100 receives a swipe-down operation performed by the user on the Scheduler card 102 in the user interface 910 shown in FIG. 9*a*, the electronic device 100 displays, in response to the operation, a user interface 920 shown in FIG. 9*b*. The user interface 920 displays a Flight Info card 103.

Figure 9C:
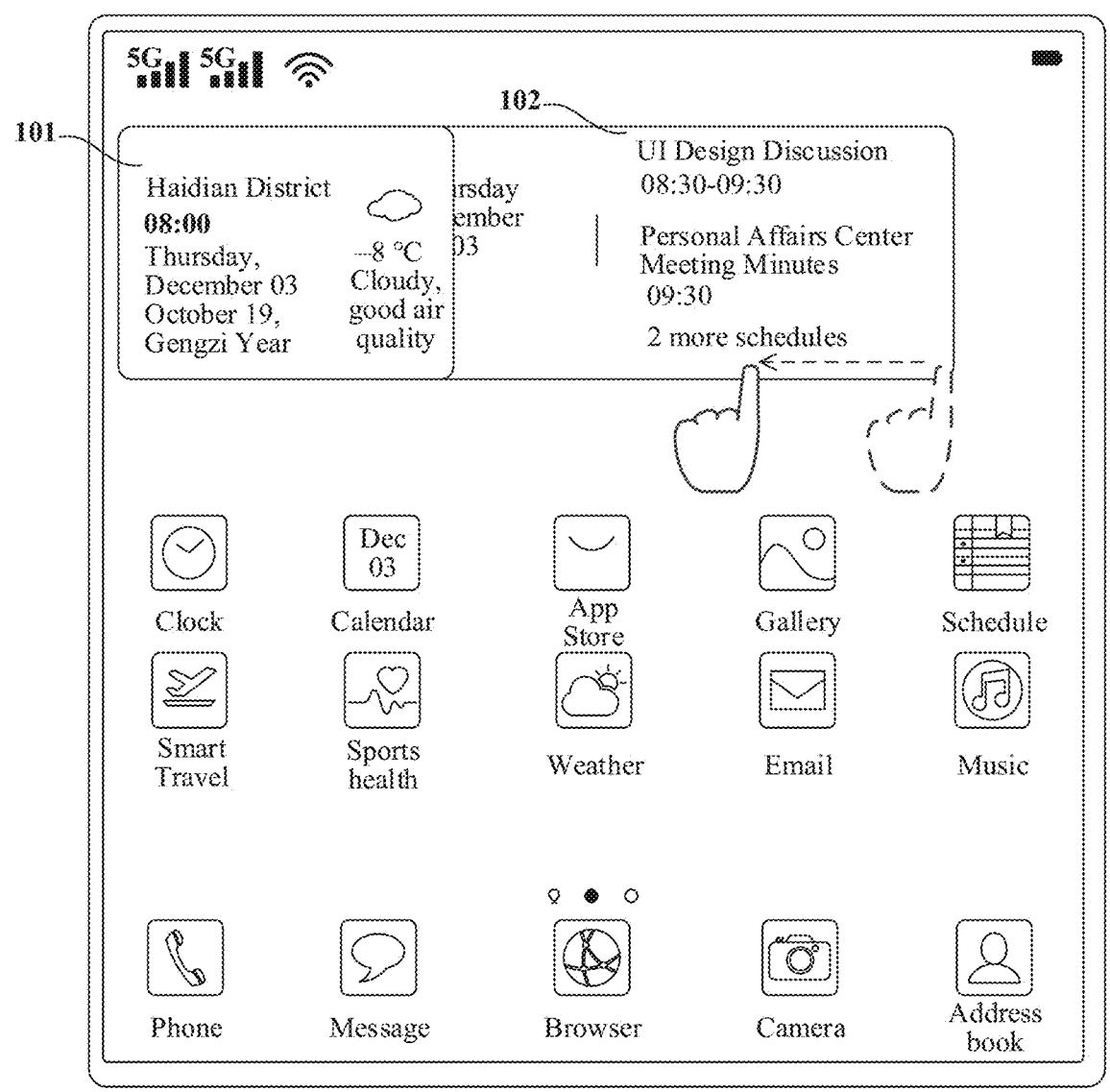

As shown in FIG. 9*c*, when the electronic device 100 receives a swipe-left operation performed by the user on the Scheduler card 102 in the user interface 910 shown in FIG. 9*c*, the electronic device 100 deletes the Scheduler card 102 from the second part of home screen card set in response to the operation. The electronic device 100 displays the user interface 930 shown in FIG. 9*b*. The user interface 930 displays the Flight Info card 103.

The process of swiping leftward the Scheduler card 102 may include: The Scheduler card 102 is swiped leftward to enter the space under the Climate Clock card 101 and then move away from the second part of home screen card set. In the above process, the Climate Clock card 101 remains displayed all the time. That is, when the Scheduler card 102 is swiped leftward to enter the space under the Climate Clock card 101, the electronic device 100 can set the Climate Clock card 101 as a mask.

Figure 9D:
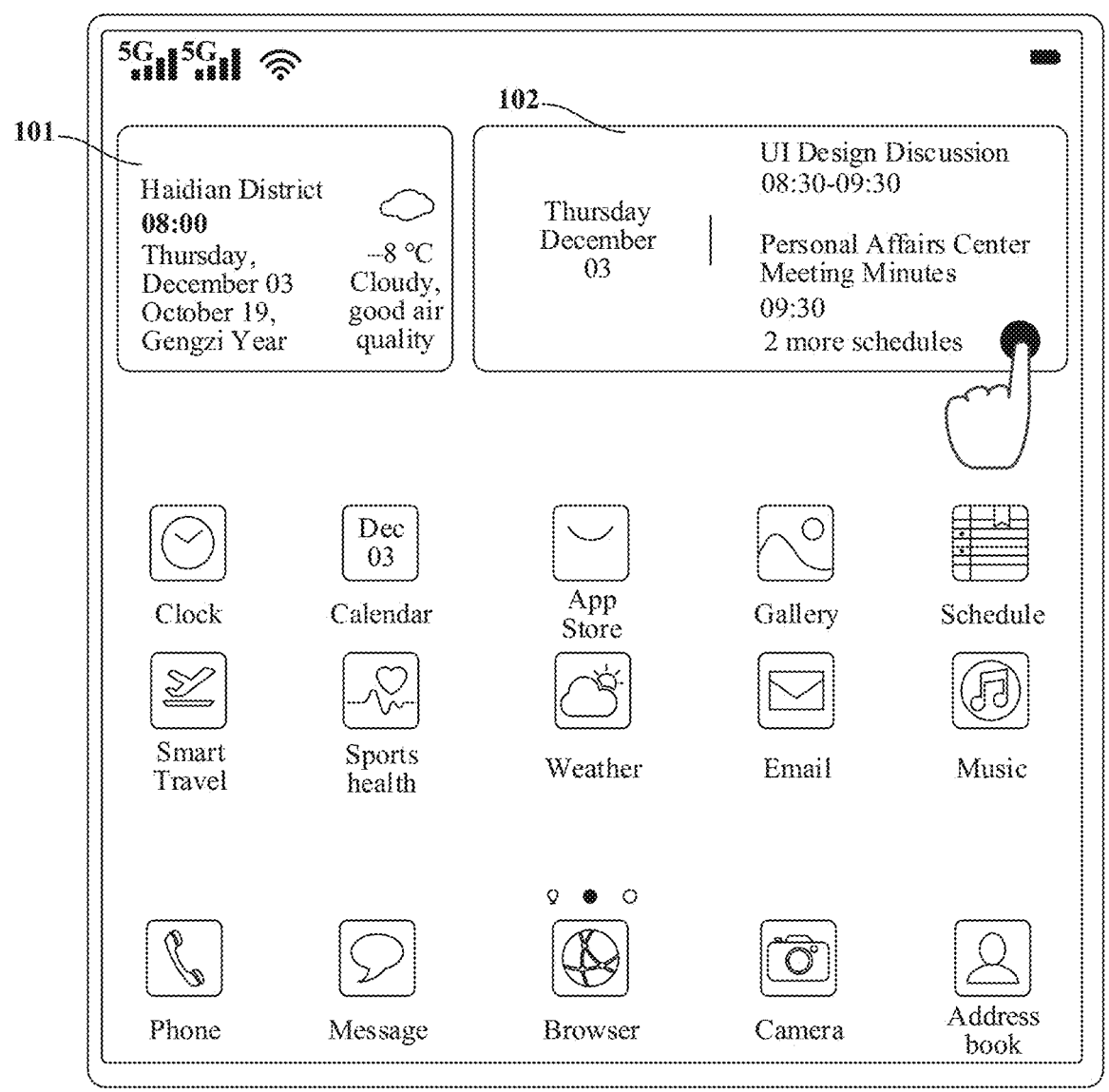
Figure 9E:
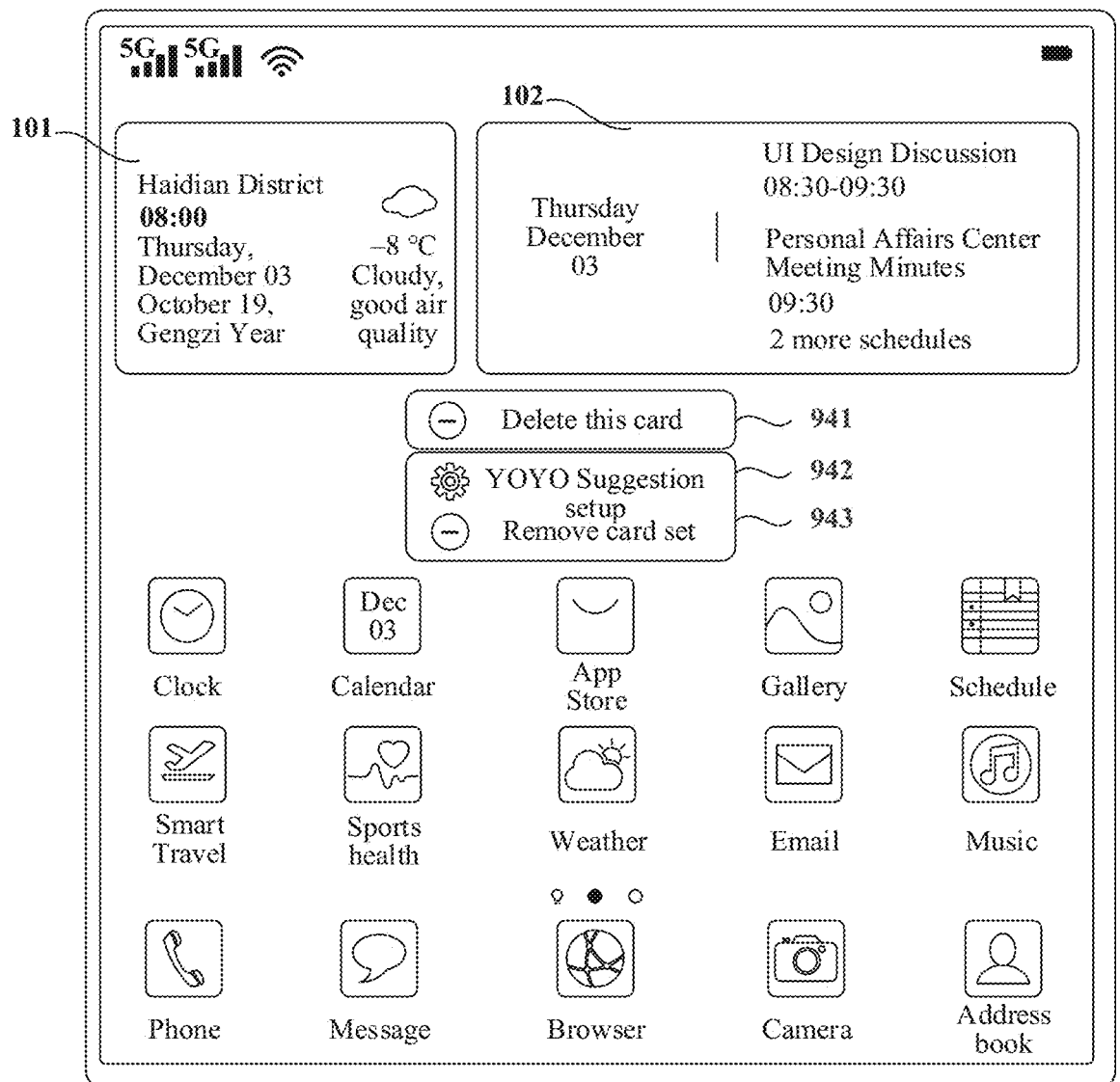

Understandably, in the process by which the Scheduler card 102 is swiped leftward to enter the space under the Climate Clock card 101, the user interface of the electronic device 100 may pop up a prompt of confirming whether to delete the Scheduler card 102, as shown in FIG. 9*e*. The electronic device 100 may delete the Scheduler card 102 from the second part of home screen card set in response to a confirmation operation of the user.

As shown in FIG. 9*d*, when the electronic device 100 receives a touch-and-hold operation performed by the user on the Scheduler card 102 in the user interface 910 shown in FIG. 9*d*, the electronic device 100 displays, in response to the operation, a user interface 940 shown in FIG. 9*e*. The user interface 940 displays a Delete This Card control 941, a YOYO Suggestion option 942, and a Remove Card Set control 943.

When the electronic device 100 receives an operation performed by the user on the Delete This Card control 941 in the user interface 940, the electronic device 100 deletes the Scheduler card 102 from the second part of home screen card set in response to the operation. The electronic device 100 displays the user interface 920 shown in FIG. 9*b*. The user interface 920 displays the Flight Info card 103.

When the electronic device 100 receives an operation performed by the user on the YOYO Suggestion option 942 in the user interface 930, the electronic device 100 displays, in response to the operation, a user interface 540 shown in FIG. 5d. The user may turn on/off the home screen card corresponding to the event, and reset the home screen card set.

When the electronic device 100 receives an operation performed by the user on the Remove Card Set control 943 in the user interface 940, the electronic device 100 removes the second part of home screen card set from the user home screen of the inner screen in response to the operation.

Understandably, in some other embodiments of this application, when the user interface on the inner screen of the electronic device 100 displays the first part of home screen card set and the second part of home screen card set, the electronic device 100 may, instead, switch the display between different home screen cards in the second part of home screen card set based on the event information included in the second part of home screen card set. To be specific, the electronic device 100 may automatically switch between the home screen cards in the second part of home screen card set based on a priority order of the event information included in the second part of home screen card set. The priority order of the event information here may be determined based on the time information, location information, and importance information corresponding to the event information, for example.

Figure 10A:
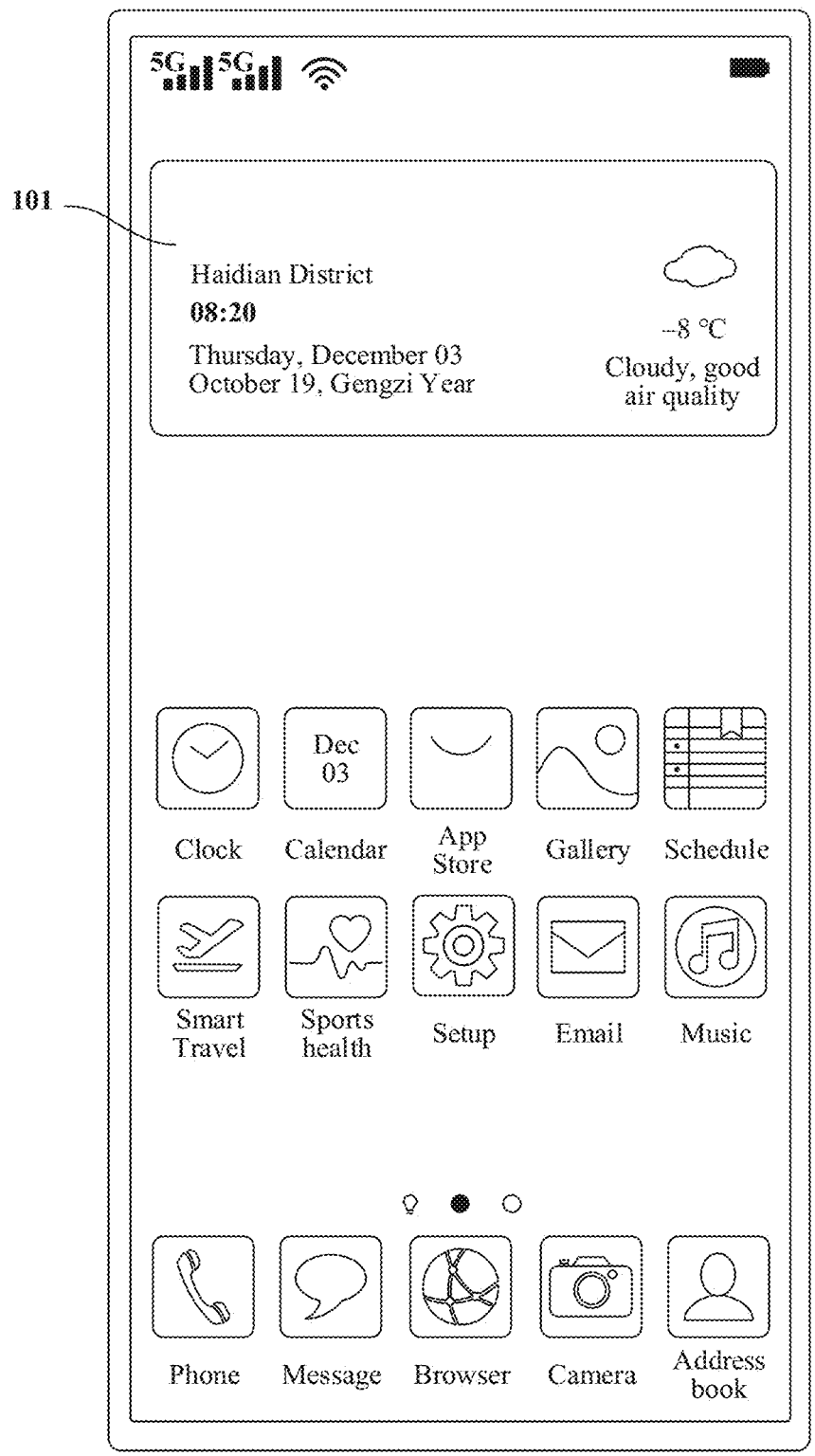
FIG. 10a to FIG. 10d are schematic diagrams of a group of user interfaces according to an embodiment of this application.
Figure 10B:
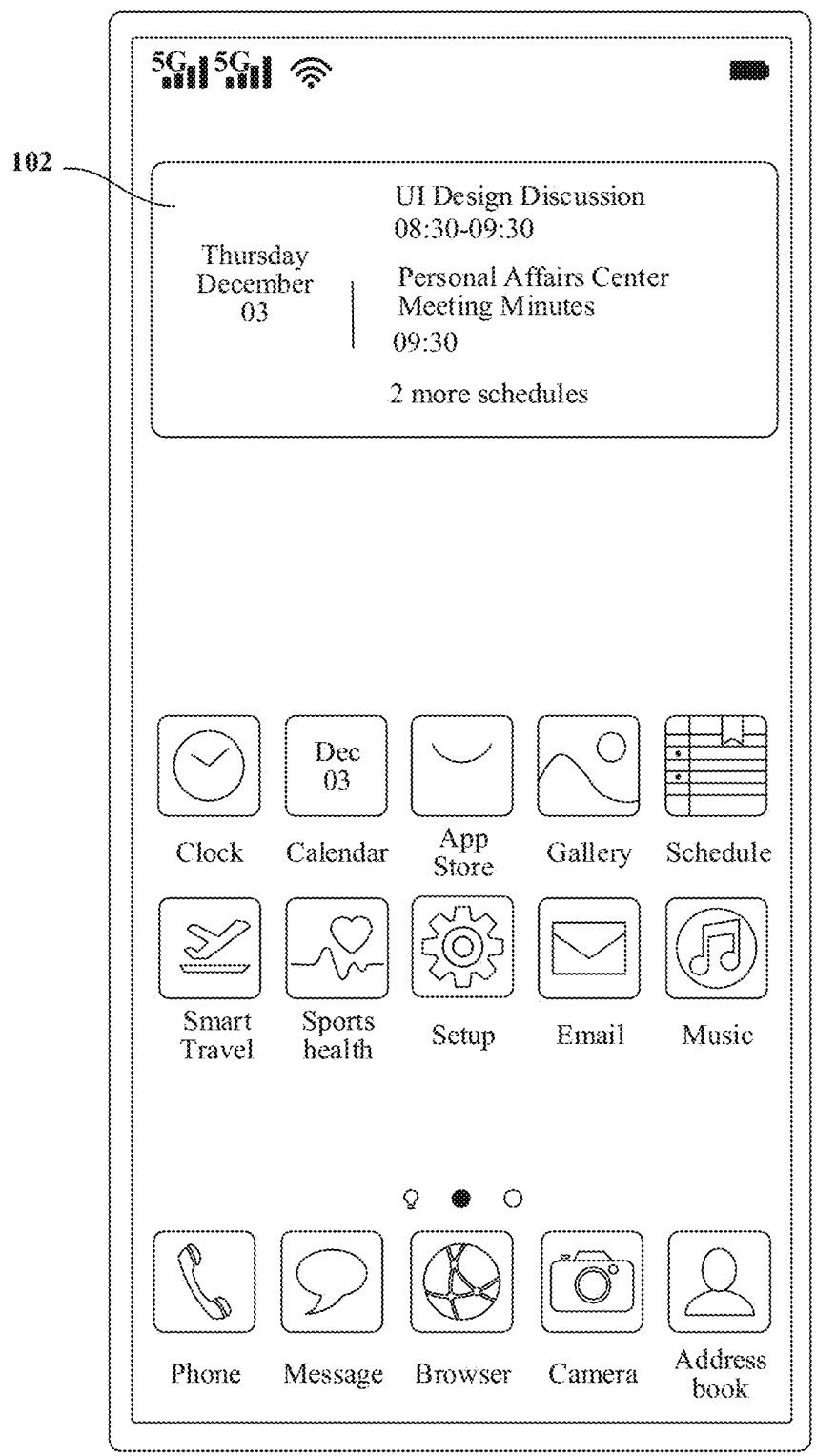

Referring to FIG. 10a to FIG. 10b. FIG. 10a to FIG. 10b show an example of automatic switching by the electronic device 100.

As shown in FIG. 10a, the electronic device 100 displays a user interface 1010 of the outer screen. The user interface 1010 displays a Climate Clock card 101. The Climate Clock card 101 may be a default home screen card that is set by the electronic device 100 in a home screen card set. For example: when the current time becomes "8:20" and when the electronic device 100 detects that a meeting scheduled for "8:30 to 9:30" is included in the Scheduler card 102 in the home screen card set on the outer screen, the electronic device 100 displays a user interface 1020 shown in FIG. 10b. The user interface 1020 displays the Scheduler card 102. The Scheduler card 102 prompts the user for the meeting scheduled for "8:30 to 9:30". For another example, when the electronic device 100 detects that a vehicle is booked by the user through a Smart Travel app, if the current location information (such as GPS information (Global Positioning System, Global Positioning System)) of the electronic device 100 changes toward the airport, then the electronic device 100 determines that the user is currently in a vehicle headed toward the airport. Therefore, the electronic device 100 may display a Flight Info card 103 in the home screen card set in the user interface. When all the events included in the home screen cards in the home screen card set have ended or fall within a preset time segment and no new event arises, the home screen card set in the user interface of the electronic device 100 may switch back to the Climate Clock card 101.

Understandably, the implementation shown in FIG. 10a to FIG. 10b, by which the electronic device 100 may switch between the home screen cards in the home screen card set based on the priority order of the event information included in the home screen card set on the outer screen, is also applicable to the second part of home screen card set on the inner screen of the electronic device 100.

In some other embodiments of this application, the electronic device 100 generates a Climate Clock card alone. This means that the user does not generate any event through the applications installed on the electronic device 100, or the user has closed all events through the YOYO Suggestion option, or the user has removed the home screen card set from the user interface of the electronic device 100. Therefore, the electronic device 100 may display Climate Clock in the user interface of the outer screen or inner screen in the form of a Climate Clock widget. The background of the climate clock displayed in the form of a widget may be consistent with the user interface.

Figure 10C:
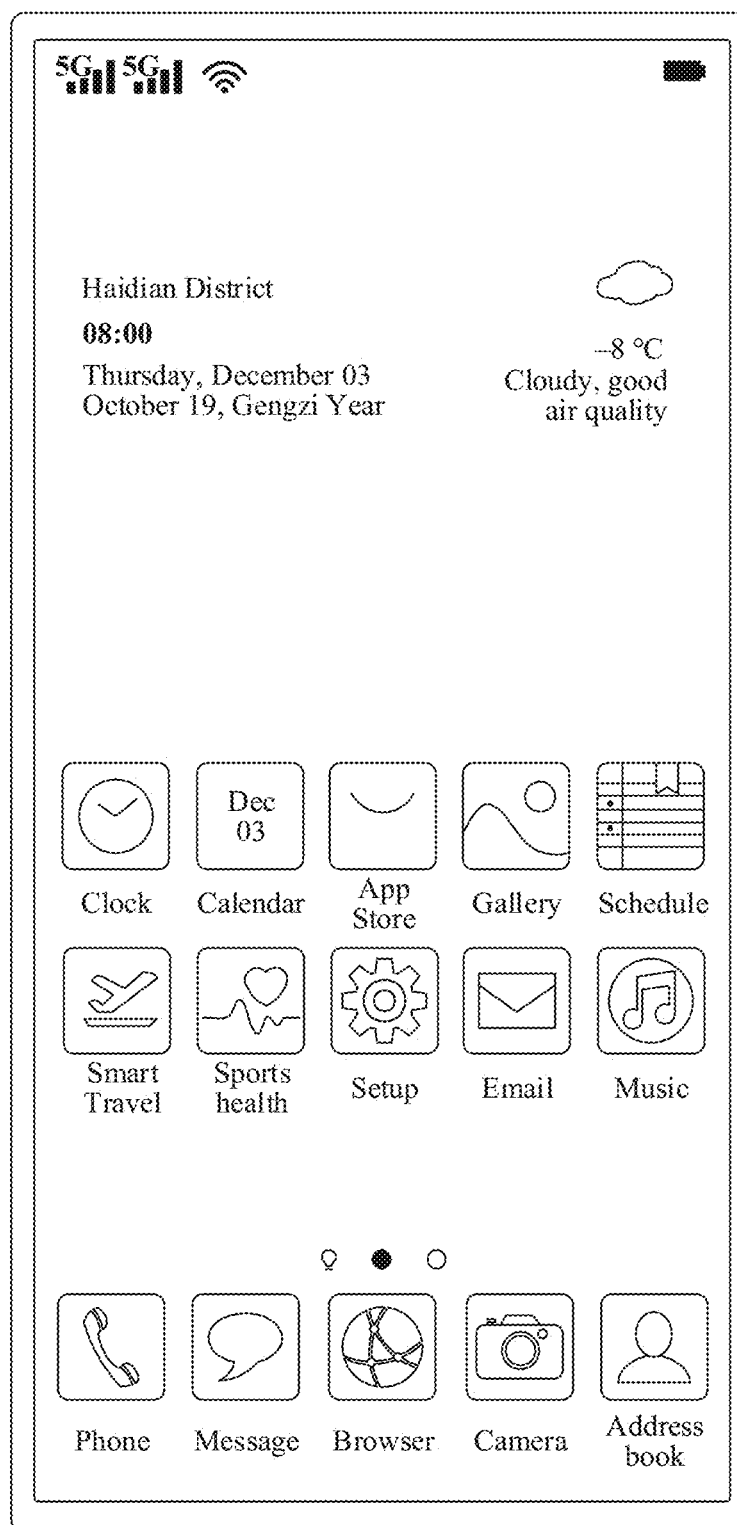
Figure 10D:

Referring to FIG. 10c to FIG. 10d. FIG. 10c to FIG. 10d show an example of displaying the climate clock in the form of a widget on the electronic device 100.

As shown in FIG. 10c, the electronic device 100 displays a user interface 1030 on the outer screen. As shown in FIG. 10d, the electronic device 100 displays a user interface 1040 on the outer screen. In the user interface 1030 and the user interface 1040, the background of the Climate Clock widget is consistent with the background of the user interface, and each element in the Climate Clock widget also conforms to the dimensions of the user interface.

S404: The electronic device 100 displays the home screen card on the outer screen in response to a user operation of folding the inner screen.

The user operation of folding the inner screen of the electronic device 100 may be: The user folds the inner screen of the electronic device while the inner screen of the electronic device 100 keeps displaying the user interface that includes the home screen cards; and, after the user folds the inner screen of the electronic device 100 again, the electronic device 100 may display the user interface through the outer screen, and once again, display, in the user interface of the outer screen and based on the display rule corresponding to the outer screen, the home screen card that includes the event of the application.

When the electronic device 100 displays a home screen card in the user interface of the outer screen based on a display rule corresponding to the outer screen, where the home screen card includes the event of the application, the home screen card may be displayed in the following additional circumstances.

In some embodiments of this application, before the user folds the inner screen of the electronic device 100, if the second part of home screen card set on the inner screen of the electronic device 100 displays a home screen card that includes an event, for example, a Scheduler card or a Flight Info card, the user interface on the outer screen of the electronic device 100 may display the home screen card of the event when the user folds the inner screen of the electronic device 100 again.

In a possible implementation, if the second part of home screen card set is stacked and displayed in order of priority on the inner screen, then, after it is detected that the inner screen is folded, the electronic device can still stack and display the home screen cards on the outer screen in the order of priority of the first part of home screen card set and the second part of home screen card set in a case that the first part of home screen card set and the second part of home screen card set are combined, stacked, and displayed on the outer screen. The card of top priority may be a Weather card in the first part of home screen card set, or a card in the second part of home screen card set.

In a possible implementation, if the user performs a swipe operation on the rank order of the second part of home screen card set on the inner screen, then, in response to the swipe operation, the card displayed on the top layer of the second part of home screen card set is a card other than the card of top priority in the second part of home screen card set. For example, if the second part of home screen card set includes card a, card b, and card c, and the priority of card a is the highest, then the card b is displayed on the top layer of the second part of home screen card set after the user swipes. In this case, after it is detected that the inner screen is folded, when the first part of home screen card set and the second part of home screen card set are displayed on the outer screen in a combined and stacked manner, card b is displayed on the top layer, where card b is a card displayed on the top layer in the second part of home screen card set before folding.

Figure 11A:
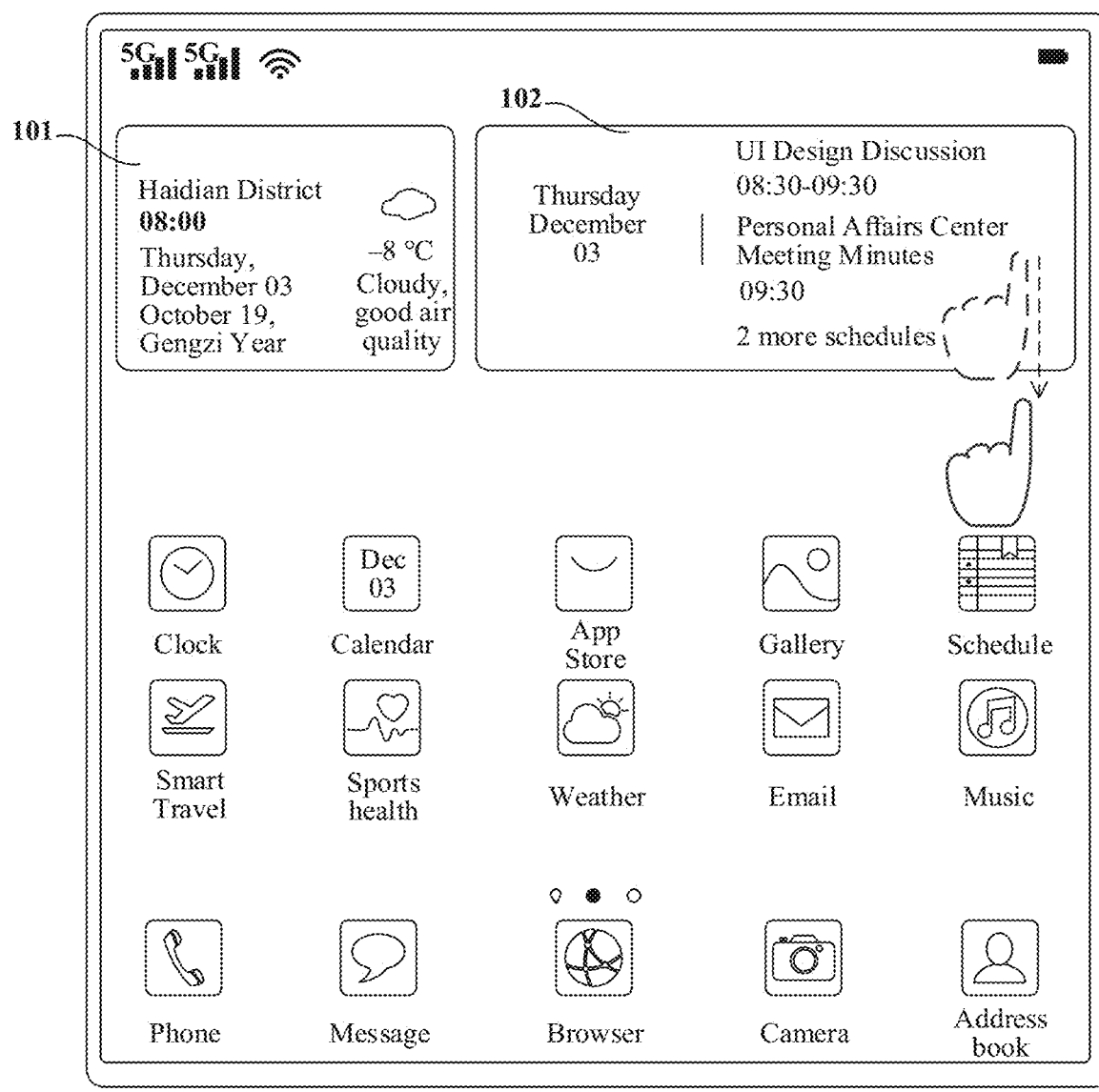
FIG. 11a to FIG. 11c are schematic diagrams of a group of user interfaces according to an embodiment of this application.
Figure 11B:
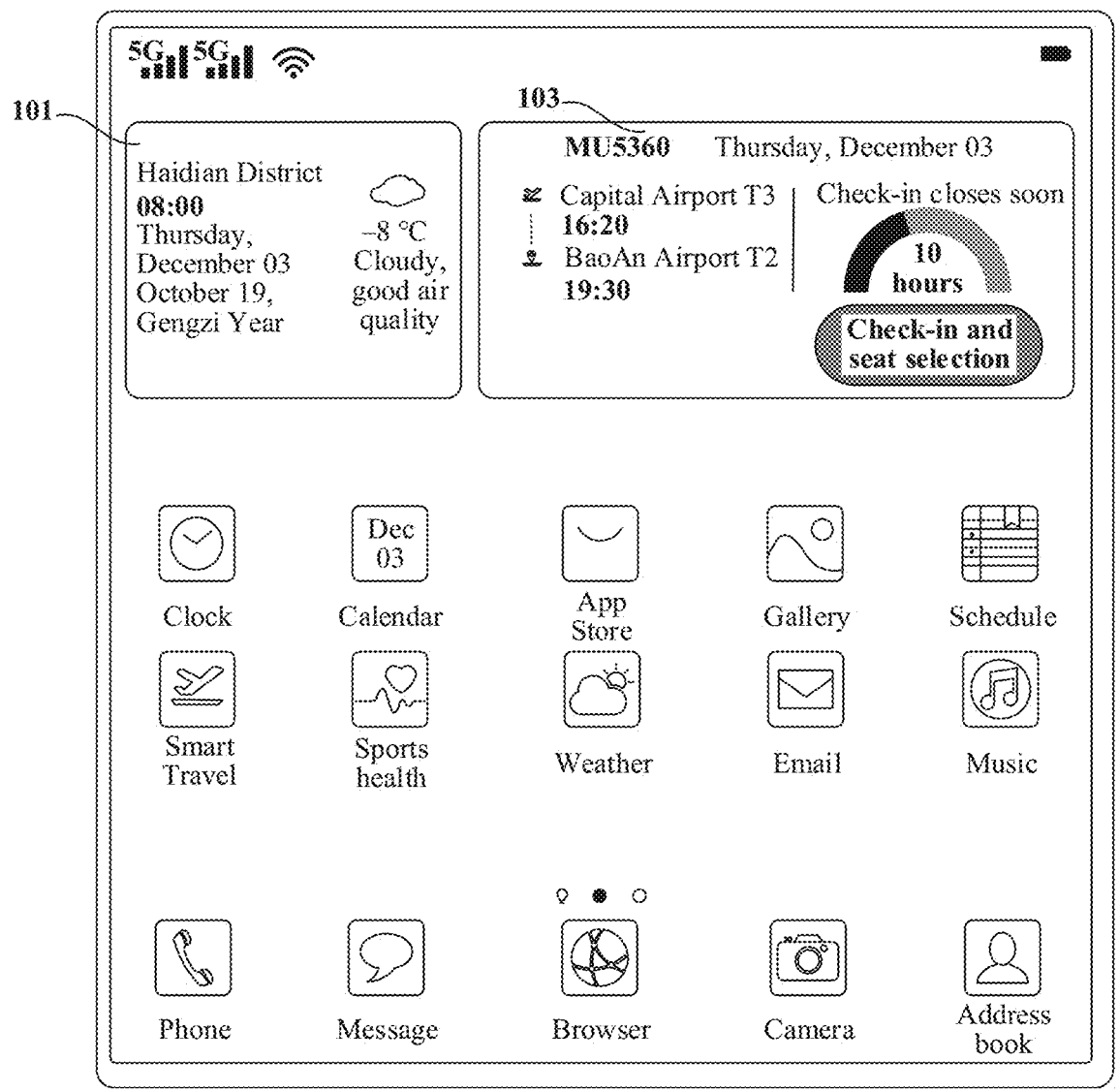
Figure 11C:
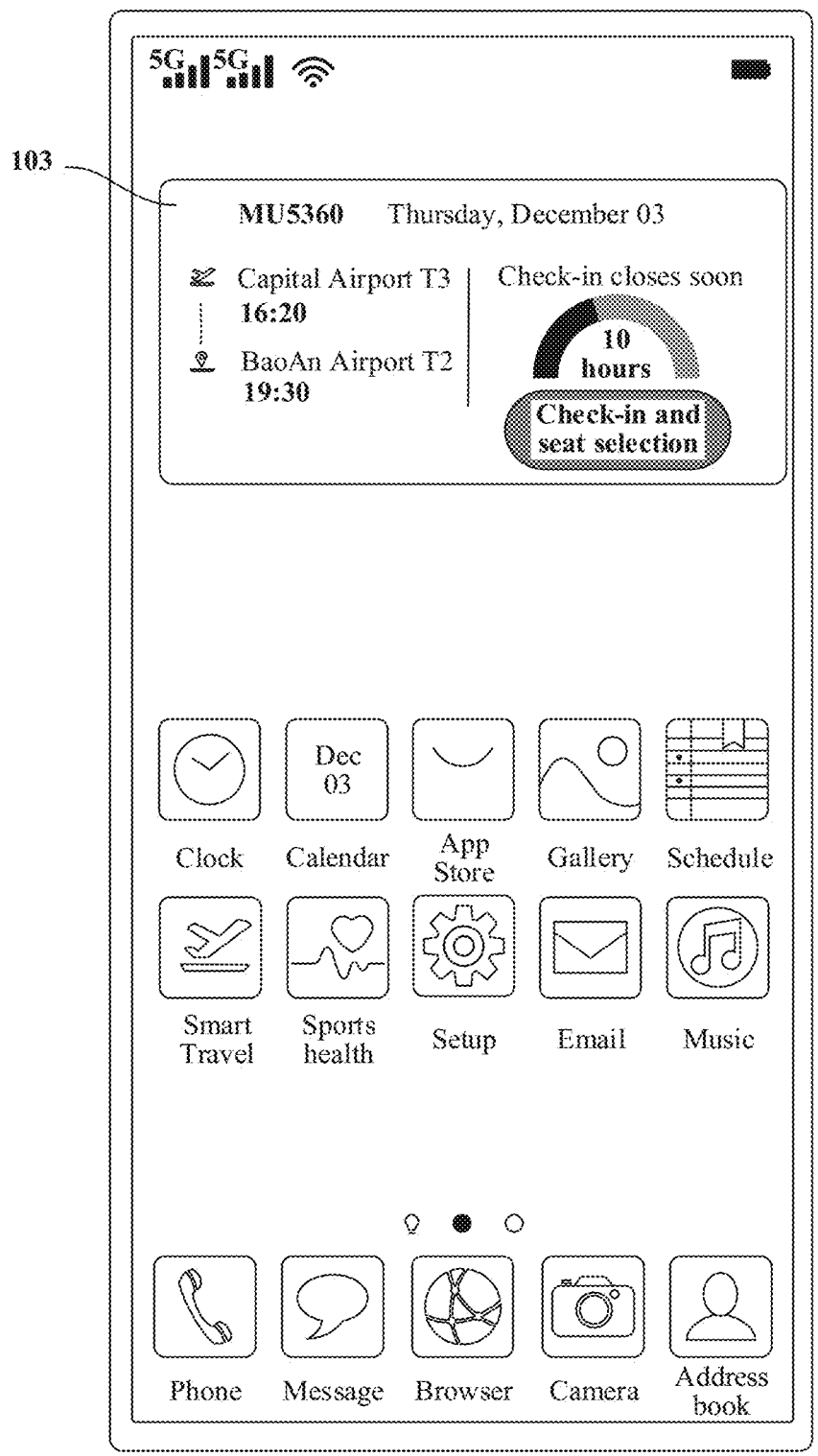

Referring to FIG. 11a to FIG. 11c, FIG. 11a to FIG. 11c show an example of a home screen card set displayed on the outer screen of the electronic device 100.

As shown in FIG. 11a, FIG. 11a exemplarily shows a user interface 1110 displayed on the inner screen of the electronic device 100. In the first part of home screen card set in the user interface 1110, the Climate Clock card 101 is displayed. In the second part of home screen card set, the Scheduler card 102 is displayed. When the electronic device 100 receives a swipe-down operation performed by the user on the Scheduler card 102 in the user interface 1110 shown in FIG. 11a, the electronic device 100 displays, in response to the operation, a user interface 1120 shown in FIG. 11b. In the first part of home screen card set in the user interface 1120, the Climate Clock card 101 is displayed. In the second part of home screen card set, the Flight Info card 103 is displayed. After the user folds the inner screen of the electronic device 100, as shown in FIG. 11c, the outer screen of the electronic device 100 displays the user interface 1130. The user interface 1130 displays the Flight Info card 103.

In some embodiments of this application, when the electronic device 100 displays a user home screen through the outer screen, the electronic device 100 can still switch the display between different home screen cards in the home screen card set in response to a gesture operation performed by the user on the home screen card set or based on the event information included in the home screen card set, as described in step S402.

Understandably, in some other embodiments of this application, the electronic device may, instead, display the home screen cards in the user interface on a leftmost home screen by using the home screen card display method illustrated in FIG. 4.

Figure 12A:
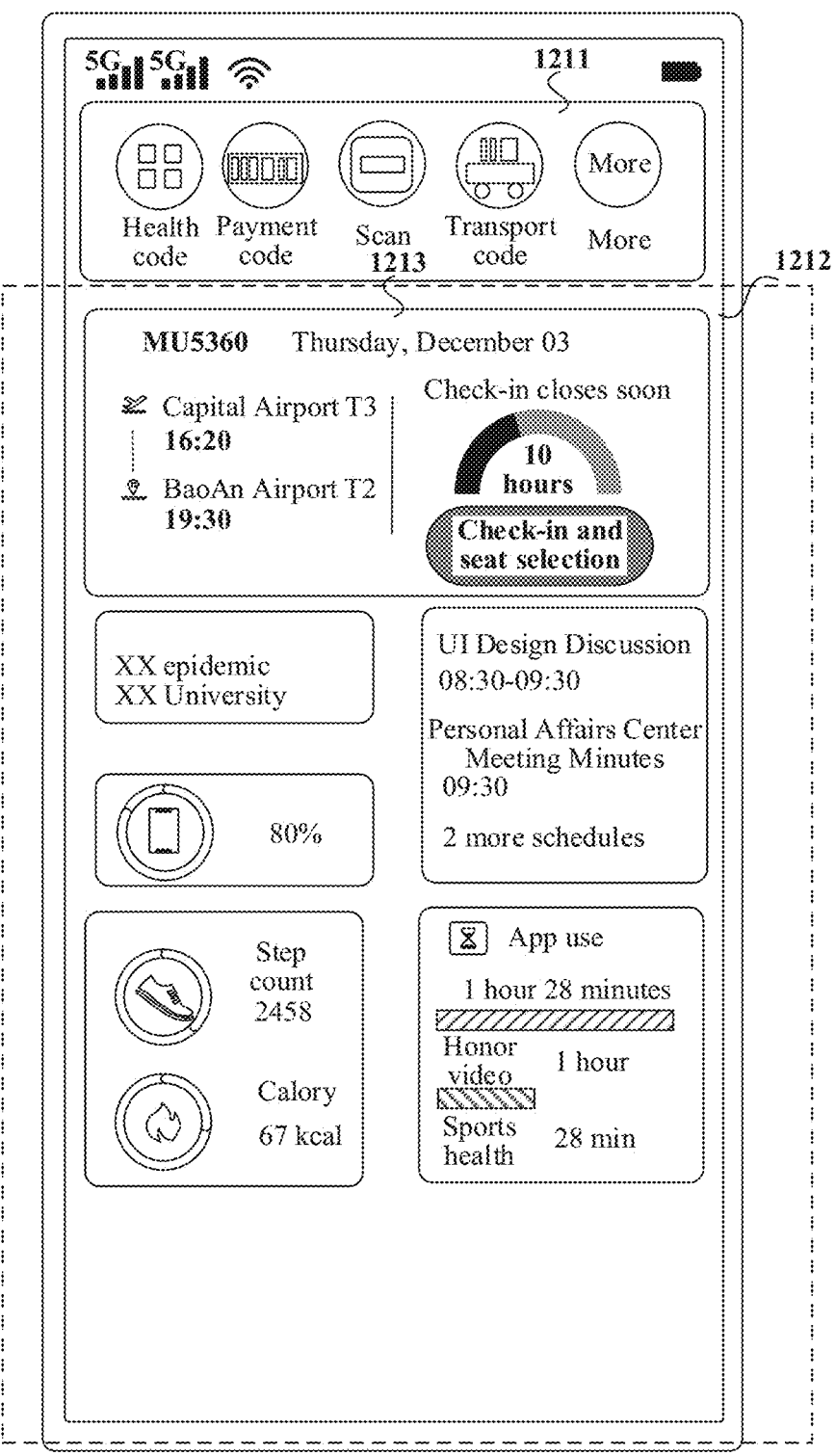
FIG. 12a to FIG. 12b are schematic diagrams of a group of user interfaces on a leftmost home screen of an electronic device according to an embodiment of this application.
Figure 12B:
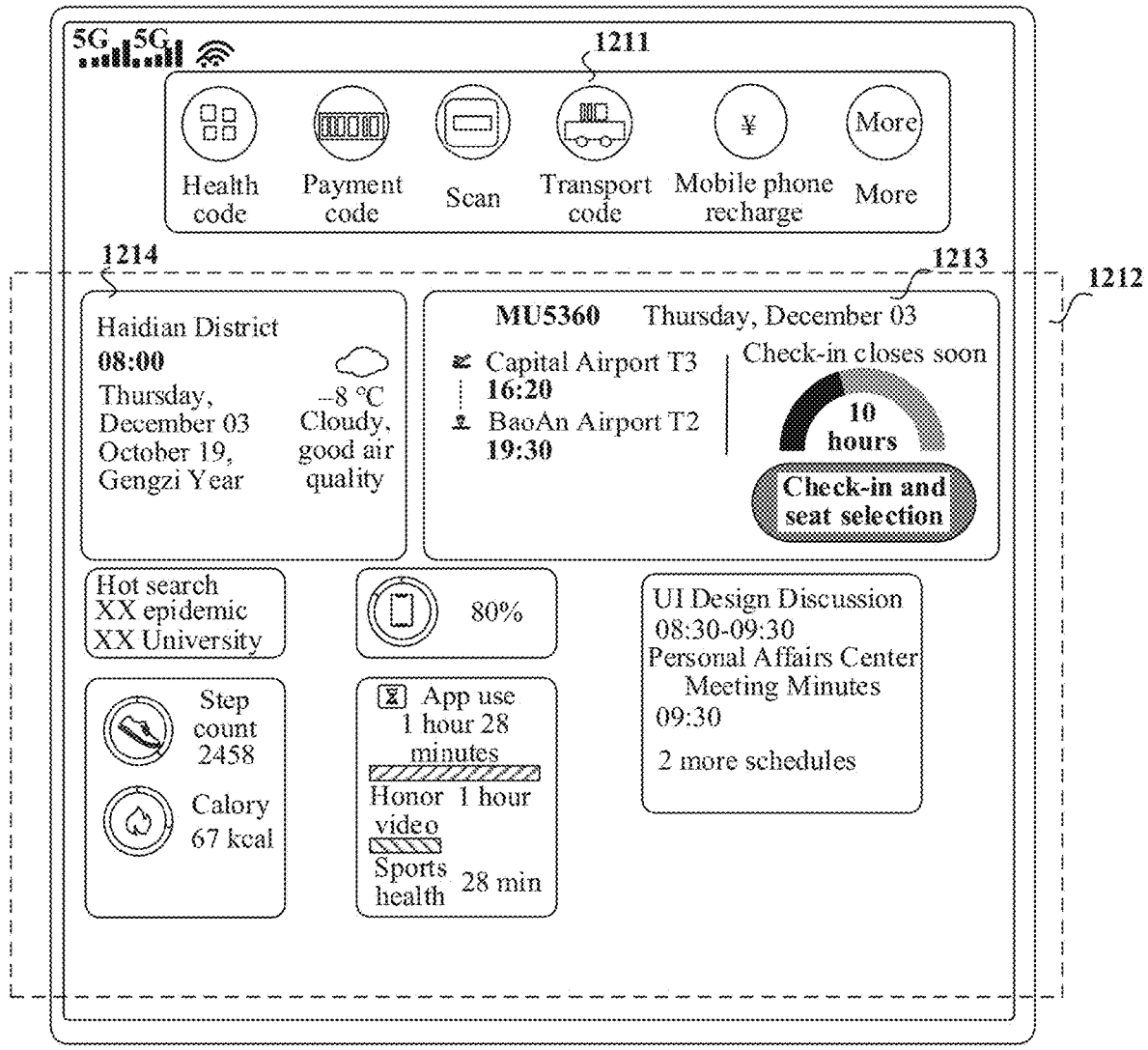

Referring to FIG. 12a to FIG. 12b, FIG. 12a to FIG. 12b show an example of home screen cards displayed on the leftmost home screen of the inner screen of the electronic device 100.

As shown in FIG. 12a, FIG. 12a exemplarily shows a user interface 1210 displayed on the outer screen of the electronic device 100. The user interface 1210 is the leftmost home screen of the outer screen of the electronic device 100. A function shortcut entry region 1211 and a home screen card region 1212 are displayed in the user interface 1210. The function shortcut entry region 1211 may include at least one function entry icon, such as a scan icon, a payment code icon, and a health code icon.

The home screen card region 1212 may include a plurality of home screen cards. The home screen cards are used for displaying the events that the user wants to follow from time to time, for example, a meeting that is about to begin; an express parcel in transit; a flight booked; and current weather, clock, and calendar. As shown in FIG. 12a, a home screen card 1213 is displayed in the home screen card region 1212. The home screen card 1213 may be a Flight Info card.

After the user unfolds the inner screen of the electronic device 100, as shown in FIG. 12b, the inner screen of the electronic device 100 displays a user interface 1220. The inner screen is larger than the outer screen in size. For example, the dimensional ratio between the inner screen and the outer screen is close to 2:1. Therefore, in the user interface 1220, the electronic device 100 may divide the home screen card set into a first part of home screen card set and a second part of home screen card set. The first part of home screen card set may include a Climate Clock card 1214 alone. In addition, the electronic device 100 may set the Climate Clock card 1214 to be displayed constantly so that the user is unable to switch the home screen card by performing a gesture operation on the Climate Clock card 1214. In the second part of home screen card set, the Flight Info card 1213 is displayed. The Scheduler card 1213 may be a home screen card ranked after the Climate Clock card 1213 in the first home screen card set.

Understandably, in the schematic flowchart of the method shown in FIG. 4, the home screen card in the user interface may be used for displaying an event generated by an application. For example: the home screen card displays a meeting generated by the user through a Scheduler app.

In this embodiment of this application, the home screen card may be further used for displaying pictures, for example, pictures saved in a gallery of the electronic device. However, after the user unfolds the inner screen of the electronic device, the electronic device may adjust the display manner of the pictures in the home screen card based on the dimension or ratio of the inner screen. For example, when the electronic device displays a picture through a home screen card, after the user unfolds the inner screen of the electronic device, the picture in the home screen card will be stretched, thereby distorting the picture and impairing user experience.

To solve the foregoing problem, an embodiment of this application provides a method for displaying home screen cards of an electronic device. In this method, the electronic device can adjust the display manner of the display content of the home screen cards on different screens of the electronic device based on a preset display rule. If the currently used screen of the electronic device is an outer screen, the electronic device may display a single picture in a home screen card on the outer screen. After the user unfolds the inner screen of the electronic device, the electronic device can adjust the display manner of the display content of home screen cards on the inner screen based on the dimensions or ratio of the inner screen relative to the outer screen of the foldable screen. For example, the electronic device displays a plurality of pictures in the home screen card by tiling, or, for another example, the electronic device displays, in the home screen card, a single picture obtained by cropping and stitching a plurality of pictures. When the user folds the inner screen after performing an operation of changing the display content of a home screen card on the inner screen, the electronic device can display, in the home screen card on the outer screen, the display content last changed by the user.

Figure 13:
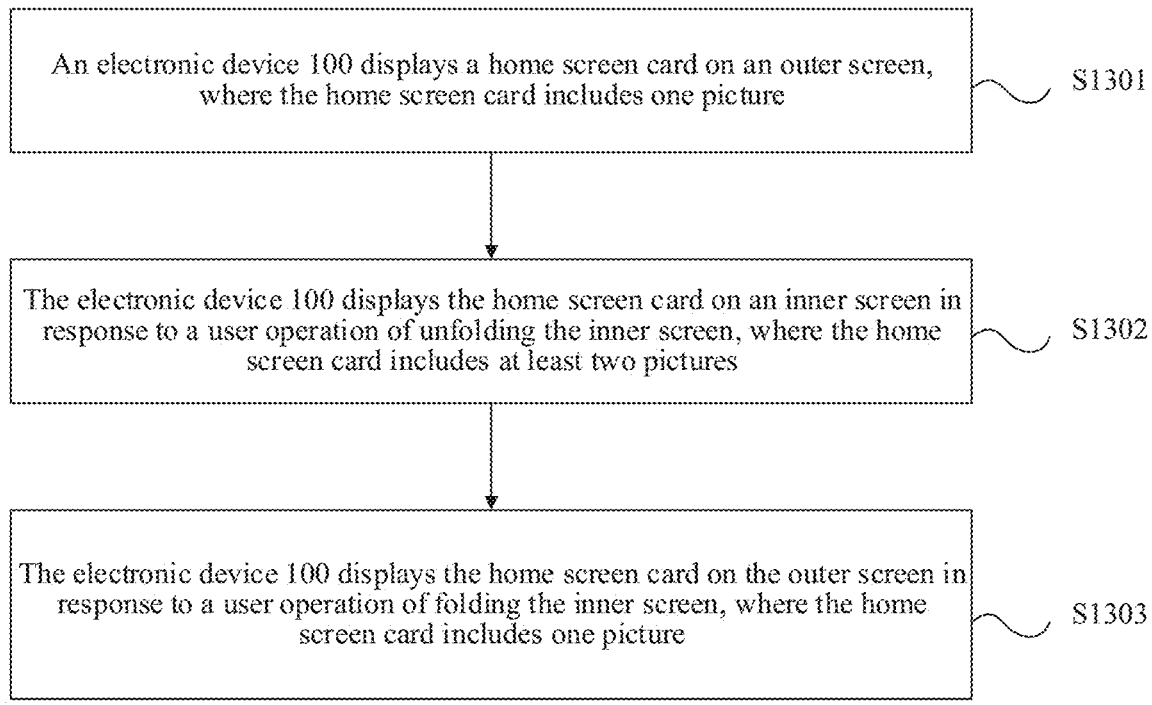
FIG. 13 is a schematic diagram of a process of a method according to an embodiment of this application.

The following describes a display method according to an embodiment of this application with reference to FIG. 13 by using an example in which the home screen card displays a picture. In this embodiment, the home screen card that displays a picture may be a home screen card that the user adds to the user interface of the electronic device to display the pictures in the gallery. Different from a home screen card that displays event information in the user interface based on the event generated by the application of the electronic device, the home screen card may be fixed onto the user interface.

In a possible implementation, the process of adding a home screen card in the user interface of the electronic device to display pictures may be: when the electronic device displays the user interface of the home screen, the user may perform a two-finger pinch operation in the user interface; in response to the two-finger pinch operation, the user interface may display a widget toolkit; the widget toolkit includes a "Gallery" option; after selecting this option, the user can add a Gallery card in a blank region of the user interface; the user may perform a touch-and-hold operation on the Gallery card; and, in response to the touch-and-hold operation on the Gallery card, the electronic device may edit the form of the home screen card and the displayed pictures.

Understandably, the Gallery card provided in this embodiment of this application is applicable to the gallery of "Smart Collection" or "Designated Album". "Smart Collection" may be a picture display service or picture display function provided by the electronic device, and enables the electronic device to automatically select a plurality of pictures from the gallery and display the pictures on the home screen in sequence, and add pictures into the home screen card in real time based on a preset rule and display the pictures in sequence. "Designated Album" may mean that, after the user selects an album in the gallery of the electronic device, the electronic device displays, in the home screen card sequentially, all the pictures in the album selected by the user.

S1301: An electronic device 100 displays a home screen card on an outer screen, where the home screen card includes a picture.

Figure 14A:
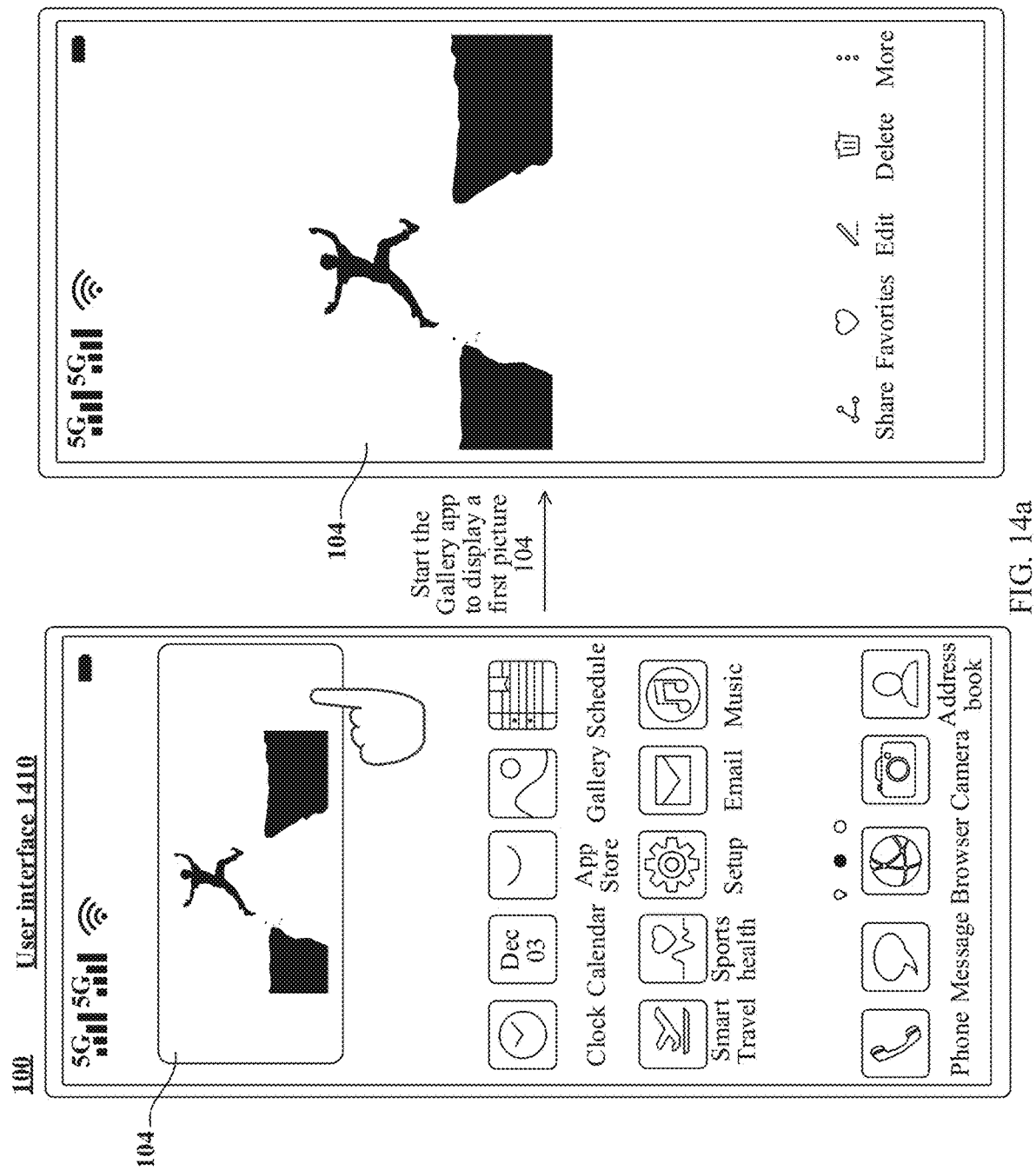
FIG. 14a to FIG. 14b are schematic diagrams of a group of user interfaces according to an embodiment of this application.
Figure 14B:
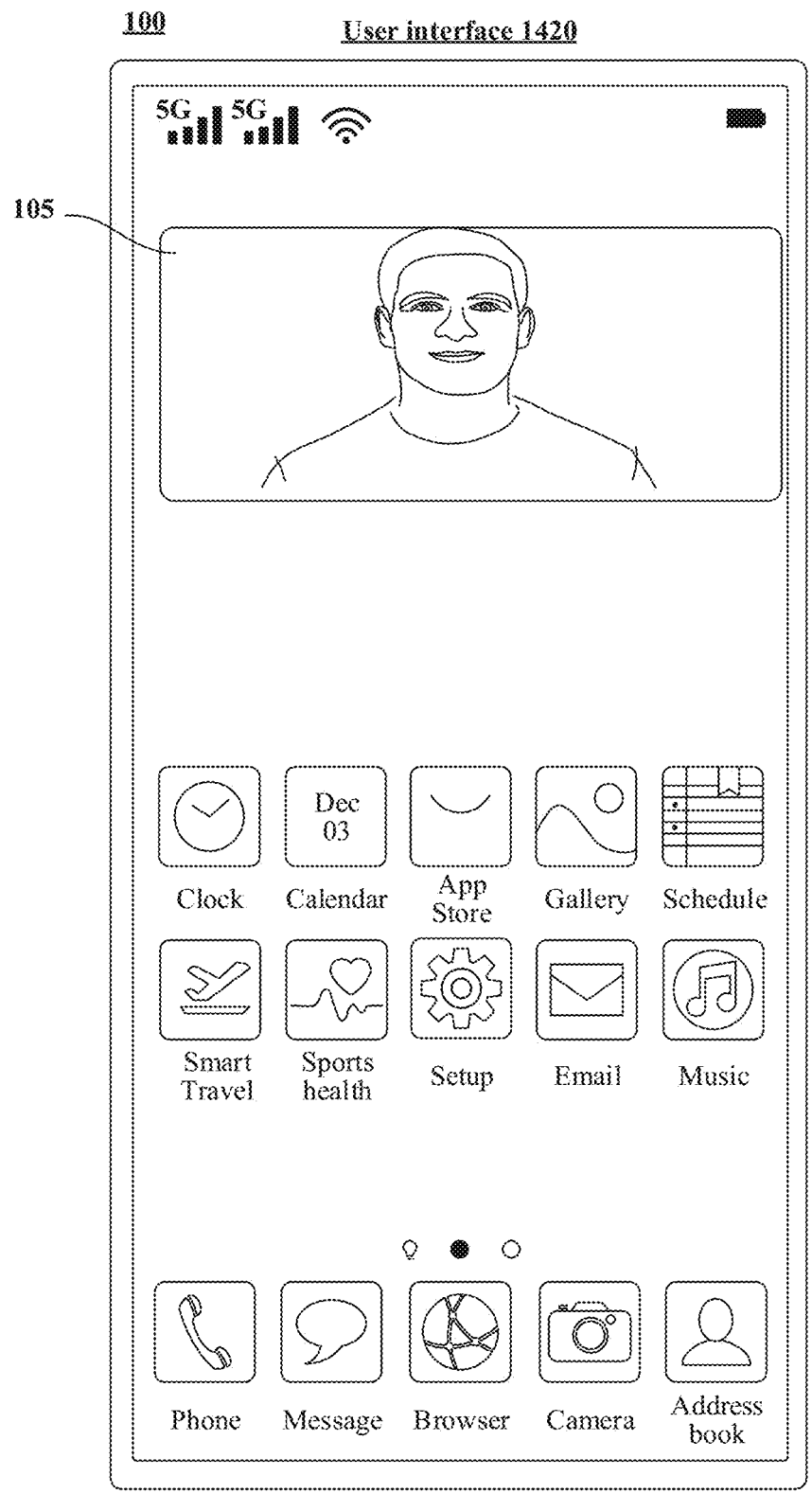

When the inner screen of the electronic device 100 is in a folded state, the electronic device 100 can display a user interface through the outer screen. The electronic device 100 can display a home screen card in the user interface of the outer screen based on a display rule corresponding to the outer screen, where the home screen card includes pictures, and the number of home screen cards may be one or more. Moreover, the electronic device 100 can switch the displayed picture in the home screen card between different pictures. Referring to FIG. 14a to FIG. 14b, FIG. 14a to FIG. 14b exemplarily show an operation performed by the user on a home screen card on an outer screen of the electronic device 100.

As shown in FIG. 14a, the home screen card in the user interface 1410 displays a first picture 104. The first picture 104 may be a default picture that is set by the Gallery app of the electronic device 100, or the first picture 104 may be a picture that the user is currently browsing.

When the electronic device 100 receives, in the user interface 1410 shown in FIG. 14a, a tap operation performed by the user on the home screen card that displays the first picture 104, the electronic device 100 may start the Gallery app in response to the operation, and display the entirety of the first picture 104. Further, the electronic device 100 may refresh the pictures in the home screen card in the user interface on the outer screen based on a preset refresh threshold such as 5 seconds. As shown in FIG. 14b, after 5 seconds, the electronic device 100 displays the user interface 1420. The home screen card in the user interface 1420 is refreshed to display a second picture 105. The second picture 105 may be a picture ranked after the first picture 104, as set by the Gallery app of the electronic device 100.

S1302: The electronic device 100 displays the home screen card on an inner screen in response to a user operation of unfolding the inner screen, where the home screen card includes at least two pictures.

After the user unfolds the inner screen of the electronic device 100, the electronic device 100 may display the user interface through the inner screen. To be specific, based on the dimensions or ratio of the inner screen relative to the outer screen, and based on a display rule corresponding to the inner screen, the electronic device 100 may display, in the user interface of the inner screen, the home screen card that includes the pictures.

When the electronic device 100 displays a home screen card in the user interface of the inner screen based on a display rule corresponding to the inner screen, where the home screen card includes the pictures, the home screen card may be displayed in the following circumstances.

In some embodiments of this application, based on a fact that the dimension of the inner screen of the electronic device 100 is larger than the dimension of the outer screen of the electronic device 100 (for example, the ratio of the dimension of the inner screen to the dimension of the outer screen may be close to 2:1), the electronic device 100 may display one home screen card in the user interface of the inner screen. The dimensional ratio between the home screen card on the inner screen of the electronic device 100 and the home screen card on the outer screen of the electronic device 100 may satisfy the specified dimensional ratio between the inner screen and the outer screen. For example, the dimensional ratio between the home screen card on the inner screen of the electronic device 100 and home screen card on the outer screen of the electronic device 100 may be close to 2:1.

The home screen card on the inner screen of the electronic device 100 may display two pictures, that is, a first picture and a second picture, at the same time. The first picture and the second picture may be arranged in parallel.

Understandably, the home screen card on the inner screen of the electronic device 100 may display just one picture instead. This picture may be obtained by cropping and stitching the first picture and the second picture.

Figure 15A:
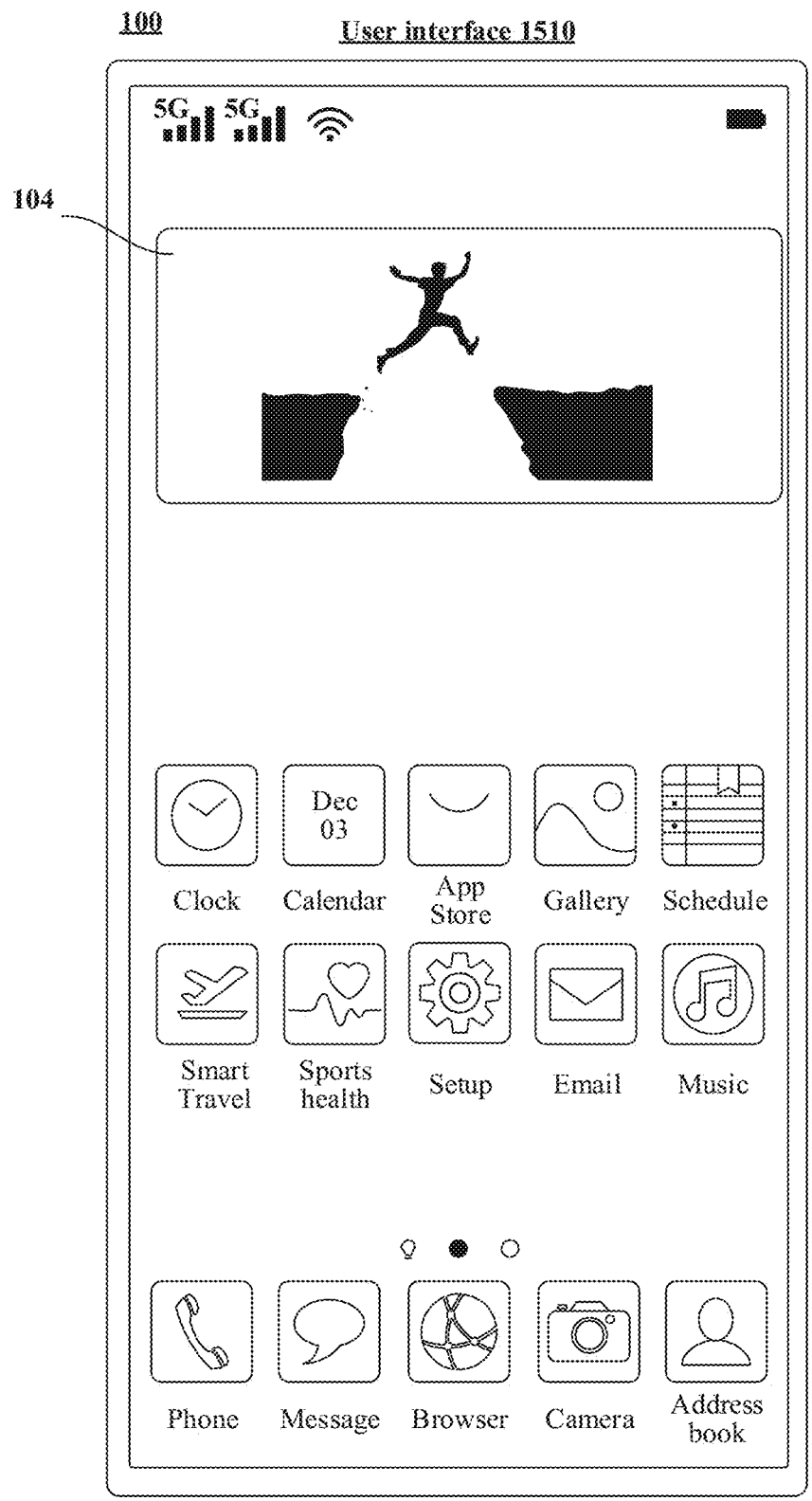
FIG. 15a to FIG. 15d are schematic diagrams of a group of user interfaces according to an embodiment of this application.
Figure 15B:
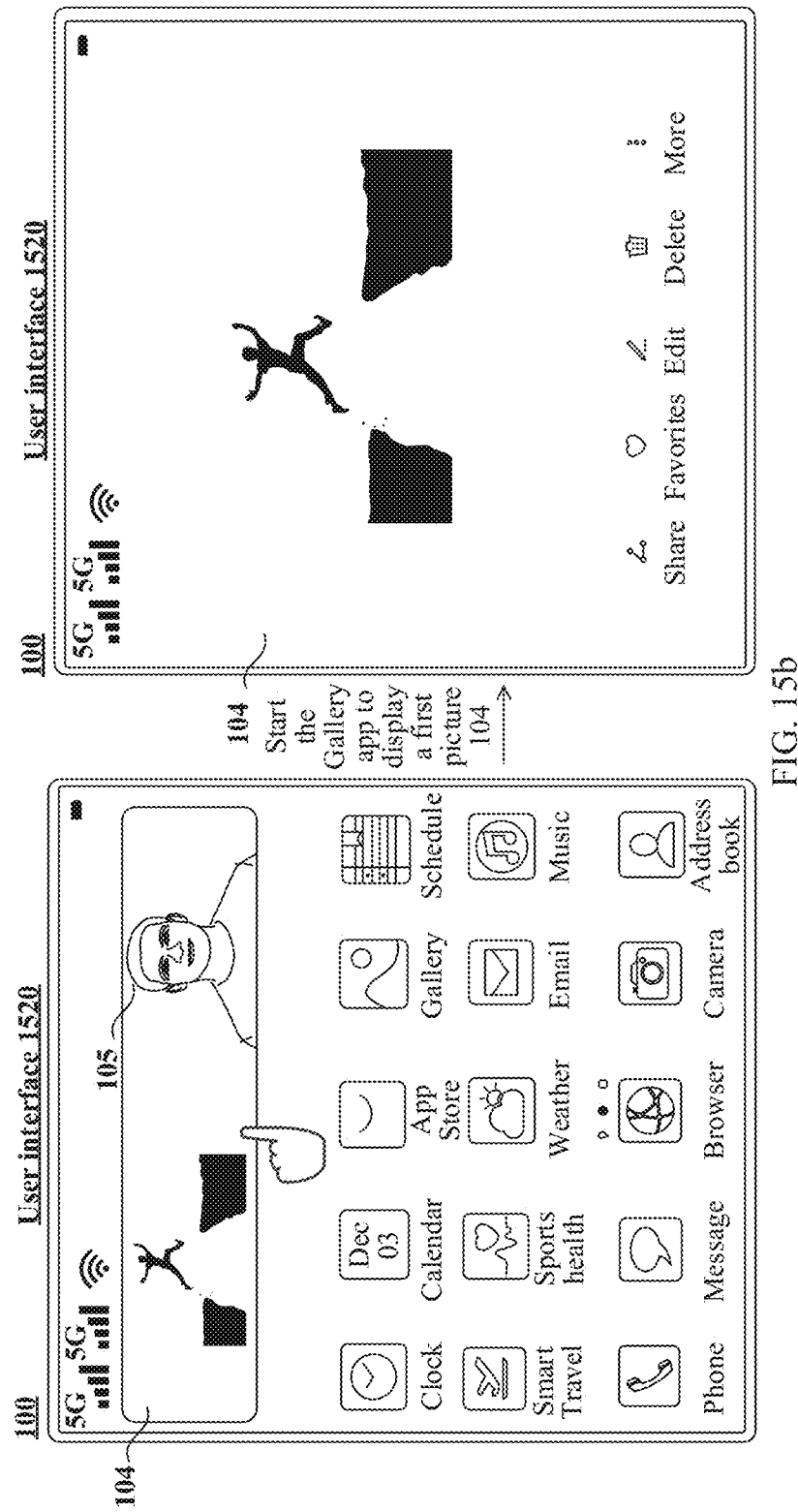
Figure 15C:
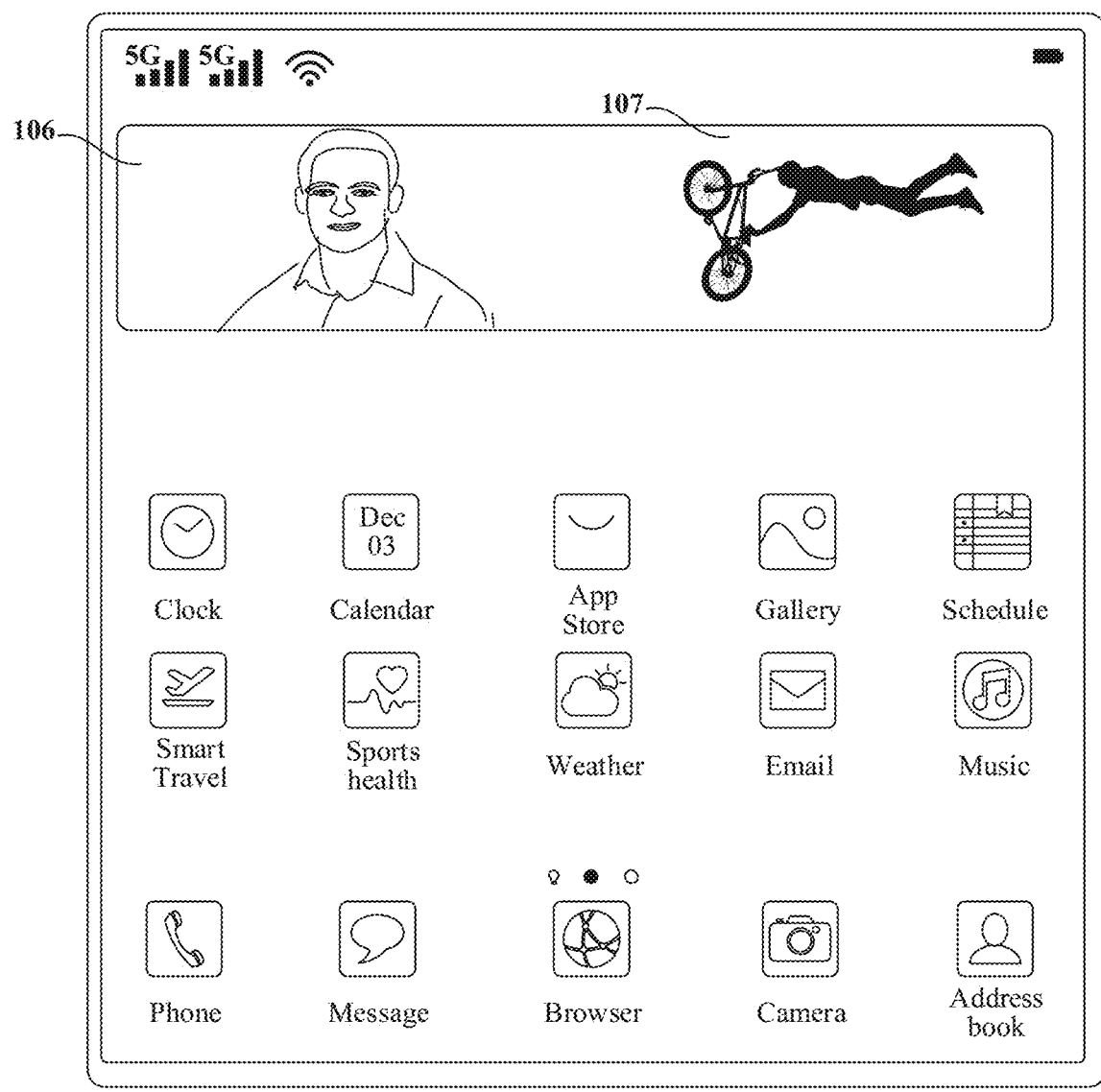

Referring to FIG. 15a to FIG. 15c, FIG. 15a to FIG. 15c show an example of a home screen card displayed on the inner screen of the electronic device 100.

As shown in FIG. 15a, FIG. 15a exemplarily shows a user interface 1510 displayed on the outer screen of the electronic device 100. The home screen card in the user interface 1510 displays a first picture 104. After the user unfolds the inner screen of the electronic device 100, as shown in FIG. 15b, the inner screen of the electronic device 100 displays a user interface 1520. The dimensional ratio between the inner screen and the outer screen is close to 2:1, and therefore, in the user interface 1520, the home screen card can display the first picture 104 and the first picture 105. The first picture 104 and the first picture 105 may be displayed in parallel. The first picture 105 may be a picture ranked after the first picture 104 as set by the Gallery app of the electronic device 100. In another embodiment of this application, the home screen card may, instead, display a picture obtained by cropping and stitching the first picture 104 and the first picture 105.

Understandably, when the electronic device 100 receives a tap operation performed by the user on the first picture 104 or the second picture 105 in the home screen card in the user interface 1520 shown in FIG. 15b, the electronic device 100 may start the Gallery app in response to the operation, and display the entirety of the first picture 104 or the second picture 105. Further, the electronic device 100 may refresh the pictures in the home screen card in the user interface on the outer screen based on a preset refresh threshold such as 5 seconds. As shown in FIG. 15c, after 5 seconds, the electronic device 100 displays the user interface 1530. The home screen card in the user interface 1530 is refreshed to display a third picture 106 and a fourth picture 107. The third picture 106 and the fourth picture 107 may be pictures ranked after the second picture 105 as set by the Gallery app of the electronic device 100.

S1303: The electronic device 100 displays the home screen card on the outer screen in response to a user operation of folding the inner screen, where the home screen card includes one picture.

After the user folds the inner screen of the electronic device 100 again, the electronic device 100 can display a user interface through the outer screen, and display a home screen card in the user interface of the outer screen again based on a display rule corresponding to the outer screen, where the home screen card includes pictures.

When the electronic device 100 displays a home screen card in the user interface of the outer screen based on a display rule corresponding to the outer screen, where the home screen card includes the pictures, the home screen card may be displayed in the following additional circumstances.

Figure 15D:
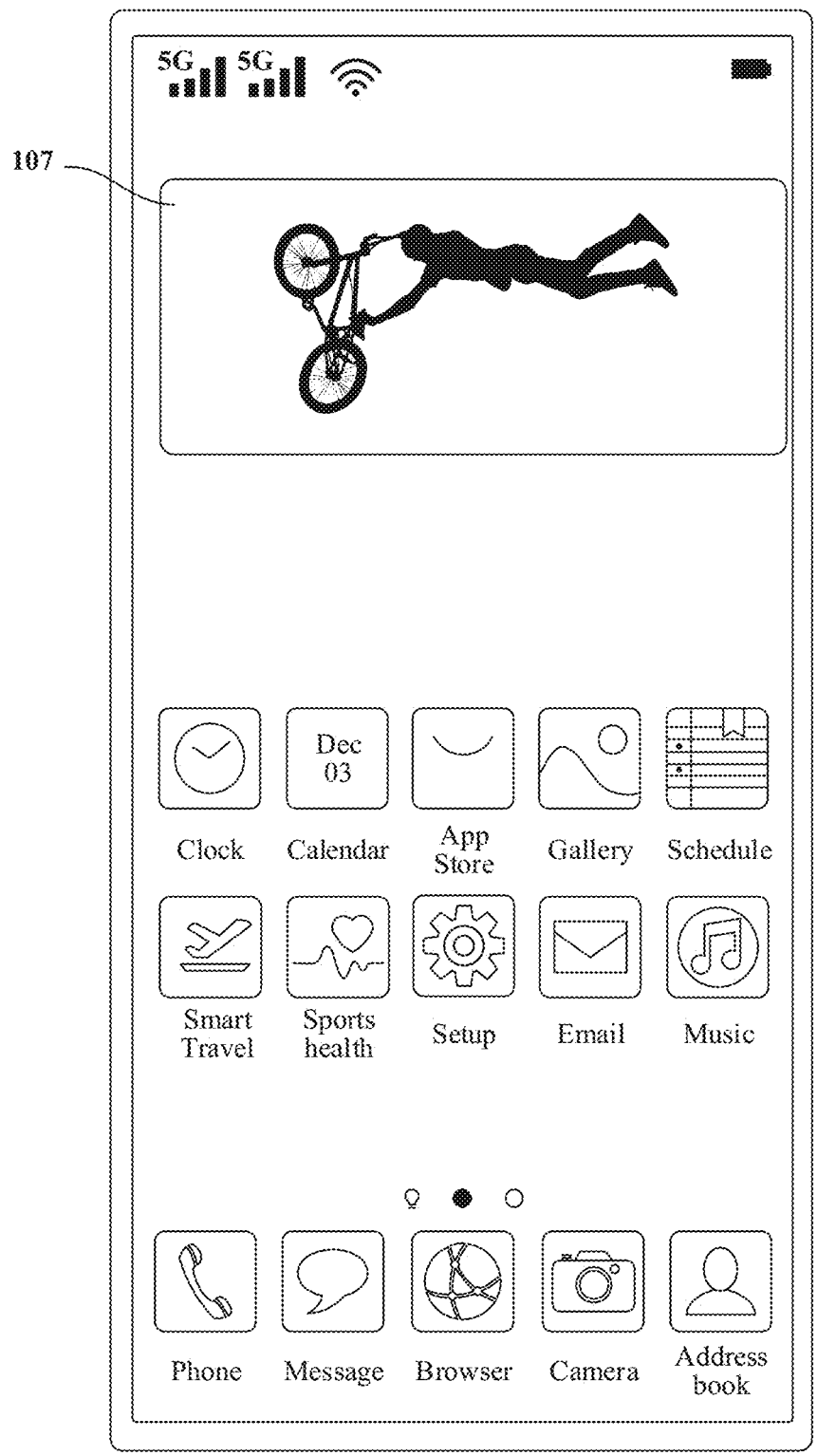

Referring to FIG. 15*c* to FIG. 15*d*, FIG. 15*c* to FIG. 15*d* show an example of a home screen card displayed on the outer screen of the electronic device 100.

As shown in FIG. 15*c*, FIG. 15*c* exemplarily shows a user interface 1530 displayed on the inner screen of the electronic device 100. The home screen card in the user interface 1530 displays a third picture 106 and a fourth picture 107. After the user folds the inner screen of the electronic device 100, as shown in FIG. 15*d*, the outer screen of the electronic device 100 displays the user interface 1540. The user interface 1540 displays the home screen card that includes the fourth picture 107. The fourth picture 107 here may be a picture ranked after the third picture 106 as set by the Gallery app of the electronic device 100.

Understandably, in some other embodiments of this application, the electronic device may always display a specified picture on the outer screen and the inner screen of the electronic device in response to a user operation of displaying the picture specified by the user. In other words, the electronic device always displays the specified picture on the inner screen after the user unfolds the inner screen, and the electronic device always displays the specified picture on the outer screen after the user folds the inner screen. The picture displayed by the electronic device through the home screen card may be a picture included in a specified album of the electronic device. The specified album here means that the picture refreshed in the home screen card is a picture in an album specified by the user in the electronic device.

Based on the display method according to this embodiment of this application illustrated in FIG. 13, after the electronic device is unfolded to switch from the outer screen to the inner screen, the electronic device can make full use of the display region of the inner screen to display more pictures through a plurality of home screen cards. After the inner screen is folded, the outer screen of the electronic device can display the latest picture displayed by the Gallery app after switching, thereby improving user experience.

In this embodiment of this application, the home screen card not only can display the pictures in the gallery, but also may be used to display a picture in a group of recommended pictures. For being differentiated from the pictures in the gallery, this picture is referred to as a moment picture or a moment video. When displaying the moment picture, the home screen card may also display a first play control and an identifier of the group of pictures. The group of pictures here may be some pictures selected from the pictures stored in the Gallery app of the electronic device. The identifier of the group of pictures may be used for indicating the theme of the group of pictures. The identifier may be generated based on time, place, events, or the like. For example, when the electronic device detects a plurality of pictures generated during the Spring Festival, the electronic device may recommend some or all of the pictures among the plurality of pictures to form the group of pictures, display one of the pictures in the home screen card, and display the first play control and the identifier "Happy Chinese New Year" of this group of pictures.

When receiving a tap operation on the first play control, the electronic device may display an interface of playback of the moment picture or moment video in response to the tap operation. The playback interface may include a second play control. In response to the user tapping the second play control, the electronic device may play a video formed of the group of pictures. In a possible implementation, the electronic device may arrange a plurality of pictures in a preset order to generate a video. In this way, when the user taps the second play control, the electronic device may display a plurality of pictures in the form of video frames.

FIG. 16*a* to FIG. 16*d* show an example of a home screen card displayed on the outer screen and inner screen of the electronic device 100.

Figure 16A:
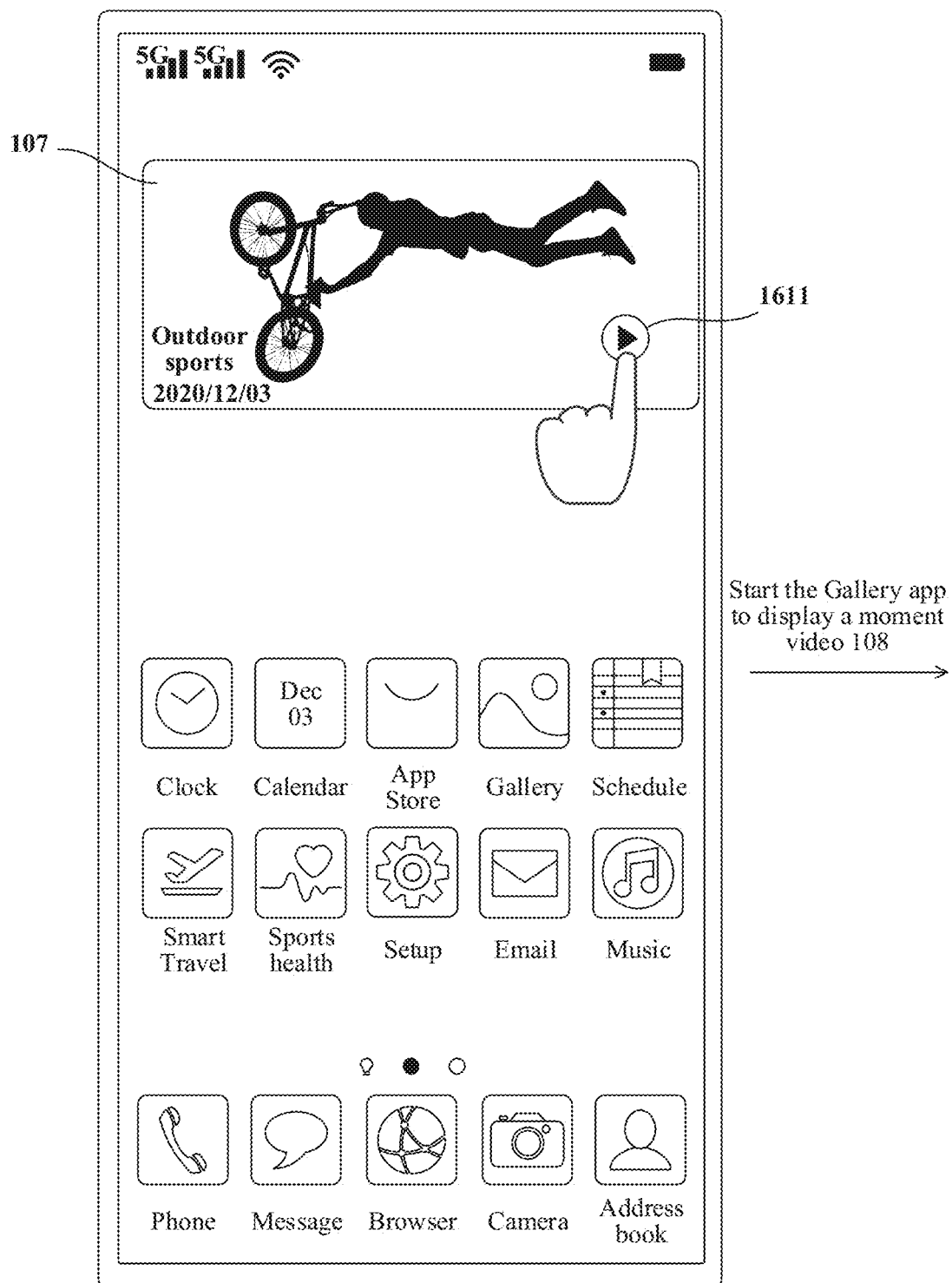
FIG. 16a to FIG. 16d are schematic diagrams of a group of user interfaces according to an embodiment of this application.
Figure 16B:
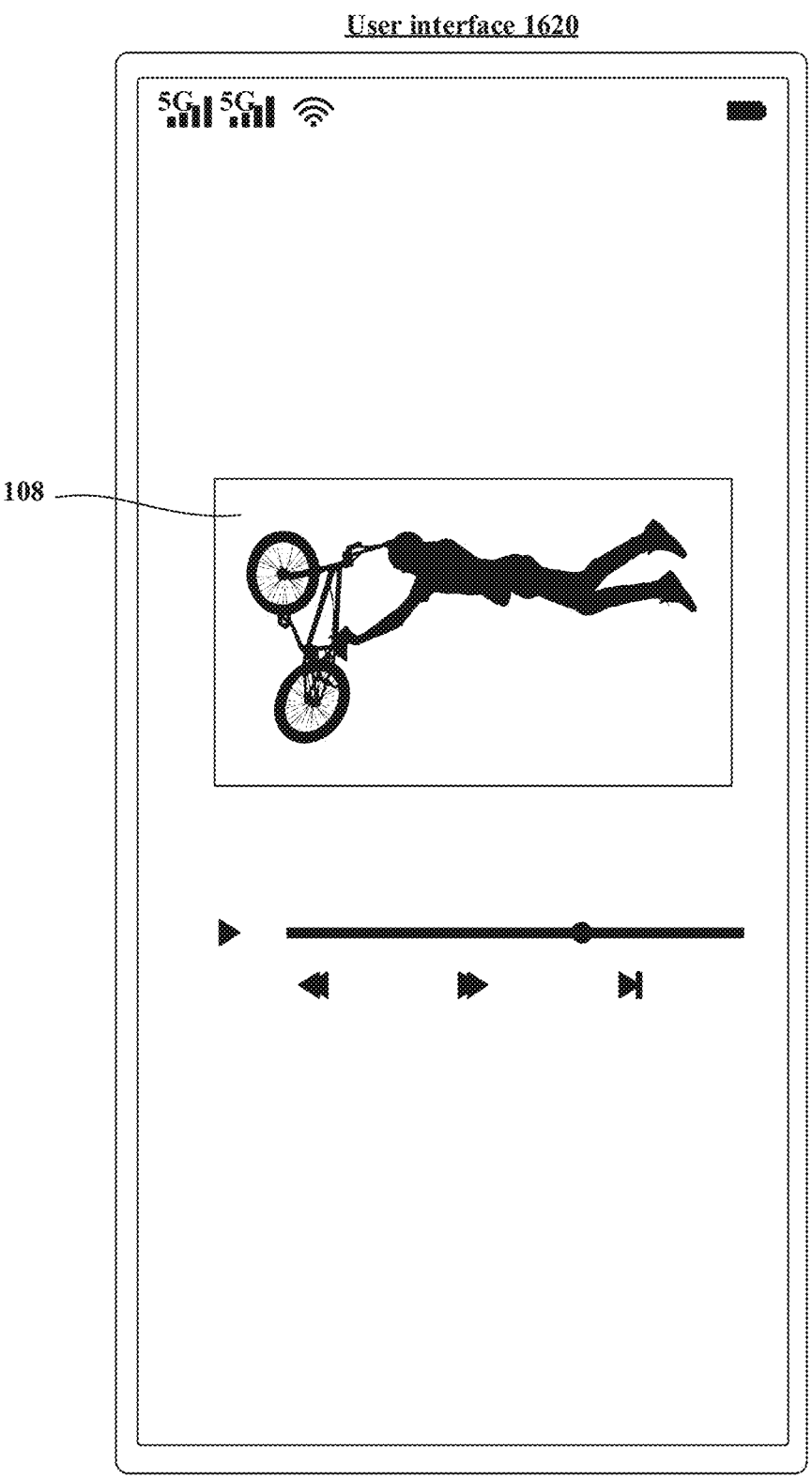

As shown in FIG. 16*a*, FIG. 16*a* exemplarily shows a user interface 1610 displayed on the outer screen of the electronic device 100. The home screen card in the user interface 1610 displays the fourth picture 107 included in the moment pictures. Evidently, the home screen card in the user interface 1610 may further include a play icon 1611 and the name of the moment picture such as "Outdoor Sports" and the current date. For example, the user may tap the play icon 1611 or the user may further tap a region outside the play icon 1611. FIG. 16*b* shows a user interface 1620 displayed on the outer screen of the electronic device 100. As shown in FIG. 16*b*, in response to such operation of the user, the electronic device 100 may start a video player app in the user interface 1620 to play the moment picture 108.

Figure 16C:
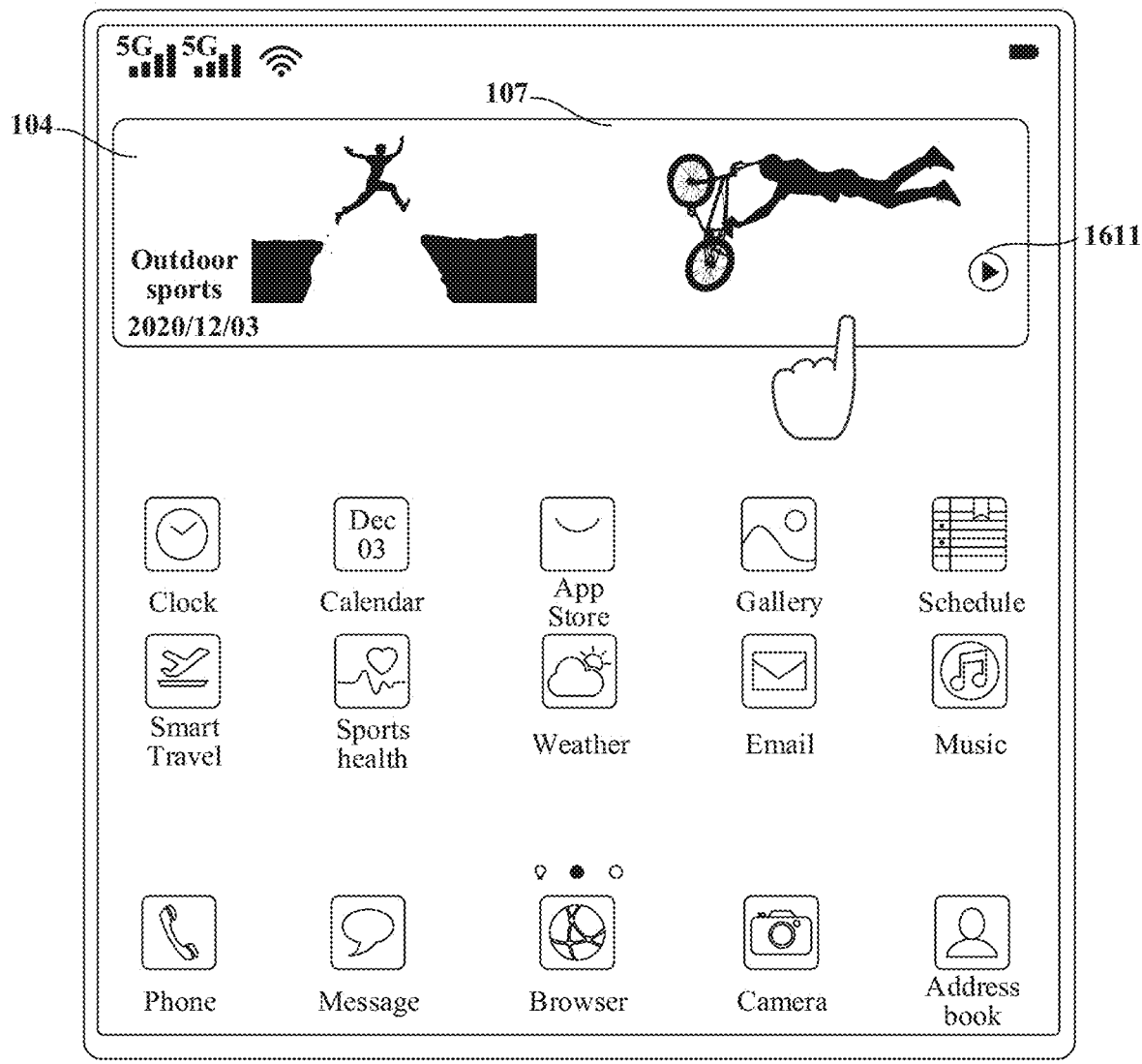
Figure 16D:
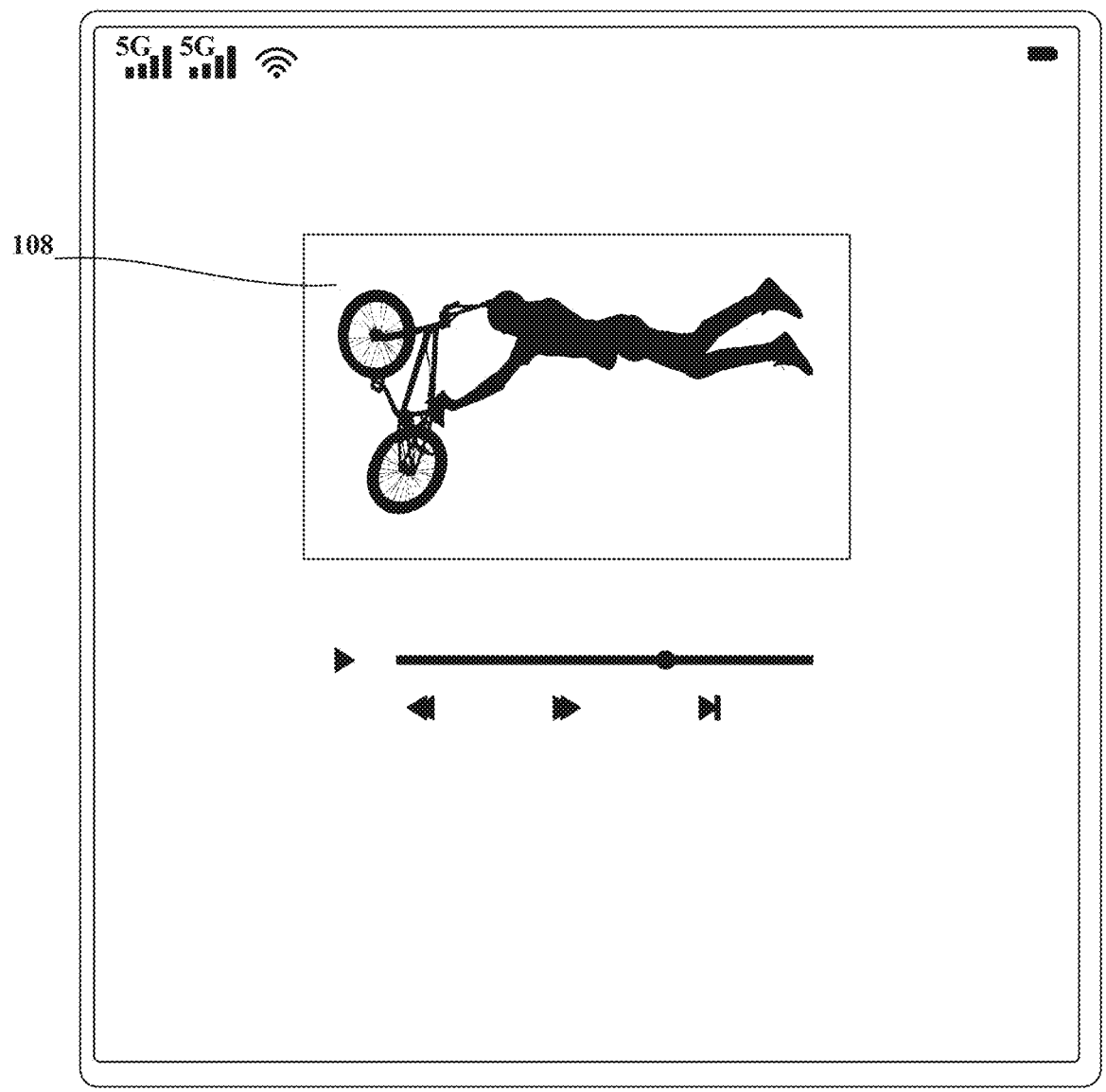

After the user unfolds the inner screen of the electronic device 100, as shown in FIG. 16*c*, the inner screen of the electronic device 100 displays a user interface 1630. In the user interface 1630, the home screen card may simultaneously display the first picture 104 and the fourth picture 107 included in the moment pictures as well as the name of the moment pictures such as "Outdoor Sports" and the current date, and further display a first play control such as the play icon 1611. When the electronic device 100 receives a tap operation on any position in the home screen card performed by the user in the user interface 1630 shown in FIG. 16*c*, such as a tap operation on the first picture 104, the fourth picture 107, or the play icon 1611, the electronic device 100 may play the moment picture 108 in the user interface 1640 in response to such operation of the user, as shown in FIG. 16*d*. FIG. 16*d* exemplarily shows a user interface 1640 displayed on the inner screen of the electronic device 100.

The method for displaying content in the home screen card in the user interface of the electronic device has been described above with reference to the above embodiment. In this embodiment of this application, the width and height of the home screen card in the user interface of the electronic device are adjustable. Based on the height and width of the home screen card, the electronic device can adjust the width and height of the picture. In this way, the width and height of the picture meet the height or width of the home screen card, whichever is smaller. Subsequently, the electronic device adjusts the width or height of the picture separately. For example, the electronic device crops or stretches the width or height of the picture, so that the width or height of the picture meets the height or width of the home screen card, whichever is larger.

Figure 17A:
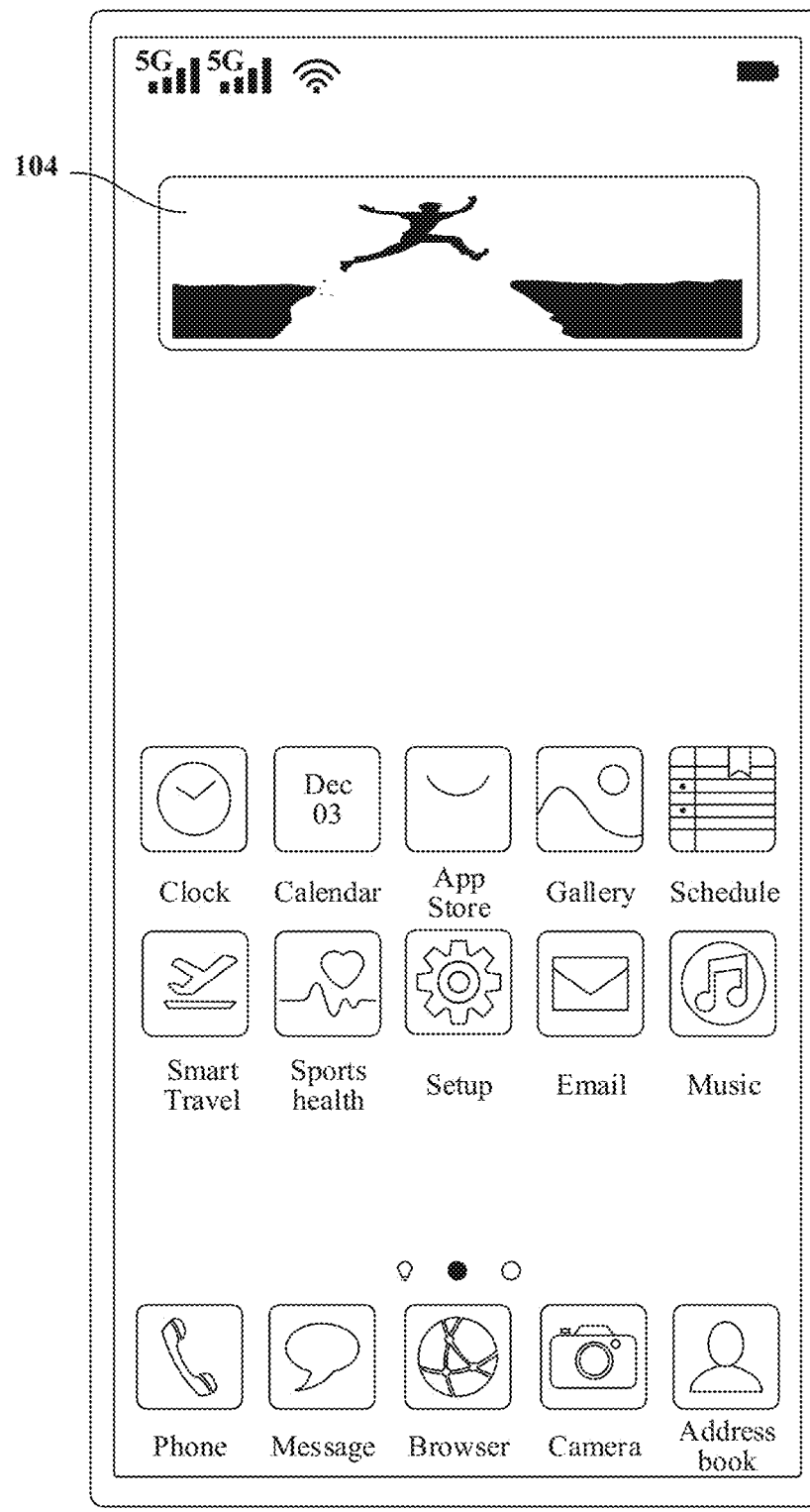
FIG. 17a to FIG. 17h are schematic diagrams of a group of user interfaces according to an embodiment of this application.
Figure 17B:
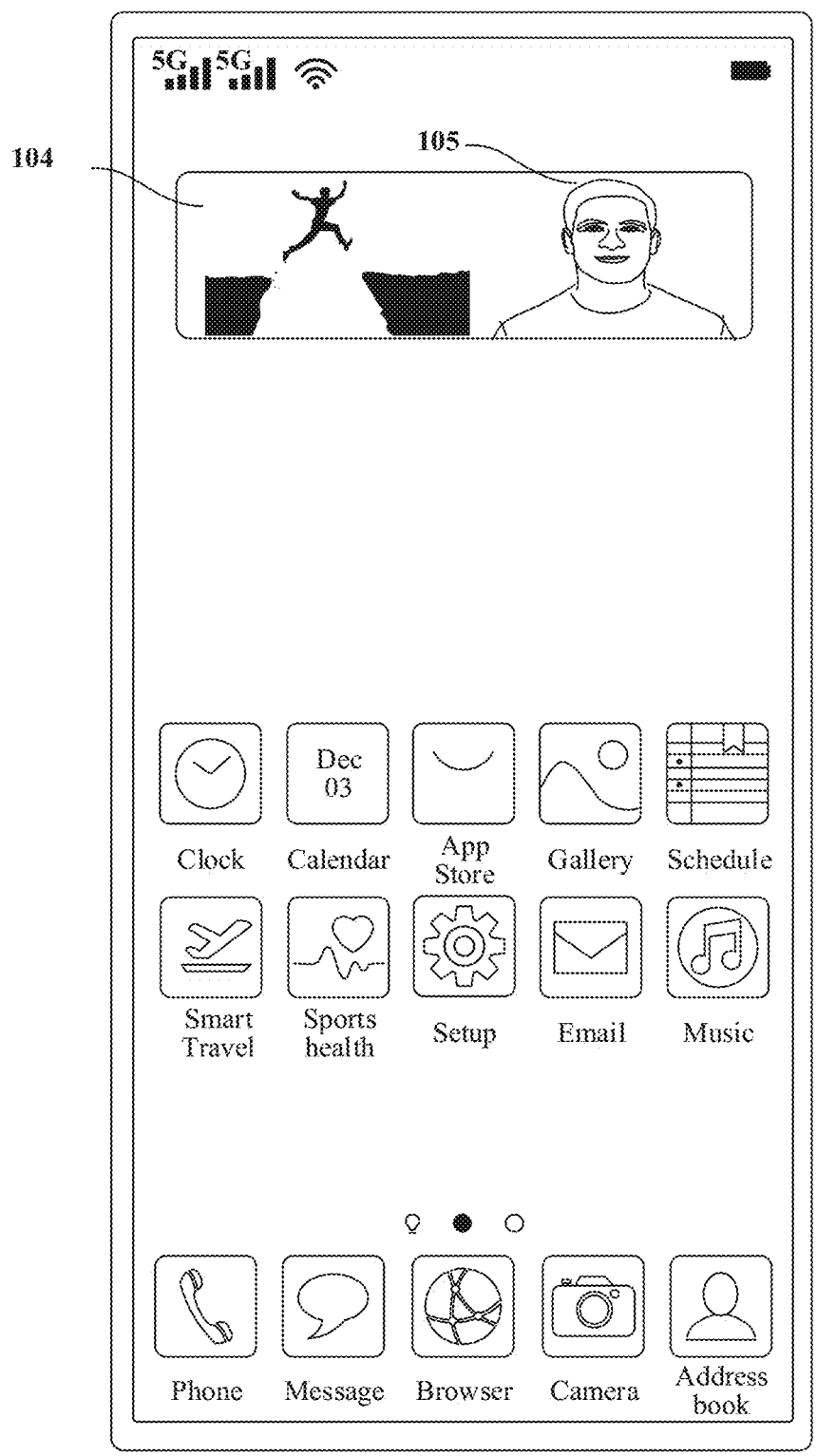
Figure 17C:
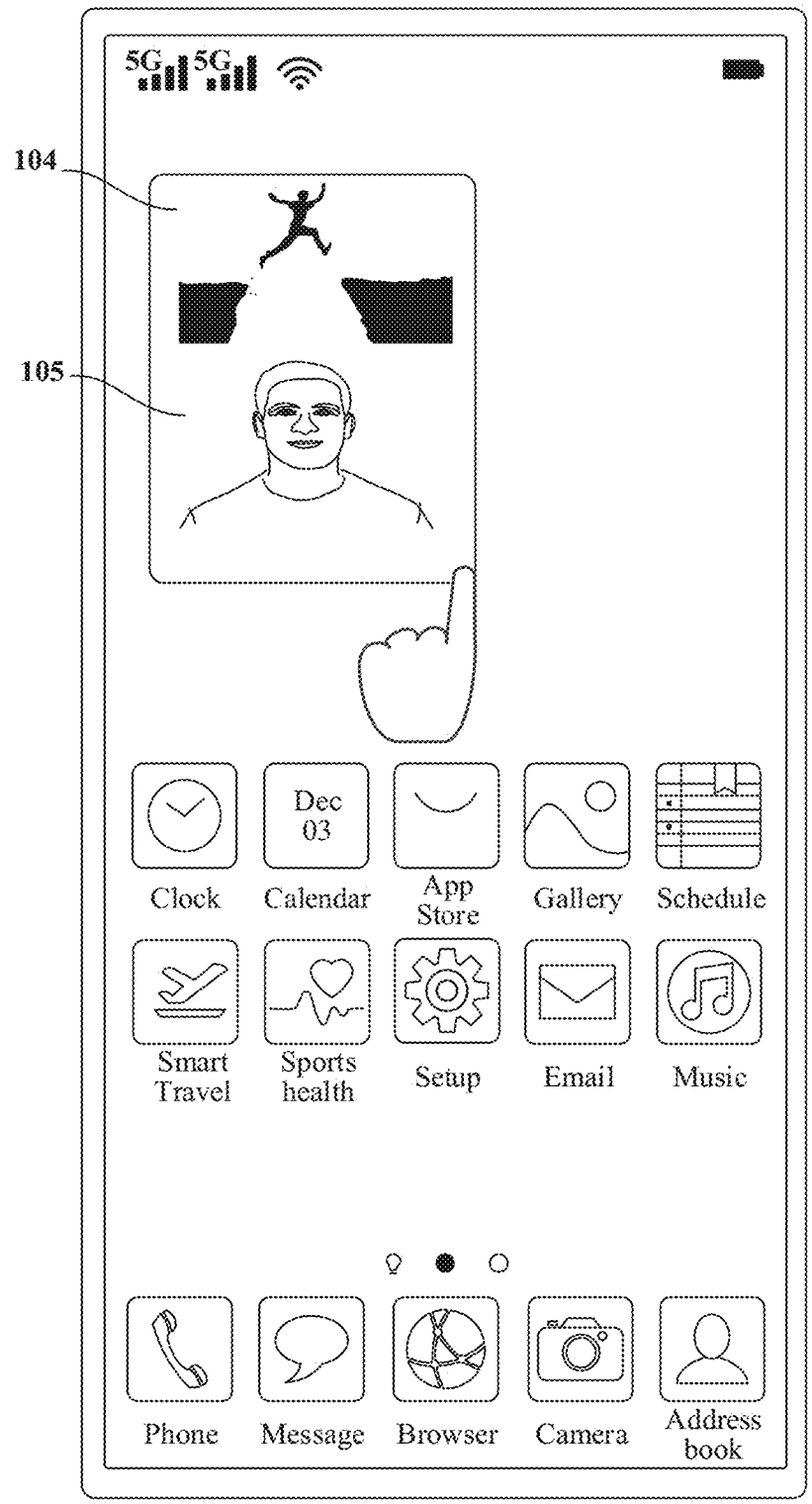

Referring to FIG. 17*a* to FIG. 17*c*, FIG. 17*a* to FIG. 17*c* show an example of a home screen card displayed on the outer screen of the electronic device 100.

As shown in FIG. 17*a*, FIG. 17*a* exemplarily shows a user interface 1710 displayed on the outer screen of the electronic device 100. The home screen card in the user interface 1710 displays the first picture 104. Evidently, the height of the home screen card in the user interface 1710 is smaller than the width. Therefore, the electronic device 100 adjusts the width and height of the first picture 104 first. For example, the electronic device 100 proportionally scales the height of the first picture 104 to be equal to the height of the home screen card in the user interface 1710 first, and then the electronic device 100 stretches the width of the first picture 104 so that both the width and the height of the first picture 104 meet the width and height of the home screen card in the user interface 1710, thereby making the first picture 104 oversized in width and making the first picture 104 less sightly.

In this embodiment of this application, the electronic device can obtain the width and height of the home screen cards in the user interface. If the width-to-height ratios of the home screen cards satisfy a preset ratio threshold, a plurality of pictures can be displayed in the home screen card in the user interface, thereby making the pictures in the home screen card sightlier.

As shown in FIG. 17*b*, FIG. 17*b* exemplarily shows a user interface 1720 displayed on the outer screen of the electronic device 100. The electronic device 100 can obtain the width and height of the home screen card in the user interface 1720. The electronic device 100 determines that the width-to-height ratio of the home screen card in the user interface 1720 satisfies a preset ratio threshold such as 3:1. If the preset ratio threshold is 2:1, the electronic device 100 may display both the first picture 104 and the second picture 105 in parallel in the home screen card in the user interface 1720. Understandably, the preset ratio threshold may be 1:2 instead. To be specific, if the electronic device 100 determines that the width-to-height ratio of the home screen card in the user interface 1720 satisfies a preset ratio threshold 1:2, the electronic device 100 may display both the first picture 104 and the second picture 105 vertically in the home screen card in the user interface 1720.

In this embodiment of this application, when the user performs an operation of adjusting the width and height of the home screen card in the user interface, the electronic device can change the number and position of the displayed pictures in the home screen card in the user interface in real time based on the adjusted width and height of the home screen card in the user interface in response to the operation.

As shown in FIG. 17*c*, FIG. 17*c* exemplarily shows a user interface 1730 displayed on the outer screen of the electronic device 100. The electronic device 100 displays the user interface 1730. In the user interface 1730, the user can drag the border of the home screen card in the user interface 1730 to adjust the width-to-height ratio of the home screen card. For example, the user adjusts the width-to-height ratio of the home screen card in the user interface 1730 to 1:2. If the preset ratio threshold is also 1:2, the electronic device 100 may display both the first picture 104 and the second picture 105 vertically in the home screen card in the user interface 1720.

In this embodiment of this application, when the user performs an operation of adjusting the width and height of the home screen card in the user interface, the electronic device can change the number and position of the displayed pictures in the home screen card in the user interface in real time based on the direction of the user operation in response to the operation.

Referring to FIG. 17*d* to FIG. 17*h*, FIG. 17*d* to FIG. 17*h* show an example of a home screen card displayed on the outer screen of the electronic device 100.

Figure 17D:
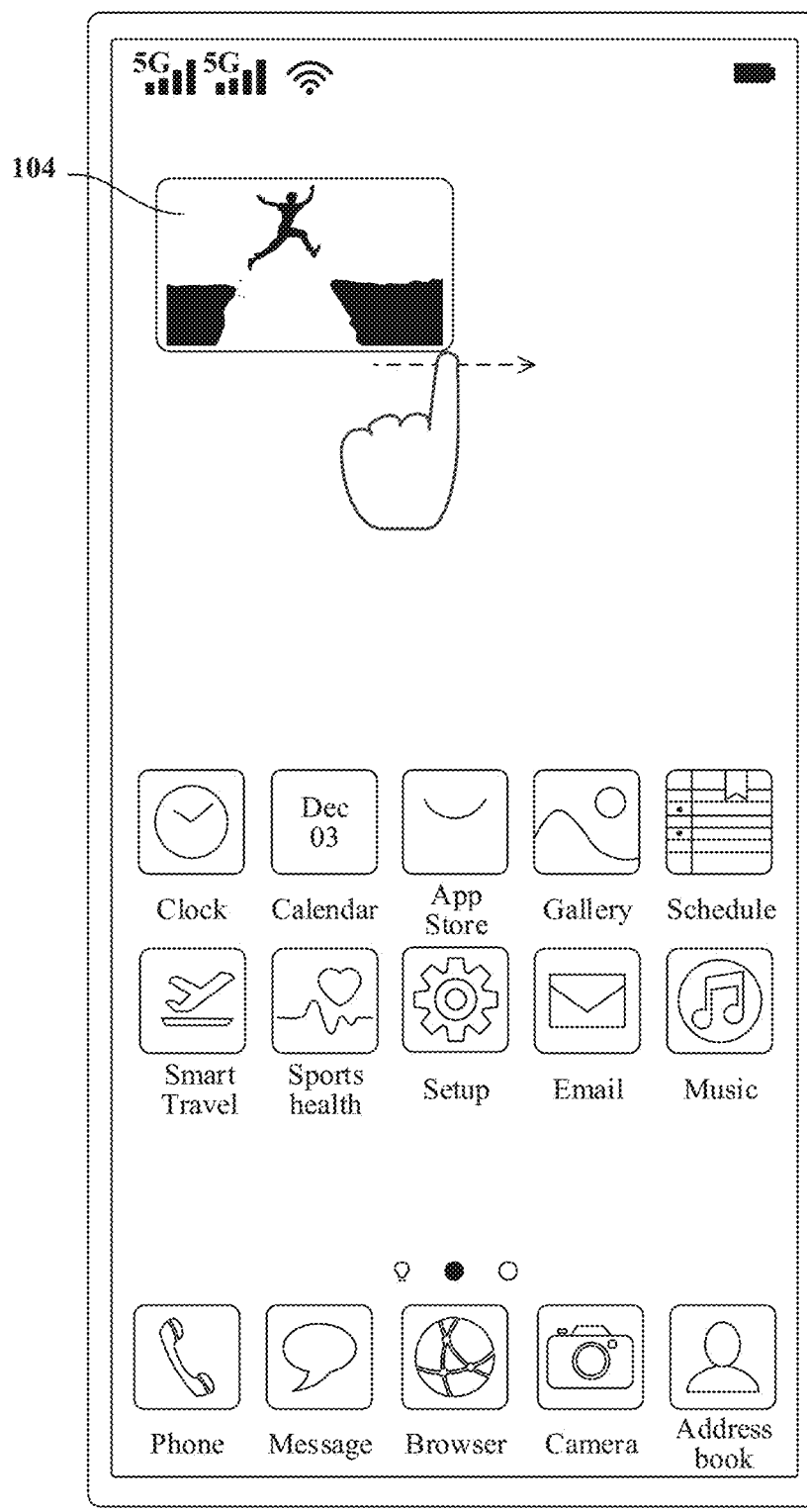
Figure 17E:
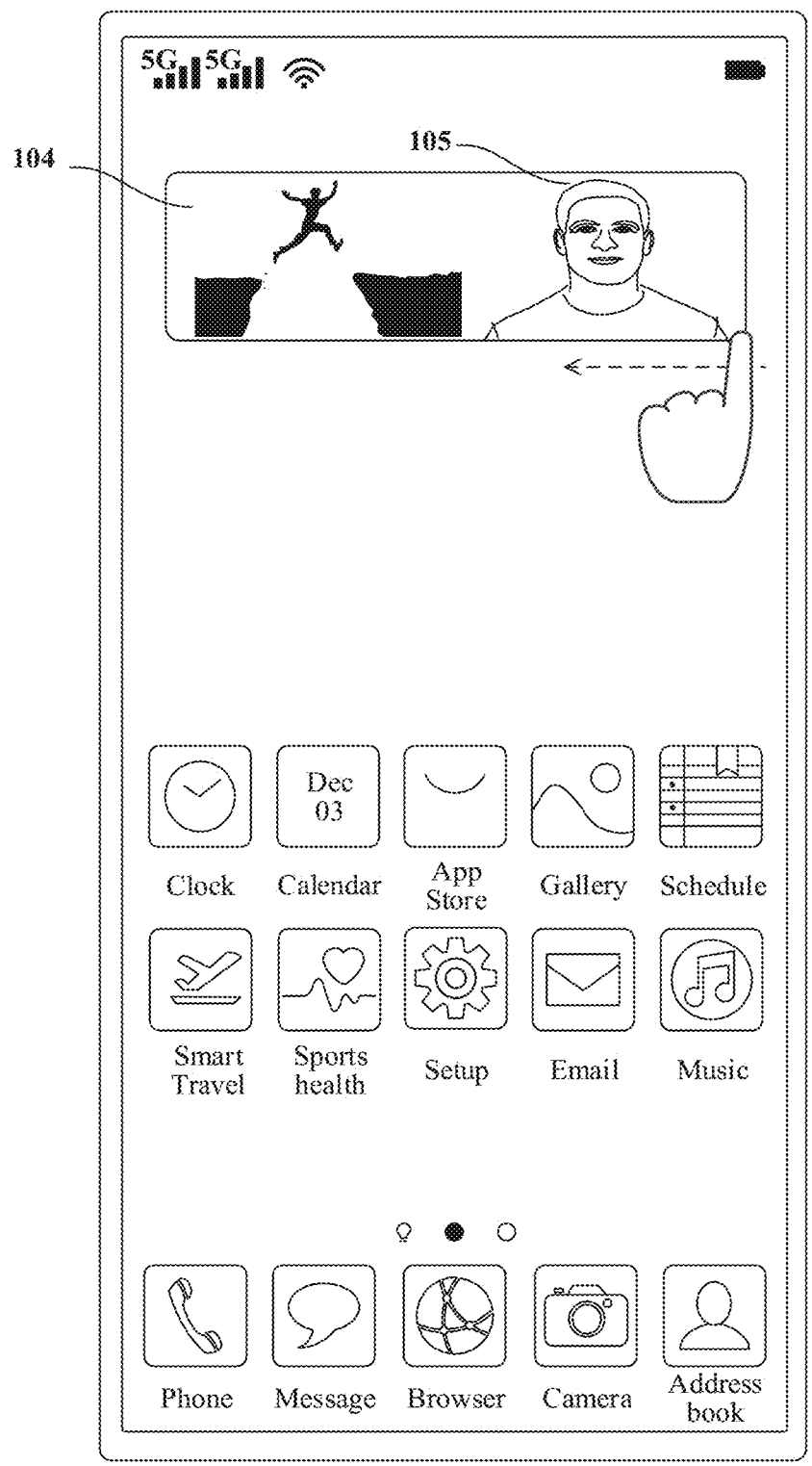

FIG. 17*d* exemplarily shows a user interface 1740 displayed on the outer screen of the electronic device 100. The electronic device 100 displays the user interface 1740. The home screen card in the user interface 1740 displays the first picture 104. The user can drag the border of the home screen card in the user interface 1740 to adjust the width-to-height ratio of the home screen card, so as to change the number and position of the pictures displayed in the home screen card in the user interface. For example, after the user drags the border of the home screen card in the user interface 1740 rightward, as shown in FIG. 17*e*, the electronic device 100 displays a user interface 1750. The home screen card that includes the first picture 104 and the second picture 105 is displayed in the user interface 1750. The first picture 104 and the second picture 105 may be arranged in parallel.

Figure 17F:
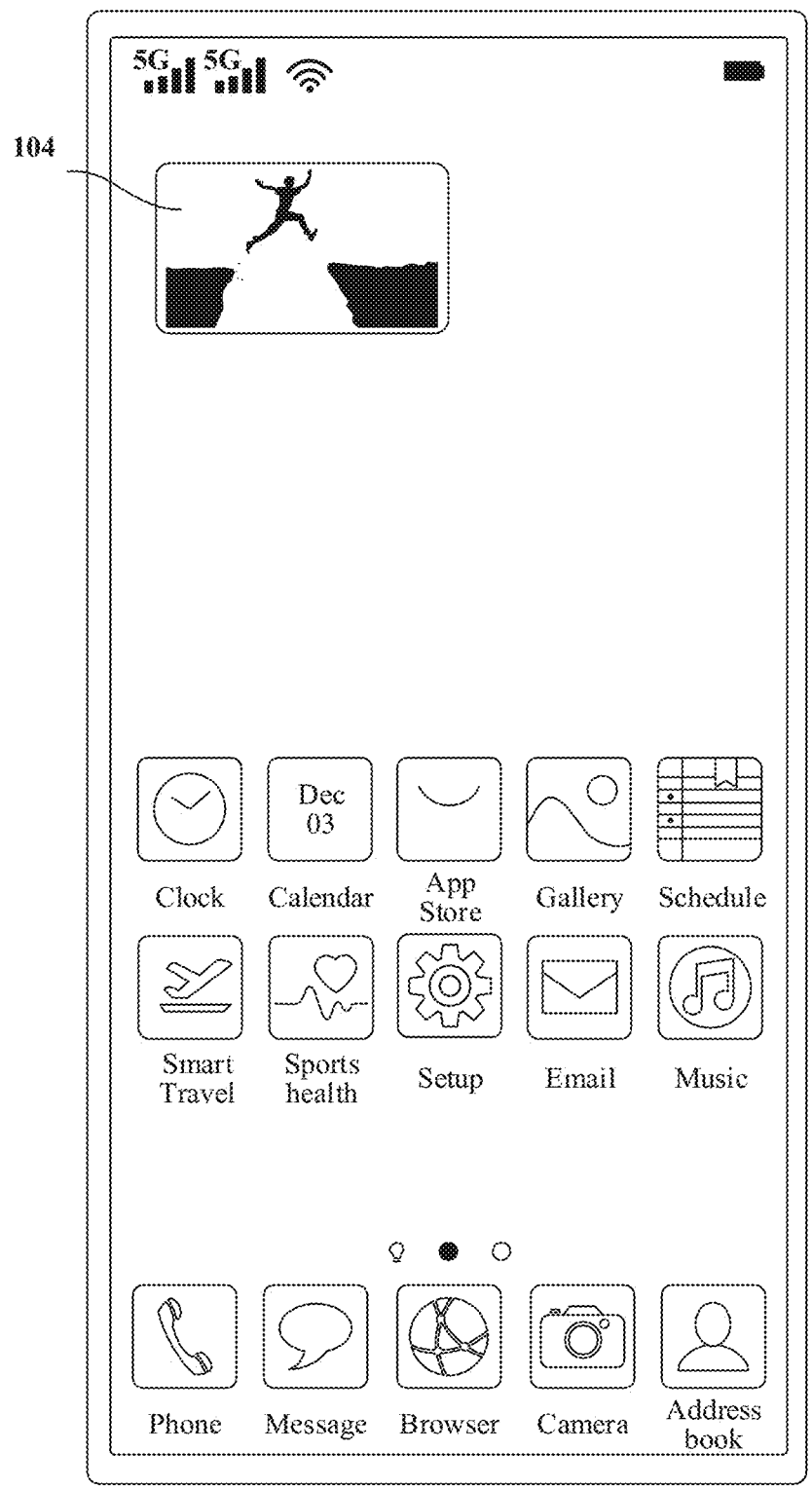

Still referring to FIG. 17*e*, after the user drags the right border of the home screen card in the user interface 1740 leftward, that is, after the user drags the border of the home screen card rightward and then drags the border of the home screen card in the reverse direction, the electronic device 100 displays a user interface 1760, as shown in FIG. 17*f*. A home screen card that includes the first picture 104 is displayed in the user interface 1760.

Figure 17G:
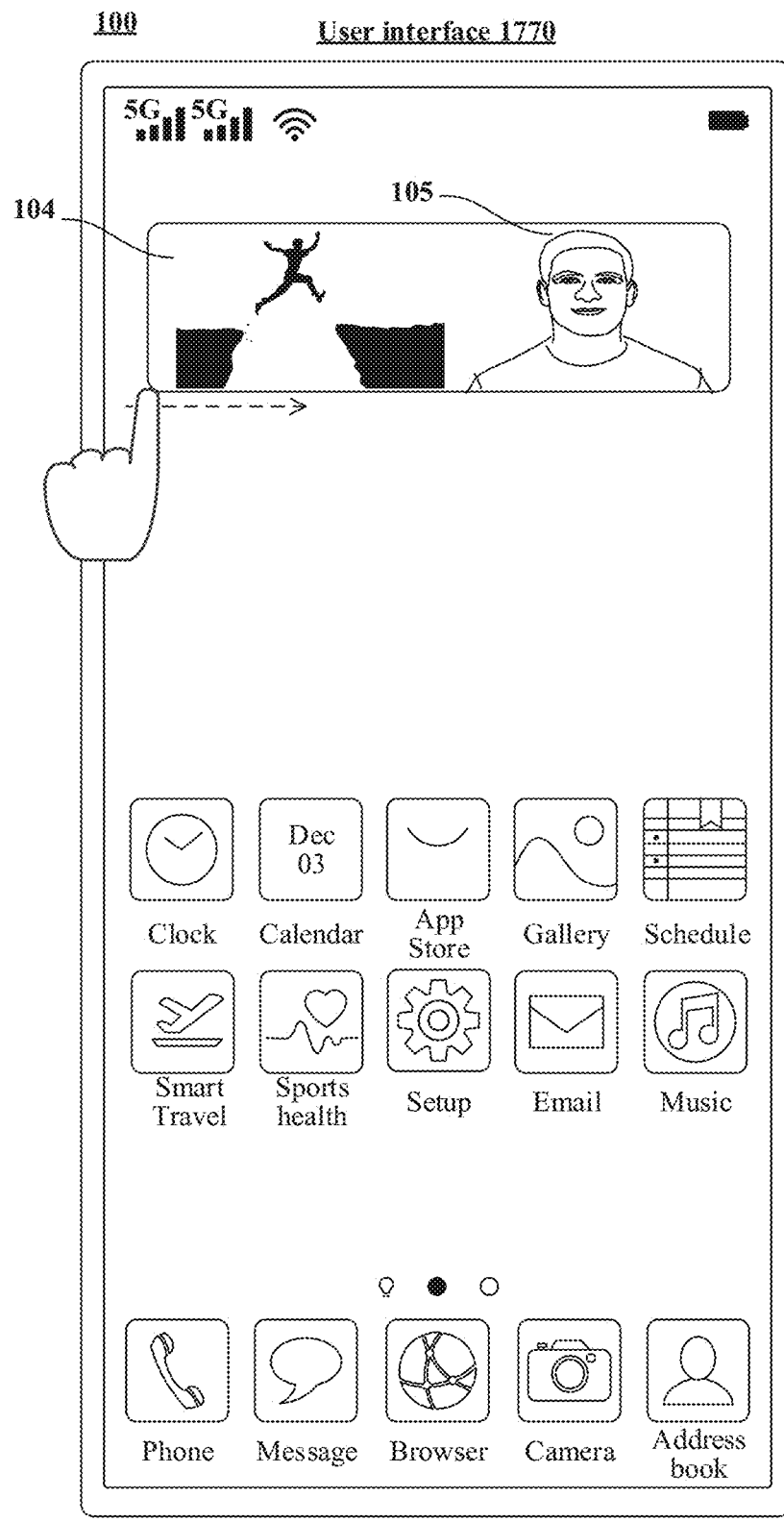
Figure 17H:
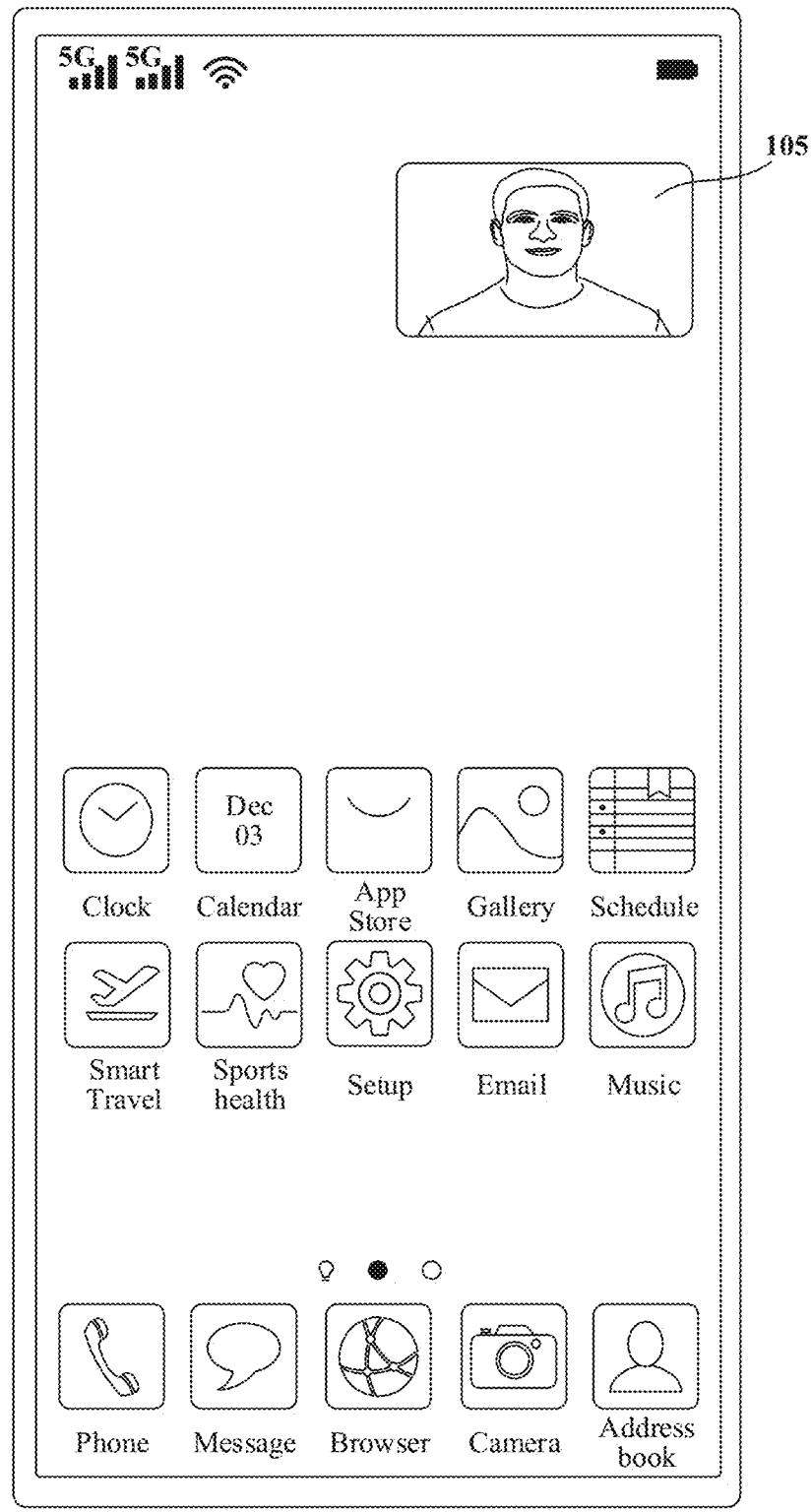

Still referring to FIG. 17*g*, after the user drags the left border of the home screen card in the user interface 1770 rightward, that is, after the user stretches the home screen card by dragging the right border of the home screen card and then drags the left border of the stretched home screen card rightward to scale down the home screen card, the electronic device 100 displays a user interface 1780, as shown in FIG. 17*h*. A home screen card that includes the first picture 105 is displayed in the user interface 1780.

According to the embodiment shown in FIG. 17*d* to FIG. 17*h*, the electronic device can determine the picture that needs to be still displayed in the home screen card based on the direction of the user operation on the home screen card in the user interface.

Understandably, the implementation shown in FIG. 17*a* to FIG. 17*e* is applicable to a vertical operation on the home screen card in addition to the horizontal operation performed on the home screen card shown in FIG. 17*a* to FIG. 17*e*. In addition, the implementation of the home screen card on the outer screen of the electronic device 100 is also applicable to the inner screen of the electronic device 100.

In the schematic flowchart of the method shown in FIG. 4 and FIG. 13, the electronic device displays the home screen card in the user interface of the home screen. The following describes a display method according to an embodiment of this application by using an example in which the electronic device displays a home screen card in a user interface of a leftmost home screen.

The leftmost home screen here may be a leftmost screen of the electronic device. The leftmost home screen may be used for display an event, a picture, and the like. For example, the event here may be data generated by the user through an application installed on the electronic device, or push notifications subscribed by the user, or the like. On the leftmost home screen, the event may be exhibited in the form of a home screen card.

Figure 18A:
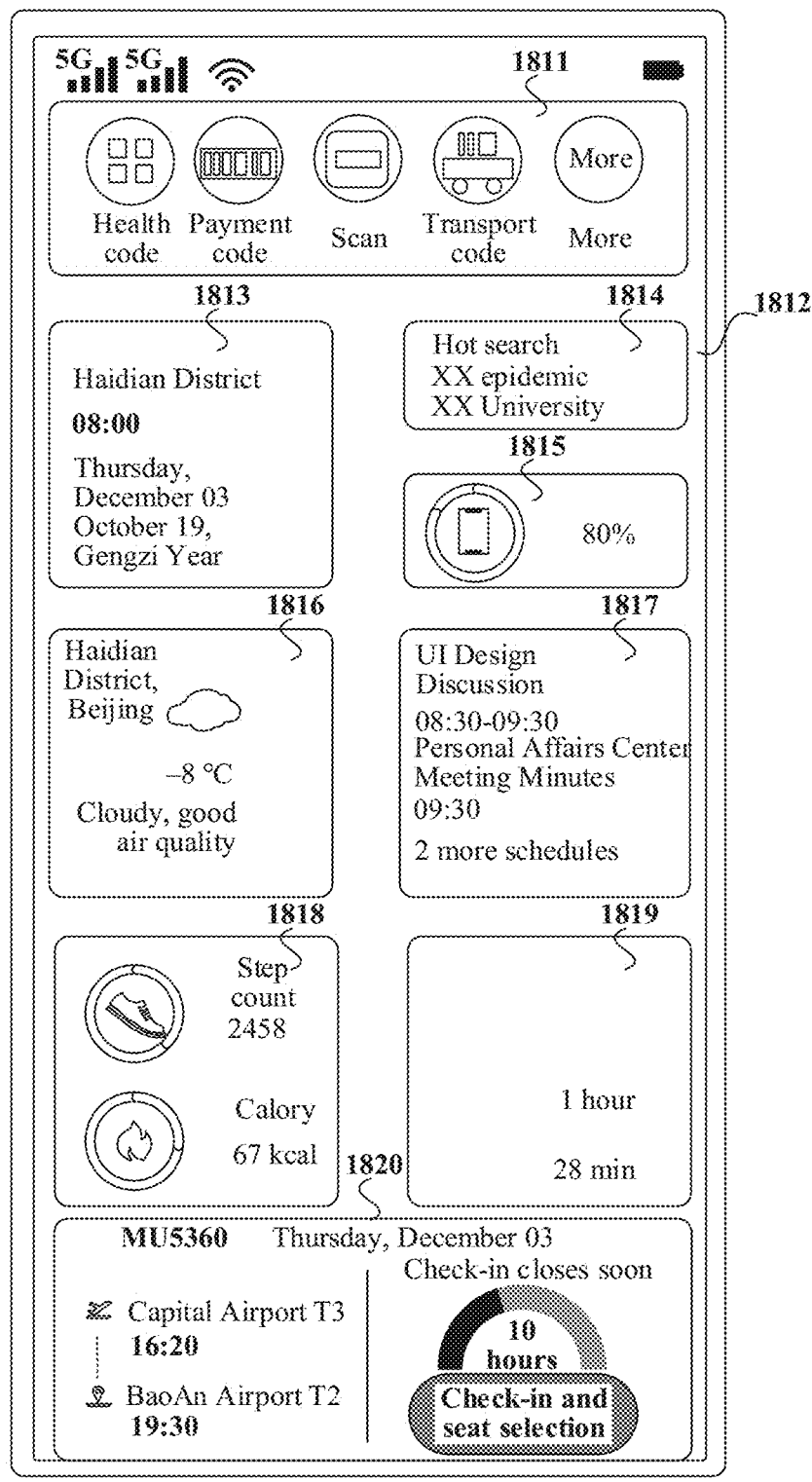
FIG. 18a to FIG. 18b are schematic diagrams of a group of user interfaces according to an embodiment of this application.
Figure 18B:
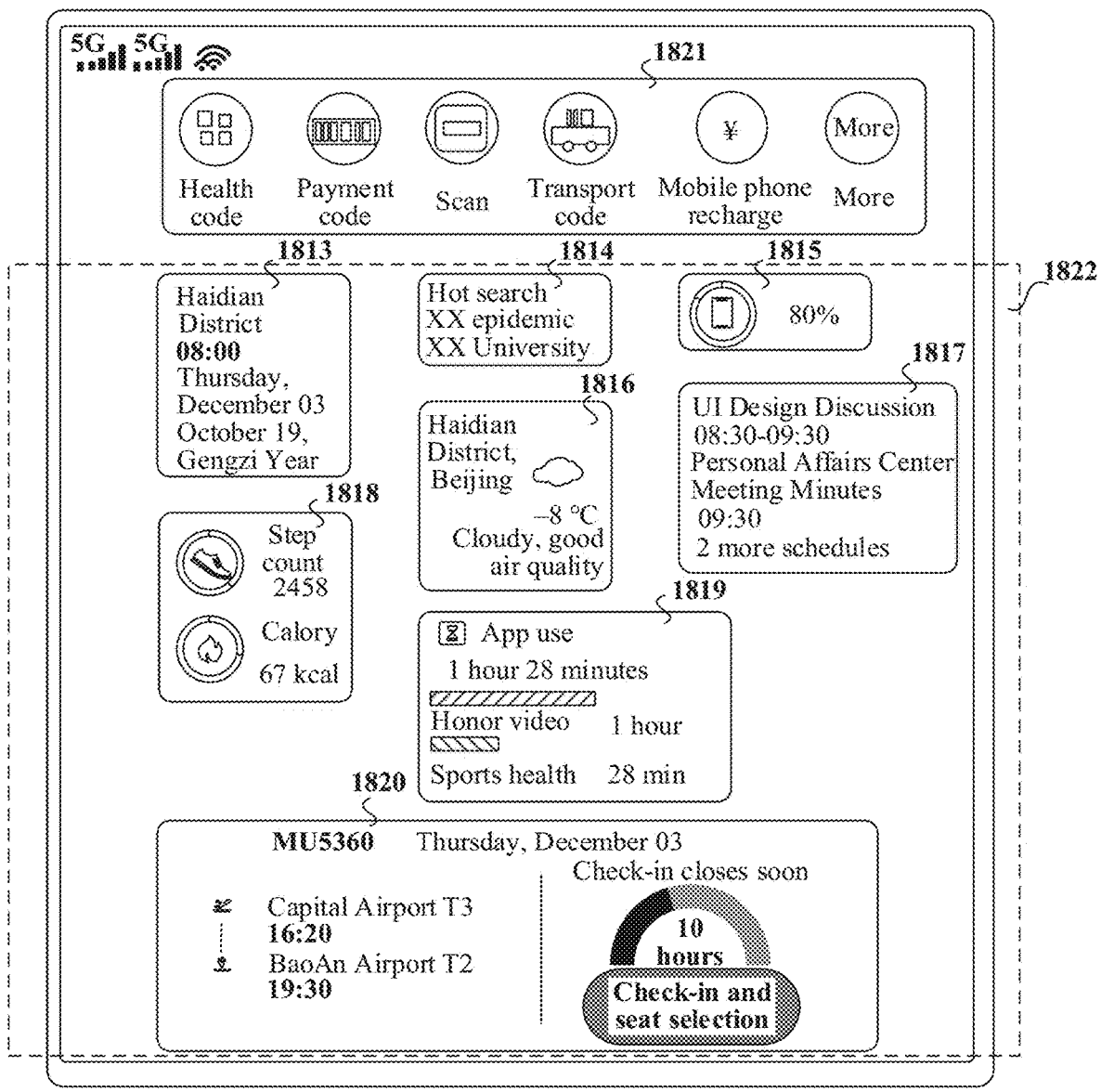

Referring to FIG. 18a to FIG. 18b, FIG. 18a to FIG. 18b exemplarily show user interfaces displayed on leftmost home screens of an outer screen and an inner screen of the electronic device 100, where the user interfaces include home screen cards.

As shown in FIG. 18a, the user interface 1810 is a leftmost home screen of the outer screen of the electronic device 100. A function shortcut entry region 1811 and a home screen card region 1812 are displayed in the user interface 1810.

The function shortcut entry region 1811 may include at least one function entry icon, such as a scan icon, a payment code icon, and a health code icon. The function entry icon corresponds to a specified function of an application. A corresponding function can be enabled when the electronic device 100 receives an operation on a function entry icon. For example, when an operation on a scan icon is received, a scanning function may be enabled.

The home screen card region 1812 may include a plurality of home screen cards. The home screen cards are used for displaying the events that the user wants to follow from time to time, for example, a meeting that is about to begin; an express parcel in transit; a flight booked; and current weather, clock, and calendar. As shown in FIG. 18a, a home screen card region 1812 displays a home screen card 1813, a home screen card 1814, a home screen card 1815, a home screen card 1816, a home screen card 1817, a home screen card 1818, a home screen card 1819, and a home screen card 1820.

In this embodiment of this application, a sorting rule applies to a plurality of home screen cards displayed in the home screen card region 1812 in the user interface 1810. The sorting rule is used for indicating a rank order of a plurality of home screen cards on a leftmost home screen. The sorting order may be determined based on the creation time and priority of the home screen cards. For example, the sorting rule may be: arranging the home screen cards from left to right and from top to bottom based on the creation time and priority of the home screen cards. Understandably, the user may adjust the arrangement at discretion. For example, the home screen cards are sorted by creation time first, and then, if a plurality of home screen cards are created at the same time, the home screen cards created at the same time may be arranged by priority. Subsequently, when the electronic device receives an operation that instructs to adjust the rank order of the home screen cards, the electronic device may adjust the rank order between the existing home screen cards in response to the operation.

After the user unfolds the inner screen of the electronic device 100, as shown in FIG. 18b, the inner screen of the electronic device 100 displays a user interface 1820. The user interface 1820 is a leftmost home screen of the inner screen of the electronic device 100. A function shortcut entry region 1821 and a home screen card region 1822 are displayed in the user interface 1820. Due to the difference of dimensions between the inner screen and the outer screen of the electronic device 100, the number of icons varies between the function shortcut entry region 1821 and the function shortcut entry region 1811, but the rank order of the home screen cards is the same between the home screen card region 1822 and the home screen card region 1812. However, the rank pattern of home screen cards varies between the home screen card region 1822 and the home screen card region 1812. Moreover, the dimensions of some home screen cards in the home screen card region 1822 may be different from the dimensions of such home screen cards in the home screen card region 1812. For example, a home screen card 1820 in the home screen card region 1812 and a home screen card 1820 in the home screen card region 1822 are the same home screen card, but the width of the home screen card 1820 in the home screen card region 1812 is greater than the width of the home screen card 1820 in the home screen card region 1822. For another example, the home screen cards in the home screen card region 1812 are arranged in a two-column pattern while the home screen cards in the home screen card region 1822 are arranged in a three-column pattern.

The increase, decrease, and relocation of the home screen cards on the inner screen of the electronic device and other factors affect the rank order of home screen cards, and the dimensions and rank pattern of the home screen cards on the inner screen are different from those of the home screen cards on the outer screen of the electronic device. If no sorting rule applies to the home screen cards displayed on the inner screen, once one home screen card displayed on the inner screen is relocated by the user, the rank order between other home screen cards is also affected, thereby resulting in a problem of disordered arrangement of the home screen cards.

To solve the foregoing problem, an embodiment of this application provides a method for displaying home screen cards of an electronic device. The method is designed to manage the arrangement of home screen cards and improve user experience in using the home screen cards.

Figure 19:
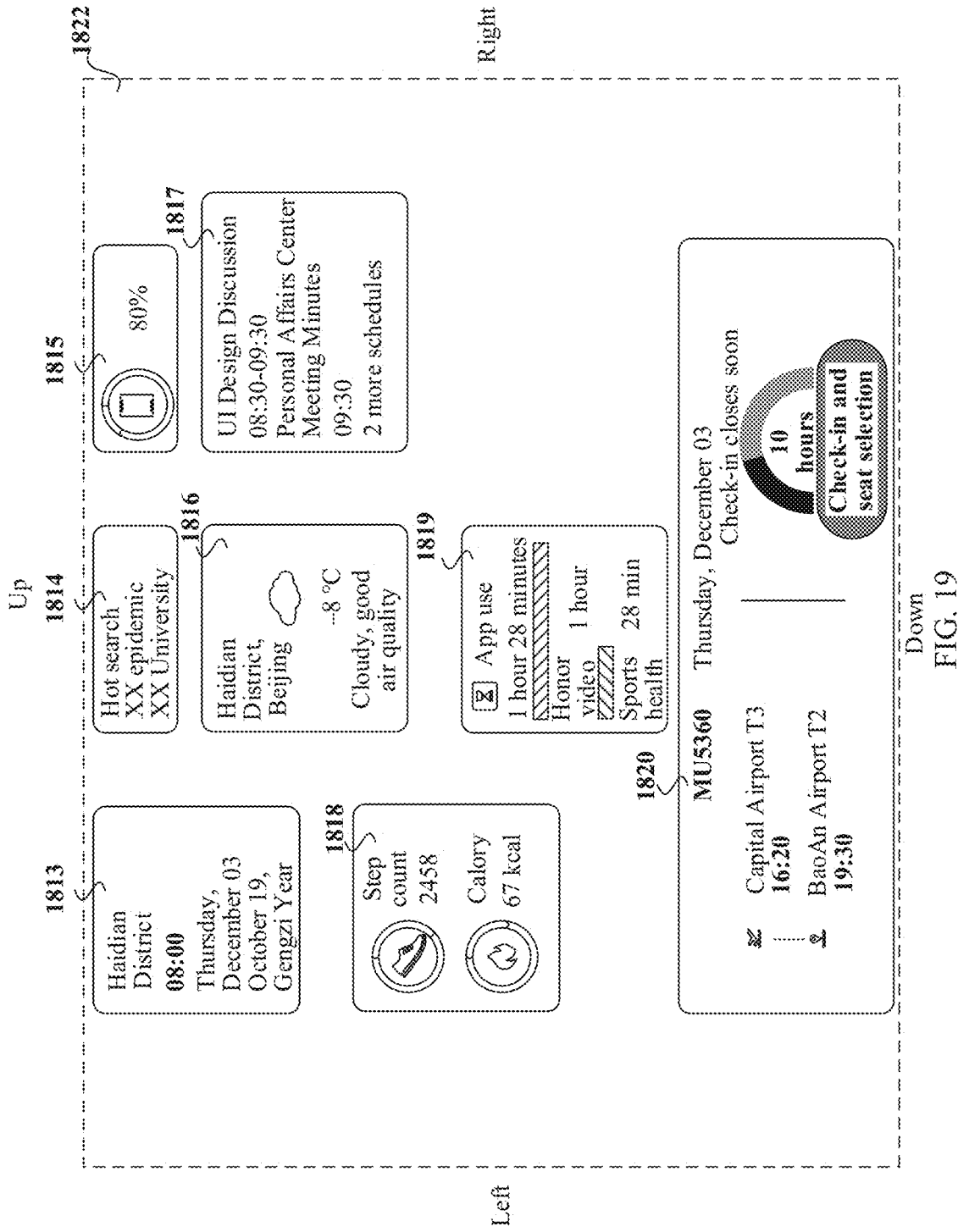
FIG. 19 is a schematic diagram of a home screen card region according to an embodiment of this application.

Referring to FIG. 19, FIG. 19 shows a home screen card region 1822 on the leftmost home screen of the inner screen of the electronic device 100. The electronic device 100 arranges the home screen cards in the home screen card region 1822 from left to right and from top to bottom according to a rank order. In addition, the left-to-right sorting rule takes precedence over the top-to-bottom sorting rule. That is, the electronic device may arrange the cards in the upper left display region with precedence over the lower right display region. "Up", "down", "left", and "right" in FIG. 19 may indicate directions benchmarked against the home screen card region 1822.

For example, in FIG. 19, a home screen card 1813, a home screen card 1814, a home screen card 1815, a home screen card 1816, a home screen card 1817, a home screen card 1818, a home screen card 1819, and a home screen card 1820 are arranged in sequence. The electronic device may arrange the home screen card 1813 on the upper left side of the home screen card region 1822. The space to the right side of the home screen card 1813, that is, the space on the upper right side of the home screen card region 1822, is still sufficient for arranging the home screen card 1814 and the home screen card 1815. In this way, the electronic device can arrange the home screen card 1814 and the home screen card 1815 on the upper right side of the home screen card region 1822. In this case, because the height of the home screen card 1814 and the home screen card 1815 is less than the height of the home screen card 1813, more arrangement regions are still available under the home screen card 1814 and the home screen card 1815. The width of the home screen card 1816 and the home screen card 1817 is the same as the width of the home screen card 1814 and the home screen card 1815. The electronic device may arrange the home screen card 1816 and the home screen card 1817 to the right side of the home screen card 1813. That is, the electronic device may arrange the home screen card 1816 and the home screen card 1817 under the home screen card 1814 and the home screen card 1815. The electronic device may arrange the home screen card 1818 under the home screen card 1813, and arrange the home screen card 1819 to the right side of the home screen card 1818. The width of the home screen card 1820 is greater than the width of an arrangement region to the right side of the home screen card 1819. Therefore, the electronic device is unable to arrange the home screen card 1820 to the right side of the home screen card 1819. The electronic device may arrange the home screen card 1820 under the home screen card 1818 and the home screen card 1819.

In this way, a vacant arrangement region is available to the right side of the home screen card 1819 and between the home screen card 1818 and the home screen card 1820.

In some embodiments of this application, still referring to FIG. 19, various types of home screen cards, such as S-type card, M-type card, and L-type card, may be arranged in the home screen card region 1822. The dimension of the M-type card is approximately twice the dimension of the S-type card. For example, the display region occupied by two S-type cards spliced seamlessly is the same in size as the display region occupied by one M-type card. In addition, the dimension of the L-type card is approximately three times the dimension of the M-type card. For example, both the home screen card 1814 and the home screen card 1815 in the home screen card region 1822 are S-type cards. The home screen card 1813, the home screen card 1816, the home screen card 1817, the home screen card 1818, and the home screen card 1819 are all M-type cards. The home screen card 1820 is an L-type cards. Alternatively, the electronic device 100 may arrange different types of home screen cards based on a left-to-right and top-to-bottom sorting rule.

In some other embodiments of this application, XL-type cards may be arranged in the home screen card region 1822. The dimension of an XL-type card is approximately twice the dimension of an L-type card.

In some embodiments of this application, the S-type card may be a card that is 1 in height and 2 in length (that is, 1×2 in size). The M-type card may be a card that is 2 in height and 2 in length (that is, 2×2 in size). The L-type card is a card that is 2 in height and 6 in length (that is, 2×6 in size). The XL-type card is a card that is 4 in height and 6 in length (that is, 4×6 in size).

Figure 20:
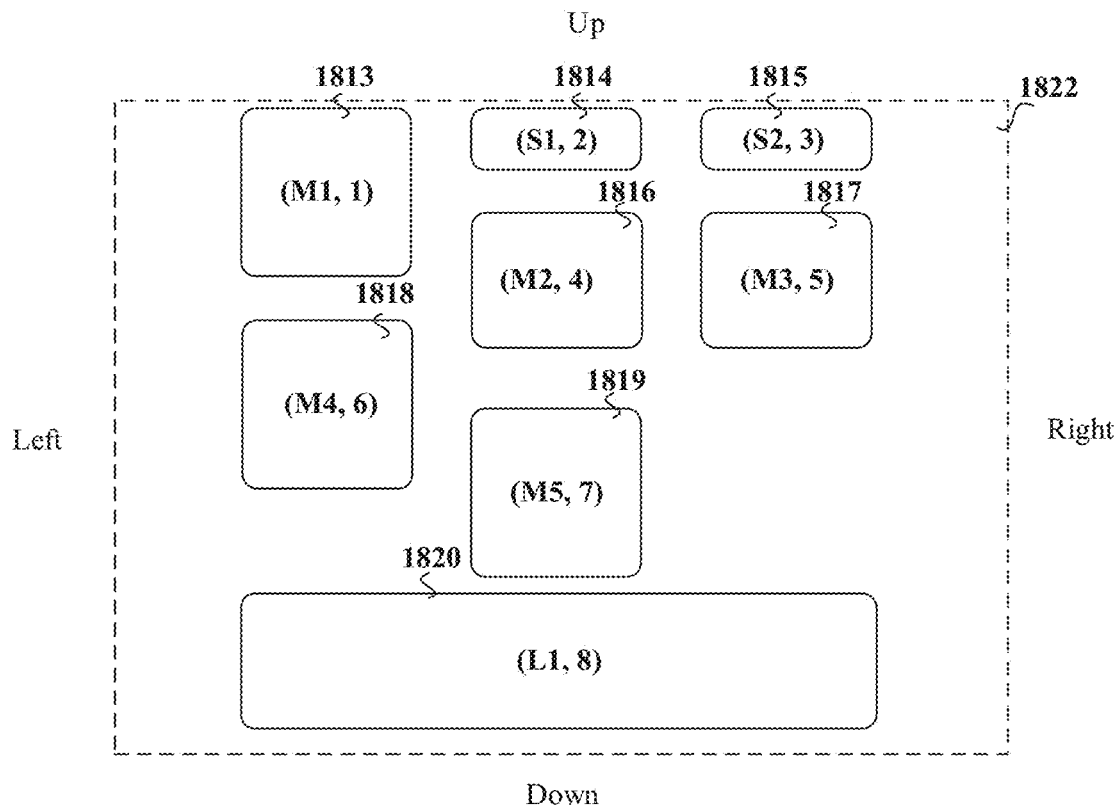
FIG. 20 is a schematic diagram of a home screen card region according to an embodiment of this application.

Referring to FIG. 20, FIG. 20 shows an example of arranging different types of home screen cards in a home screen card region 1822 on a leftmost home screen displayed on the inner screen of the electronic device 100 based on a left-to-right and top-to-bottom sorting rule. To facilitate a person skilled in the art to understand the principles of arranging the home screen cards, different home screen cards are represented by the home screen card types and numerals in FIG. 20. For example, as shown in FIG. 20, S1 represents the home screen card 1814, and the home screen card 1814 is an S-type card. S2 represents the home screen card 1815, and the home screen card 1815 is an S-type card. M1 represents the home screen card 1813, and the home screen card 1813 is an M-type card. M2 represents the home screen card 1816, and the home screen card 1816 is an M-type card. M3 represents the home screen card 1817, and the home screen card 1817 is an M-type card. M4 represents the home screen card 1818, and the home screen card 1818 is an M-type card. M5 represents the home screen card 1819, and the home screen card 1819 is an M-type card. L1 represents the home screen card 1820, and the home screen card 1820 is an L-type card.

In addition, to facilitate a person skilled in the art to understand the principles of arranging the cards, the rank order between the home screen cards is marked with serial numbers in FIG. 20. The smaller the serial number of a home screen card, the more the home screen card is ranked ahead.

For example, as shown in FIG. 20, the home screen card 1813 is marked with (M1, 1). In this marking, M1 represents the home screen card 1813, and the serial number 1 means that the home screen card 1813 ranks first among the home screen card 1813, the home screen card 1814, the home screen card 1815, the home screen card 1816, the home screen card 1817, the home screen card 1818, the home screen card 1819, and the home screen card 1820. The home screen card 1814 is marked with (S1, 2). In this marking, S1 represents the home screen card 1814, and the serial number 2 means that the home screen card 1814 ranks second. The home screen card 1815 is marked with (S2, 3). In this marking, S2 represents the home screen card 1815, and the serial number 3 means that the home screen card 1815 ranks third. The home screen card 1816 is marked with (M2, 4). In this marking, M2 represents the home screen card 1816, and the serial number 4 means that the home screen card 1816 ranks fourth. The home screen card 1817 is marked with (M3, 5). In this marking, M3 represents the home screen card 1817, and the serial number 5 means that the home screen card 1817 ranks fifth. The home screen card 1818 is marked with (M4, 6). In this marking, M4 represents the home screen card 1818, and the serial number 6 means that the home screen card 1818 ranks sixth. The home screen card 1819 is marked with (M5, 7). In this marking, M5 represents the home screen card 1819, and the serial number 7 means that the home screen card 1819 ranks seventh. The home screen card 1820 is marked with (L1, 8). In this marking, L1 represents the home screen card 1820, and the serial number 8 means that the home screen card 1820 ranks eighth. Understandably, the serial number of a home screen card is variable. For example, with the change of the arrangement position of a home screen card, the corresponding serial number also changes.

In some embodiments of this application, the electronic device 100 may arrange the home screen cards based on a left-to-right and top-to-bottom sorting rule, and then based on the rank order of each home screen card, where the rank order is determined by the creation time and priority of the home screen card. In this way, every home screen card is ensured to be arranged in the home screen card region 1822 on the leftmost home screen displayed on the inner screen of the electronic device 100.

Still referring to FIG. 20, (M1, 1) ranks first. The electronic device may determine the arrangement position of M1 first. In this case, the entire home screen card region 1822 belongs to the arrangement region of M1. In this way, the electronic device determines the arrangement position of M1 in the home screen card region 1822 based on a left-to-right and top-to-bottom sorting rule. For example, the electronic device may determine that M1 is arranged on the upper left side of the home screen card region 1822, so that M1 is adjacent to the left edge and the upper edge of the home screen card region 1822. After determining the arrangement position of M1, the electronic device continues to determine the arrangement position of (S1, 2). For (S1, 2), both the arrangement region to the right side of M1 and the arrangement region under M1 can accommodate S1, that is, belong to the arrangement region of S1. Based on the sorting rule, the electronic device preferentially arranges S1 in the arrangement region to the right side of M1. In this way, S1 and M1 are arranged horizontally in the home screen card region 1822. That is, the upper edges of S1 and M1 are located at the same height. For (S2, 3), both the arrangement region to the right side of S1 and the arrangement region under S1 can accommodate S2. The electronic device preferentially arranges S2 in the arrangement region to the right side of S1 based on the sorting rule. S2 and S1 are arranged horizontally in the home screen card region 1822. That is, the upper edges of S1 and S2 are located at the same height. For (M2, 4), both the arrangement region to the right side of M1 and the arrangement region under M1 can accommodate M2. The electronic device preferentially arranges M2 in the arrangement region to the right side of M1 based on the sorting rule. M2 and M1 are arranged horizontally in the home screen card region 1822. The upper edges of M1 and M2 are not located at the same height. The upper edge of M2 is aligned with the lower edge of S1. For (M3, 5), both the arrangement region to the right side of M2 and the arrangement region under S2 can accommodate M2. The electronic device preferentially arranges M3 in the arrangement region to the right side of M2 based on the sorting rule. M3 and M2 are arranged horizontally in the home screen card region 1822. The upper edges of M1 and M2 are located at the same height. The upper edge of M3 is aligned with the lower edge of S2. For (M4, 6), the arrangement region under M1 can accommodate M4. The electronic device preferentially arranges M4 in the arrangement region under M1 based on the sorting rule. M4 and M1 are vertically arranged m the home screen card region 1822, and the upper edge of M4 is aligned with the lower edge of M1. For (M5, 6), both the arrangement region to the right side of M4 and the arrangement region under M4 can accommodate M5. The electronic device preferentially arranges M5 in the arrangement region to the right side of M4 based on the sorting rule. M5 and M4 are arranged horizontally in the home screen card region 1822. The upper edges of M5 and M4 are not located at the same height. The upper edge of M5 is aligned with the lower edge of M2. For (L1, 8), the L-type home screen card is large in size, and cannot be arranged horizontally along with other types of home screen cards. Based on the sorting rule, the electronic device determines that L1 is arranged under M5, and the upper edge of L1 is close to the lower edge of M5. The arrangement region available for arranging other types of home screen cards exists between L1 and M4 and M3.

With the home screen cards arranged in this way, the electronic device ensures that the home screen cards displayed in a home screen card region 1822 of the leftmost home screen of the inner screen are arranged in an orderly manner, and ensures that a home screen card ranked ahead is displayed first, thereby utilizing the display resources efficiently.

In some embodiments of this application, after receiving an operation on a home screen card, the electronic device also adjusts the arrangement of the home screen card in response to the operation on the home screen card. The operation on a home screen card may include: adding a home screen card, deleting a home screen card, and adjusting the arrangement position of a home screen card, and the like.

Figure 21:
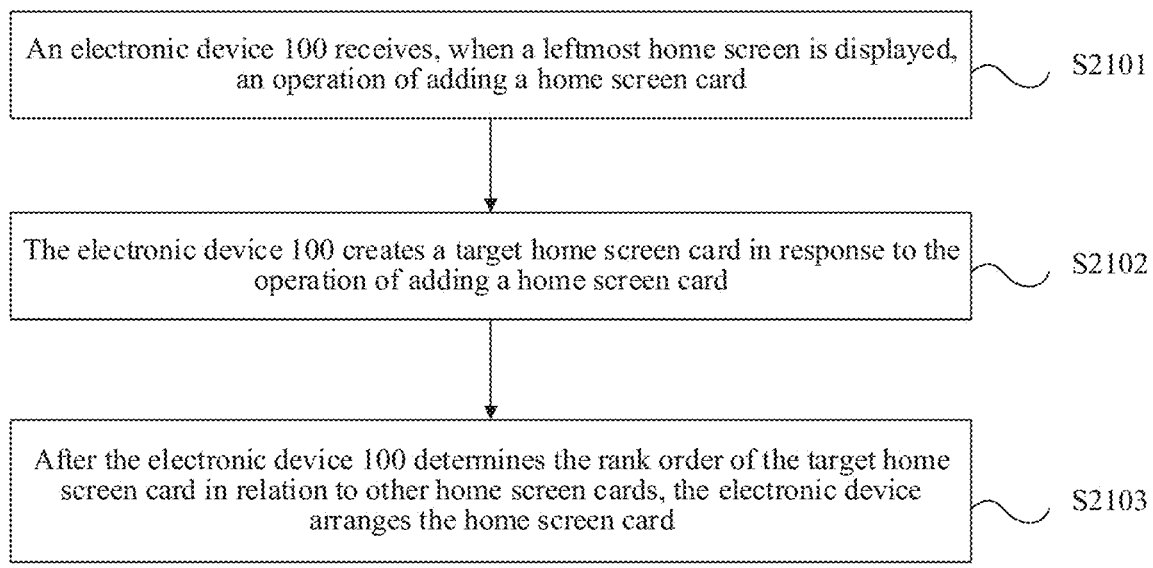
FIG. 21 is a schematic diagram of a process of a method according to an embodiment of this application.

The following describes in detail a method for displaying home screen cards according to an embodiment of this application with reference to the schematic method flowchart shown in FIG. 21. The method shown in FIG. 21 may be implemented by a processor of the electronic device 100 by executing related instructions.

Referring to FIG. 21, the display method may include the following steps.

S2101: An electronic device 100 receives, when a leftmost home screen is displayed, an operation of adding a home screen card.

In some embodiments of this application, the operation of adding a home screen card may be an operation performed by the user on the leftmost home screen displayed on the inner screen of the electronic device 100. For example, the operation of adding a home screen card may be an operation of the user creating a home screen card corresponding to an application of the electronic device 100.

Figure 22A:
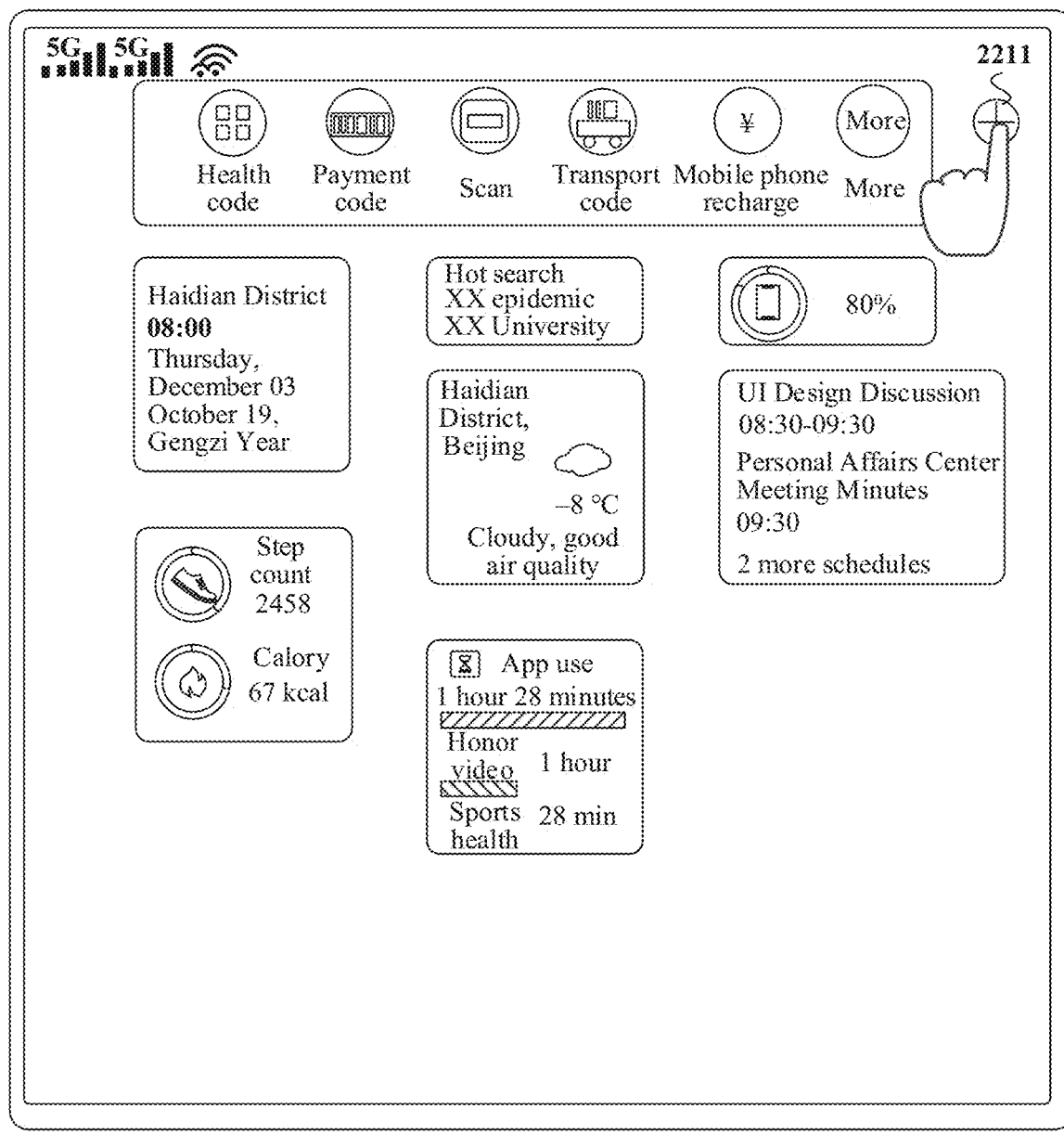
FIG. 22*a* to FIG. 22*c* are schematic diagrams of a group of user interfaces according to an embodiment of this application.
Figure 22B:
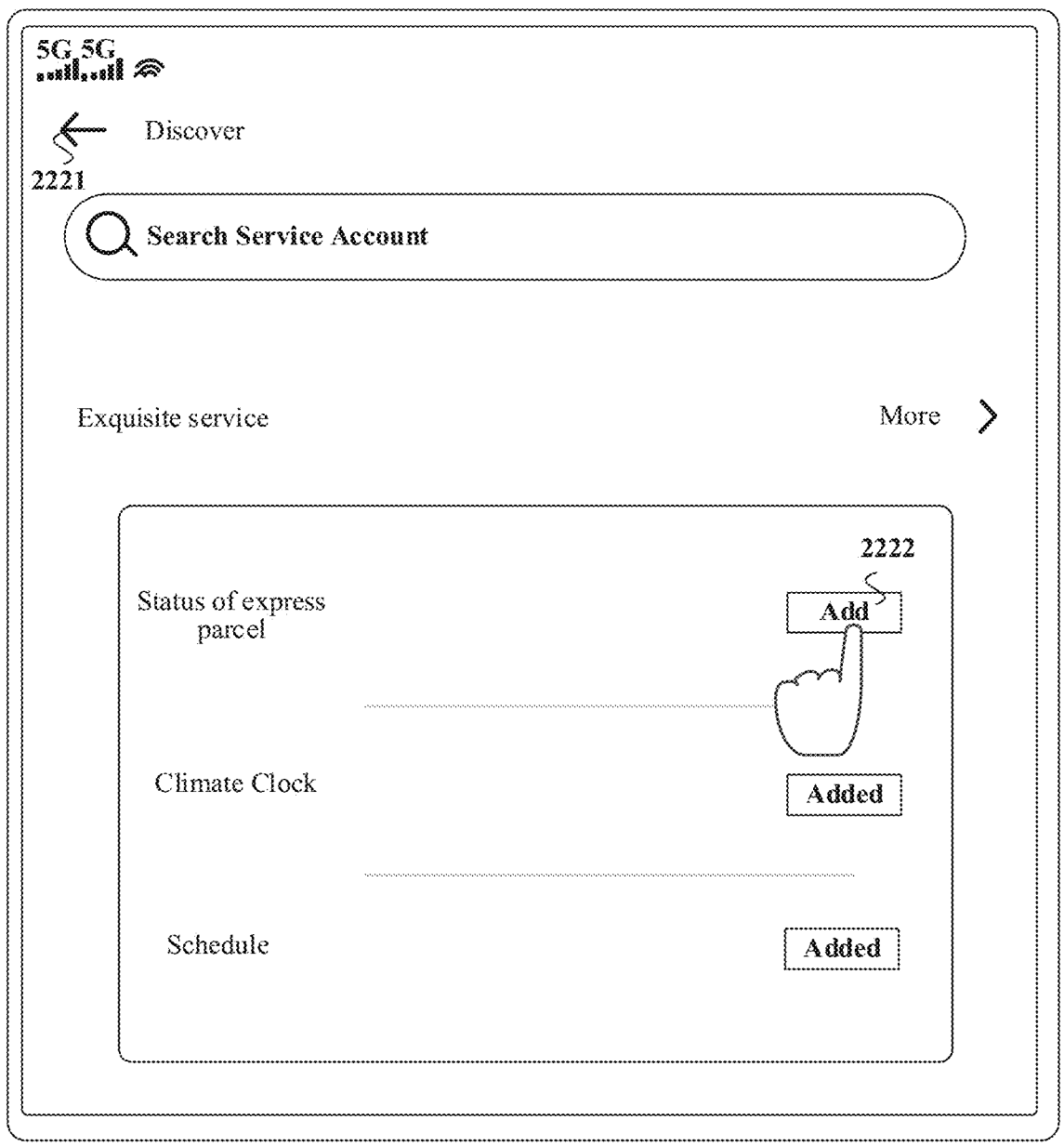
Figure 22C:
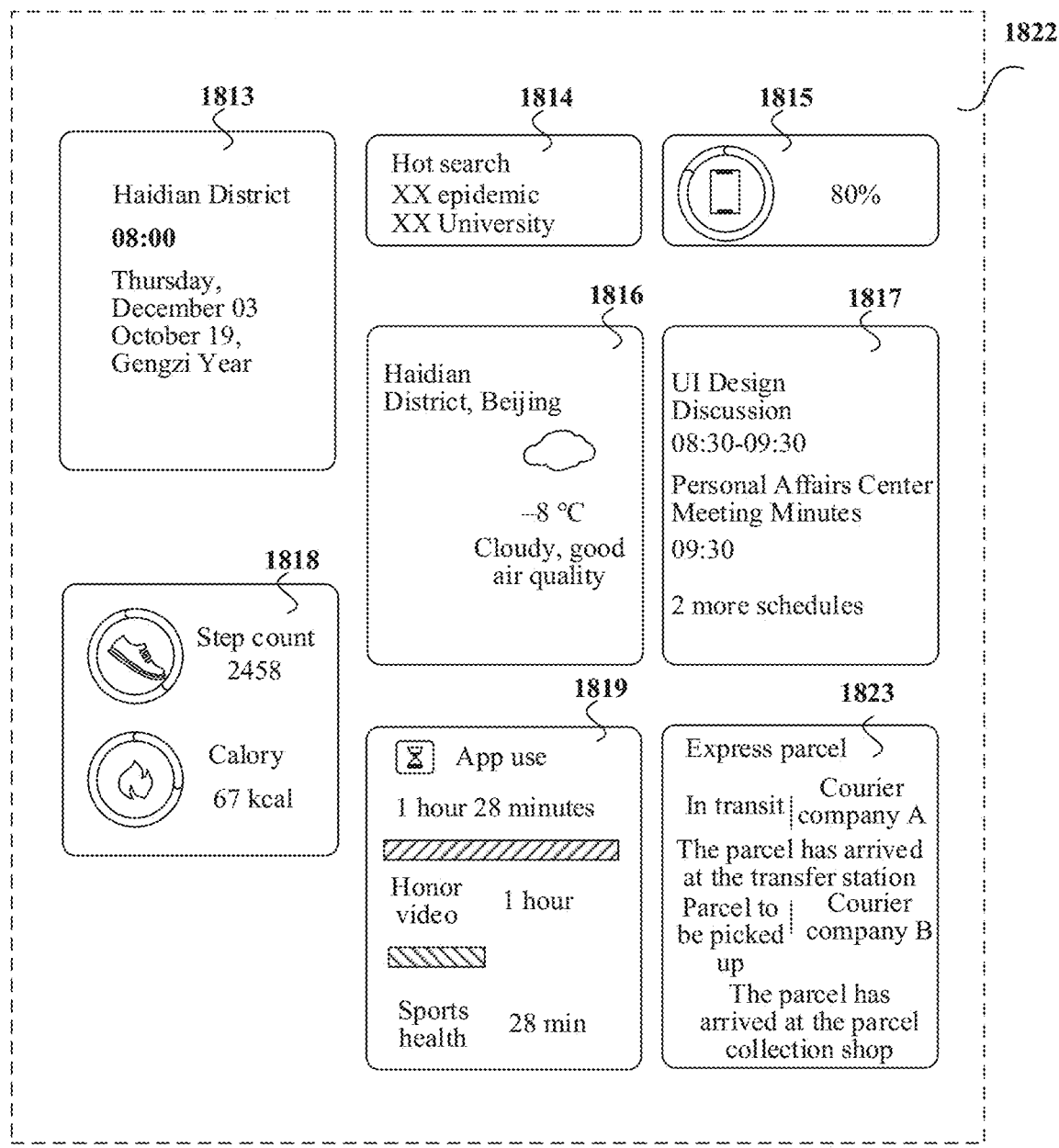

Referring to FIG. 22*a* to FIG. 22*c*, FIG. 22*a* to FIG. 22*c* show an example of a home screen card displayed on the inner screen of the electronic device 100.

As shown in FIG. 22*a*, FIG. 22*a* exemplarily shows a user interface 2210 displayed on the inner screen of the electronic device 100. The user interface 2210 may be a leftmost home screen displayed on the inner screen of the electronic device 100. The user interface 2210 includes and displays a control 2211 used for opening an interface for adding a home screen card. When the electronic device 100 receives an operation such as a tap operation performed by the user on the control 2211, the inner screen of the electronic device 100 displays a user interface 2220, as shown in FIG. 22*b*. The user interface 2220 includes and displays a Back control 2221. Understandably, when the electronic device 100 receives an operation such as a tap operation performed by the user on the control 2221, the inner screen of the electronic device 100 goes back to display the user interface 2210 again, as shown in FIG. 22*a*.

S2102: The electronic device 100 creates a target home screen card in response to the operation of adding a home screen card.

In some embodiments of this application, as shown in FIG. 22*b*, the user interface 2220 lists the types of home screen cards that can be added and the types of home screen cards already added, and displays an Add control 2222. When receiving an operation such as a tap operation performed by the user on the control 2222, the electronic device 10 may add a new home screen card 1823, that is, a target home screen card, in the home screen card region 1822 displayed on the inner screen of the electronic device 100, as shown in FIG. 22*c*.

S2103: After the electronic device 100 determines the rank order of the target home screen card in relation to other home screen cards, the electronic device arranges the home screen card.

In some embodiments of this application, before displaying the target home screen card, the electronic device 100 may determine the rank order of the target home screen card in relation to existing home screen cards in the home screen card region 1822 displayed on the inner screen of the electronic device 100.

Figure 23A:
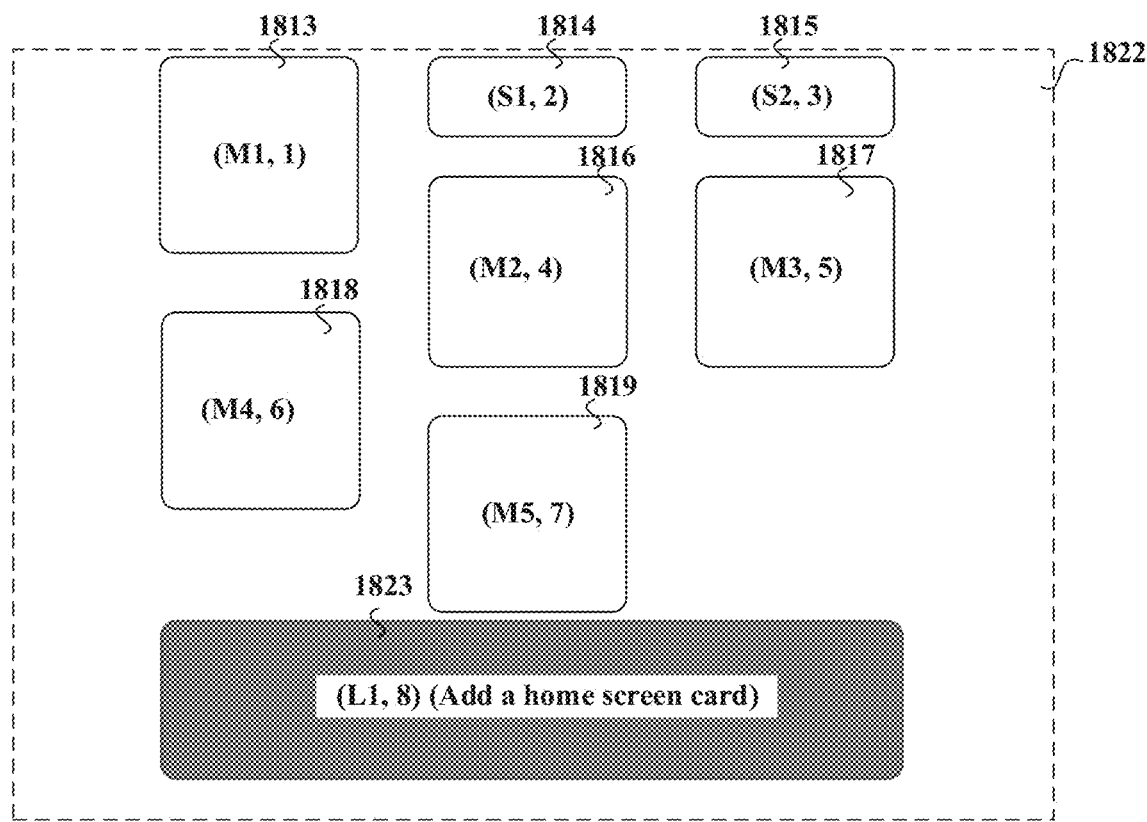
FIG. 23*a* to FIG. 23*c* are schematic diagrams of a group of user interfaces according to an embodiment of this application.
Figure 23B:
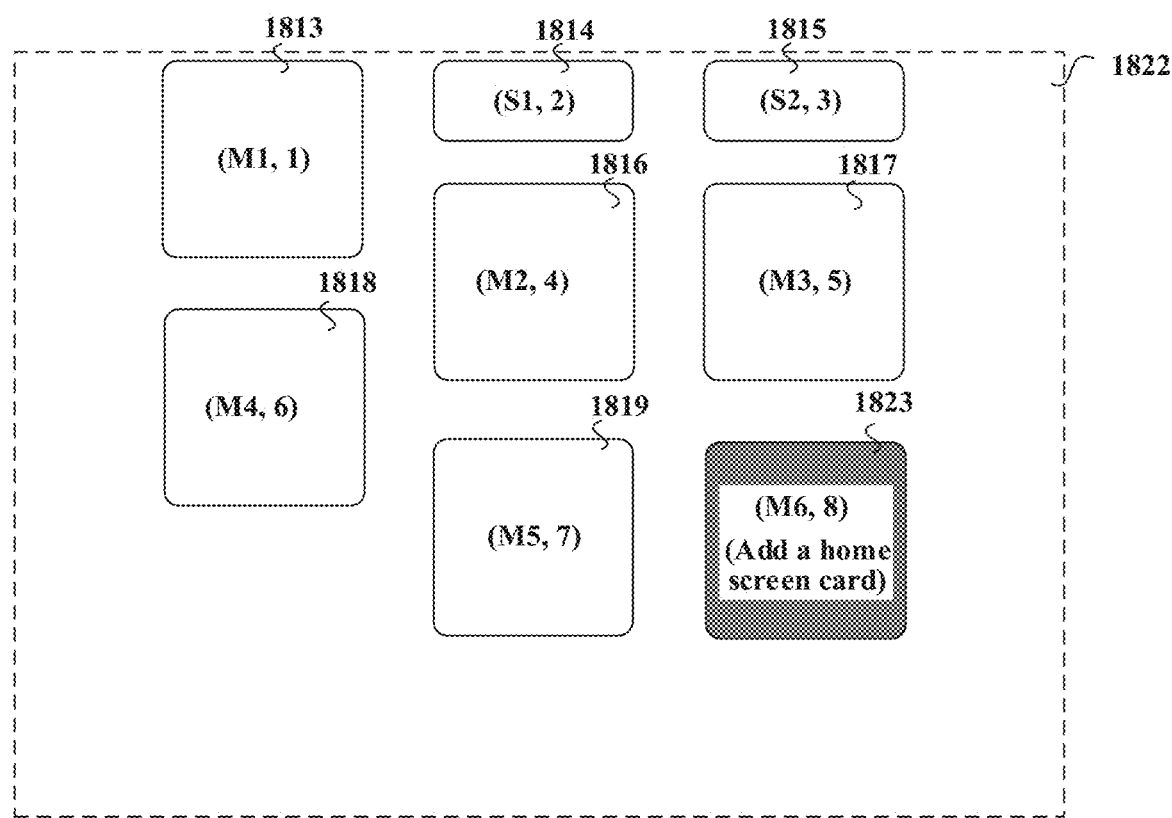
Figure 23C:
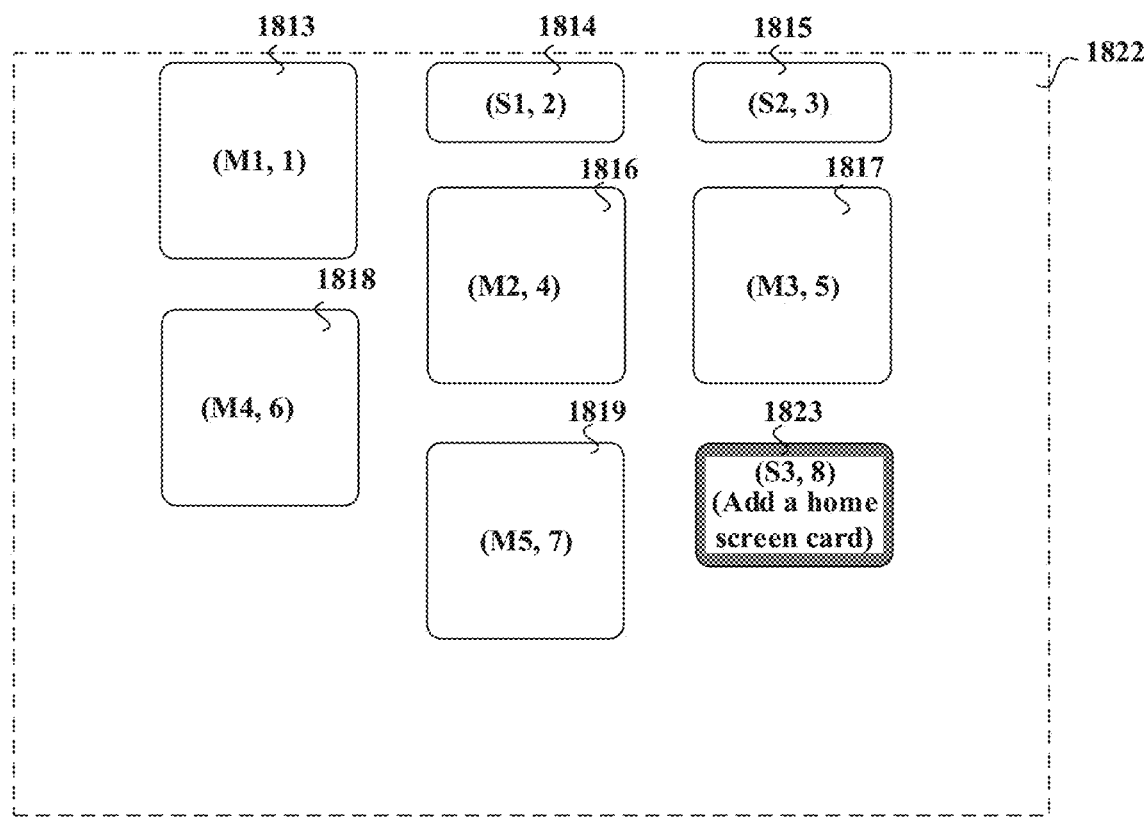

Referring to FIG. 23*a* to FIG. 23*c*, FIG. 23*a* to FIG. 23*c* show an example of arranging home screen cards in a home screen card region 1822 displayed on the inner screen of the electronic device 100.

As shown in FIG. 23*a*, the target home screen card 1823 is an L-type card. In this case, the display space to the right side of M5 is unable to accommodate the target home screen card 1823. Therefore, the electronic device 100 may arrange the card under M5. The electronic device 100 marks the target home screen card 1823 as (L1, 8).

For another example, as shown in FIG. 23*b*, the target home screen card 1823 is an M-type card. In this case, the arrangement region to the right side of M5 can accommodate the target home screen card 1823, and the arrangement region under M4 can also accommodate the target home screen card 1823. Based on the left-to-right and top-to-bottom sorting rule, the electronic device determines to arrange the target home screen card 1823 to the right side of M5, horizontally along with M5. The electronic device 100 marks the target home screen card 1823 as (M6, 8).

For example, as shown in FIG. 23c, the target home screen card 1823 is an S-type card. In this case, the arrangement region to the right side of M5 can accommodate the target home screen card 1823, and the arrangement region under M4 can also accommodate the target home screen card 1823. Based on the left-to-right and top-to-bottom sorting rule, the electronic device 100 determines to arrange the target home screen card 1823 to the right side of M5, horizontally along with M5. The electronic device 100 marks the target home screen card 1823 as (S3, 8).

In some other embodiments of this application, the electronic device 100 may receive, when the leftmost home screen is displayed, an operation of deleting a home screen card. The operation of deleting a home screen card may be an operation performed by the user on the leftmost home screen displayed on the inner screen of the electronic device 100. For example, the operation of deleting a home screen card may be an operation of the user deleting a home screen card existent on the leftmost home screen displayed on the inner screen of the electronic device 100.

Figure 24A:
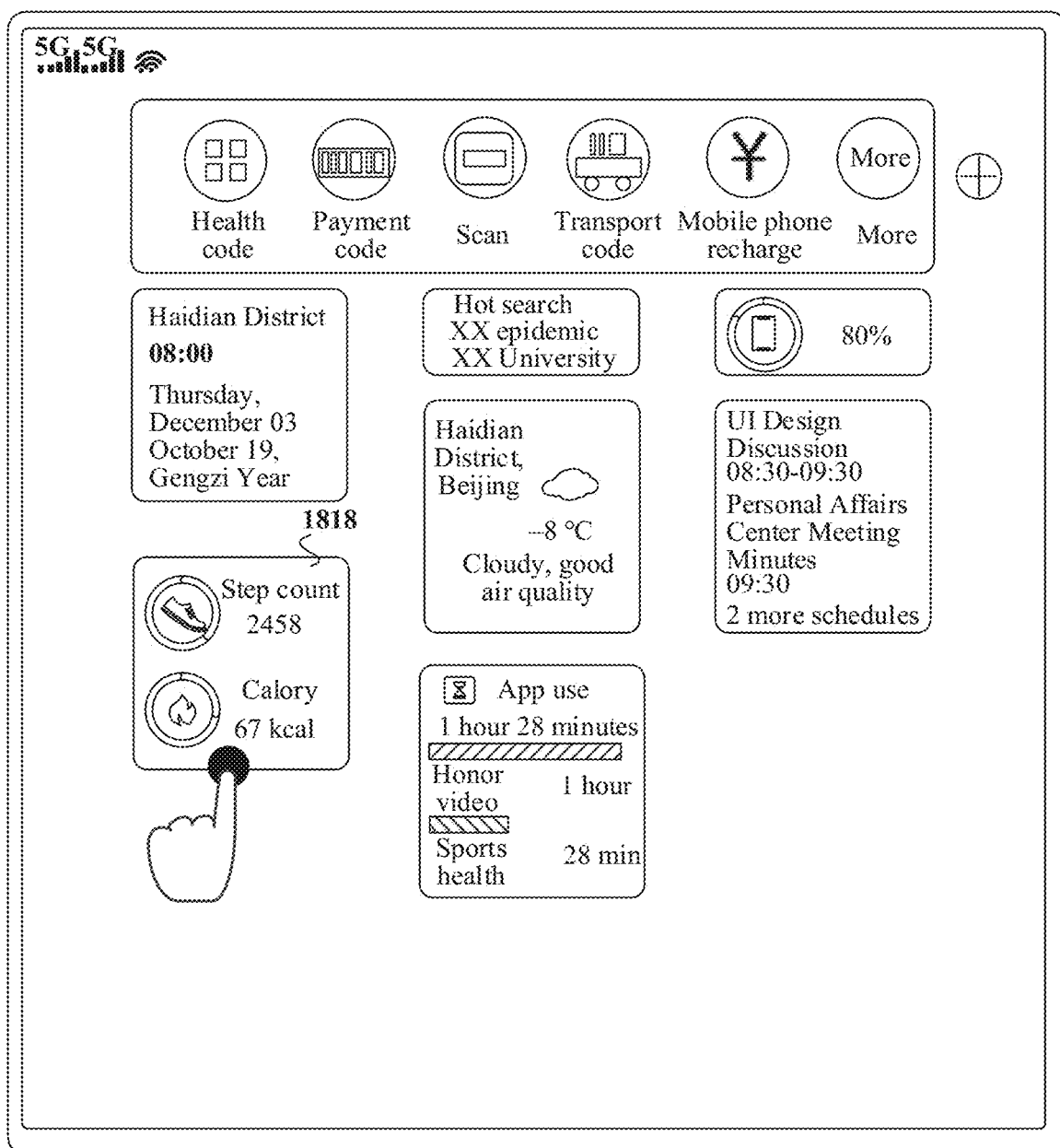
FIG. 24*a* to FIG. 24*c* are schematic diagrams of a group of user interfaces according to an embodiment of this application.
Figure 24B:
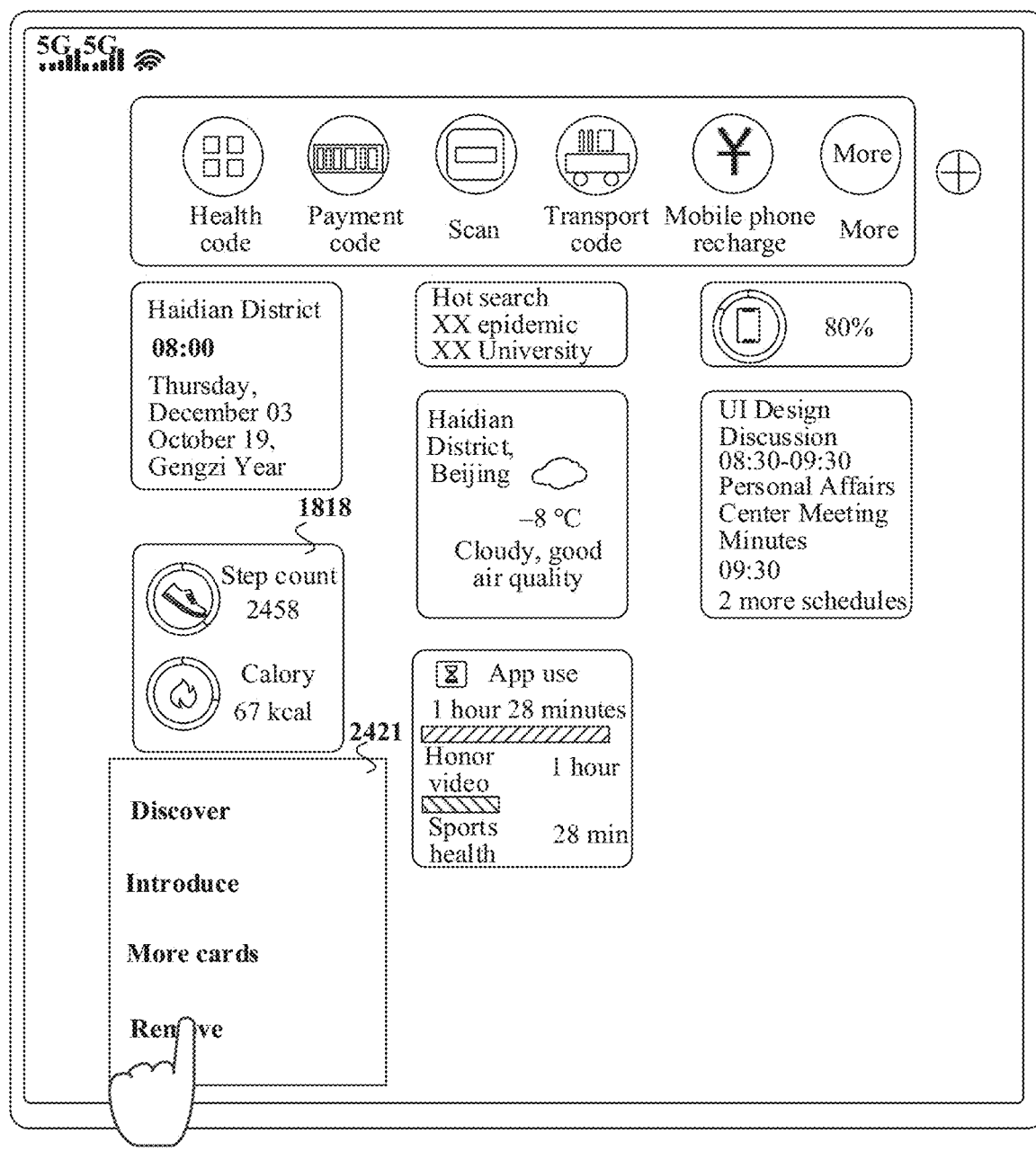
Figure 24C:
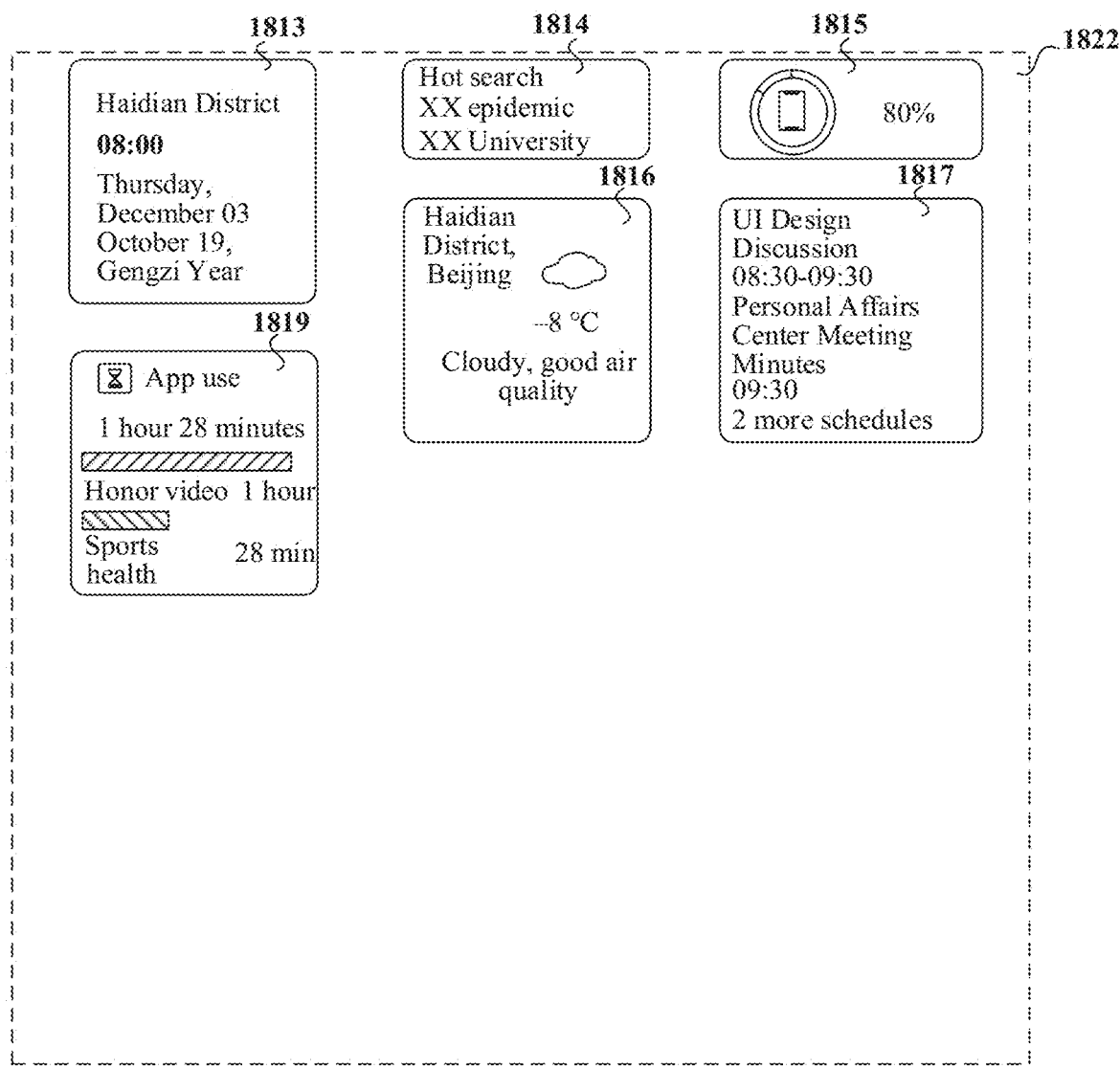

Referring to FIG. 24a to FIG. 24c, FIG. 24a to FIG. 24c show an example of a home screen card displayed on the inner screen of the electronic device 100.

As shown in FIG. 24a, FIG. 24a exemplarily shows a user interface 2410 displayed on the inner screen of the electronic device 100. The user interface 2410 may be the leftmost home screen. When the electronic device 100 receives an operation such as a touch-and-hold operation performed by the user on the home screen card 1818, the inner screen of the electronic device 100 displays a user interface 2420. The user interface 2420 displays an operation window 2421. Operation options, such as Discover, Introduction. More cards, and Remove, are listed in operation window 2421. When the electronic device 100 receives an operation such as a tap operation performed by the user on the "Remove" option, the electronic device 100 may delete the home screen card 1818. As shown in FIG. 24c, the electronic device 100 may delete the home screen card 1818 from the home screen card region 1822 displayed on the inner screen of the electronic device 100. In other words, the electronic device 100 may cancel the display of the home screen card 1818 in the home screen card region 1822.

Understandably, when the original arrangement region of the home screen card 1818 can accommodate the home screen card arranged behind the home screen card 1818, the electronic device 100 may rearrange the home screen cards as required, thereby effectively utilizing the display resources of the electronic device 100.

Figure 25A:
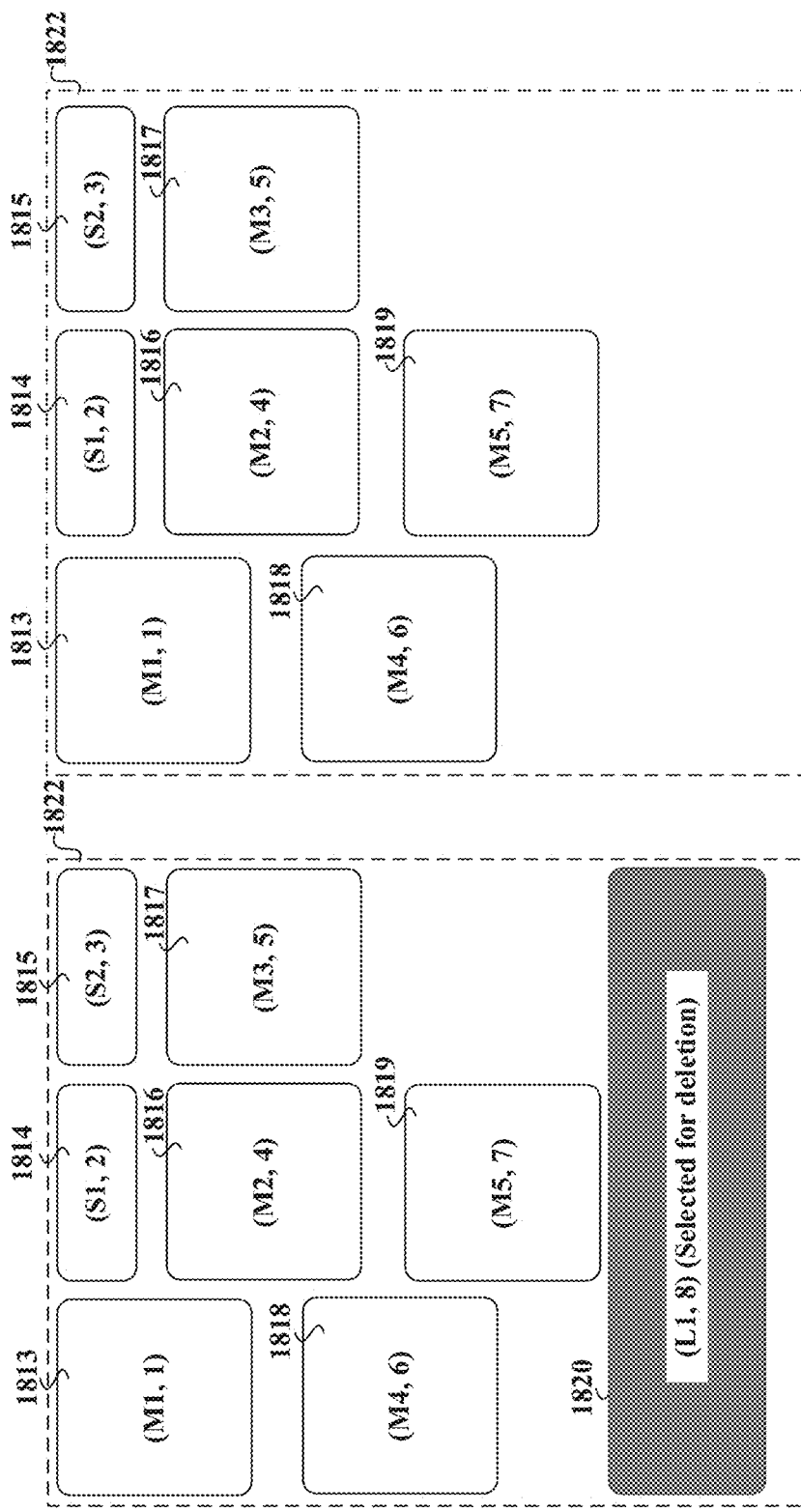
Figure 25B:
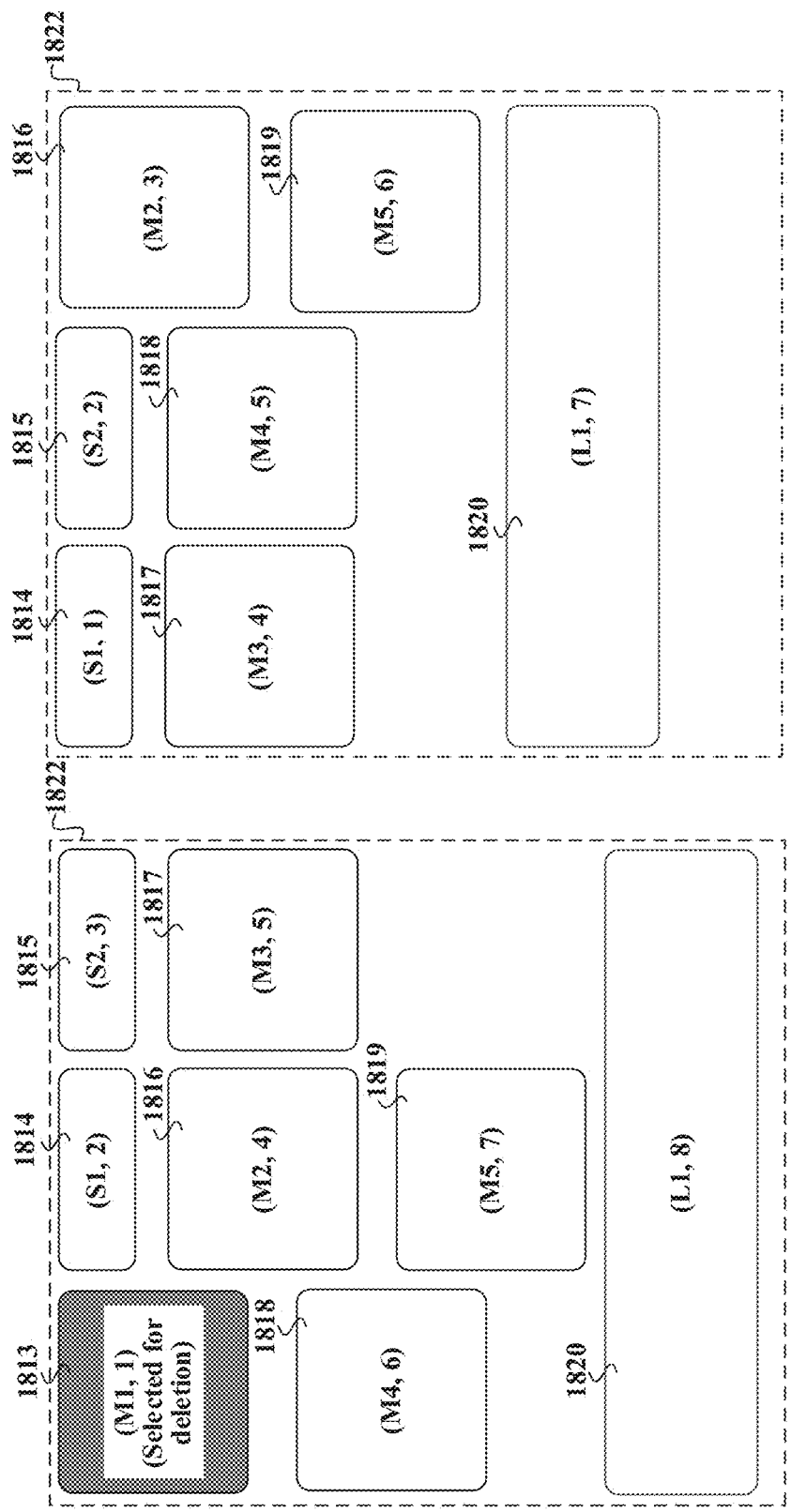

Referring to FIG. 25a to FIG. 25c, FIG. 25a to FIG. 25c show an example of arranging home screen cards in a home screen card region 1822 displayed on the inner screen of the electronic device 100.

For example, as shown in FIG. 25a, after the home screen card 1820 (L1, 8) is selected and deleted, the electronic device 100 may cancel the display of L1 in the home screen card region 1822 displayed on the inner screen. Because no other home screen cards exist after the home screen card 1820 (L1, 8), the electronic device 100 may keep the rank order of other home screen cards unchanged.

For another example, as shown in FIG. 25b, after the home screen card 1813 (M1, 1) is selected and deleted, the electronic device 100 may cancel the display of M1 in the home screen card region 1822 displayed on the inner screen. S1 is a card next to M1, and S1 is smaller than M1 in size, so that the original arrangement region of M1 can accommodate S1. Therefore, the electronic device 100 arranges S1, S2, M2, M3, M4, M5, and L1 sequentially based on a left-to-right and top-to-bottom sorting rule.

For another example, as shown in FIG. 25c, after the home screen card 1814 (S1, 2) is selected and deleted, the electronic device 100 may cancel the display of S1 in the home screen card region 1822 displayed on the inner screen. S2 is a card next to S1, and is identical to S1 in size, so that the original arrangement region of S1 can accommodate S2. Therefore, the electronic device 100 arranges M1, S2, M2, M3, M4, M5, and L1 sequentially based on a left-to-right and top-to-bottom sorting rule.

In some other embodiments of this application, the electronic device 100 may receive, when the leftmost home screen is displayed, an operation of adjusting a home screen card. The operation of adjusting a home screen card may be an operation performed by the user on the leftmost home screen displayed on the inner screen of the electronic device 100. For example, the operation of adjusting a home screen card may be an operation of the user adjusting the arrangement position of a home screen card existent on the leftmost home screen displayed on the inner screen of the electronic device 100.

Figure 26:
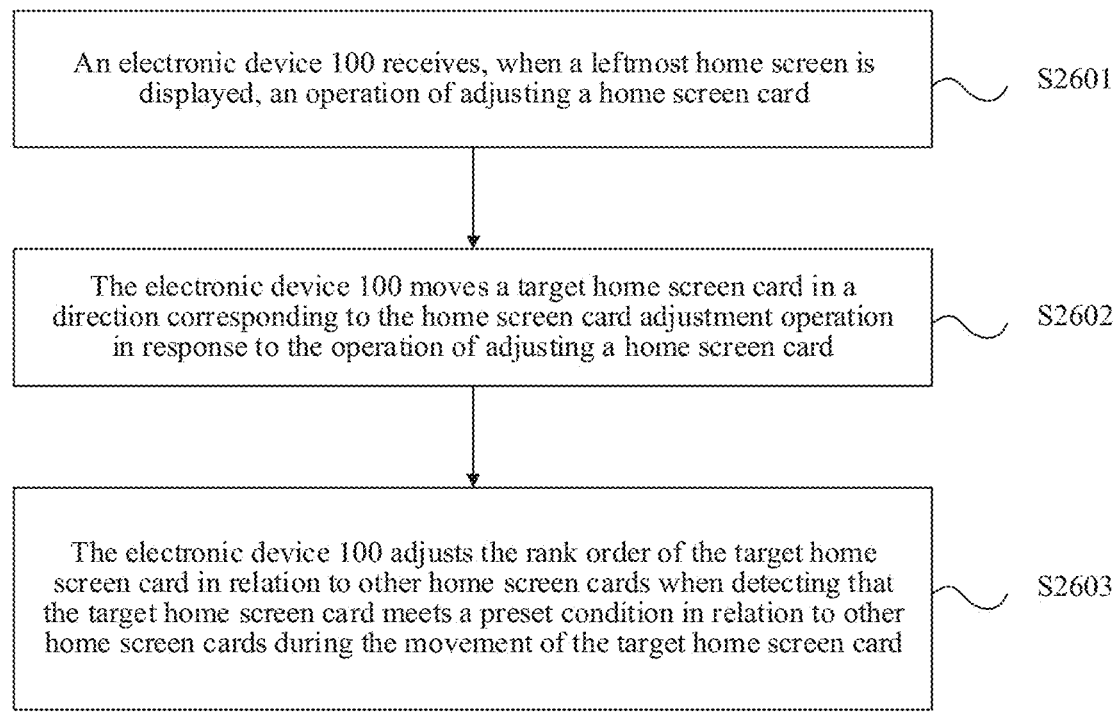
FIG. 26 is a schematic diagram of a process of a method according to an embodiment of this application.

The following describes in detail a method for displaying home screen cards according to an embodiment of this application with reference to the schematic method flowchart shown in FIG. 26. The method shown in FIG. 26 may be implemented by a processor of the electronic device 100 by executing related instructions.

S2601: An electronic device 100 receives, when a leftmost home screen is displayed, an operation of adjusting a home screen card.

Figure 27A:
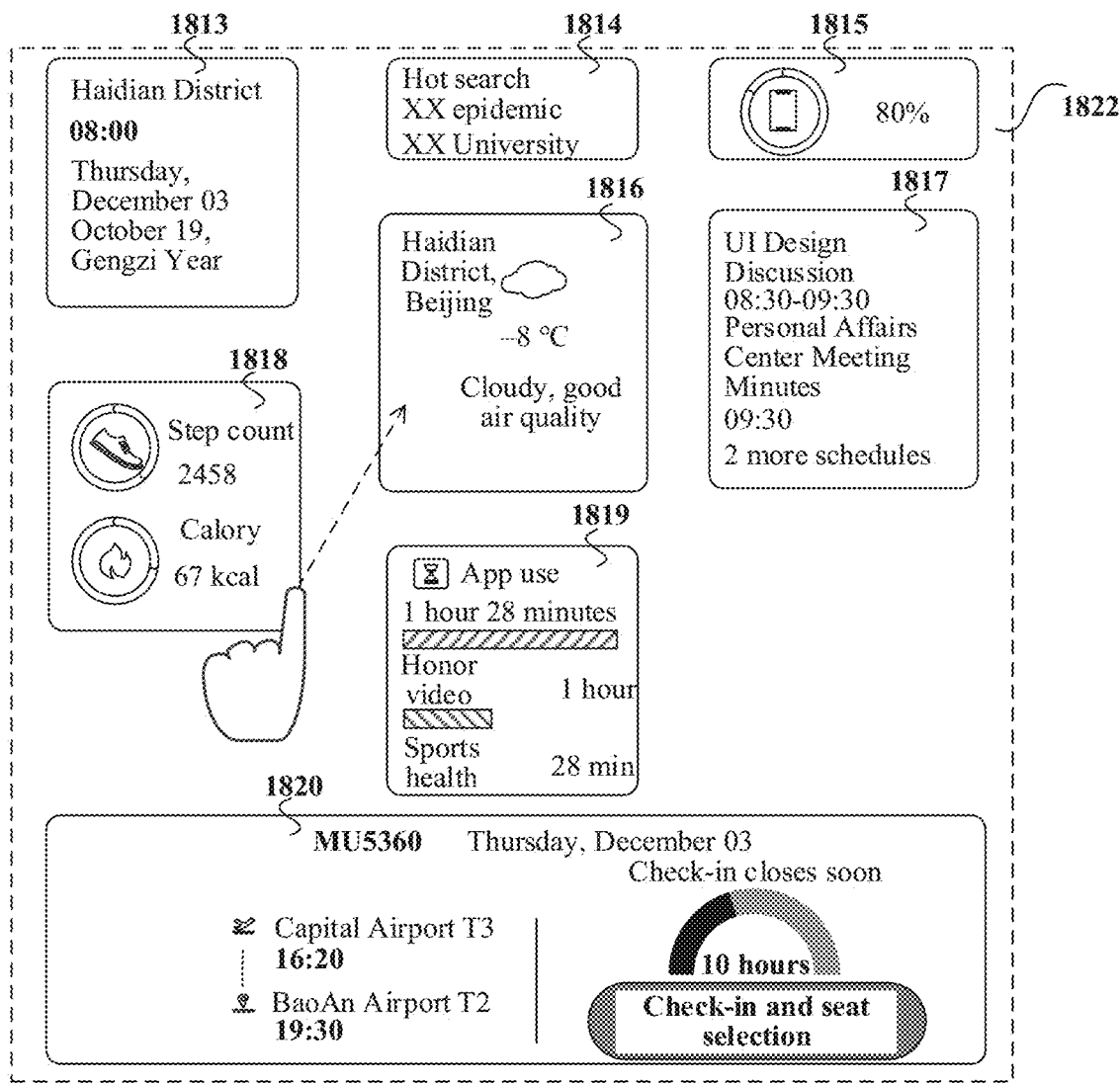
FIG. 27*a* to FIG. 27*c* are schematic diagrams of a group of user interfaces according to an embodiment of this application.
Figure 27B:
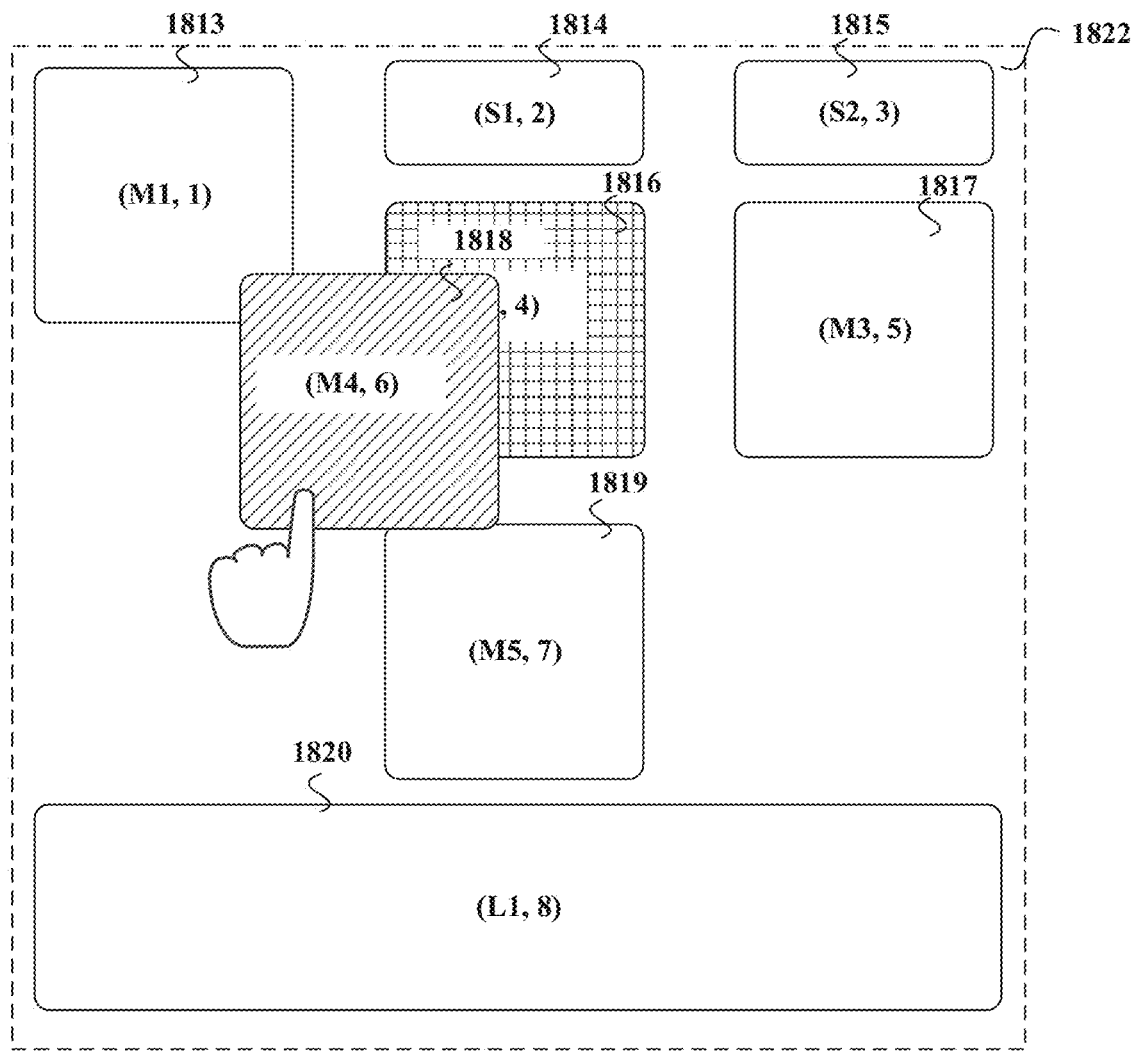
Figure 27C:
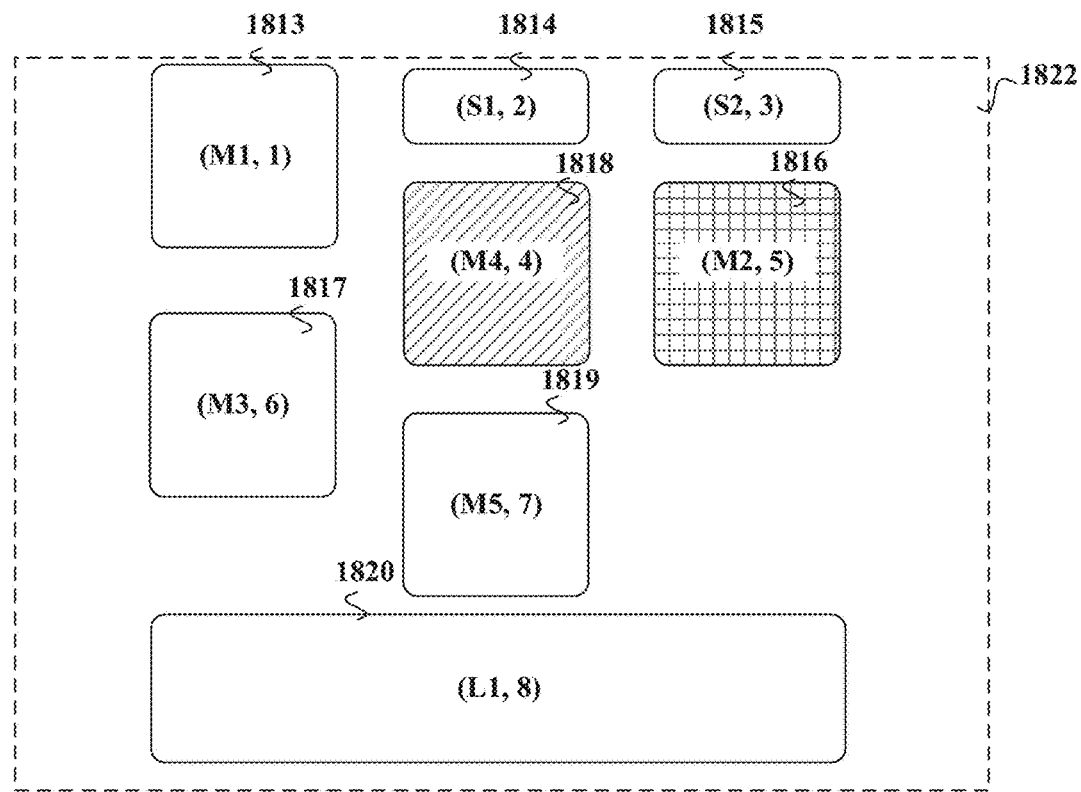

Referring to FIG. 27a to FIG. 27c, FIG. 27a to FIG. 27c show an example of arranging home screen cards in a home screen card region 1822 displayed on the inner screen of the electronic device 100.

S2602: The electronic device 100 moves a target home screen card in a direction corresponding to the home screen card adjustment operation in response to the operation of adjusting a home screen card.

As shown in FIG. 27a, FIG. 27a exemplarily shows a home screen card region 1822 displayed on the inner screen of the electronic device 100. The home screen card 1818 is a home screen card in the home screen card region 1822. The operation of adjusting a home screen card may be an action of instructing to move the home screen card 1818. As shown in FIG. 27b, for example, the operation of adjusting a home screen card may be: a user finger touches the display screen and then holds the home screen card 1818 (M4), the finger drives the home screen card 1818 (M4) to move toward the upper right, and the home screen card 1818 (M4) moves to the position of the home screen card 1816 (M2).

S2603: The electronic device 100 adjusts the rank order of the target home screen card in relation to other home screen cards when detecting that the target home screen card meets a preset condition in relation to other home screen cards during the movement of the target home screen card.

As shown in FIG. 27c, when the home screen card 1818 moves to the position of the home screen card 1816, the marking of the home screen card 1818 (M4) changes from (M4, 6) to (M4, 4), the marking of the home screen card 1816 (M2) changes from (M2, 4) to (M2, 5), and the marking of the home screen card 1817 (M3) changes from (M3, 5) to (M3, 6). The serial number in the marking is used for indicating the rank order of the home screen card in the home screen card region 1822. In this case, the electronic device 100 determines a new rank order of the home screen card in the home screen card region 1822, so that the home screen card 1818 (M4) is arranged ahead of the home screen card 1816 (M2), and the home screen card 1816 (M2) and the home screen card 1817 (M3) move backward in sequence.

In some embodiments of this application, the preset condition mentioned in FIG. 26 may include at least one of the following conditions:

Preset condition 1: During movement of a home screen card, the current home screen card moves to the target position, and the home screen cards between the current home screen card and the target position (including the home screen card at the target position) are rearranged to adjust the rank order of the home screen card based on a left-to-right and top-to-bottom sorting rule.

Preset condition 2: During movement of a home screen card, if the home screen card needs to cross a row region or column region formed by other home screen cards, when the home screen card moves to the row region or column region, the rank order of the home screen card in relation to some of the home screen cards that form the row region or column region may be adjusted, and then the rank order of the home screen card is adjusted based on the target position of the home screen card.

Preset condition 3: During movement of a relatively large home screen card, if a plurality of relatively small home screen cards exist at the target position of the relatively large home screen card, the relatively large home screen card and a plurality of relatively small home screen cards are simultaneously triggered to be rearranged, and therefore, the plurality of relatively small home screen cards are rearranged together as a whole in relation to the relatively large home screen card to adjust the rank order of the home screen card.

Preset condition 4: During movement of a home screen card, if three relatively small home screen cards that form a row region and one relatively large home screen card that forms a row region are simultaneously triggered to be rearranged, the three relatively small home screen cards that form a row region are rearranged together as a whole in relation to the relatively large home screen card that forms a row region to adjust the rank order of the home screen card.

Understandably, the items listed above are merely preset conditions to be possibly selected by a person skilled in the art during implementation of this embodiment of this application, and other types of preset conditions may still apply to this embodiment of this application.

The following describes a process of adjusting the rank order of a home screen card based on a preset condition during movement of different types of home screen cards in a plurality of scenarios according to an embodiment of this application.

Figure 28A:
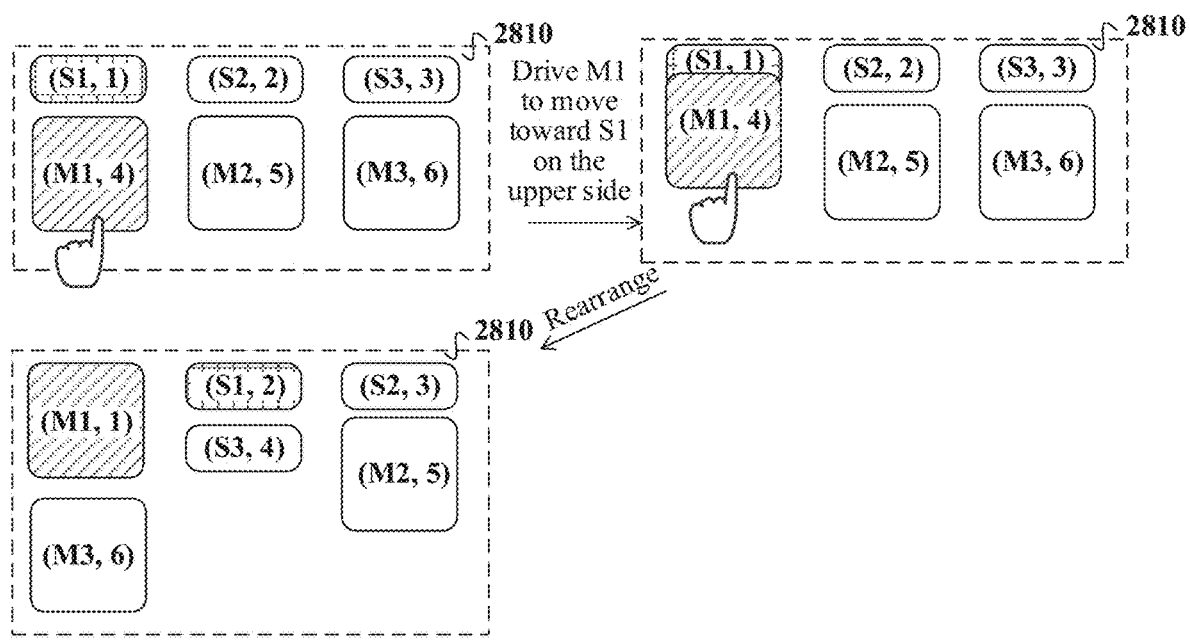
FIG. 28*a* to FIG. 28*c* are schematic diagrams of a group of user interfaces according to an embodiment of this application.
Figure 28B:
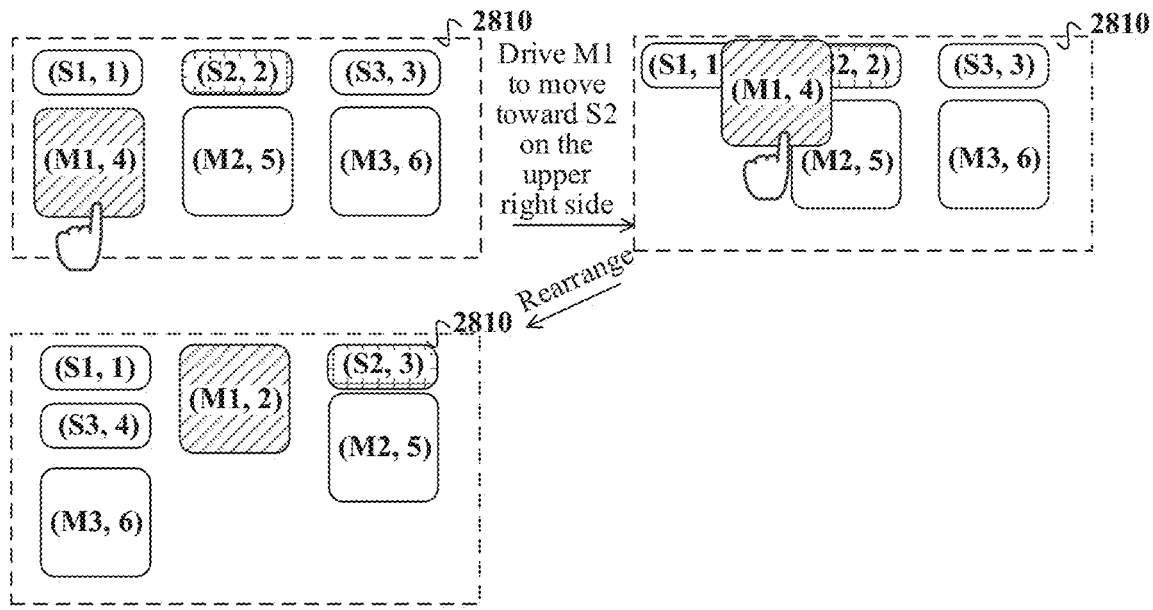
Figure 28C:
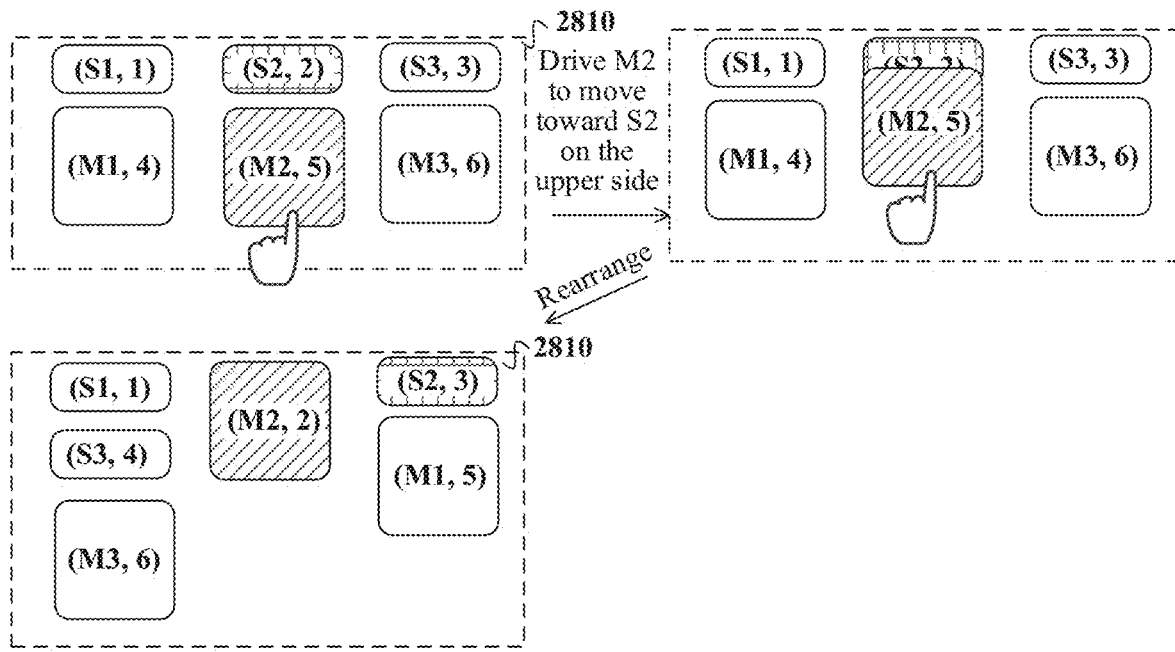

Referring to FIG. 28*a* to FIG. 28*c*, FIG. 28*a* to FIG. 28*c* show an example of adjusting the rank order of a home screen card in a home screen card region 2810 displayed on the inner screen of the electronic device 100.

As shown in FIG. 28*a*, FIG. 28*a* exemplarily shows a home screen card region 2810 displayed on the inner screen of the electronic device 100. In the home screen card region 2810, a home screen card S1, a home screen card S2, a home screen card S3, a home screen card M1, a home screen card M2, and a home screen card M3 are arranged in sequence. The electronic device 100 detects that a user finger selects M1 and drags M1 to swipe toward S1, that is, toward the upper side. When M1 reaches the position of S1, the electronic device 100 may re-determine a rank order between the home screen cards based on a left-to-right and top-to-bottom sorting rule. In the new rank order, M1 is arranged to the left side of S1, and S1 is still arranged ahead of S2. S3 is arranged under S1, and M2 and M3 are relocated rightward in sequence, so that M2 is arranged under S2, and M3 is arranged under M1. After the rearrangement, the home screen card M1, the home screen card S1, the home screen card S2, the home screen card S3, the home screen card M2, and the home screen card M3 are arranged in sequence.

As shown in FIG. 28*b*, FIG. 28*b* exemplarily shows a home screen card region 2810 displayed on the inner screen of the electronic device 100. In the home screen card region 2810, a home screen card S1, a home screen card S2, a home screen card S3, a home screen card M1, a home screen card M2, and a home screen card M3 are arranged in sequence. The electronic device 100 detects that a user finger selects M1 and drags M1 to swipe toward S2, that is, toward the upper right side. When M1 reaches the position of S2, the electronic device 100 may re-determine a rank order between the home screen cards based on a left-to-right and top-to-bottom sorting rule. In the new rank order, M1 is arranged to the right side of S1, and S2 is arranged to the right side of M1. S3 is arranged under S1, and M2 and M3 are relocated rightward in sequence, so that M2 is arranged under S2, and M3 is arranged under S3. After the rearrangement, the home screen card S1, the home screen card M1, the home screen card S2, the home screen card S3, the home screen card M2, and the home screen card M3 are arranged in sequence.

As shown in FIG. 28*c*, FIG. 28*c* exemplarily shows a home screen card region 2810 displayed on the inner screen of the electronic device 100. In the home screen card region 2810, a home screen card S1, a home screen card S2, a home screen card S3, a home screen card M1, a home screen card M2, and a home screen card M3 are arranged in sequence. The electronic device 100 detects that a user finger selects M2 and drags M2 to swipe toward S2, that is, toward the upper side. When M2 reaches the position of S2, the electronic device 100 may re-determine a rank order between the home screen cards based on a left-to-right and top-to-bottom sorting rule. In the new rank order, M2 is arranged to the right side of S1, and S2 is arranged to the right side of M2. S3 is arranged under S1, and M1 and M3 are relocated rightward in sequence, so that M1 is arranged under S2, and M3 is arranged under S3. After the rearrangement, the home screen card S1, the home screen card M2, the home screen card S2, the home screen card S3, the home screen card M1, and the home screen card M3 are arranged in sequence.

Referring to FIG. 29*a* to FIG. 29*c*, FIG. 28*a* to FIG. 28*c* show an example of adjusting the rank order of a home screen card in a home screen card region 2910 displayed on the inner screen of the electronic device 100.

Figure 29A:
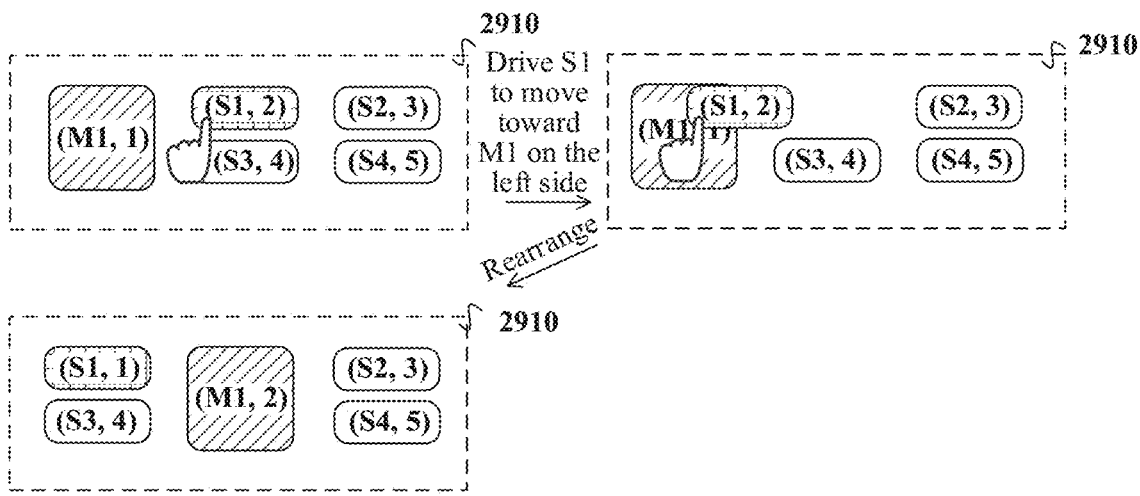
FIG. 29*a* to FIG. 29*c* are schematic diagrams of a group of user interfaces according to an embodiment of this application.

As shown in FIG. 29*a*, FIG. 28*a* exemplarily shows a home screen card region 2910 displayed on the inner screen of the electronic device 100. In the home screen card region 2910, a home screen card M1, a home screen card S1, a home screen card S2, a home screen card S3, and a home screen card S4 are arranged in sequence. The electronic device 100 detects that a user finger selects S1 and drags S1 to swipe toward M1, that is, toward the left side. When S1 reaches the position of M1, the electronic device 100 may re-determine a rank order between the home screen cards based on a left-to-right and top-to-bottom sorting rule. In the new rank order, S1 is arranged to the left side of M1, S2 is arranged to the right side of M1, and S3 is relocated leftward. In this way, S3 is arranged under S1, and S4 is arranged under S2. After the rearrangement, the home screen card S1, the home screen card M1, the home screen card S2, the home screen card S3, and the home screen card S4 are arranged in sequence.

Figure 29B:
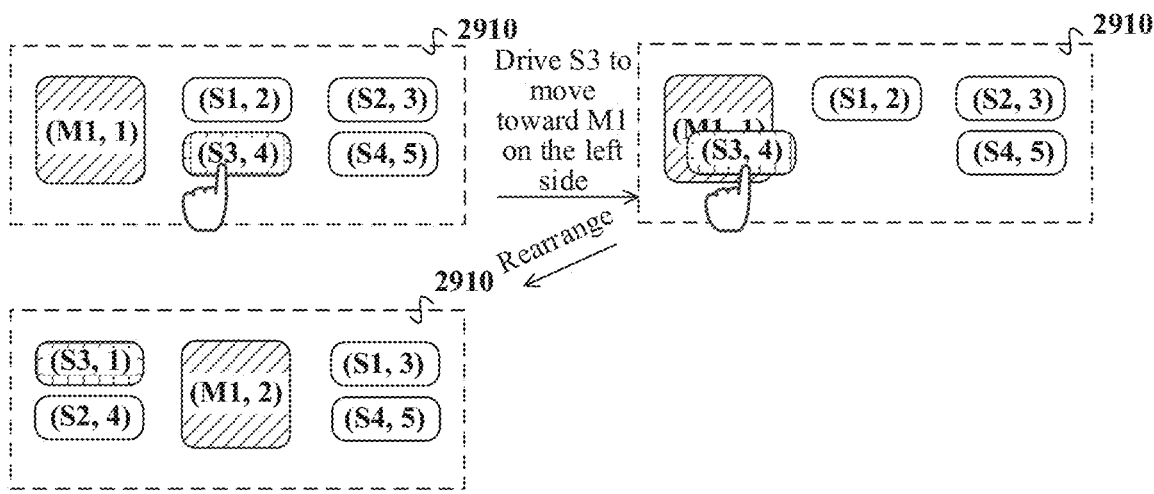

As shown in FIG. 29b, FIG. 29b exemplarily shows a home screen card region 2910 displayed on the inner screen of the electronic device 100. In the home screen card region 2910, a home screen card M1, a home screen card S1, a home screen card S2, a home screen card S3, and a home screen card S4 are arranged in sequence. The electronic device 100 detects that a user finger selects S3 and drags S3 to swipe toward M1, that is, toward the left side. When S3 reaches the position of M1, the electronic device 100 may re-determine a rank order between the home screen cards based on a left-to-right and top-to-bottom sorting rule. In the new rank order, S3 is arranged to the left side of M1, S1 is arranged to the right side of M1, and S2 is relocated leftward. In this way, S2 is arranged under S3, and S4 is arranged under S1. After the rearrangement, the home screen card S3, the home screen card M1, the home screen card S1, the home screen card S2, and the home screen card S4 are arranged in sequence.

Figure 29C:
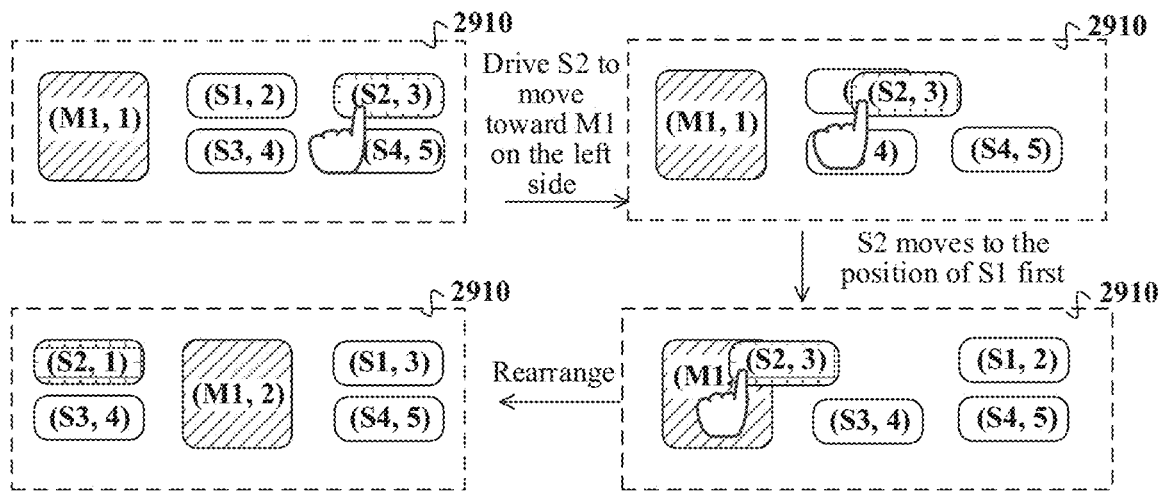

As shown in FIG. 29c, FIG. 29c exemplarily shows a home screen card region 2910 displayed on the inner screen of the electronic device 100. In the home screen card region 2910, a home screen card M1, a home screen card S1, a home screen card S2, a home screen card S3, and a home screen card S4 are arranged in sequence. The electronic device 100 detects that a user finger selects S2 and drags S2 to swipe toward M1, that is, toward the left side; and S2 needs to cross a column region formed by S1 and S3. When S2 passes through the column region formed by S1 and S3, the electronic device 100 may move S1 to the start position of S2 first based on a left-to-right and top-to-bottom sorting rule and the preset condition illustrated in FIG. 26. In this way, S1 is arranged to the right side of S2. When S2 reaches the position of M1, the electronic device 100 may re-determine a rank order between the home screen cards. In the new rank order, S2 is arranged to the left side of M1, S1 is arranged to the right side of M1, and S3 is relocated leftward. In this way, S3 is arranged under S2, and S4 is arranged under S1. After the rearrangement, the home screen card S2, the home screen card M1, the home screen card S1, the home screen card S3, and the home screen card S4 are arranged in sequence.

Figure 30A:
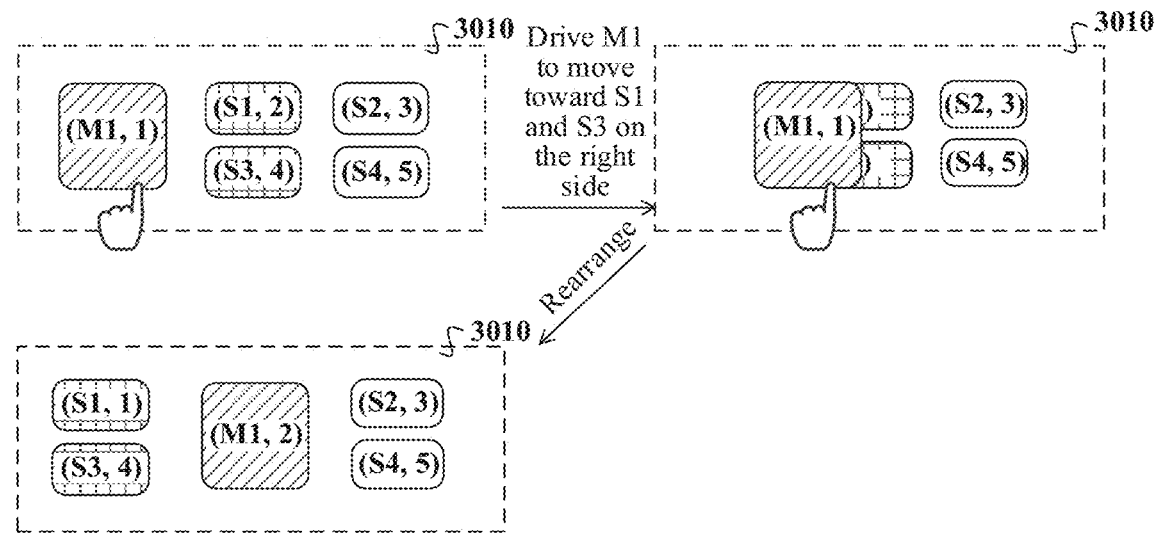
FIG. 30*a* to FIG. 30*b* are schematic diagrams of a group of user interfaces according to an embodiment of this application.
Figure 30B:
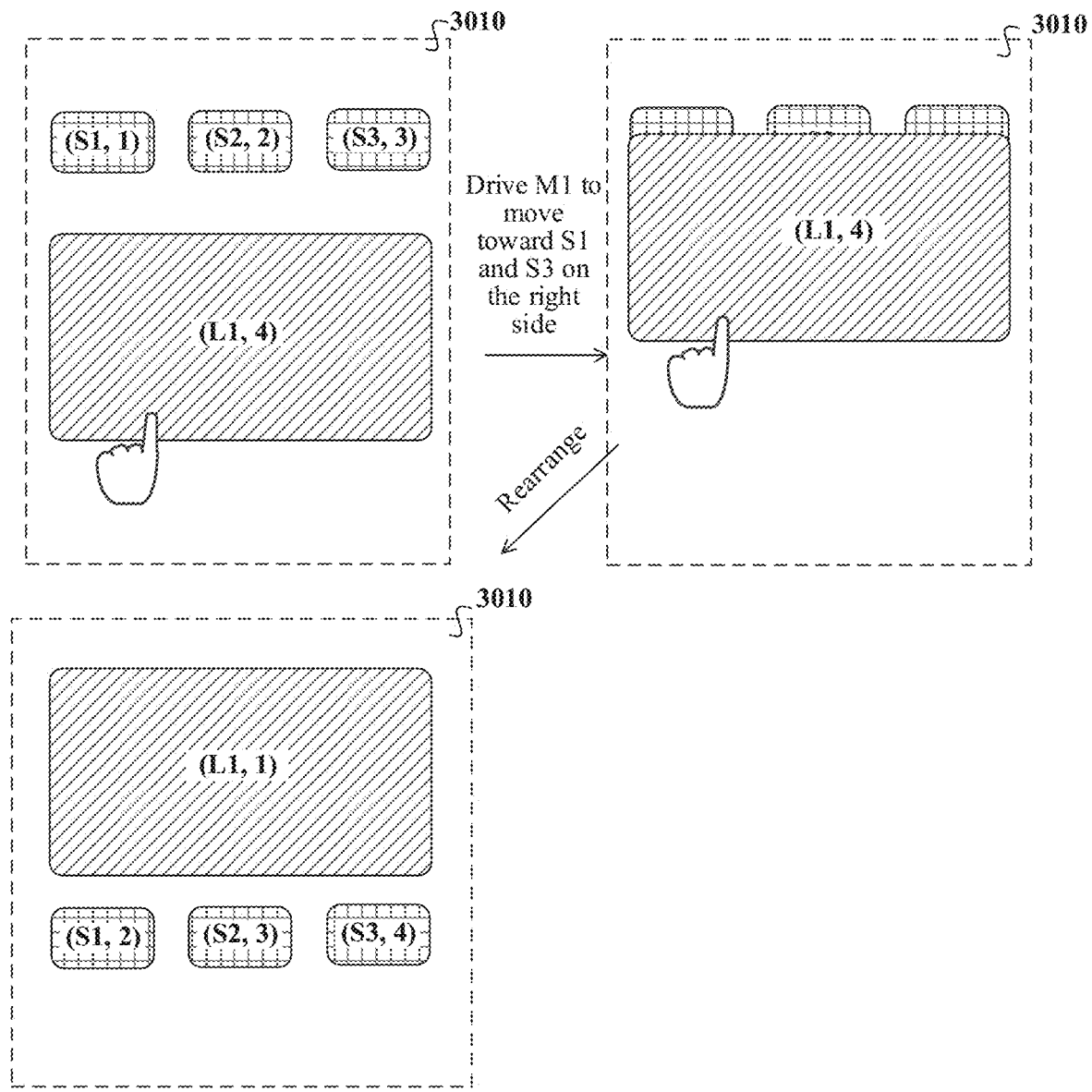

Referring to FIG. 30a to FIG. 30b, FIG. 30a to FIG. 30b show an example of adjusting the rank order of a home screen card in a home screen card region 2910 displayed on the inner screen of the electronic device 100.

As shown in FIG. 30a. FIG. 30a exemplarily shows a home screen card region 3010 displayed on the inner screen of the electronic device 100. In the home screen card region 3010, a home screen card M1, a home screen card S1, a home screen card S2, a home screen card S3, and a home screen card S4 are arranged in sequence. The electronic device 100 detects that a user finger selects M1 and drags M1 to swipe toward a column region formed by S1 and S3, that is, toward the right side. When M1 reaches the position of S1 and S3, the electronic device 100 may re-determine a rank order between the home screen cards based on a left-to-right and top-to-bottom sorting rule. In the new rank order, S1 and S3 are arranged to the left side of M1, and S2 and S4 are arranged to the right side of M1. Evidently, the column region formed by S1 and S3 can be moved together as a whole to the original position of M1. In this way, S3 is arranged under S1, and S4 is arranged under S2. After the rearrangement, the home screen card S1, the home screen card M1, the home screen card S2, the home screen card S3, and the home screen card S4 are arranged in sequence.

As shown in FIG. 30b, FIG. 30b exemplarily shows a home screen card region 3010 displayed on the inner screen of the electronic device 100. In the home screen card region 3010, a home screen card S1, a home screen card S2, a home screen card S3, and a home screen card L1 are arranged in sequence. The electronic device 100 detects that a user finger selects L1 and drags M1 to swipe toward a row region formed by S1, S2, and S3, that is, toward the upper side. When L1 reaches the position of S1, S2, and S3, the electronic device 100 may re-determine a rank order between the home screen cards based on a left-to-right and top-to-bottom sorting rule. In the new rank order, the row region formed by S1, S2, and S3 may be moved together as a whole to the original position of L1. In this way, S1, S2, and S3 are arranged under L1; and S1, S2, and S3 are arranged in sequence. After the rearrangement, the home screen card L1, the home screen card S1, the home screen card S2, and the home screen card S3 are arranged in sequence.

Understandably, for an XL-type card, the XL-type card is the same as the L-type card in width. Therefore, the preset condition and sorting rule applicable to the L-type card are also applicable to the XL-type card.

Understandably, although the terms such as "first" and "second" may be used herein to describe various features, the features are not limited by the terms. The terms are merely intended for a purpose of differentiation, but not intended as an indication or implication of relative importance of the features. For example, to the extent not departing from the scope of the embodiments of this application, a first feature may also be referred to as a second feature, and similarly, a second feature may also be referred to as a first feature.

In addition, various operations are described as a plurality of discrete operations in a manner that makes the illustrative embodiments most easily comprehensible. However, the order described herein is never to be construed as to imply that the operations are necessarily dependent on the described order. Many of such operations may be performed in parallel, concurrently, or simultaneously. In addition, the sequence of various operations may be rearranged. Upon completion of a described operation, the processing may be terminated, but without excluding additional operations not included in the drawings. The processing may correspond to a method, a function, a procedure, a subroutine, or the like.

References to "an embodiment", "embodiment", "illustrative embodiment", and the like in the specification mean that the described embodiment may include a specific feature, structure, or characteristic, but each embodiment may include, but not necessarily, the specific feature, structure, or characteristic. In addition, such phrases do not necessarily refer to the same embodiment. Further, when a particular feature is described with reference to a specific embodiment, the knowledge of a person skilled in the art can affect the combination of the feature with other embodiments, whether or not the embodiments are explicitly described.

Unless otherwise specified in the context, the terms "include", "comprise", and "contain" are synonyms. The expression "A/B" represents A or B. The expression "A and/or B" means "A alone, B alone, or both A and B".

As used herein, the term "module" may represent, as a part thereof, or include: a memory (shared, dedicated, or grouped), an application-specific integrated circuit (ASIC), an electronic circuit and/or processor (shared, dedicated, or grouped), or a combined logic circuit, which, in each case, is configured to execute one or more software or firmware programs; and/or other appropriate components that provide such functions.

In the drawings, some structures or method features may be shown in a particular arrangement and/or order. However, understandably, no such particular arrangement and/or order is mandatory. Rather, in some embodiments, such features may be described in a different manner and/or order than shown in the illustrative drawings. In addition, the inclusion of structures or method features in a particular drawing does not imply that all embodiments need to include such features. In some embodiments, such features are not necessarily included, or such features may be combined with other features.

Although some embodiments of this application have been described in detail above with reference to drawings, the use of the technical solutions of this application is not limited to various applications mentioned in the embodiments of this application. Various structures and variations can be easily made with reference to the technical solutions hereof to achieve various beneficial effects mentioned herein. Variations made to the embodiments of this application by a person of ordinary skill in the art without departing from the conception of this application still fall within the scope of this application.

What is claimed is:

1. A method, comprising:
   detecting a first operation when a plurality of cards are displayed on a second screen of an electronic device in a stacked manner;
   displaying, on a first screen of the electronic device in response to the first operation, the plurality of cards displayed on the second screen, wherein a first part of cards and a second part of cards among the plurality of cards are displayed in different positions on the first screen;
   displaying the plurality of cards on the second screen in a stacked manner based on a priority of the plurality of cards, with a first card displayed on top; and
   displaying the second part of cards on the first screen in a stacked manner based on the priority,
   wherein the first screen is larger than the second screen,
   wherein the first part of cards comprises the first card, and
   wherein the second part of cards comprises a second card other than a card of top priority among the plurality of cards on a first layer in response to the first operation.

2. The method of claim 1, wherein the first screen is a foldable screen, the first screen is in a folded state when the plurality of cards are displayed on the second screen in a stacked manner, and being in the folded state means that an angle between a first sub-screen and a second sub-screen of the first screen is smaller than a first preset angle.

3. The method of claim 1, wherein the first operation is an operation to unfold an angle between a first sub-screen and a second sub-screen of the first screen to an angle larger than a first preset angle.

4. The method of claim 3, wherein when the first screen is in an unfolded state, the first screen is disposed opposite to the second screen, and the first screen and the second screen are located on different sides of the electronic device.

5. The method of claim 1, further comprising: detecting a second operation; and displaying, on the second screen in response to the second operation, the first part of cards and second part of cards displayed on the first screen, wherein the first part of cards and the second part of cards are displayed in an identical position on the second screen in a stacked manner based on the priority.

6. The method of claim 1, further comprising: detecting a second operation; and displaying, on the second screen in response to the second operation, the first part of cards and second part of cards displayed on the first screen, wherein the first part of cards and the second part of cards are displayed in an identical position on the second screen in a stacked manner, and wherein the second card or the first card is displayed on the first layer.

7. The method of claim 1, further comprising: receiving a third operation on the second part of cards; displaying a third card on the first layer of the second part of cards in response to the third operation; detecting a second operation; and displaying, on the second screen in response to the second operation, the first part of cards and second part of cards displayed on the first screen, wherein the first part of cards and the second part of cards are displayed in an identical position on the second screen in a stacked manner, and the third card is displayed on the first layer.

8. The method of claim 5, wherein the second operation is an operation to fold an angle between a first sub-screen and a second sub-screen of the first screen to an angle smaller than a second preset angle.

9. The method of claim 1, wherein the priority of the plurality of cards depends on a comparison between time information or location information comprised in the plurality of cards and current time information or current location information of the electronic device.

10. The method of claim 1, wherein the preset condition is a rank order preset for the plurality of cards during creation or modification of the plurality of cards.

11. An electronic device, comprising:
    a first screen;
    a second screen, wherein the first screen is larger than the second screen;
    one or more processors coupled to the first and second screens; and
    one or more memories coupled to the one or more processors and configured to store instructions that, when executed by the one or more processors, cause the electronic device to be configured to:
    detect a first operation when a plurality of cards are displayed on the second screen in a stacked manner;
    display, on the first screen in response to the first operation, the plurality of cards displayed on the second screen, wherein a first part of cards and a second part of cards among the plurality of cards are displayed in different positions on the first screen;
    display the plurality of cards on the second screen in a stacked manner based on a priority of the plurality of cards, with a first card displayed on top; and
    display the second part of cards on the first screen in a stacked manner based on the priority,
    wherein the first part of cards comprises the first card, and
    wherein the second part of cards comprises a second card other than a card of top priority among the plurality of cards on a first layer in response to the first operation.

12. The electronic device of claim 11, wherein the first screen is a foldable screen, the first screen is in a folded state when the plurality of cards are displayed on the second screen in a stacked manner, and being in the folded state means that an angle between a first sub-screen and a second sub-screen of the first screen is smaller than a first preset angle.

13. The electronic device of claim 11, wherein the first operation is an operation to unfold an angle between a first sub-screen and a second sub-screen of the first screen to an angle larger than a first preset angle.

14. The electronic device of claim 13, wherein when the first screen is in an unfolded state, the first screen is disposed opposite to the second screen, and the first screen and the second screen are located on different sides of the electronic device.

15. The electronic device of claim 11, wherein the electronic device is further configured to:
   detect a second operation; and
   display, on the second screen in response to the second operation, the first part of cards and second part of cards displayed on the first screen, wherein the first part of cards and the second part of cards are displayed in an identical position on the second screen in a stacked manner based on the priority.

16. The electronic device of claim 15, wherein the second operation is an operation to fold an angle between a first sub-screen and a second sub-screen of the first screen to an angle smaller than a second preset angle.

17. The electronic device of claim 11, wherein the electronic device is further configured to:
   detect a second operation; and
   display, on the second screen in response to the second operation, the first part of cards and second part of cards displayed on the first screen, wherein the first part of cards and the second part of cards are displayed in an identical position on the second screen in a stacked manner, and wherein the second card or the first card is displayed on the first layer.

18. The electronic device of claim 11, wherein the electronic device is further configured to:
   receive a third operation on the second part of cards;
   display a third card on the first layer of the second part of cards in response to the third operation;
   detect a second operation; and
   display, on the second screen in response to the second operation, the first part of cards and second part of cards displayed on the first screen, wherein the first part of cards and the second part of cards are displayed in an identical position on the second screen in a stacked manner, and the third card is displayed on the first layer.

19. The electronic device of claim 11, wherein the priority of the plurality of cards depends on a comparison between time information or location information comprised in the plurality of cards and current time information or current location information of the electronic device.

20. The electronic device of claim 11, wherein the preset condition is a rank order preset for the plurality of cards during creation or modification of the plurality of cards.

* * * * *